United States Patent
Himeno et al.

(10) Patent No.: US 8,974,983 B2
(45) Date of Patent: Mar. 10, 2015

(54) ELECTRICAL CONDUCTIVE MEMBER AND POLYMER ELECTROLYTE FUEL CELL USING THE SAME

(75) Inventors: Tomokatsu Himeno, Yokohama (JP); Atsushi Miyazawa, Kamakura (JP); Motoki Yaginuma, Yokohama (JP); Keisuke Yamamoto, Chigasaki (JP); Keiji Okada, Yokohama (JP); Tsutomu Yamazaki, Yokohama (JP); Yasuhiro Numao, Yokosuka (JP); Toshihiko Tsuda, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 504 days.

(21) Appl. No.: 13/130,979

(22) PCT Filed: Oct. 20, 2009

(86) PCT No.: PCT/JP2009/068048
§ 371 (c)(1),
(2), (4) Date: Aug. 4, 2011

(87) PCT Pub. No.: WO2010/061696
PCT Pub. Date: Jun. 3, 2010

(65) Prior Publication Data
US 2011/0287336 A1    Nov. 24, 2011

(30) Foreign Application Priority Data

Nov. 25, 2008 (JP) ............... P2008-300133
Nov. 26, 2008 (JP) ............... P2008-301309
Nov. 27, 2008 (JP) ............... P2008-303217
Nov. 27, 2008 (JP) ............... P2008-303219
Nov. 27, 2008 (JP) ............... P2008-303223
Jun. 15, 2009 (JP) ............... P2009-142600

(51) Int. Cl.
*H01M 8/10*    (2006.01)
*H01M 8/02*    (2006.01)
*H01M 8/08*    (2006.01)
*H01M 8/12*    (2006.01)
*H01M 8/14*    (2006.01)

(52) U.S. Cl.
CPC .......... *H01M 8/0213* (2013.01); *H01M 8/0228* (2013.01); *H01M 8/0254* (2013.01);
(Continued)

(58) Field of Classification Search
None
See application file for complete search history.

(56) References Cited

U.S. PATENT DOCUMENTS

| | | |
|---|---|---|
| 5,747,185 A | 5/1998 | Hsu |
| 2008/0160390 A1 | 7/2008 | Nakata |
| 2008/0299374 A1 | 12/2008 | Choi et al. |

FOREIGN PATENT DOCUMENTS

| | | |
|---|---|---|
| EP | 2020400 (A) | 2/2009 |
| JP | 63-102167 A | 5/1988 |

(Continued)

OTHER PUBLICATIONS

Japanese Office Action of Japanese Application No. 2009-142600 Sep. 17, 2013, 5 pages.

Primary Examiner — Patrick Ryan
Assistant Examiner — Carmen Lyles-Irving
(74) Attorney, Agent, or Firm — Foley & Lardner LLP

(57) ABSTRACT

An electrical conductive member includes: an electrical conductive structure including: a substrate; an electrical conductive carbon layer provided on at least one surface of the substrate and containing electrical conductive carbon; and a middle layer interposed between the substrate and the electrical conductive carbon layer. An intensity ratio R ($I_D/I_G$) of a D-band peak intensity ($I_D$) to a G-band peak intensity ($I_G$) measured by a Raman scattering spectroscopic analysis in the electrical conductive carbon layer is between 1.4 and 1.9.

14 Claims, 40 Drawing Sheets

(52) U.S. Cl.
CPC .............. *H01M 8/083* (2013.01); *H01M 8/086* (2013.01); *H01M 2008/1095* (2013.01); *H01M 2008/1293* (2013.01); *H01M 2008/147* (2013.01); *Y02E 60/50* (2013.01); *Y02E 60/525* (2013.01); *Y02E 60/526* (2013.01)
USPC ........................... 429/492; 429/479; 429/521

(56) References Cited

FOREIGN PATENT DOCUMENTS

| | | |
|---|---|---|
| JP | 10-87396 (A) | 4/1998 |
| JP | 11-49506 (A) | 2/1999 |
| JP | 2000-67881 (A) | 3/2000 |
| JP | 2002-327271 (A) | 11/2002 |
| JP | 2004-185998 (A) | 7/2004 |
| JP | 2006-286457 (A) | 10/2006 |
| JP | 2007-134107 (A) | 5/2007 |
| JP | 2007-165275 (A) | 6/2007 |
| JP | 2007-207718 (A) | 8/2007 |
| JP | 2008-4540 (A) | 1/2008 |
| JP | 2008-41253 (A) | 2/2008 |
| JP | 2008-153200 (A) | 7/2008 |
| JP | 2008-222545 (A) | 9/2008 |
| JP | 2009-238497 (A) | 10/2009 |
| RU | 2 172 543 C2 | 8/2001 |
| RU | 2319256 C1 | 3/2008 |

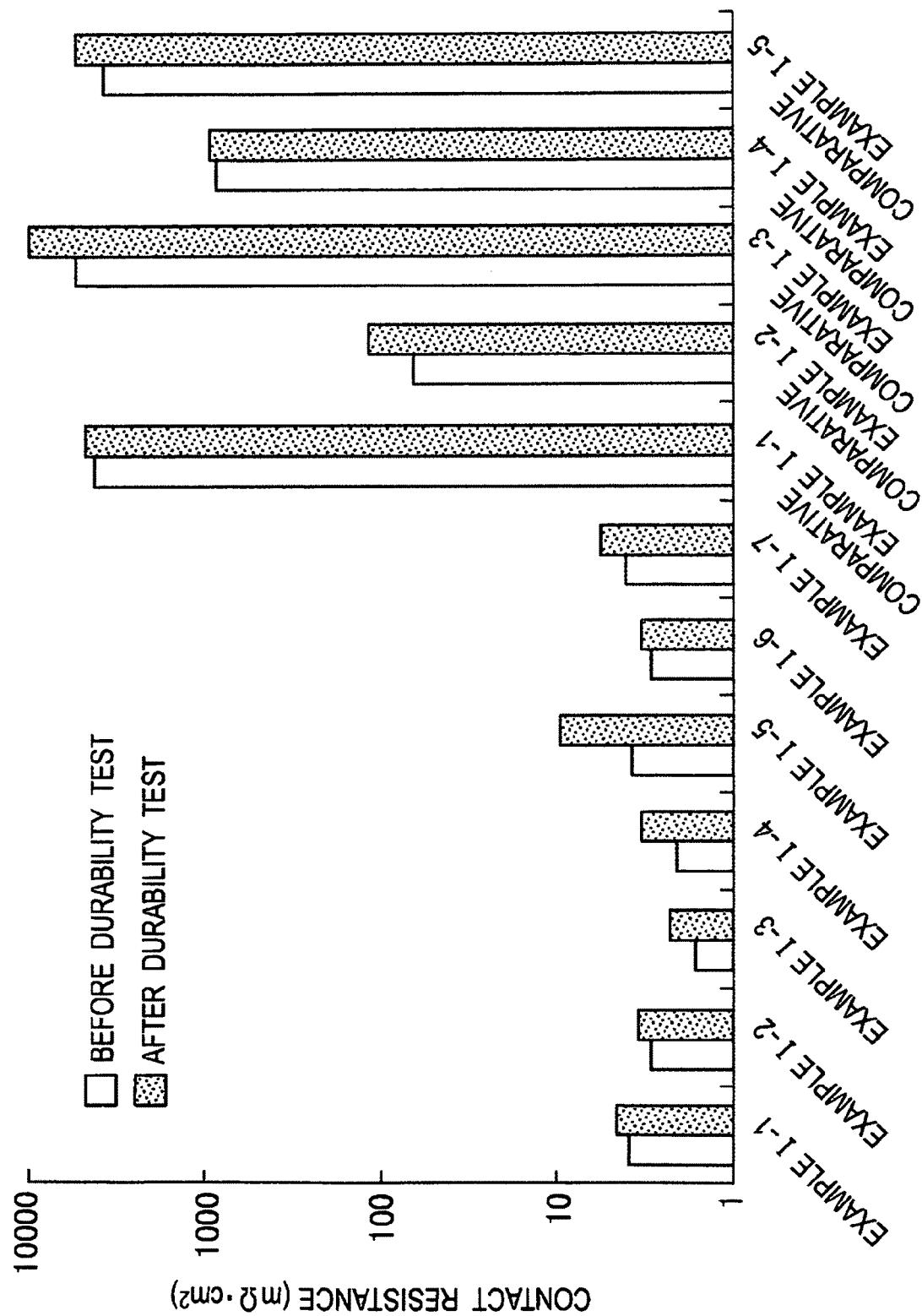

FIG. 15
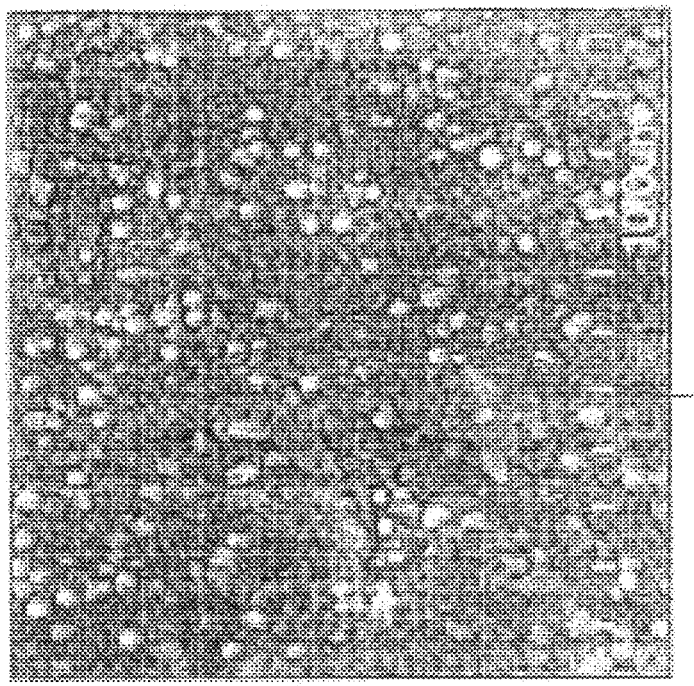
(b)
EXAMPLE I-8
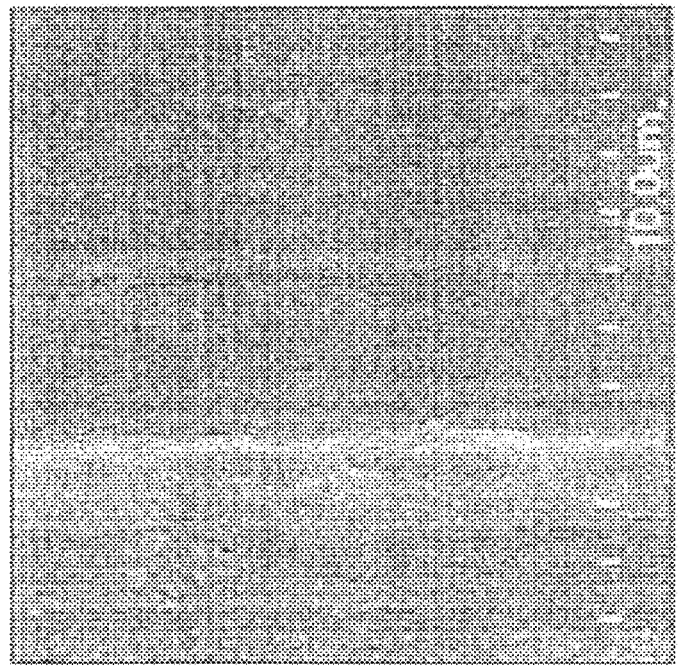
(a)
EXAMPLE I-9
SEM OBSERVATION (SURFACE)

GRANULAR COMPOSITION

PLATING Cr FILM
(DENSE BARRIER LAYER)

SPUTTERING Cr FILM
(MIDDLE LAYER)

ELECTRICAL CONDUCTIVE MEMBER AND POLYMER ELECTROLYTE FUEL CELL USING THE SAME

TECHNICAL FIELD

The present invention relates to an electrical conductive member and a polymer electrolyte fuel cell using the electrical conductive member.

BACKGROUND ART

A polymer electrolyte fuel cell (PEFC) has a stacked structure constituted by a plurality of single cells that have a power generation function. Each of single cells has a membrane electrode assembly (MEA) including (a) a polymer electrolyte membrane, (b) a pair of catalyst layers to interpose the polymer electrolyte membrane therebetween, and (c) a pair of gas diffusion layers (GDL) to disperse supply gas. The MEA in one single cell is electrically connected to another MEA in an adjacent single cell via a separator. Then, a fuel cell stack is constituted by a plurality of the single cells that are stacked on top of each other. The fuel cell stack thus obtained functions as a power generation means available for various purposes. In the fuel cell stack, a separator functions to electrically connect the adjacent single cells to each other, as described above. In addition, the surface of the separator facing the MEA is generally provided with a gas flow path. Such a gas flow path functions as a gas supply means to supply fuel gas and oxidant gas to an anode and a cathode, respectively.

The following is a simple explanation of a power generation mechanism of the PEFC. At the time of the operation of the PEFC, fuel gas (such as hydrogen gas) is supplied to an anode side, and oxidant gas (such as air and oxygen) is supplied to a cathode side. As a result, electrochemical reactions represented by the following reaction formulae proceed at the anode and cathode sides, respectively, so as to generate electricity.

[Math 1]

Anode reaction: $H_2 \rightarrow 2H^+ + 2e^-$     (1)

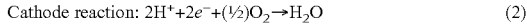

Cathode reaction: $2H^+ + 2e^- + (\frac{1}{2})O_2 \rightarrow H_2O$     (2)

As a material constituting a separator for a fuel cell required to have electrical conductivity, metal, carbon and electrical conductive resin are conventionally used. Among those materials, a separator constituted by carbon or electrical conductive resin is required to be relatively thick in order to maintain a certain level of intensity of the separator after the formation of a gas flow path formed thereon. Accordingly, the total thickness of a fuel cell stack using such a separator becomes thicker. The increase in thickness of the stack is not preferable since a compactification of the PEFC for a vehicle is required.

On the other hand, a separator constituted by metal has relatively high intensity. Therefore, a thickness of the metal separator can be reduced to some extent. In addition, due to excellent electrical conductivity, there is an advantage of decreasing a contact resistance to the MEA by using the metal separator. However, such a metal separator has possibilities of a decrease in electrical conductivity caused by corrosion, and also a power reduction derived from the decrease in electrical conductivity. Consequently, the metal separator is required to have improved resistance to corrosion while excellent electrical conductivity is ensured.

Patent Literature 1 discloses a technique to form a metal layer such as Ti and a carbide layer thereof on one surface of a metal substrate of a metal separator, followed by forming a carbon layer constituted by graphitized carbon on the metal layer and the carbide layer.

Patent Literature 2 discloses a technique to form an oxide film of a substrate of a metal separator between the substrate and an electrical conductive thin film so as to form a middle layer constituted by metal elements or metalloid elements.

Patent Literature 3 discloses a separator in which a carbon-based film containing a composite metal oxide is formed on a substrate.

CITATION LIST

Patent Literature

Patent Literature 1: Japanese Patent Unexamined Publication No. 2006-286457
Patent Literature 2: Japanese Patent Unexamined Publication No. 2004-185998
Patent Literature 3: Japanese Patent Unexamined Publication No. 2007-134107

SUMMARY OF INVENTION

Conventional fuel cell separators include carbon layers having various crystal structures. Therefore, corrosion resistance and electrical conductivity of the separators also vary depending on the crystal structures of the carbon layers of each separator. In any cases, the conventional separators are still not sufficient to ensure corrosion resistance and/or electrical conductivity even if those separators are subjected to a surface treatment such as a provision of the carbon layer. In Patent Literature 2, an oxide film provided on a surface of a substrate is a layer with high electrical isolation. Therefore, electrical conductivity in a thickness direction of a separator is decreased. With regard to the technique described in Patent Literature 3, since a metal oxide included in a carbon film has electrical isolation, electrical conductivity in a thickness direction of a separator is decreased, or a contact resistance to a gas diffusion layer is increased.

The present invention has been devised in view of such conventional problems. It is an object of the present invention to provide an electrical conductive member that has improved resistance to corrosion while excellent electrical conductivity is ensured sufficiently, a method for manufacturing the electrical conductive member, and a polymer electrolyte fuel cell using the electrical conductive member.

An electrical conductive member according to a first aspect of the present invention comprises: an electrical conductive structure comprising: a substrate; an electrical conductive carbon layer provided on at least one surface of the substrate and containing electrical conductive carbon; and a middle layer interposed between the substrate and the electrical conductive carbon layer. An intensity ratio R ($I_D/I_G$) of a D-band peak intensity ($I_D$) to a G-band peak intensity ($I_G$) measured by a Raman scattering spectroscopic analysis in the electrical conductive carbon layer is 1.3 or more.

A polymer electrolyte fuel cell according to a second aspect of the present invention includes the electrical conductive member.

BRIEF DESCRIPTION OF DRAWINGS

FIG. 12A is a graph showing a measurement result of a contact resistance before and after an immersion test for electrical conductive members prepared in Examples I-1 to I-7 and Comparative Examples I-1 to I-5.

FIGS. 15a and 15b are SEM photographs observing surfaces of Example I-9 and Example I-8.

DESCRIPTION OF EMBODIMENTS

First Embodiment

Figure 1:
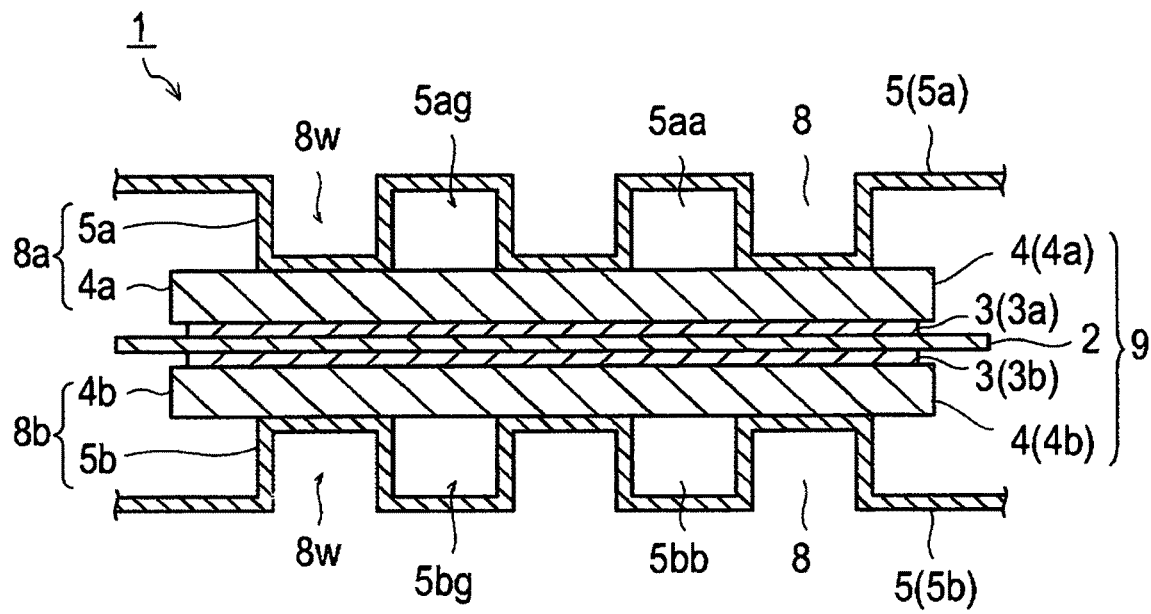
FIG. 1 is a schematic cross-sectional view showing a fundamental constitution of a cell unit of a polymer electrolyte fuel cell using an electrical conductive member (separator) according to a first embodiment.

The following is a description of an electrical conductive member, a method for manufacturing the electrical conductive member, and a polymer electrolyte fuel cell according to the first embodiment of the present invention with reference to the drawings. Note that, the present invention is not limited only to the following embodiment. In the drawings, dimensional ratios are magnified for the convenience of explanation of the present invention, and may be different from the actual ratios.

An electrical conductive member (electrical conductive structure) according to the present embodiment includes a metal substrate, and an electrical conductive carbon layer that contains electrical conductive carbon and is provided on at least one surface of the metal substrate. An intensity ratio R ($I_D/I_G$) of a peak intensity ($I_D$) of D-band to a peak intensity ($I_G$) of G-band of the electrical conductive carbon layer, which is measured by a Raman scattering spectroscopic analysis, is 1.3 or more. The electrical conductive member according to the present embodiment is preferably provided with the metal substrate, and a middle layer that is provided on the metal substrate and covered with the electrical conductive carbon layer. Preferably, the middle layer has a columnar structure, and the electrical conductive member is provided with protruded grains on an outermost surface thereof.

Conventional fuel cell separators included electrical conductive carbon layers having various crystal structures. Therefore, corrosion resistance and electrical conductivity of the separators also vary depending on each crystal structure of the carbon layers of the separators. In other words, it is difficult to stably control a fuel cell. In any cases, conventionally provided metal separators were not sufficient to ensure resistance to corrosion and/or electrical conductivity for practical use even if the separators were subjected to a surface treatment such as a provision of the electrical conductive carbon layer. Moreover, when an electrical conductive carbon film was formed on a substrate of the metal separator, even if a middle layer such as a metal layer and a carbide layer thereof was provided in order to ensure adhesion, the middle layer was not subjected to a crystal structure control. Therefore, since an anticorrosion property of the substrate and a densification of the electrical conductive carbon film were not sufficient, water molecules infiltrated the metal substrate. As a result, a promotion of corrosion of the substrate caused a problem of an increase in contact resistance. As described in Patent Literature 2, an oxide film provided on a surface of a substrate is a layer with high electrical isolation. Therefore, there is a problem of decreasing electrical conductivity in a thickness direction of a separator.

In view of these problems, when a metal separator (electrical conductive member) uses a metal substrate such as aluminum that is easily corroded, the present embodiment provides thick columnar structure crystals in a middle layer as a way to enhance an anticorrosion function of the separator. As one characteristic when employing such crystals, the middle layer and also an outermost surface of the electrical conductive member have a protruded configuration. Meanwhile, a conventional manufacturing method does not provide a protruded configuration in a separator.

The present invention is a breakthrough technique capable of reducing gaps and cracks in the electrical conductive carbon layer. In addition, the presence of protruded grains in the outermost surface is derived from the growth of a column diameter of the columnar structure in the middle layer. Therefore, the number of gaps in the outermost layer is reduced, so as to provide a function to prevent water intrusion. Accordingly, an anticorrosion effect of the metal substrate can be enhanced, and the metal substrate can be applied stably as a substrate for the separator over a long period of time even when metal such as aluminum that is lightweight and inexpensive but is easily corroded is employed. Namely, by having a larger column diameter of the columnar structure in the middle layer, cracks of the electrical conductive carbon film caused in gaps of the middle layer and on the middle layer can be reduced and water intrusion can be prevented, so as to inhibit oxidation at each interface and also inhibit an increase in contact resistance. The columnar structure in the middle layer is preferably constituted by columnar crystals. In the following explanation, although the columnar crystals are used for the columnar structure in the middle layer as a best substance, the present invention is not limited only to the columnar crystals, and other configurations applied to the columnar structure can be conceivable.

Figure 2:
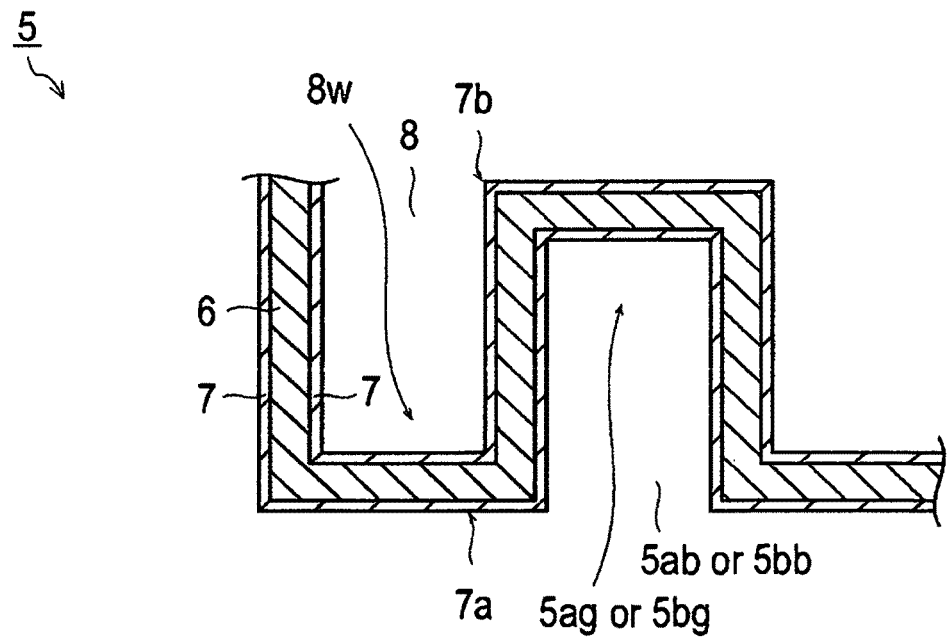
FIG. 2 is a cross-sectional view typically showing a constitution of a metal substrate of the separator of FIG. 1 and a processed layer formed on the substrate.

FIG. 1 is a cross-sectional view typically showing a fundamental constitution of a fuel cell using a metal separator as one example of the electrical conductive member according to the present embodiment, more specifically, showing a fundamental constitution of a cell unit of a polymer electrolyte fuel cell (PEFC). FIG. 2 is a partial cross-sectional view schematically showing a layer formed on a surface of a substrate of the metal separator of FIG. 1.

A cell unit 1 of a fuel cell (PEFC) shown in FIG. 1 has a polymer electrolyte membrane 2, and a pair of catalyst layers 3 (anode catalyst layer 3a and cathode catalyst layer 3b) provided on both surfaces of the polymer electrolyte membrane 2 to interpose therebetween. A stacked body constituted by the polymer electrolyte membrane 2 and the catalyst layers 3 (3a, 3b) is interposed between a pair of gas diffusion layers 4 (anode gas diffusion layer 4a and cathode gas diffusion layer 4b). Thus, the polymer electrolyte membrane 2, the pair of the catalyst layers 3 (3a, 3b) and the pair of the gas diffusion layers 4 (4a, 4b) are stacked to constitute a membrane electrode assembly (MEA) 9.

In the cell unit 1 of the PEFC, the MEA 9 is further interposed between a pair of metal separators 5 (anode separator 5a and cathode separator 5b) having electrical conductivity so as to constitute the cell unit 1. FIG. 1 shows the metal separators 5a and 5b provided on both sides of the MEA 9. Note that, a stack in which a plurality of the MEAs 9 are stacked commonly uses the metal separators 5 that are also used as metal separators for adjacent PEFCs (see FIGS. 13 and 14). In other words, a fuel cell stack is constituted in such a manner that the MEAs 9 are sequentially stacked via the metal separators 5. In an actual fuel cell stack, gas seal members are provided between the metal separators 5a and 5b and the polymer electrolyte membrane 2, and between the cell unit 1 and the adjacent cell unit 1. However, such gas seal members are not shown in FIGS. 1 and 2 (see FIGS. 13 and 14).

Figure 13:
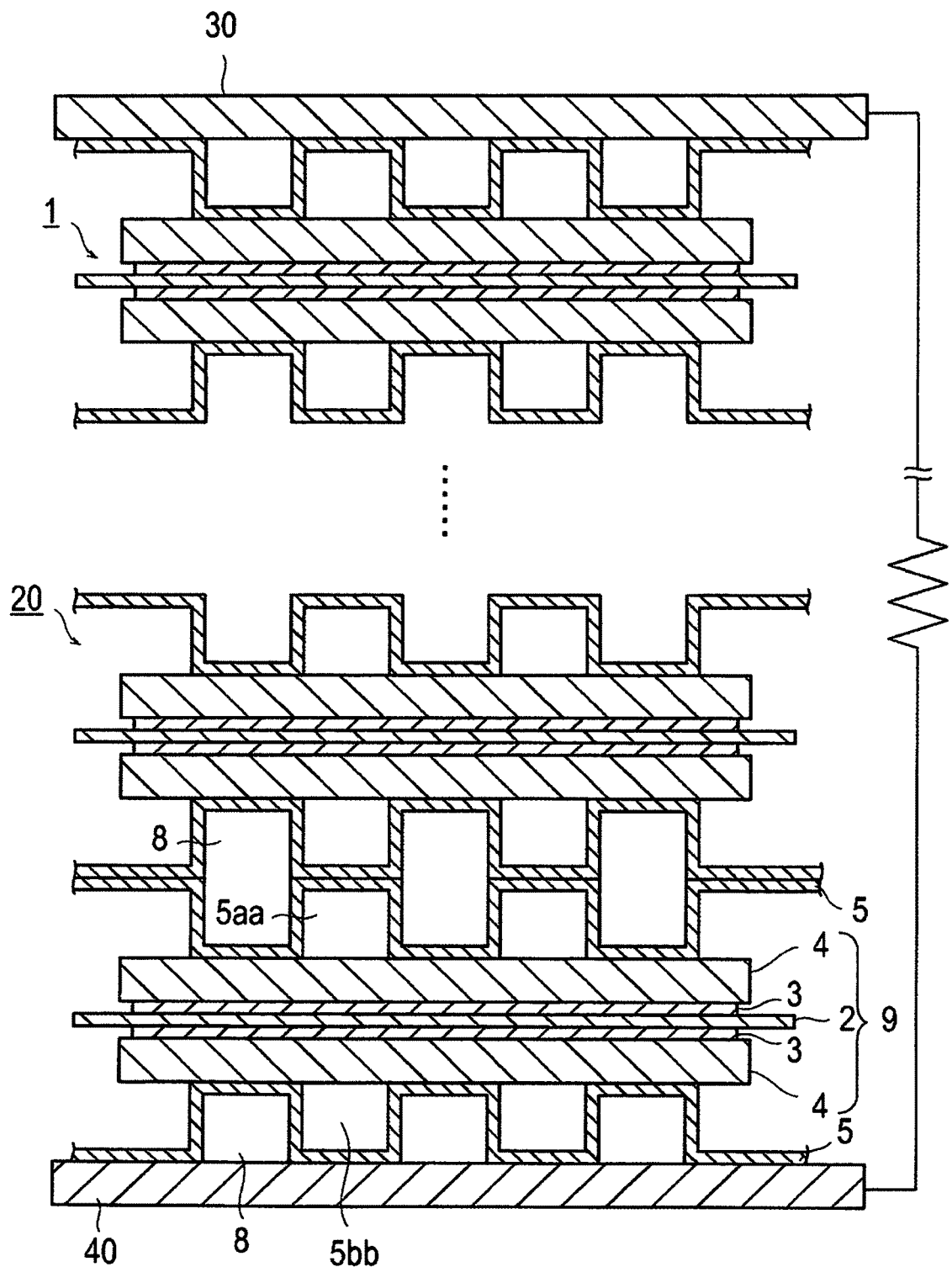
FIG. 13 is a schematic view showing a fuel cell stack applying an electrical conductive member according to an embodiment of the present invention.

For example, a thin plate having the thickness of 0.5 mm or less is pressed, so that a concave-convex configuration of the metal separators 5 (5a, 5b) shown in FIGS. 1, 2 and 13 is obtained. Convex portions of the metal separators 5 as viewed from the MEA 9 are in contact with the MEA 9. Therefore, an electrical connection between the metal separators 5 and the MEA 9 is obtained. Concave portions of the metal separators 5 as viewed from the MEA 9 (spaces between the metal separators 5 and the MEA 9 derived from the concave-convex configuration of the metal separators 5) function as a gas flow path through which gas flows at the time of the operation of the PEFC 1. Specifically, a fuel gas 5ag flows in gas flow paths 5aa of the anode separator 5a, and an oxidant gas 5bg flows in gas flow paths 5bb of the cathode separator 5b. Examples of the fuel gas 5ag include hydrogen and hydrogen-containing gas. Examples of the oxidant gas 5bg include air and $O_2$-containing gas.

Concave portions of the metal separators 5 as viewed from the opposite side of the MEA 9 are used as refrigerant flow paths 8 through which a refrigerant 8w flows to cool the PEFC at the time of the operation of the PEFC 1. Examples of the refrigerant 8w include coolant water and water. Generally, the metal separators 5 are provided with a manifold (not shown). The manifold functions as a connection means for connecting the cell units 1 when constituting a stack. Due to such a configuration, a mechanical strength of the fuel cell stack can be obtained (see FIGS. 13 and 14). In an actual fuel cell, gas seal members are provided between the metal separators 5 and both ends of the polymer electrolyte membrane 2, and between the cell unit 1 and the adjacent cell unit 1 of the fuel cell. However, such gas seal members are not shown in the figures.

As described above, the metal separators 5 have a function to electrically connect the MEAs 9 in series, and include the manifold and the gas flow paths 5aa and 5bb and refrigerant flow paths 8 through which different fluids such as the fuel gas 5ag, the oxidant gas 5bg and the refrigerant 8w flow. Furthermore, the metal separators 5 have a function to ensure a mechanical strength of a stack. In addition, the electrolyte membrane 2 is usually a perfluorosulfonic acid-type membrane. Thus, the inside of a fuel cell is under moist and weak acidic corrosion circumstances caused by various acidic ions eluded from the electrolyte membrane and humidified gas flowing into the fuel cell. Therefore, as shown in FIG. 2, the metal separators 5 are necessarily subjected to a surface treatment with regard to resistance to corrosion in addition to electrical conductivity. In the metal separators 5, a layer 7 to be provided on a metal substrate 6 as a surface treatment is definitely applied to a reaction surface under a serious corrosion condition. In addition to a reaction surface 7a, a cooling surface 7b opposite to the reaction surface 7a is also necessarily subjected to the similar treatment depending on types of the refrigerant (coolant water) 8w and circumstances.

Figure 3:
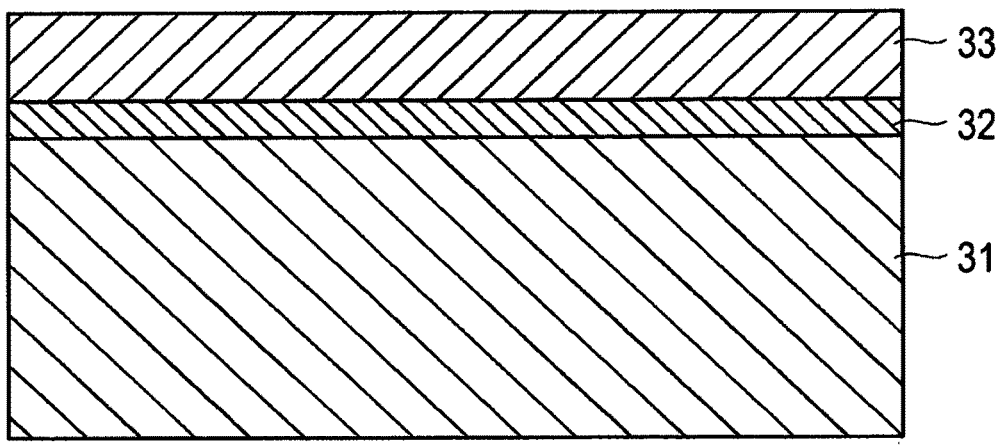
FIG. 3 is a schematic cross-sectional view showing a surface of the metal separator in FIG. 1.

FIG. 3 is a cross-sectional view showing one aspect of a surface portion of the metal separator 5. In the present embodiment, the electrical conductive member constituting the separator 5 includes a metal substrate 31 and an electrical conductive carbon layer 33. In addition, a middle layer 32 is interposed between the metal substrate 31 and the electrical conductive carbon layer 33. In the cell unit 1, the electrical conductive carbon layer 33 of the metal separator 5 is provided so as to be positioned on the side of the MEA 9.

Figure 4A:
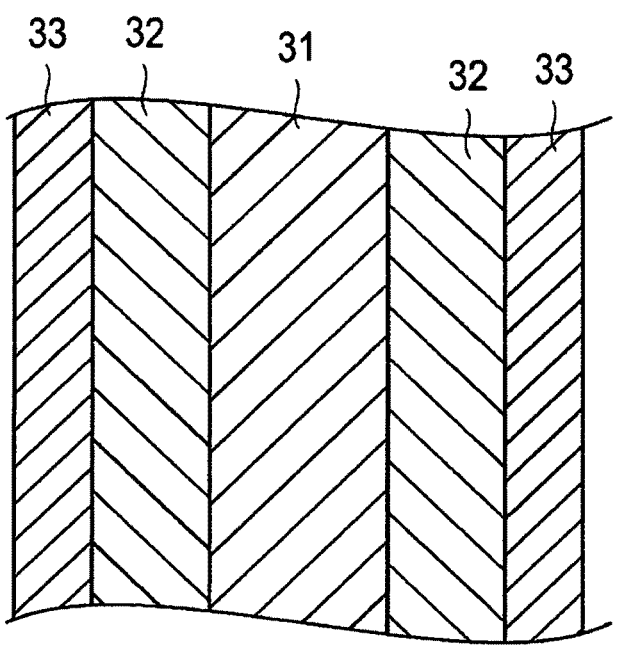
FIG. 4A is a cross-sectional view typically showing a constitution of the separator of FIG. 1 provided with a middle layer and an electrical conductive carbon layer on both sides of the metal substrate.
Figure 4B:
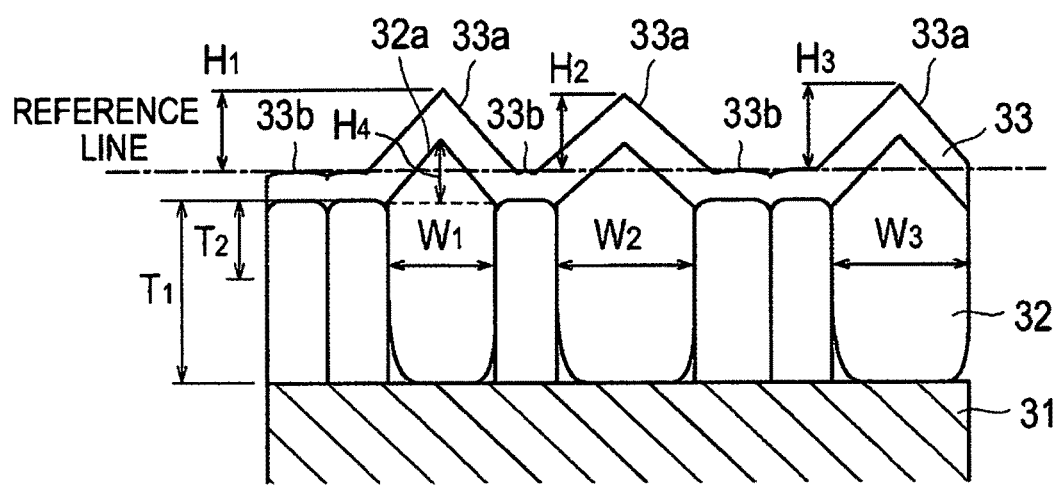
FIG. 4B is an enlarged view showing one aspect of a middle layer and an electrical conductive carbon layer.
Figure 4C:
FIG. 4C is an enlarged view showing another aspect of a middle layer and an electrical conductive carbon layer.

FIG. 4A is a partial cross-sectional view showing a constitution and position of each layer formed on the surfaces of the metal substrate of the metal separator, and is a simplified diagram for illustrating functions for a surface treatment required for each layer. FIG. 4B is a partially-enlarged view of FIG. 4A, and is an enlarged view more specifically showing a constitution of the middle layer having a thick columnar crystal structure and the electrical conductive carbon layer having protruded grains on the outermost surface thereof. FIG. 4C is an enlarged view more specifically showing a constitution of the separator having the metal substrate, the middle layer having a thin needle-shaped crystal structure, and the electrical conductive carbon layer without protruded grains on the outermost surface thereof. In FIG. 4B, the reference signs $H_1, H_2, H_3, \ldots$ represent a height (protrusion height) of the protruded grains on the outermost surface of the electrical conductive carbon layer 33, and the reference signs $W_1, W_2, W_3, \ldots$ represent a thickness (column diameter, width) of the columnar crystal structure provided in the middle layer 32. The reference numeral 33b in FIG. 4C represents a protruded grain on the outermost surface of the electrical conductive carbon layer 33.

Similarly in the embodiment shown in FIG. 4A, the electrical conductive member constituting the metal separator 5 includes the metal substrate 31 (the reference numeral 6 in FIG. 2) and the electrical conductive carbon layer 33 (a part of the reference numeral 7 in FIG. 2: outer side). In addition, the middle layer 32 (a part of the reference numeral 7 in FIG. 2: inner side) is interposed between the metal substrate 31 and the electrical conductive carbon layer 33.

As shown in FIGS. 4A to 4C, the cross-section of the metal separator 5 is constituted in such a manner that both main sides (surfaces) of the metal substrate 31 are provided with the middle layers 32 and the electrical conductive carbon layers 33 as an outermost layer. When stainless steel having an excellent anticorrosion property such as SUS316L is applied to the metal substrate 31, an anticorrosion property is not seriously required for the middle layer 32 since the metal substrate 31 itself has resistance to corrosion circumstances in a fuel cell. While, when aluminum is applied to the metal substrate 31 so as to enhance a reduction in thickness and cost, aluminum itself has poor resistance to corrosion although aluminum contributes to a thickness and weight reduction effect superior to stainless steel. However, according to the test results by the inventors, it is recognized that the crystal structure of the middle layer 32 is controlled so as to solve the above-mentioned problem (such as provision of corrosion resistance).

Corrosion occurred in the material constituting the metal substrate 31 of the metal separator 5 is influenced by a weak acid (acidity) in a fuel cell and a surface potential of the metal separator 5. Thus, when aluminum is used for the metal substrate 31 of the metal separator 5, corrosion resistance to acidity and the potential is required. However, when the metal substrate 31 is subjected to a surface treatment for preventing aluminum in the metal substrate 31 from coming into contact with water as much as possible, an underlying problem of corrosion can be solved since corrosion per se is derived from the presence of water. Therefore, such a treatment is a great advantage for the metal substrate 31. Accordingly, even when cracks such as pinholes are caused in the electrical conductive carbon layer 33 as an outermost layer, water intrusion to the inside of the separator under the middle layer 32 can be prevented since the crystal structure of the middle layer 32 is controlled. As a result, a desired excellent performance as a fuel cell can be stably maintained for a long period of time. The following is a specific explanation of each element of the metal separator 5 according to the present embodiment.

[Metal Substrate]

The metal substrate 31 is a main layer of the electrical conductive member constituting the metal separator 5, and contributes to ensuring electrical conductivity and mechanical strength.

Examples of the constitution material of the metal substrate 31 include iron, titanium, copper, aluminum and alloys thereof. The use of these materials is preferable in terms of a mechanical strength, general versatility, cost performance and workability. In this embodiment, an iron alloy includes stainless steel. Among these, the metal substrate 31 is preferably constituted by stainless steel, aluminum or aluminum alloy. When stainless steel is used for the metal substrate 31, electrical conductivity on a contact surface with a gas diffusion substrate as a constitution material of the gas diffusion layers (GDL) 4 can be obtained sufficiently. Accordingly, even if moisture infiltrates gaps in a film in a rib shoulder portion, durability is maintained due to corrosion resistance of an oxide film generated in the metal substrate 31 constituted by stainless steel. In this embodiment, the GDL is constituted by pressured portions (contact portions with the metal separator 5; rib portions) in which surface pressure is directly applied to the GDL 4 (4a, 4b) and portions with no direct pressure (noncontact portions; flow path portions). The rib shoulder portion is a shoulder portion of each contact portion with the metal separator 5.

Examples of stainless steel include austenite series, martensite series, ferrite series, austenite-ferrite series, and precipitation hardening series. As austenite series, SUS201, SUS202, SUS301, SUS302, SUS303, SUS304, SUS305, SUS316(L) and SUS317 standardized according to Japanese Industrial Standards are included. As austenite-ferrite series, SUS329J1 is included. As martensite series, SUS403 and SUS420 are included. As ferrite series, SUS405, SUS430 and SUS430LX are included. As precipitation hardening series, SUS630 is included. Especially, it is more preferable to use stainless steel of austenite series such as SUS304 and SUS316. A content ratio of iron in stainless steel is preferably 60 to 84% by mass, more preferably 65 to 72% by mass. In addition, a content ratio of chromium in stainless steel is preferably 16 to 20% by mass, more preferably 16 to 18% by mass.

Examples of the aluminum alloy include pure aluminum series, aluminum-manganese series, and aluminum-magnesium series. Other elements other than aluminum in the aluminum alloy are not particularly limited as long as those are generally applicable as an aluminum alloy. For example, copper, manganese, silicon, magnesium, zinc and nickel are included. As a specific example of the aluminum alloy, as pure aluminum series, A1050 and A1050P standardized according to Japanese Industrial Standards are included. As aluminum-manganese series, A3003P and A3004P are included. As aluminum-magnesium series, A5052P and A5083P are included. At the same time, since the separator is required to have a mechanical strength and formability, alloy refining is appropriately performed in addition to the determination of the alloy types. When the metal substrate 31 is constituted by a simple body such as titanium and aluminum, a purity of titanium and aluminum is preferably 95% by mass or more, more preferably 97% by mass or more, even more preferably 99% by mass or more.

A thickness of the metal substrate 31 is preferably between 50 μm and 500 μm in view of workability, a mechanical strength, and an improvement in energy density of a fuel cell in order to reduce a film thickness of the separator 5 itself. The thickness of the metal substrate is more preferably between 80 μm and 300 μm, even more preferably between 80 μm and 200 μm. Specifically when stainless steel is used, the thickness of the metal substrate 31 is preferably between 80 μm and 150 μm. When aluminum is used for the metal substrate 31, the thickness of the metal substrate 31 is preferably between 100 μm and 300 μm. When the thickness of the metal substrate 31 is within the above-mentioned ranges, the metal separator 5 having a desired reduced thickness and workability can be achieved while maintaining a sufficient strength as the metal separator 5.

For example, in order to provide a sufficient strength as a constitution material of the separator 5 for a fuel cell, the metal substrate 31 is preferably constituted by a material having a high gas shutoff property. Since each metal separator 5 for a fuel cell assumes a role as a divider between the cells, different types of gas flow in both sides of each separator 5 (see FIG. 13). Thus, the metal substrate 31 preferably has a high gas shutoff property as much as possible in view of a prevention of mixture of adjacent gases and a variation of gas flow rate.

[Electrical Conductive Carbon Layer]

The electrical conductive carbon layer 33 contains electrical conductive carbon. Due to the presence of this layer, resistance to corrosion is improved compared to the case where only the metal substrate 31 is provided, while electrical conductivity of the electrical conductive member constituting the metal separator 5 is ensured.

The electrical conductive carbon layer 33 according to the present embodiment is defined by an intensity ratio R ($I_D/I_G$) of a D-band peak intensity ($I_D$) to a G-band peak intensity ($I_G$) of the electrical conductive carbon layer, which is measured by a Raman scattering spectroscopic analysis. Specifically, the intensity ratio R ($I_D/I_G$) is 1.3 or more. The following is a specific explanation of the corresponding constitution requirement.

When a carbon material is analyzed by Raman spectroscopy, peaks usually appear in the vicinity of 1350 cm$^{-1}$ and 1584 cm$^{-1}$. High crystalline graphite has a single peak in the vicinity of 1584 cm$^{-1}$. This peak is usually referred to as "G-band". While, as crystallinity is lowered, in the other words, as a defect of the crystal structure are increased and the structure of graphite is disordered, a peak appears in the vicinity of 1350 cm$^{-1}$, which is usually referred to as "D-band". A peak of diamond is precisely 1333 cm$^{-1}$, which is distinct from the D-band. The intensity ratio R ($I_D/I_G$) of the D-band peak intensity ($I_D$) to the G-band peak intensity ($I_G$) is used as an index of a size of graphite clusters of the carbon material, a disordered level of the graphite structure (defect of the crystal structure), and an sp$^2$ bond ratio. That is, in the present embodiment, the R value may be regarded as an index of a contact resistance of the electrical conductive carbon layer 33, and used as a film parameter for controlling electrical conductivity of the electrical conductive carbon layer 33.

In order to calculate the R ($I_D/I_G$) value, Raman spectrum of the carbon material is measured by use of a Micro-Raman spectroscope. Specifically, a relative intensity ratio (peak area ratio ($I_D/I_G$)) of the peak intensity ($I_D$) of 1300 to 1400 cm$^{-1}$ referred to as D-band to the peak intensity ($I_G$) of 1500 to 1600 cm$^{-1}$ referred to as G-band is calculated to obtain the R value.

As described above, the R value according to the present embodiment is 1.3 or more. This R value is preferably between 1.4 and 2.0, more preferably between 1.4 and 1.9, even more preferably between 1.5 and 1.8. When the R value is 1.3 or more, the electrical conductive carbon layer 33 in which electrical conductivity in a stacking direction of a fuel cell is sufficiently ensured can be obtained. Moreover, the R value is 2.0 or less, a reduction of a graphite component can be suppressed. In addition to this, an increase in inner stress of the electrical conductive carbon layer 33 itself can be suppressed, so that adhesion to the metal substrate 31 (middle layer 32) as a base material can be further improved.

A mechanism to obtain the above-mentioned effect by setting the R value at 1.3 or more according to the present embodiment is assumed as follows. However, the scope of the present invention is not limited by the following assumed mechanism.

Figure 5A:
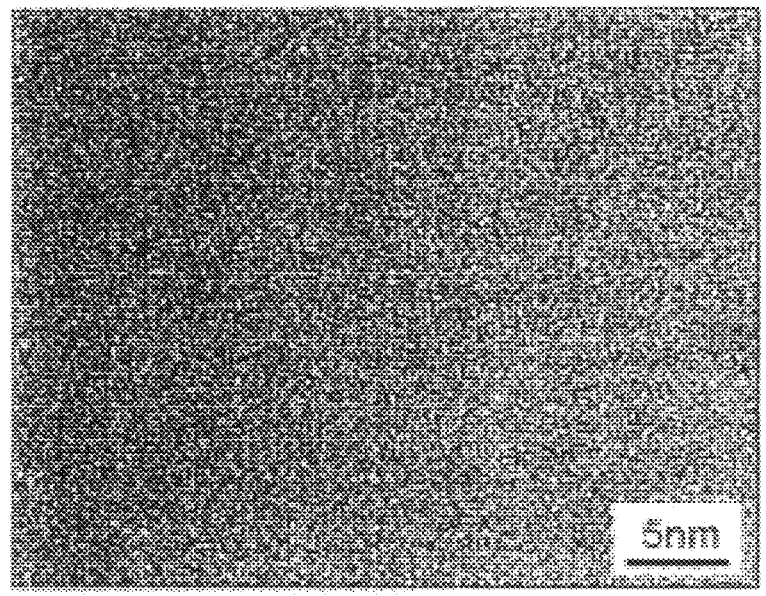
FIG. 5A is a photograph (magnification: 400 thousand) of a cross-section of an electrical conductive member (electrical conductive member A) having an electrical conductive carbon layer with R=1.0 to 1.2 observed with TEM.
Figure 5B:
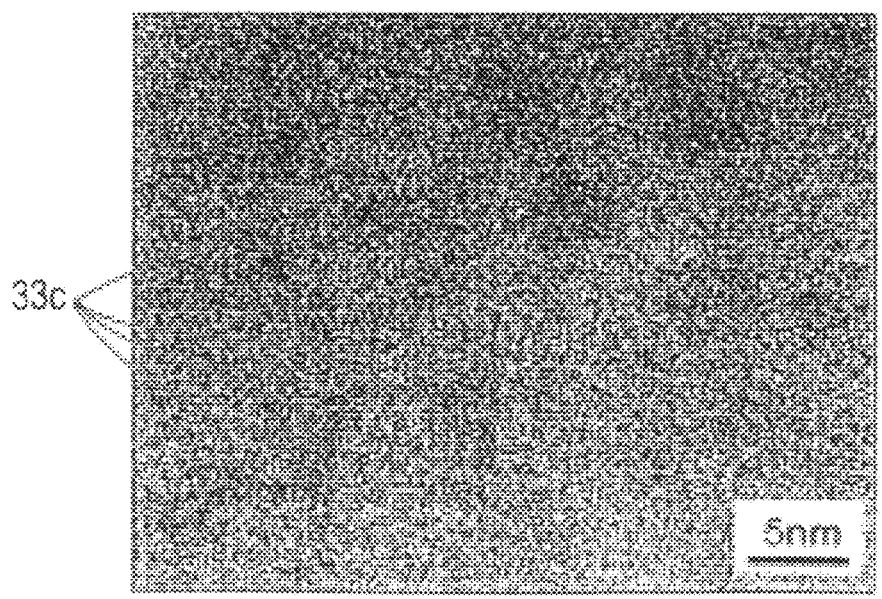
FIG. 5B is a photograph (magnification: 400 thousand) of a cross-section of an electrical conductive member (electrical conductive member B) having an electrical conductive carbon layer with R=1.6 observed with TEM.

As described above, an increase in intensity of the D-band peak (that is, increase of the R value) represents an increase in defect of the crystal structure in the graphite structure. In other words, it represents an increase of sp$^3$ carbon in high crystalline graphite approximately only constituted by sp$^2$ carbon. FIG. 5A is a photograph (magnification: 400 thousand) of a cross-section of an electrical conductive member A having an electrical conductive carbon layer with R=1.0 to 1.2 observed with a transmission electron microscope (TEM). Similarly, FIG. 5B is a photograph (magnification: 400 thousand) of a cross-section of an electrical conductive member B having an electrical conductive carbon layer with R=1.6 observed with TEM. The electrical conductive members A and B were prepared by use of SUS316L as the metal substrate 31, and forming the middle layer 32 (thickness: 0.2 μm) and the electrical conductive carbon layer 33 (thickness: 0.2 μm) sequentially provided on the surface of the metal substrate 31 by a sputtering method. Bias voltage applied to the metal substrate 31 at the time of the formation of the electrical conductive carbon layer 33 in the electrical conductive member A is 0 V. Bias voltage applied to the metal substrate 31 at the time of the formation of the electrical conductive carbon layer 33 in the electrical conductive member B is −140 V.

As can be seen from FIG. 5B, the electrical conductive carbon layer in the electrical conductive member B has a polycrystalline graphite structure. Namely, a number of graphite clusters 33c are present in the electrical conductive member B. However, such a polycrystalline graphite structure is not confirmed in the electrical conductive carbon layer in the electrical conductive member A.

Microscopically, "polycrystalline graphite" has an anisotropic graphite crystal structure (graphite cluster) in which graphene planes (hexagonal planes) are stacked. Macroscopically, on the other hand, polycrystalline graphite has an isotropic crystalline body in which a number of the graphite structures are aggregated. Therefore, polycrystalline graphite can be regarded as a kind of diamond-like carbon (DLC). Generally, monocrystalline graphite has an orderly structure in which graphene planes are stacked, even macroscopically, as represented by highly oriented pyrolytic graphite (HOPG). However, polycrystalline graphite includes the graphite structures as an individual cluster, and has a disordered layer structure. By adjusting the R value to the above-mentioned values, the disordered level (amount and size of graphite clusters) is moderately maintained, so as to ensure an electrical conductive path from one side to the other side of the electrical conductive carbon layer 33. As a result, it is conceivable that a decrease in electrical conductivity caused by the provision of the electrical conductive carbon layer 33 to the metal substrate 31 is prevented. Furthermore, in addition to the electrical conductive carbon layer 33, by providing the middle layer 32 between the metal substrate 31 and the electrical conductive carbon layer 33, and controlling the crystal structure thereof, an increase in contact resistance can be suppressed, while excellent electrical conductivity is ensured sufficiently.

In polycrystalline graphite, since the graphene planes are formed by the connection of sp$^2$ carbon atoms constituting graphite clusters, electrical conductivity is ensured in a plane direction of the graphene planes. In addition, polycrystalline graphite is substantially constituted by only carbon atoms, has a small specific surface area, and has a small amount of connected functional groups. Therefore, polycrystalline graphite has excellent resistance to corrosion caused by acidic water. Also in powder such as carbon black, a primary particle is usually constituted by an aggregation of graphite clusters, and therefore, electrical conductivity is exerted. However, since individual particles are separated, a large number of functional groups are formed on the surface. Therefore, corrosion is easily caused by acidic water and the like. Even if the electrical conductive carbon layer 33 is formed by carbon black, there is a problem of a deficiency in density as a protect film.

When the electrical conductive carbon layer 33 according to the present embodiment is constituted by polycrystalline graphite, a size of graphite clusters constituting polycrystalline graphite is not particularly limited. As one example, an average diameter of the graphite clusters is preferably between 1 nm and 50 nm, more preferably between 2 nm and 10 nm. When the average diameter of graphite clusters is within the above-mentioned ranges, an increase in thickness of the electrical conductive carbon layer 33 can be prevented while the crystal structure of polycrystalline graphite is maintained. The "diameter" of the respective graphite clusters represents a maximum distance among arbitrary two-point distances on an outline of the respective clusters. The average diameter of the graphite clusters is calculated as an average value of the diameters of the clusters observed in several to several tens of visual fields by use of an observational means such as an SEM and a TEM.

According to the present embodiment, as shown in the figures such as FIG. 4B, preferably, the electrical conductive carbon layer 33 is partially formed on the surface of the middle layer so as to have protruded grains 33a with a diameter of 200 nm to 500 nm. Especially, the protruded grains 33a having a diameter of 200 nm to 500 nm and microparticles 33b having a diameter of 50 nm to 100 nm preferably coexist on an outermost surface of the electrical conductive member (refer to Example I-8). However, in the present embodiment, the protruded grains 33a with a diameter of 200 nm to 500 nm is not necessarily formed on the outermost surface of the electrical conductive member, as shown in FIG. 4C. More specifically, the electrical conductive carbon layer 33 only constituted by the microparticles 33b with a diameter of 50 nm to 100 nm may be provided on the outermost surface of the electrical conductive member without the protruded grains 33a with a diameter of 200 nm to 500 nm. Even in such a configuration, the desired object of the present invention can be achieved when the intensity ratio R of the electrical conductive layer 33 is 1.3 or more (refer to Example I-9).

In the configuration shown in FIG. 4B, the middle layer 32 is provided between the electrical conductive carbon layer 33 and the metal substrate 31, and the crystal structure of the middle layer 32 is controlled, so that the columnar crystals keep having a thick column diameter consistently toward the interface between the middle layer 32 and the electrical conductive carbon layer 33. Therefore, gaps and cracks in the electrical conductive carbon layer 33 formed on the middle layer 32 can be reduced. When the protruded grains 33a with a diameter of 200 nm to 500 nm, preferably 300 nm to 500 nm, more preferably 400 nm to 500 nm are present on the outermost surface, the gaps caused in the outermost surface of the electrical conductive member is decreased, so as to prevent water intrusion. In addition, the presence of the microparticles 33b in the peripheral portions of the protruded grains 33a (that is, flat portions having a small concave-convex variation) is particularly effective in decreasing the gaps and defects in the electrical conductive carbon layer 33. Due to such a configuration, a corrosion resistant function in the electrical conductive carbon layer 33 can be improved while a corrosion resistant function of the middle layer 32 to the metal substrate 31 is enhanced, and a decrease in film thickness can be achieved without a decrease in coverage. Especially, a corrosion resistant effect of the metal substrate 31 can be enhanced. Thus, easily-corroded metal such as aluminum can also be applied to the metal substrate 31.

In the present embodiment, the diameter of the protruded grains 33a on the outermost surface of the electrical conductive member (electrical conductive carbon layer 33) represents a range of a size distribution. The diameter of the protruded grains 33a on the outermost surface of the electrical conductive member is measured by use of an observational means such as a scanning electron microscope (SEM) and a transmission electron microscope (TEM), and is calculated as an average grain diameter observed in several to several tens of visual fields. Similarly, the size (diameter) of the microparticles 33b on the outermost surface of the electrical conductive member represents a range of a size distribution. The size of the microparticles 33b on the outermost surface of the electrical conductive member can be measured concurrently with the protruded grains 33a. In particular, the largest length of low contrast (white) grains is measured based on an observation result of a sample surface observed by the SEM, so as to obtain the grain diameter of the protruded grains 33a.

The protruded grains 33a are present on the outermost surface of the electrical conductive member, in which the number is at least 30 grains or more, preferably within a range of 30 to 100 grains, more preferably within a range of 50 to 80 grains per 100 $\mu m^2$. Since the gaps in the middle layer 32 is decreased when the number of the grains is within the above-mentioned ranges, an oxide film formed inside the treated surface can be suppressed, and therefore, an increase in contact resistance can be prevented. When the number of the protruded grains 33a per 100 $\mu m^2$ is less than 30, a growth of the columnar crystal diameter of the middle layer 32 is suppressed. As a result, the number of the gaps between the columnar crystals on the outermost surface of the electrical conductive member may be increased, and there is a possibility of an increase in contact resistance.

Even when the number of the protruded grains 33a per 100 $\mu m^2$ is less than 30, a case of at least one protruded grain 33a can be also included within the scope of the present invention as long as the effect of the present embodiment is not detracted. In other words, the crystal structure of carbon included in the electrical conductive carbon layer 33 is controlled apart from the constitution of the middle layer 32, so as to ensure an electrical conductive path from one side to the other side of the electrical conductive carbon layer 33. Therefore, the electrical conductive member having further improved resistance to corrosion can be provided while excellent electrical conductivity is ensured sufficiently (see FIGS. 4C, 15A, 16A, 17A and 18A, and Example I-9).

An apex distance between the protruded grains 33a on the outermost surface is preferably 1 $\mu m$ or less (see FIG. 4B). Since the protruded grains 33a are uniformly provided on the surface when having such a configuration, a corrosion resistant property of the metal substrate 31 is improved. Therefore, a corrosion resistant function of the electrical conductive carbon layer 33 is improved while a corrosion resistant function of the middle layer 32 to the metal substrate 31 is also enhanced. Accordingly, a decrease in film thickness can be achieved without a decrease in coverage.

The height H of the protruded grains 33a is between 100 nm and 500 nm, preferably between 200 nm and 500 nm, more preferably between 300 nm and 400 nm, with respect to the peripheral portions thereof on the outermost surface of the electrical conductive member (see FIG. 4B). When the height of the protruded grains 33a is within the above-mentioned ranges, the gaps in the middle layer 32 are decreased so that the corrosion resistant function of the metal substrate 31 can be further enhanced, since the columnar crystals in the middle layer 32 are grown and the column diameter W in the middle layer 32 becomes thick. In addition, a specific surface area of the electrical conductive carbon layer 33 is increased when the outermost surface of the electrical conductive member has a protruded configuration due to the provision of the protruded grains 33a. When the outermost surface of the electrical conductive carbon layer 33 is hydrophilic, a degree of hydrophilicity is increased due to the increase of the specific surface area. Therefore, an effect of an improvement of surface wettability is achieved. More specifically, it is known that the degree of hydrophilicity is increased when a static contact angle of water droplets on a sample surface is 90 degrees or less, and the hydrophilic surface has a fine concave-convex configuration. As hydrophilicity on the surface is improved, a draining property is improved. Therefore, a decrease of a gas diffusion property caused by a flooding phenomenon can be prevented. Note that, the height H of the protruded grains 33a with respect to the peripheral portions on the outermost surface represents an average value of heights obtained by the following measuring method. The following are explanations of the terms and measuring methods with regard to the electrical conductive carbon layer used in this description.

(a) The protruded grains 33a are grains partially constituting the electrical conductive carbon layer and being protruded along the protrusions of the middle layer. The microparticles 33b are particles partially constituting the electrical conductive carbon layer, which are not protruded compared to the protruded grains. For a measurement of the respective diameters of the protruded grains 33a and the microparticles 33b, one grain or particle is picked up from contrasts confirmed by a surface observation using an SEM, followed by obtaining an average diameter in each grain or particle.

(b) The height H ($H_1$, $H_2$, $H_3$) of the protruded grains 33a is a height from the surface of each microparticle 33b present in the periphery of the protruded grains 33a to the apex of each protruded grain 33a. The height of the protruded grains 33a can be obtained by a cross-sectional observation using a TEM.

(c) The number of the protruded grains 33a having a diameter of 200 nm to 500 nm per 100 $\mu m^2$ is measured as follows. First, by a surface observation using an SEM, grains in which whiteness is confirmed as a contrast are determined as protruded grains. Then, the number of the determined grains having the above-mentioned diameter per 100 $\mu m^2$ is measured.

(d) The number of the microparticles 33b having a diameter of 50 nm to 100 nm can be measured by a surface observation using an SEM.

In the present embodiment, the electrical conductive carbon layer 33 may be substantially composed only of polycrystalline graphite, or may be composed only of polycrystalline graphite. However, the electrical conductive carbon layer 33 may include other materials other than polycrystalline graphite. Examples of the carbon materials other than polycrystalline graphite include graphite block (high crystalline graphite), carbon black, fullerene, carbon nanotube, carbon nanofiber, carbon nanohorn, and carbon fibril. Specific examples of carbon black include Ketjen black, acetylene black, channel black, lamp black, oil furnace black, and thermal black. Carbon black may be subjected to a graphite treatment. These carbon materials may be combined with resin such as polyester resin, aramid resin and polypropylene resin. Further, examples of the materials other than the carbon materials contained in the electrical conductive carbon layer 33 include noble metal such as gold (Au), silver (Ag), platinum (Pt), ruthenium (Ru), palladium (Pd), rhodium (Rh) and indium (In); water-repellent substances such as polytetrafluoroethylene; and electrical conductive oxides. With regard to the materials other than polycrystalline graphite, only one of them may be used, or two or more of them may be combined.

An average particle diameter of the carbon materials that are in a granulous state other than the polycrystalline graphite is preferably between 2 nm and 100 nm, more preferably between 5 nm and 20 nm, in view of a decrease in thickness of the electrical conductive carbon layer. Note that, the "particle diameter" represents a maximum distance among arbitrary two-point distances on an outline of the respective particles. In addition, the "average particle diameter" is calculated as an average value of the particle diameters of the particles observed in several to several tens of visual fields by use of an observational means such as an SEM and a TEM, unless otherwise specified.

A fiber diameter of the carbon materials that are in a fibrous state such as carbon nanotube other than the polycrystalline graphite is preferably between 0.4 nm and 100 nm, more preferably between 1 nm and 20 nm. A fiber length when the carbon materials are in a fibrous state is between 5 nm and 200 nm, more preferably between 10 nm and 100 nm. An aspect ratio when the carbon materials are in a fibrous state is between 1 and 500, more preferably between 2 and 100. When the fiber diameter and length are within the above-mentioned ranges, respectively, the thickness of the electrical conductive carbon layer can be controlled appropriately.

An average thickness of the electrical conductive carbon layer 33 excluding the protruded grains 33a is preferably between 1 nm and 1000 nm, more preferably between 2 nm and 500 nm, even more preferably between 5 nm and 200 nm. When the thickness of the electrical conductive carbon layer 33 is within the above-mentioned ranges, sufficient electrical conductivity between the gas diffusion substrate and the metal separator 5 can be obtained, and the metal substrate 31 can have a high corrosion resistant function. In the present embodiment, although the electrical conductive carbon layer 33 may be provided only on one surface of the electrical conductive member (metal separator 5) as shown in FIG. 3, the electrical conductive carbon layer 33 is preferably provided on both surfaces of the electrical conductive member as shown in FIG. 2 and FIG. 4A. This is because the corrosion resistant effect of the metal substrate 31 can be further enhanced while adhesion between the metal substrate 31 and the electrical conductive carbon layer 33 is ensured via the middle layer 32.

With regard to a Raman scattering spectroscopic analysis of the electrical conductive carbon layer 33, an average peak measured by a rotational anisotropy measurement of the Raman scattering spectroscopic analysis preferably shows a twofold symmetry pattern. The following is a simple explanation of a measurement principle of the rotational anisotropy measurement.

Figure 6A:
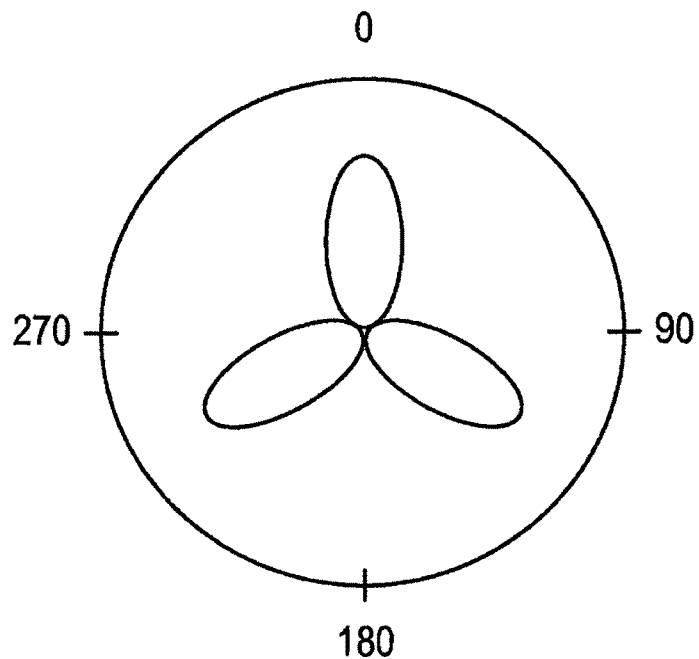
FIG. 6A is a typical view showing a threefold symmetry pattern of an average peak in a rotational anisotropy measurement of a Raman scattering spectroscopic analysis.
Figure 6B:
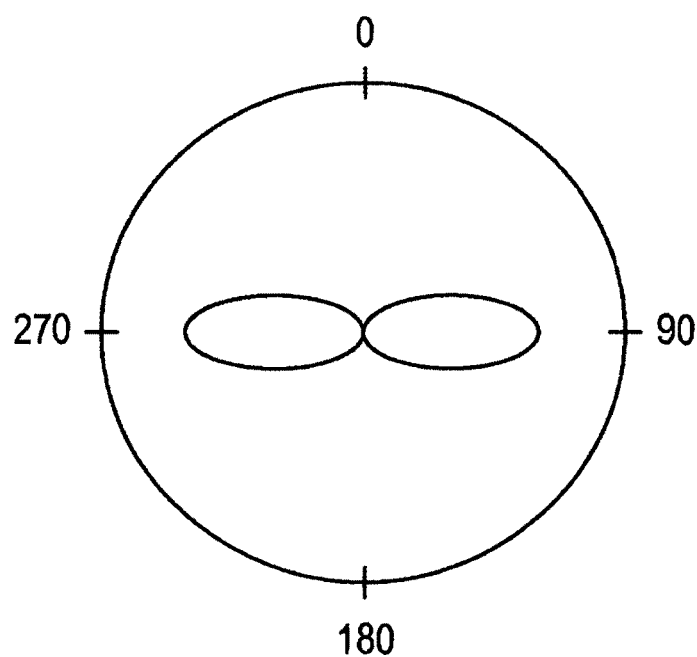
FIG. 6B is a typical view showing a twofold symmetry pattern of an average peak in a rotational anisotropy measurement of a Raman scattering spectroscopic analysis.
Figure 6C:
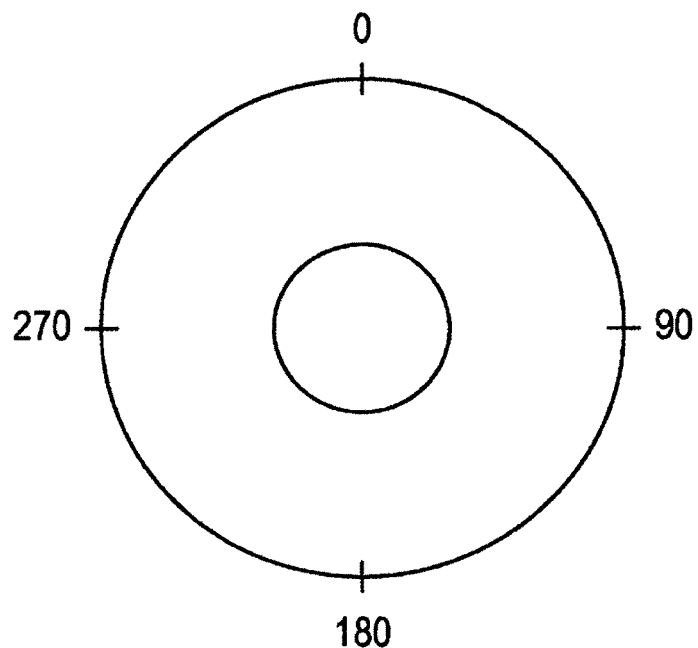
FIG. 6C is a typical view without symmetry pattern of an average peak in a rotational anisotropy measurement of a Raman scattering spectroscopic analysis.

The rotational anisotropy measurement of the Raman scattering spectroscopic analysis is performed by a Raman scattering spectroscopic measurement while a measurement sample is rotated 360 degrees in a horizontal direction. Specifically, the surface of the measurement sample is subjected to laser irradiation, so as to measure normal Raman spectrum. Then, the measurement sample is rotated 10 degrees to measure the Raman spectrum in a similar manner. This operation is repeated until the measurement sample is rotated 360 degrees. Then, an average value of the peak intensities obtained at each degree is calculated, so as to represent in polar coordinates of 360 degrees as one round by defining the lowest peak in the measured peak intensities as a center O. Thus, the average peak can be obtained. For example, when a graphite layer is present in the sample surface in such a manner that graphene planes are parallel to a plane direction of the sample, a threefold symmetry pattern as shown in FIG. 6A can be seen. When a graphite layer is present in the sample surface in such a manner that graphene planes are perpendicular to a plane direction of the sample, a twofold symmetry pattern as shown in FIG. 6B can be seen. When an amorphous carbon layer with no definite crystal structure is present in the sample surface, a pattern with no symmetry as shown in FIG. 6C can be seen. Therefore, when the average peak measured by the rotational anisotropy measurement shows the twofold symmetry pattern, the plane direction of the graphene planes constituting the electrical conductive carbon layer 33 approximately corresponds to the stacking direction of the electrical conductive carbon layer 33. Thus, such a configuration is preferable because electrical conductivity in the electrical conductive carbon layer 33 is ensured by the shortest path.

Figure 7A:
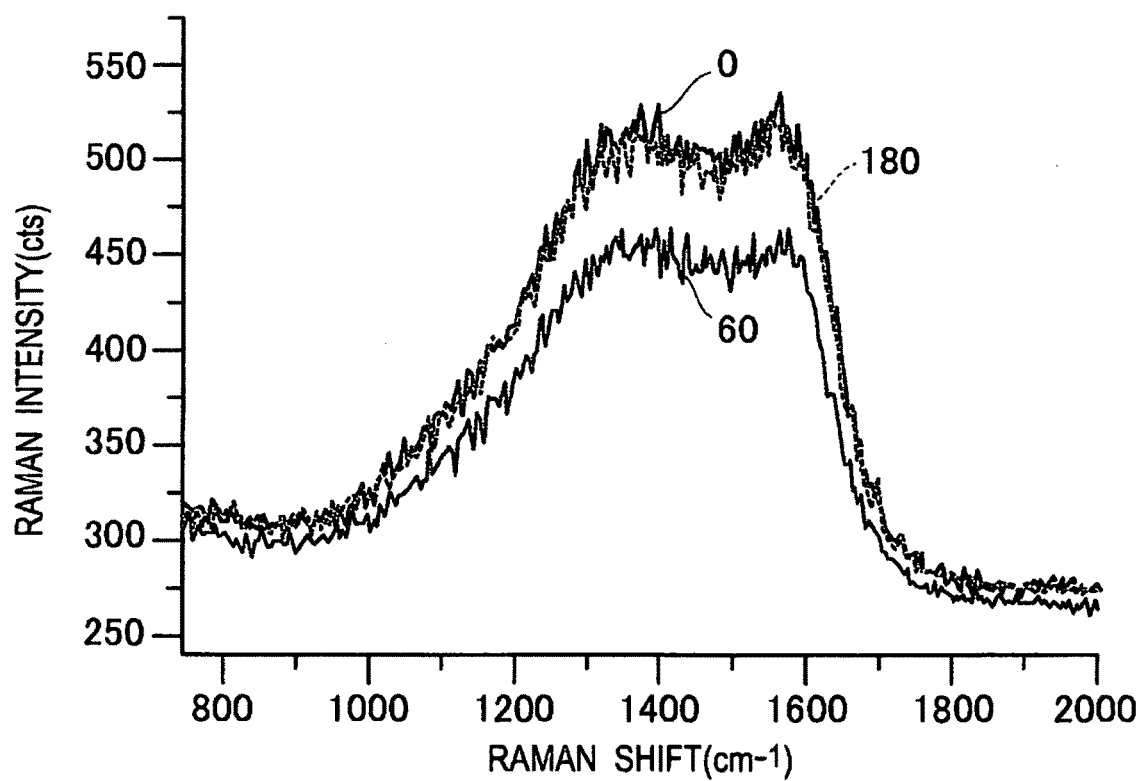
FIG. 7A is a graph showing Raman spectra using an electrical conductive member B as a measurement sample at rotation degrees of 0°, 60° and 180°.
Figure 7B:
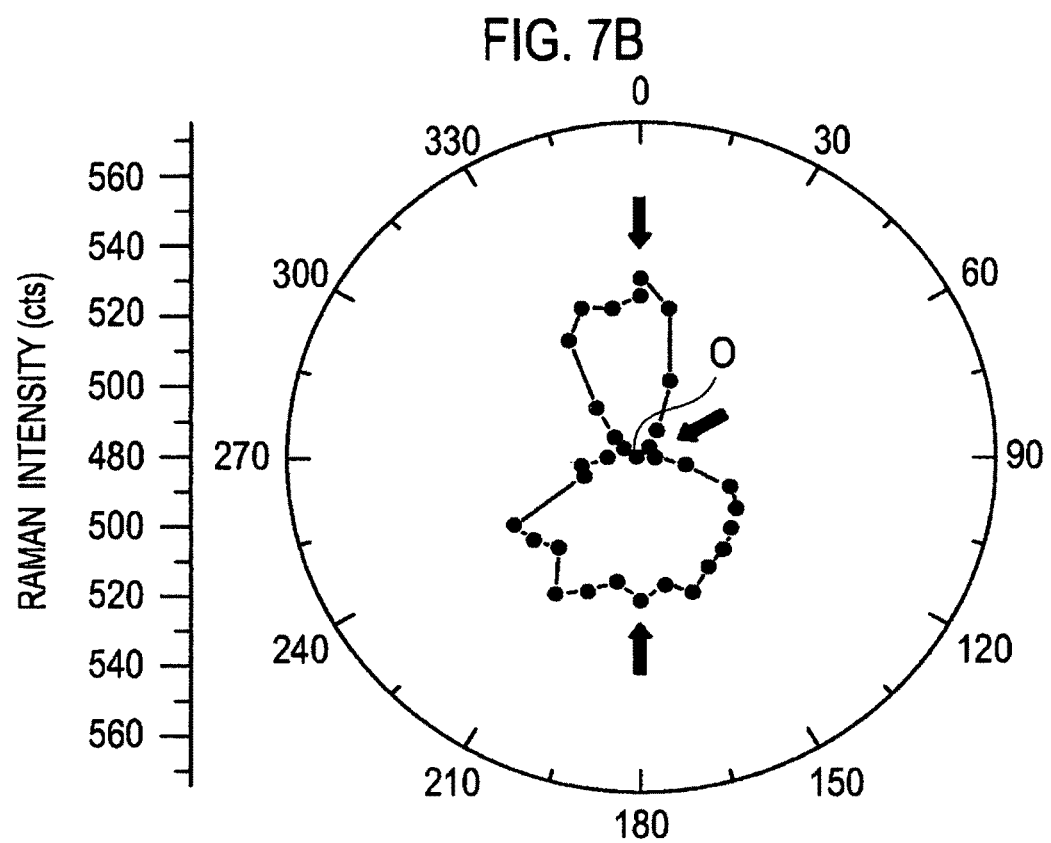
FIG. 7B is a graph showing an average peak in a rotational anisotropy measurement for an electrical conductive member B.

FIGS. 7A and 7B show the results of the rotational anisotropy measurement. FIG. 7A shows Raman spectra in which the electrical conductive member B is used as a measurement sample, in which the rotation degrees of the sample are 0°, 60° and 180°, respectively. FIG. 7B shows an average peak in the rotational anisotropy measurement of the electrical conductive member B obtained by the above-mentioned method. As shown in FIG. 7B, the peaks appeared at 0° and 180° in the rotational anisotropy measurement of the electrical conductive member B. This corresponds to the twofold symmetry pattern shown in FIG. 6B. In this description, "to show the twofold symmetry pattern" represents the presence of 180-degree opposite two peaks based on the lowest peak intensity as a reference point in the average peak, as shown in FIG. 6B and FIG. 7B. This definition is available since the peak intensity shown in the threefold symmetry pattern and the peak intensity shown in the twofold symmetry pattern are considered to show approximately the same value in principle.

In the present embodiment, Vickers hardness of the electrical conductive carbon layer 33 is defined. The "Vickers hardness (Hv)" represents a value defining a hardness degree of a substance, and a value inherent in each substance. In this description, such Vickers hardness represents a value measured by a nanoindentation method. The nanoindentation method is a method for continuously applying and releasing load by use of a diamond indenter with micro load with respect to the sample surface, and measuring hardness from the obtained load-displacement curve. As the degree of Hv is higher, the substance becomes harder. In the preferable embodiment, specifically, the Vickers hardness of the electrical conductive carbon layer 33 is preferably 1500 Hv or less, more preferably 1200 Hv or less, even more preferably 1000 Hv or less, particularly preferably 800 Hv or less. When the Vickers hardness is within the above-mentioned values, excessive incorporation of $sp^3$ carbon with no electrical conductivity is suppressed, and a decrease in electrical conductivity of the electrical conductive carbon layer 33 can be prevented. Although a minimum value of the Vickers hardness is not particularly limited, the hardness of the electrical conductive carbon layer 33 is sufficiently ensured if the Vickers hardness is 50 Hv or more. Accordingly, the electrical conductive member (separator 5) can be provided in which the electrical conductive carbon layer 33 has a resistance to an external contact or impact such as friction and has excellent adhesion to the metal substrate 31 as a base. Further in an aspect in which the middle layer 32 is provided as in the case of the present embodiment, the electrical conductive member can be provided in which the electrical conductive carbon layer 33, the middle layer 32, and further the metal substrate 31 contribute to improved hardness and excellent adhesion. In view of this, the Vickers hardness of the electrical conductive carbon layer 33 is more preferably 80 Hv or more, even more preferably 100 Hv or more, particularly preferably 200 Hv or more.

Figure 8:
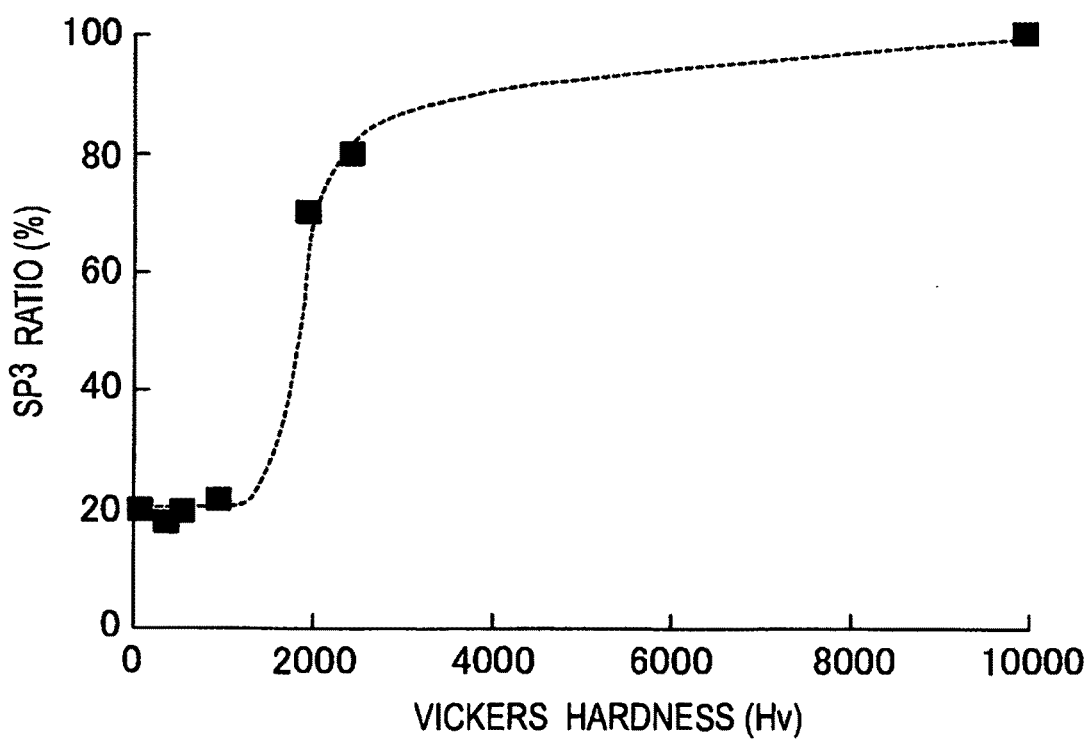
FIG. 8 is a graph showing a relationship between Vickers hardness and an $sp^3$ ratio value in an electrical conductive carbon layer in an electrical conductive member, in which the Vickers hardness of the electrical conductive carbon layer is varied with a change of bias voltage and a film formation system using a sputtering method.

Here, SUS316L was prepared as the metal substrate 31 of the electrical conductive member. The middle layer 32 constituted by Cr (thickness of 0.2 μm) and the electrical conductive carbon layer 33 (thickness of 0.2 μm) were formed sequentially on the surface of the metal substrate 31 by a sputtering method. This middle layer 32 includes columnar crystals having an average column width of between 200 nm and 500 nm in a cross-section of the middle layer 32. Such columnar crystals occupy 60% of the whole thickness of the middle layer that are present on the side of the electrical conductive carbon layer 33. In addition, the protruded grains 33a having a diameter (size distribution) of 200 nm to 500 nm and the microparticles 33b having a diameter of 50 nm to 100 nm coexist on the outermost surface of the electrical conductive carbon layer 33, in which an average of 60 grains of the protruded grains 33a are present per 100 μm² in the electrical conductive carbon layer 33. In this case, the bias voltage and film formation system were controlled so that the crystal structure of the middle layer 32 was controlled, and the columnar crystals having a desired diameter and number were formed, followed by varying the Vickers hardness of the electrical conductive carbon layer 33. FIG. 8 shows a relationship between the Vickers hardness of the electrical conductive carbon layer 33 in the electrical conductive member thus obtained and the $sp^3$ ratio value. In FIG. 8, diamond has the $sp^3$ ratio=100% and 10000 Hv. According to the result shown in FIG. 8, it is recognized that the $sp^3$ ratio value is greatly decreased when the Vickers hardness of the electrical conductive carbon layer 33 is 1500 Hv or less. In addition, it is assumed that a contact resistance value of the electrical conductive member is decreased as the $sp^3$ ratio value is decreased.

In the present embodiment, the content of hydrogen atoms included in the electrical conductive carbon layer 33 is preferably taken into consideration. That is, when hydrogen atoms are included in the electrical conductive carbon layer 33, the hydrogen atoms are bound to carbon atoms. As a result, a hybrid orbital of the carbon atoms to which the hydrogen atoms are bound shifts from $sp^2$ to $sp^3$ to lose electrical conductivity. Accordingly, electrical conductivity of the electrical conductive carbon layer 33 is decreased. Moreover, when the C—H bond in polycrystalline graphite is increased, bond continuity is lost, and the hardness of the electrical conductive carbon layer 33 is decreased. Consequently, a mechanical strength and corrosion resistance of the electrical conductive member are decreased. In view of this, the content of the hydrogen atoms in the electrical conductive carbon layer 33 is preferably 30 atom % or less, more preferably 20 atom % or less, even more preferably 10 atom % or less with respect to total atoms constituting the electrical conductive carbon layer 33. With regard to the content of the hydrogen atoms in the electrical conductive carbon layer 33, a value obtained by an elastic recoil detection analysis (ERDA) is employed. In this method, the measurement sample is inclined to shortly pass a helium ion beam thereinto, thereby detecting elements that are pushed to the front. Since atomic nuclei of the hydrogen atoms are lighter than the incident helium ions, the atomic nuclei of the hydrogen atoms are pushed to the front when the hydrogen atoms are present in the same space. Since such recoil is elastic diffusion, energy spectrum of the recoiled atoms reflects a mass of the atomic nuclei. Thus, the number of the atomic nuclei of the recoiled hydrogen atoms is measured by use of a solid state detector, so that the content of the hydrogen atoms in the measurement sample is measured.

Figure 9:
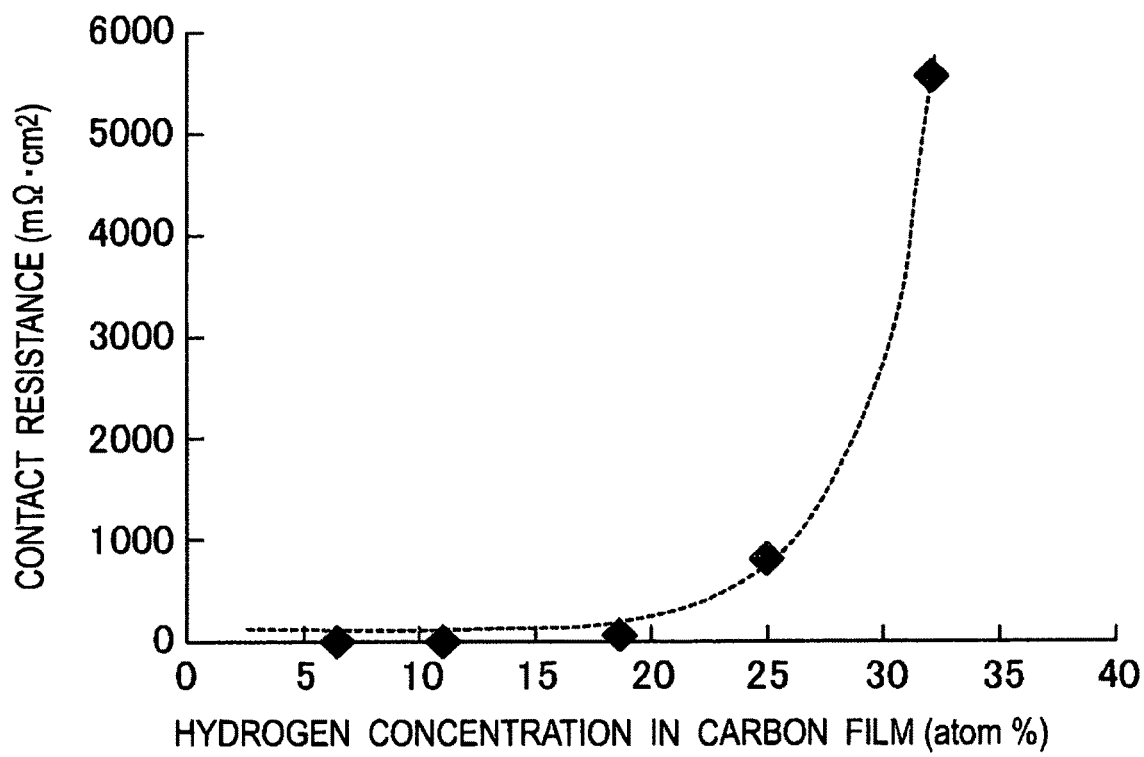
FIG. 9 is a graph showing a measurement result of contact resistances in electrical conductive members including electrical conductive carbon layers with different contents of hydrogen atoms while an R value is 1.3 or more.

FIG. 9 is a graph showing a measurement result of contact resistances in some electrical conductive members including the electrical conductive carbon layers 33 with the different contents of the hydrogen atoms while an R value is 1.3 or more. As shown in FIG. 9, when the content of the hydrogen atoms in the electrical conductive carbon layer 33 is 30 atom % or less, the contact resistance value of the electrical conductive member is significantly decreased. In the test shown in FIG. 9, SUS316L was used as the metal substrate 31 of the electrical conductive member. The middle layer 32 constituted by Cr (thickness of 0.2 μm) and the electrical conductive carbon layer 33 (thickness of 0.2 μm) were formed sequentially on the surface of the metal substrate 31 by a sputtering method. In this case, the film formation system and the amount of hydrocarbon gas were controlled, so that the content of the hydrogen atoms in the electrical conductive carbon layer was varied.

In the present embodiment, the whole metal substrate 31 is covered with the electrical conductive carbon layer 33 via the middle layer 32. In other words, a rate of the covered area (coverage) of the metal substrate 31 with the electrical conductive carbon layer 33 is 100%. However, the present invention is not limited to this coverage, and the coverage may be less that 100%. The coverage of the metal substrate 31 covered with the electrical conductive carbon layer 33 is preferably 50% or more, more preferably 80% or more, even more preferably 90% or more, most preferably 100%. Due to such coverage, a decrease in electrical conductivity and corrosion resistance, which is associated with the oxide film formation on exposed areas of the metal substrate 31 that are not covered with the electrical conductive carbon layer 33, can be suppressed effectively. Note that, when the middle layer 32 described below is interposed between the metal substrate 31 and the electrical conductive carbon layer 33 as in the case of the present embodiment, the coverage represents an area ratio of the metal substrate 31 that is overlapped with the electrical conductive carbon layer 33 when the electrical conductive member (metal separator 5) is viewed from a stacking direction.

[Middle Layer]

As shown in FIGS. 2 and 3, the electrical conductive member constituting the metal separator 5 in the present embodiment includes the middle layer 32. The middle layer 32 has a function to improve adhesion between the metal substrate 31 and the electrical conductive carbon layer 33, and a function to prevent elution of ions from the metal substrate 31. In particular, when the R value exceeds the upper limit of the above-described desired range, a significant effect derived from the provision of the middle layer 33 can be obtained. Note that, even when the R value is within the desired range, the middle layer 32 is necessarily provided. From the other point of view, the effect derived from the provision of the middle layer 32 is obtained more significantly when the metal substrate 31 is constituted by aluminum or an aluminum alloy. The following is a desired configuration of the middle layer 32. First, the terms and measuring methods with regard to the middle layer used in this description will be explained.

(a) The columnar crystal structure is a structure in which crystals constituting the middle layer grow into a columnar shape in a film thickness direction.

(b) An average value of the column widths W of the columnar crystals in the cross-section of the middle layer is obtained as follows. First, according to the result of the cross-section observation by a TEM, one column is specified at the column interface confirmed by contrasts in the columnar crystals growing in a direction perpendicular to the metal substrate 31. Then, a distance between one interface parallel to the metal substrate and the other interface is calculated, thereby obtaining the average value of the column widths W.

(c) The percentage of the whole thickness of the middle layer occupied by the columnar crystals present on the electrical conductive carbon layer side having a column width of between 200 nm and 500 nm in the cross-section of the middle layer is obtained as follows. As shown in FIG. 4B, according to the result of the cross-section observation by the TEM, the percentage is obtained as a ratio ($T_2/T_1$) of a thickness $T_2$ of the columnar crystals having the above-mentioned width to an average thickness $T_1$ of the middle layer. The thickness $T_1$ of the middle layer is defined as a thickness in which a height $H_4$ of the protrusion 32a in the middle layer is subtracted.

(d) The electrical conductive carbon layer side in the whole middle layer represents a 50% area in a thickness direction of the middle layer from the electrical conductive carbon layer.

(e) The measurement method of the thickness (average value) of the middle layer can be read from the result of the cross-section observation by the SEM or TEM.

As described above, the middle layer 32 has the columnar crystal structure. As specifically described later, the middle layer 32 provided with the protruded grains 33a present on the outermost surface of the electrical conductive member is preferably formed by a sputtering method. According to the present embodiment, the middle layer 32 is provided between the electrical conductive carbon layer 33 and the metal substrate 31, and the columnar crystal structure of the middle layer 32 is controlled so that the columnar crystals keep having a thick column diameter consistently toward the interface between the middle layer 32 and the electrical conductive carbon layer 33. Accordingly, columnar protrusions (convex portions) are formed on the surface of the middle layer 32. Then, the electrical conductive carbon layer 33 is formed on the middle layer 32. Therefore, the electrical conductive carbon layer 33 is formed along the uneven surface of the middle layer 32. As a result, the middle layer 32 has the columnar crystal structure, and the electrical conductive member provided with the protruded grains 33a formed on the outermost surface thereof is provided. In this electrical conductive member, the middle layer 32 is provided to have the columnar crystals with a thick column diameter, in which the protruded grains 33a are present on the outermost surface thereof. Accordingly, gaps caused between the columnar crystals in the middle layer 32 and gaps and cracks caused in the electrical conductive carbon layer 33 provided on the middle layer 32 are drastically decreased. The protruded grains 33a are derived from the growth of the column diameter in the middle layer. Therefore, the number of gaps in the outermost layer is decreased, thereby providing a function to prevent water intrusion. As a result, oxidation at each interface is suppressed, an increase in contact resistance is prevented while excellent and sufficient electrical conductivity are ensured, and an anticorrosion effect of the metal substrate 31 can be enhanced. Thus, metal such as aluminum that is easily corroded can be also applied to the metal substrate 31 of the metal separator 5.

The middle layer 32 is preferably constituted by materials that can provide the above-described adhesion. Examples of such materials include metal in Group 4 (Ti, Zr, Hf), metal in Group 5 (V, Nb, Ta), metal in Group 6 (Cr, Mo, W) in a periodic table, and carbide, nitride and carbonitride thereof. Among those, metal with less ion elution such as chromium (Cr), tungsten (W), titanium (Ti), molybdenum (Mo), niobium (Nb) or hafnium (Hf), or carbide, nitride or carbonitride thereof is preferably used. More preferably, Cr or Ti, or carbide or nitride thereof is used. Particularly, when Cr or Ti, or carbide or nitride thereof is used, the middle layer 32 can ensure adhesion to the electrical conductive carbon layer 33 located above, and can provide an anticorrosion effect to the metal substrate 31 as a base. When the metal substrate 31 is constituted by, particularly, aluminum or an aluminum alloy, corrosion is promoted due to moisture that reaches the periphery of the interface, and an oxide film of aluminum is formed. As a result, electrical conductivity of the whole metal substrate 31 in a thickness direction is reduced. Since chromium and titanium (or carbide or nitride thereof) form a passivation film, these are particularly effective due to a characteristic of less ion elution even if there are exposed portions. Especially, when the above-mentioned metal with less ion elution (particularly Cr or Ti) or carbide or nitride thereof is used, the corrosion resistant property of the metal separator 5 can be significantly improved.

In the middle layer 32, an average value of the column widths $W_1$, $W_2$, $W_3$ of the columnar crystals in the cross-section of the middle layer 32 is between 200 nm and 500 nm, preferably between 300 nm and 500 nm, more preferably between 400 nm and 500 nm. When the average value of the column widths of the columnar crystals in the cross-section of the middle layer 32 is within the above-mentioned ranges, the gap volume between the columnar crystals is decreased, so that intrusion of moisture reaching the metal substrate 31 can be prevented. Preferably, the crystal structure of the middle layer 32 is controlled when the middle layer 32 is provided, so that the columnar crystals keep having a thick column diameter consistently toward the interface between the middle layer 32 and the electrical conductive carbon layer 33. Therefore, gaps and cracks in the electrical conductive carbon layer 33 formed on the middle layer 32 can be significantly decreased. The grain diameter of the protruded grains 33a in the outermost layer of the electrical conductive member (metal separator 5) is closely related to the column diameter of the columnar crystals. When the column diameter of the columnar crystals becomes thick and the grain diameter of the protruded grains 33a is between 200 nm and 500 nm, the gaps caused in the outermost layer of the electrical conductive member is decreased, so as to obtain a function to prevent water intrusion.

The column width of the columnar crystals in the cross-section of the middle layer 32 is preferably between 200 nm and 500 nm. Preferably, 5 to 95% of the whole thickness of the middle layer 32 is constituted by the columnar crystals having the width within the above-mentioned range, and such columnar crystals are present on the side of the electrical conductive carbon layer 33. In the present embodiment, the width of the columnar crystals in the outermost surface of the middle layer 32 is preferably kept to the interface between the metal substrate 31 and the middle layer 32 as much as possible. However, when the middle layer 32 is provided on the metal substrate 31 first, high energy is necessarily applied to the surface of the metal substrate 31 in order to consistently have the thick columnar crystals. As a result, adhesion between the metal substrate 31 and the middle layer 32 may be decreased. Therefore, as shown in FIG. 4B, the width of the columnar crystals on the side of the metal substrate 31 is preferably thinner than that on the side of the electrical conductive carbon layer 33. Accordingly, the anticorrosion effect of the metal substrate 31 can be more stably maintained while adhesion between the metal substrate 31 and the electrical conductive carbon layer 33 is ensured. The column width of the columnar crystals in the cross-section of the middle layer 32 is between 200 nm and 500 nm, preferably between 200 nm and 400 nm, more preferably between 200 nm and 300 nm. In addition, the columnar crystals having the width within the above-mentioned ranges account for 5 to 95%, preferably 20 to 90%, more preferably 50 to 90% of the whole thickness of the middle layer 32, and such columnar crystals are preferably formed on the side of the electrical conductive carbon layer 33.

A thickness of the middle layer is not particularly limited. However, in order to achieve a reduction in size of the fuel cell stack by reducing the thickness of the metal separator 5 as much as possible, the thickness of the middle layer 32 is preferably between 0.01 µm and 10 µm, more preferably between 0.02 µm and 5 µm, even more preferably between 0.05 µm and 5 µm, most preferably between 0.1 µm and 1 µm. When the thickness of the middle layer 32 is 0.01 µm or more, an even layer is formed so as to improve the corrosion resistance of the metal substrate 31 effectively. When the thickness of the middle layer 32 is 10 µm or less, an increase in film stress of the middle layer 32 is suppressed. Accordingly, a decrease of a film-following property with respect to the metal substrate 31 and a generation of exfoliation and cracks associated therewith can be prevented.

Especially, the thickness of the middle layer 32 is preferably between 0.02 µm and 5 µm. When the middle layer 32 has the thickness within the above-mentioned range, the middle layer 32 further preferably has the following constitution. That is, the columnar crystals having the width of 200 nm to 500 nm on the surface of the middle layer 32 on the side of the electrical conductive carbon layer 33 preferably account for 5% or more of the whole thickness of the middle layer 32 in a direction from the electrical conductive carbon layer 33 to the metal substrate 31. Further, the columnar crystals having the above-mentioned width preferably account for preferably 20 to 90%, more preferably 50 to 90% of the whole thickness of the middle layer 32 in the direction from the electrical conductive carbon layer 33 to the metal substrate 31.

When the thickness of the middle layer 32 is less than 0.02 µm, the columnar crystal structure of the middle layer 32 is undeveloped, and thus, it is difficult to maintain density in the middle layer 32. On the other hand, when the thickness of the middle layer 32 exceeds 5 µm, film stress is increased, and cracks and exfoliation may be caused since adhesion to the metal substrate 31 is decreased. However, the thickness of the middle layer 32 may be approximately up to 10 µm as long as the desired effect of the present invention is ensured. Moreover, the width of the columnar crystals is preferably kept to the interface between the metal substrate 31 and the middle layer 32 as much as possible. Due to such a steric structure of the middle layer 32, the anticorrosion effect of the metal substrate 31 can be more stably ensured while strong adhesion between the metal substrate 31 and the electrical conductive carbon layer 33 is maintained.

In addition, the surface of the middle layer 32 on the side of the electrical conductive carbon layer 33 is preferably constituted by a concave-convex structure at a nano level. Due to such a configuration, adhesion of the electrical conductive carbon layer 33 to the middle layer 32 can be further improved.

Further, when a coefficient of thermal expansion of the middle layer 32 is close in value to a coefficient of thermal expansion of metal constituting the metal substrate 31, adhesion between the middle layer 32 and the metal substrate 31 is improved. However, such a condition may decrease adhesion between the middle layer 32 and the electrical conductive carbon layer 33. Also, when a coefficient of thermal expansion of the middle layer 32 is close in value to a coefficient of thermal expansion of the electrical conductive carbon layer 33, adhesion between the middle layer 32 and the metal substrate 31 may be decreased. In view of these situations, the relation among the coefficient of thermal expansion ($\alpha_{mid}$) of the middle layer 32, the coefficient of thermal expansion ($\alpha_{sub}$) of the metal substrate 31, and the coefficient of thermal expansion ($\alpha_c$) of the electrical conductive carbon layer 33 preferably meets the following formula.

[Math 2]

$$\alpha_{sub} > \alpha_{mid} > \alpha_c$$

Although the middle layer 32 may be provided on at least one surface of the metal substrate 31, the middle layer 32 is preferably provided on both surfaces of the metal substrate 31. As described above, the electrical conductive carbon layer 33 may be present on both sides of the metal substrate 31. In such a case, the middle layers 32 are preferably interposed between the metal substrate 31 and the respective electrical conductive carbon layers 33 on both sides of the metal substrate 31. In the case where the middle layer 32 is provided only between the metal substrate 31 and one of the electrical conductive carbon layers 33, the middle layer 32 is preferably provided on the side of the electrical conductive carbon layer 33 that is to be positioned on the side of the MEA 9.

The following is a preferable embodiment for manufacturing the electrical conductive member according to the present embodiment. However, the scope of the present invention is not limited only to the following embodiment. The conditions such as a material for the respective elements of the electrical conductive member constituting the metal separator 5 are the same as described above, and therefore, the explanation thereof will not be repeated in this embodiment.

First, as a constitution material of the metal substrate 31, an aluminum plate, an aluminum alloy plate, titanium plate, or stainless steel plate having a desired thickness is prepared. Next, the surface of the prepared constitution material of the metal substrate 31 is subjected to a degreasing and washing treatment by use of an appropriate solvent. Examples of the solvent include ethanol, ether, acetone, isopropyl alcohol, trichloroethylene, and a caustic alkali agent. Examples of the degreasing and washing treatment include ultrasonic cleaning. With regard to the conditions of ultrasonic cleaning, a treatment time is approximately 1 to 10 minutes, a frequency is approximately 30 to 50 kHz, and a power is approximately 30 to 50 W.

Then, an oxide film formed on the surface of the constitution material of the metal substrate 31 is removed. Examples of a method for removing the oxide film include a washing treatment by acid, a dissolution treatment by applying an electrical potential, and an ion bombardment treatment. In addition, preferably, an alkali immersion cleaning, an oxide film removal by alkali (alkali etching), and a surface activation treatment by a hydrofluoric acid mixed solution are performed, followed by a zincate treatment in a zinc substitution bath. Although conditions for the zincate treatment are not particularly limited, for example, a bath temperature is 10 to 40° C. and an immersion time is 20 to 90 seconds. The removal process of the oxide film may be omitted.

Preferably, these treatments are performed on the surface of the metal plate at least on which the middle layer is formed. More preferably, these treatments are performed on both sides of the metal plate.

Next, the electrical conductive carbon layer 33 is formed on the surface of the constitution material of the metal substrate 31 on which the above-mentioned treatments are performed. For example, a layer including electrical conductive carbon is stacked on the metal substrate 31 at an atomic level so as to obtain the electrical conductive carbon layer 33, by use of the above-mentioned constitution material (such as graphite) of the electrical conductive carbon layer 33 as a target. Thus, adhesion at the interface between the electrical conductive carbon layer 33 and the metal substrate 31 directly attached to each other and the periphery thereof can be maintained for a long period of time due to an intermolecular force or an entry of a small amount of carbon atoms.

When the middle layer 32 and the electrical conductive carbon layer 33 are sequentially formed on the surface of the metal substrate 31 on which the above-mentioned treatments are performed, the middle layer 32 is first formed on at least one surface of the metal substrate 31 before the formation of the electrical conductive carbon layer 33. As a method for forming the middle layer 32, a method similar to the electrical conductive carbon layer 33 as described later is applied. It is to be noted that the target is required to be changed to the constitution material of the middle layer 32.

Especially in this embodiment, negative bias voltage is preferably shifted from a lower level to a higher level at the time of the formation of the middle layer 32. Specifically, as described in Example I-8 below, at an early stage of the formation of the middle layer 32, the formation is started at low bias voltage (at least more than 0 V, between more than 0 V and 50 V) so as not to increase surface roughness at the interface between the middle layer 32 and the metal substrate 31. Then, the bias voltage is shifted to a high level (generally between 50 and 500 V, preferably between 100 and 250 V), so as to increase the width of the columnar crystals. The appropriate columnar crystal structure can be controlled through a preliminary experiment and the like.

As described above, at the early stage of the formation of the middle layer 32, the formation may be started at low bias voltage so as not to increase surface roughness at the interface between the middle layer 32 and the metal substrate 31. For example, the bias voltage is initially set at more than 0 to 50 V. Then, there may be a range in which the voltage is shifted from a higher level to a lower level, such as 120 V→90 V→200 V. This is because the column diameter of the columnar crystals becomes small when the bias voltage is a lower level, the column diameter of the columnar crystals becomes large when the bias voltage is a higher level, and the column diameter at the high voltage level can be maintained even the voltage is then shifted to a lower level and the like. Namely, at the early stage of the formation of the middle layer 32, the formation may be started at lower bias voltage so as not to increase surface roughness at the interface between the middle layer 32 and the metal substrate 31, followed by shifting the bias voltage to a higher level. As a result, the width of the columnar crystals can be increased regardless of the voltage variation. The electrical conductive carbon layer 33 is then formed along the thick columnar crystals of the middle layer 32.

As a method for manufacturing the electrical conductive member, the electrical conductive member can be obtained in which the middle layer 32 has a columnar crystal structure and the outermost layer is provided with the protruded grains 33a, by a simple method only to change a setup value of a device. Especially when the middle layer 32 is formed on the metal substrate 31 first, high energy is applied to the surface of the metal substrate 31 in order to consistently have the thick columnar crystals. As a result, adhesion between the metal substrate 31 and the middle layer 32 may be decreased. Therefore, the width of the columnar crystals on the side of the metal substrate 31 is preferably thinner than that on the side of the electrical conductive carbon layer 33. Thus, at the early stage of the formation of the middle layer 32, the formation is preferably started at lower bias voltage so as not to increase surface roughness at the interface between the middle layer 32 and the metal substrate 31. However, with regard to the width of the columnar crystals in the following stage, the large column diameter of the columnar crystals is preferably kept to the interface between the electrical conductive carbon layer 33 and the middle layer 32 as much as possible. Thus, the bias voltage is then shifted to a higher level, so as to increase the width of the columnar crystals. Then, the electrical conductive carbon layer 33 is developed along the columnar crystals of the middle layer 32. Due to such a manufacturing method, the columnar crystals of the middle layer 32 have a thick column diameter consistently toward the interface between the middle layer 32 and the electrical conductive carbon layer 33. Accordingly, gaps and cracks in the electrical conductive carbon layer 33 formed on the middle layer 32 can be decreased.

As a method of shifting the negative bias voltage from a lower level to a higher level, a sputtering method is preferably used. In addition, the electrical conductive carbon layer 33 is also preferably formed by a sputtering method. Furthermore, the middle layer 32 is preferably formed prior to the electrical conductive carbon layer 33 by a similar dry process, especially a sputtering method, for convenience in process. In this case, since the middle layer 32 can be formed by the same method and device as the electrical conductive carbon layer 33, a manufacture process cost can be reduced.

In the process of the formation of the middle layer 32, the surface of the metal substrate 31 is preferably subjected to a pretreatment such as a polishing treatment, followed by forming a film on the surface of the metal substrate 31 by a sputtering method. This is because the column diameter of the respective columnar crystals increases caused by a decrease in number of nucleating sites of the columnar crystals when the surface roughness of the metal substrate 31 is decreased because of the polishing treatment. As for the pretreatment, generally operated treatments can be widely employed in addition to the polishing treatment. For example, electrolytic polishing, a lapping treatment, or a microshot treatment can be applied.

Next, the middle layer 32 and the electrical conductive carbon layer 33 are sequentially formed on the surface of the constitution material of the metal substrate 31 on which the above-mentioned treatments are performed. For example, using the above-mentioned constitution material (such as chromium) of the middle layer 32 as a target, the chromium middle layer 32 is stacked on the respective surfaces of the metal substrate 31 (such as aluminum or alloy thereof) by shifting the bias voltages as described above. Then, sequentially using the constitution material (such as graphite) of the electrical conductive carbon layer 33 as a target, the layer 33 containing electrical conductive carbon is stacked at an atomic level on each surface of the middle layer 32. Therefore, the middle layer 32 and the electrical conductive carbon layer 33 can be sequentially formed. In addition, adhesion at each interface of the electrical conductive carbon layer 33, the middle layer and the metal substrate 31 directly attached to each other and the periphery thereof can be maintained for a long period of time due to an intermolecular force or an entry of a small amount of carbon atoms.

Preferable examples of a method for stacking the middle layer 32 and the electrical conductive carbon layer 33 include a physical vapor deposition (PVD) method such as a sputtering method and an ion plating method, and an ion beam deposition method such as a filtered cathodic vacuum arc (FCVA) method. Examples of the sputtering method include a magnetron sputtering method, an unbalanced magnetron sputtering (UBM) method, a dual magnetron sputtering method, and an ECR sputtering method. Examples of the ion plating method include an arc ion plating method. Especially, the sputtering method and the ion plating method are preferable, and the sputtering method is more preferable. Due to those methods, a carbon layer with a small content of hydrogen can be formed. As a result, a connection ratio between carbon atoms ($sp^2$ hybridized carbon) can be increased, and excellent electrical conductivity can be achieved. Moreover, the film formation at a relatively low temperature is possible, and therefore, damage to the metal substrate 31 can be minimized. Particularly according to the sputtering method, bias voltage and the like is controlled so that the middle layer 32 having the above-mentioned columnar crystal structure can be obtained.

As described above, when the middle layer 32 and the electrical conductive carbon layer 33 are formed by the sputtering method, negative bias voltage is preferably applied to the metal substrate 31 at the time of sputtering. According to such a process, the middle layer 32 having the columnar crystal structure and the electrical conductive carbon layer 33 in which graphite clusters are densely assembled can be formed due to an ion irradiation effect. The middle layer 32 thus obtained enhances the anticorrosion effect of the metal substrate 31, and metal that is easily corroded such as aluminum can be also applied to the metal substrate 31. Further, since the electrical conductive carbon layer 33 has excellent electrical conductivity, the metal separator 5 with a small contact resistance to the other members (such as MEA 9) can be provided.

In the present embodiment, an absolute value of the applied negative bias voltage is not particularly limited, and any voltage capable of forming the electrical conductive carbon layer 33 can be employed. The applied voltage is preferably between 50 and 500 V, more preferably between 100 and 300 V. On the other hand, in the middle layer 32, the method of shifting the negative bias voltages at the film formation from a lower level to a higher level is preferable, as described above. Specifically, as described in Examples below, the film formation is started at low bias voltage (between more than 0 and 50 V) at the initial stage of the formation of the middle layer 32, followed by shifting the bias voltage to a high level (generally between 50 and 500 V, preferably between 100 and 250 V), so as to increase the width of the columnar crystals. As described above, at the early stage of the formation of the middle layer 32, the formation may be started at lower bias voltage. Then, there may be a range in which the voltage is shifted from a higher level to a lower level, such as 120 V→90 V→200 V.

Other conditions at the time of the film formation are not particularly limited, and conventionally known findings are appropriately applied. In the case where the electrical conductive carbon layer 33 is formed by a UBMS method, the middle layer 32 is preferably formed preliminarily using a similar device and method, followed by forming the electrical conductive carbon layer 33 thereon. Thus, the middle layer 32 and the electrical conductive carbon layer 33 having excellent adhesion to the metal substrate 31 are formed. Note that, the middle layer 32 may be formed using a different method and device, followed by forming the electrical conductive carbon layer 33 using a different device and method. Even in such a case, the middle layer 32 and the electrical conductive carbon layer 33 having excellent adhesion to the metal substrate 31 are formed. When the electrical conductive carbon layer 33 is formed on the metal substrate 31 using other means or devices, the electrical conductive carbon layer 33 having excellent adhesion to the metal substrate 31 is formed even when the middle layer is not provided.

According to the above-mentioned method, the middle layer 32 and the electrical conductive carbon layer 33 are formed on one side of the metal substrate 31. In the case where the middle layer 32 and the electrical conductive carbon layer 33 are formed on both sides of the metal substrate 31, the middle layer 32 and the electrical conductive carbon layer 33 may be formed on the other side of the metal substrate 31 in a similar manner. According to the method similar to the above-mentioned method, the electrical conductive member provided with the middle layer 32 and the electrical conductive carbon layer 33 formed on the respective sides of the metal substrate 31 at the same time is manufactured. When the middle layer 32 and the electrical conductive carbon layer 33 are formed on both sides of the metal substrate 31, a commercially-available film formation device (simultaneous both side sputtering film formation device) may be used. Alternatively, the middle layer 32 and the electrical conductive carbon layer 33 may be formed on one side of the metal substrate 31 first, followed by forming the middle layer 32 and the electrical conductive carbon layer 33 on the other side of the metal substrate 31 sequentially, although this is not advantageous in terms of cost performance. Possibly, first, the middle layer 32 is formed on one surface of the metal substrate 32, followed by forming the middle layer 32 on the other side in a device using chromium as a target. Next, by changing the target to carbon, the electrical conductive carbon layer 33 is formed on the middle layer 32 formed on one side, followed by forming the electrical conductive carbon layer 33 on the other side. Thus, when the middle layer 32 and the electrical conductive carbon layer 33 are formed on the respective sides of the metal substrate 31, the similar method to the case of the one-side formation is also applied.

Figure 19:
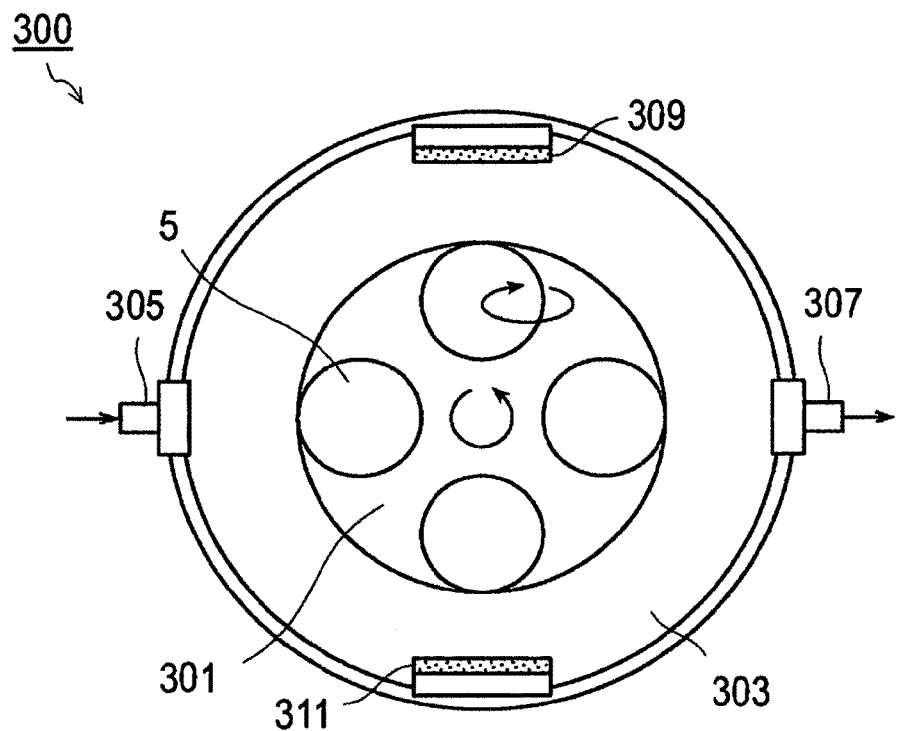
FIG. 19 is a planar schematic view showing a production device for forming a middle layer and an electrical conductive carbon layer by a sputtering method.
Figure 20:
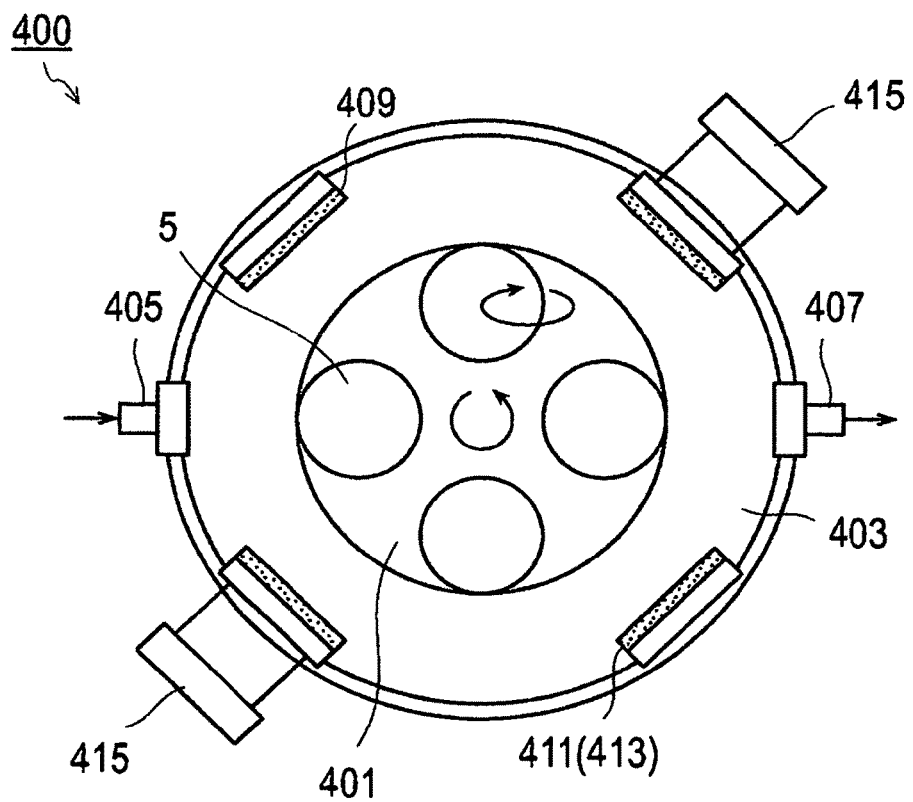
FIG. 20 is a planar schematic view showing a production device for forming a middle layer and an electrical conductive carbon layer by an arc ion plating method.

FIG. 19 is a planar schematic view showing a production device for forming at least one of the middle layer 32 and the electrical conductive carbon layer 33 by a sputtering method. In the figure, a device that is applicable to an unbalanced magnetron sputtering method used in Examples is shown as a sputtering device. FIG. 20 is a planar schematic view showing a production device for forming at least one of the middle layer 32 and the electrical conductive carbon layer 33 by an arc ion plating method. Note that, FIGS. 19 and 20 respectively show an example of installing an available disk-shaped wafer instead of the flat metal separator 5 before concave-convex pressing.

When sputtering is performed using devices 300 and 400 shown in FIGS. 19 and 20, one or more metal separators 5 are placed on rotating tables 301 and 401. In order to form the layers on both sides of each metal separator 5, each metal separator 5 also rotates in a direction perpendicular to a rotation axis of each table. Each axis of the arrow directions of the tables 301 and 401, and each axis of the arrow directions of the respective metal separators 5 are perpendicular to each other.

The inside of each vacuum chamber 303 and 403 is kept at $10^{-1}$ to $10^{-2}$ Torr level, so that inert gas (such as $N_2$ and Ar) is introduced thereto from air supply inlets 305 and 405, as necessary. In order to control a predetermined pressure level (such as vacuum) in the vacuum chambers 303 and 403, unnecessary gas is arbitrarily emitted from exhaust outlets 307 and 407.

The vacuum chambers 303 and 403 and the tables 301 and 401 holding each metal separator 5 are connected with a temperature controller for temperature controlling, respectively.

First, the surface of each metal separator 5 is subjected to Ar ion bombardment, so that an oxide film formed on the surface layer of each metal separator 5 is removed. A removal time may be several seconds to several minutes since the oxide film is formed with the thickness of several angstroms. In the present embodiment, Cr is provided as the middle layer 32 before the formation of the electrical conductive carbon layer 33. Thus, Cr targets 309 and 409 are arranged in the chambers 301 and 401. After the formation of the middle layer 32 using Cr, the electrical conductive carbon layer 33 is formed by use of carbon targets 311 and 411 that are subsequently arranged in the same chambers 301 and 401. As described in Example I-8 below, the middle layer 32 may be formed with constant bias voltage without changing the voltage level, or formed with a change of the bias voltage twice or more. In such a case, the middle layer 32 may be formed while continuously changing the bias voltage. In addition, the middle layer 32 may be formed continuously by changing bias voltage, temperature or vacuum of each metal separator 5 (refer to Example I-8). The electrical conductive carbon layer 33 may also be formed with constant bias voltage without changing the voltage level, or formed with a change of the bias voltage twice or more. When the electrical conductive carbon layer 33 contains hydrogen in carbon molecules constituting the layer, electrical conductivity tends to be decreased. Therefore, sputtering using a solid (such as carbon graphite) as a target is preferable.

When the electrical conductive carbon layer 33 is formed by the arc ion plating method using the device shown in FIG. 20 (refer to Example I-6), the carbon target 411 can be used as a target similar to FIG. 19. By providing another evaporation source 413 for arc discharge, the electrical conductive carbon layer 33 can be formed without reducing the degree of vacuum in the same chamber 401. In addition, when the electrical conductive carbon layer 33 is formed by the AIP method using the device shown in FIG. 20, the electrical conductive carbon layer 33 may also be formed with constant voltage, current, vacuum, temperature and bias voltage of an arc power source 415 with no change of the respective values in order to obtain the electrical conductive carbon layer 33 having predetermined characteristics, or may be formed with a change of those values arbitrarily.

The electrical conductive carbon layer 33 is preferably formed in the same batch using the device shown in FIG. 19 or 20 after exchanging the targets after the vapor deposition of the middle layer 32, by changing at least one of bias voltage, temperature, vacuum and the amount of supplied gas. This is because the electrical conductive carbon layer 33 can be formed sequentially after the formation of the middle layer 32 and formed in the same formation process, which is advantageous in terms of cost reduction.

In the present embodiment, the middle layer 32 and the electrical conductive carbon layer 33 are preferably formed by sputtering using the device shown in FIG. 19 (Examples I-1 to I-5, I-8 and I-9), or by the AIP method (refer to Example I-6) or the ECR sputtering method (refer to Example I-7) using the device shown in FIG. 20. Due to sputtering or the AIP method, an electrical conductive path from one side to the other side of the electrical conductive carbon layer 33 is obtained. Therefore, the electrical conductive member having further enhanced resistance to corrosion can be provided while excellent electrical conductivity is ensured sufficiently. Further, due to sputtering or the AIP method, the middle layer that prevents an increase in contact resistance can be formed while excellent electrical conductivity is ensured sufficiently.

The middle layer 32 and the electrical conductive carbon layer 33 are preferably formed by use of a solid source (such as graphite carbon). If a gas source is used, the high-quality middle layer 32 and electrical conductive carbon layer 33 with a high quality are not easily obtained because of currently available gas species. This is because hydrogen enters the middle layer 32 and the electrical conductive carbon layer 33, and therefore, electrical conductivity is decreased. Each size and number of the targets 309, 311, 409, 411 and 413 can be adjusted appropriately according to the size or throughput of the metal separator 5.

The middle layer 32 and the electrical conductive carbon layer 33 according to the present embodiment can be applied not only to the metal separator 5 but also to any surfaces of the other members where electrical conductivity and corrosion resistance are required. Examples of such members include collectors 30 and 40 (see FIG. 14) provided on both ends of a stack 20 in which a plurality of cells are stacked, and terminal connection members (see output terminals 37 and 47 in FIG. 14) for monitoring voltage.

The electrical conductive member according to the present embodiment can be used for various purposes. One of representative examples is the metal separator 5 of the cell unit 1 shown in FIG. 1. However, the electrical conductive member according to the present embodiment is not limited to the metal separator 5. For example, the electrical conductive member can be used for a separator for various types of fuel cells such as a phosphoric acid fuel cell (PAFC), a molten carbonate fuel cell (MCFC), a solid oxide fuel cell (SOFC) and an alkaline fuel cell (AFC), in addition to the PEFC. Other than the separator for a fuel cell, the electrical conductive member is used for various purposes in which both electrical conductivity and corrosion resistance are required. Examples of the purposes using the electrical conductive member according to the present embodiment include other members in a fuel cell (collector, bus bar, gas diffusion substrate, MEA), and contact points of electronic members.

In addition, the electrical conductive member according to the present embodiment can be used under a humid environment and a conducting environment. Under such environments, the function effect of the present invention in achieving both electrical conductivity and corrosion resistance is significantly achieved. The "humid environment" represents an environment in which a relative humidity in an atmosphere in contact with the electrical conductive member is 30% RH or more. The relative humidity in this embodiment is preferably 30% RH or more, more preferably 60% RH or more, particularly preferably 100% RH or more. The "conducting environment" in which the electrical conductive member according to the present embodiment is used represents an environment in which current flows through the electrical conductive member with current density of 0.001 A/cm$^2$ or more. The current density is preferably 0.01 A/cm$^2$ or more.

Figure 14:
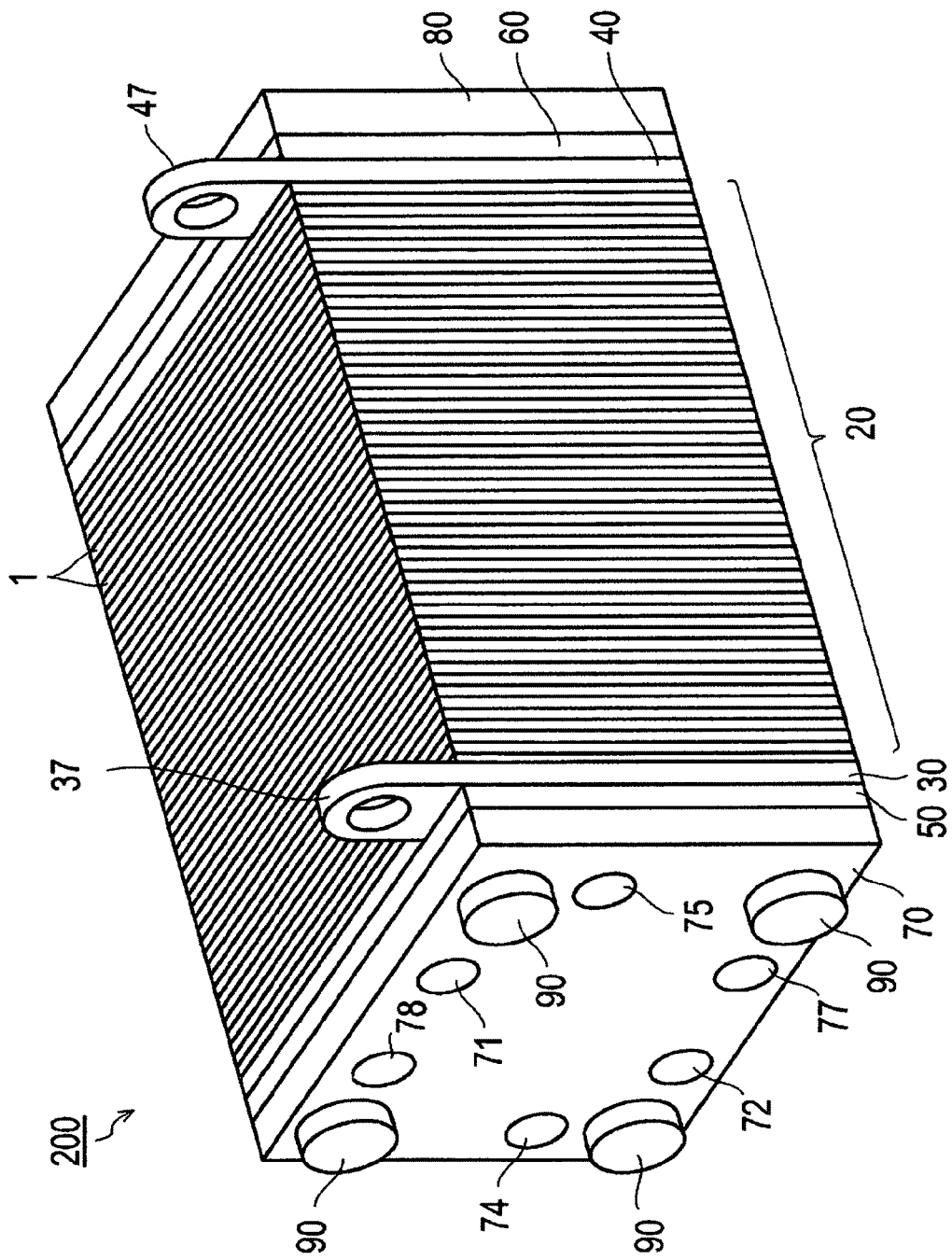
FIG. 14 is a perspective view of the fuel cell stack of FIG. 13.

Next, the components constituting the PEFC using the metal separator 5 constituted by the electrical conductive member according to the present embodiment will be explained with reference to FIGS. 1 to 4, 13 and 14. The present embodiment is characterized by the electrical conductive member constituting the separator. Thus, specific configurations such as a shape of the metal separator 5 in the cell unit 1, and specific configurations of other members other than the metal separator 5 constituting a fuel cell are arbitrarily modified with reference to conventionally known findings. FIG. 13 is a schematic cross-sectional view for illustrating one example of a fuel cell stack constitution in which a plurality of cell units of the fuel cell shown in FIG. 1 are stacked. FIG. 14 is a perspective view of the fuel cell stack constitution of FIG. 13.

[Electrolyte Layer]

The electrolyte membrane 2 is constituted by the polymer electrolyte membrane 2, for example, shown in FIGS. 1 and 13. The polymer electrolyte membrane 2 has a function to selectively transmit protons generated in the anode catalyst layer 3a at the time of the operation of the PEFC to the cathode catalyst layer 3b along a film thickness direction. In addition, the polymer electrolyte membrane 2 has a function as a separating wall not to mix the fuel gas 5ag supplied to the anode side with the oxidant gas 5bg supplied to the cathode side.

The polymer electrolyte membrane 2 is divided into a fluorinated polymer electrolyte membrane and a hydrocarbon polymer electrolyte membrane depending on the type of ion exchange resin as a constitutional material. Examples of the ion exchange resin constituting the fluorinated polymer electrolyte membrane include a perfluorocarbon sulfonic acid polymer such as Nafion (registered trademark, manufactured by DuPont Corporation), Aciplex (registered trademark, manufactured by Asahi Kasei Corporation), and Flemion (registered trademark, manufactured by Asahi Glass Co. Ltd.); a perfluorocarbon phosphonic acid polymer; a trifluorostyrene sulfonic acid polymer; an ethylenetetrafluoroethylene-g-styrene sulfonic acid polymer; an ethylene-tetrafluoroethylene copolymer; and a polyvinylidene fluoride-perfluorocarbon sulfonic acid polymer. In view of an improvement of power generation performance such as heat resistance and chemical stability, the above-mentioned fluorinated polymer electrolyte membranes are preferably used. Particularly, the fluorinated polymer electrolyte membrane constituted by the perfluorocarbon phosphoric acid polymer is preferably used.

Specific examples of the hydrocarbon polymer electrolyte membrane include sulfonated polyether sulfone (S-PES), sulfonated polyaryl ether ketone, alkyl sulfonated polybenzimidazole, alkyl phosphonated polybenzimidazole, sulfonated polystyrene, sulfonated polyether ether ketone (S-PEEK), and sulfonated polyphenylene (S-PPP). In view of manufacturing reasons such as low-cost raw materials, easy manufacturing processes, and high material selectivity, the above-mentioned hydrocarbon polymer electrolyte membranes are preferable. The above-mentioned ion exchange resins may be used singly, or may be used with a combination of two or more types thereof.

A thickness of the electrolyte membrane 2 may be determined appropriately in view of the characteristics of the fuel cell to be obtained, and is not particularly limited. However, the thickness of the electrolyte layer is generally approximately between 5 μm and 300 μm. When the thickness of the electrolyte layer is within such a range, the balance among intensity during the formation, durability in use, and output property in use can be controlled properly.

[Catalyst Layer]

The catalyst layers 3 (anode catalyst layer 3a, cathode catalyst layer 3b) shown in FIGS. 1 and 13 are layers in which a cell reaction actually proceeds. Specifically, an oxidation reaction of hydrogen proceeds in the anode catalyst layer 3a, and a reduction reaction of oxygen proceeds in the cathode catalyst layer 3b. The catalyst layers 3 include a catalyst component, a catalyst support supporting the catalyst component, and an electrolyte. Hereinafter, a composite body in which the catalyst component is supported on the catalyst support is also referred to as an electrode catalyst.

The catalyst component used for the anode catalyst layer 3a is not particularly limited as long as it has a catalytic function for an oxidation reaction of hydrogen, and a well-known catalyst may be used. The catalyst component used for the cathode catalyst layer 3b is also not particularly limited as long as it has a catalytic function for a reduction reaction of oxygen, and a well-known catalyst may be used. Specifically, the catalyst component may be selected from platinum, ruthenium, iridium, rhodium, palladium, osmium, tungsten, lead, iron, chromium, cobalt, nickel, manganese, vanadium, molybdenum, gallium and aluminum, and alloys of those.

Among them, the catalyst component at least containing platinum is preferably used in order to enhance catalytic activity, poisoning resistance to carbon monoxide, heat resistance, and the like. With regard to a composition of the alloy, the content of platinum is preferably 30 to 90 atom %, and the content of metal alloyed with platinum is preferably 10 to 70 atom %, although the composition depends on the type of metal formed into the alloy. It is to be noted that an alloy is generally constituted by a metal element to which one or more of different metal elements or nonmetal elements added, and is a general term of elements having a metallic property. Examples of a constitution of the alloy include an eutectic alloy as a so-called mixture in which component elements become individual crystals, a solid solution in which the component elements are completely blended together, and a compound in which the component elements compose an intermetallic compound or a compound of metal and nonmetal, and any of those may be applied to the present invention. In the present embodiment, the catalyst component used in the anode catalyst layer 3a and the catalyst component used in the cathode catalyst layer 3b can be appropriately selected from the above-mentioned components. In the following description, unless otherwise specified, the similar definition between the anode catalyst layer and the cathode catalyst layer will be made with regard to the catalyst components, which are collectively referred to as a "catalyst component". However, the catalyst components for the anode catalyst layer 3a and for the cathode catalyst layer 3b are not necessarily the same. The catalyst components are appropriately selected for each catalyst layer so as to exert the desired effects described above.

A shape and size of the catalyst component is not particularly limited, and a similar shape and size to well-known catalyst components can be employed. However, the catalyst component preferably has a granular shape. In this case, an average particle diameter of catalyst particles is preferably between 1 nm and 30 nm. When the average particle diameter of the catalyst particles is within the above-mentioned range, the balance between catalyst efficiency and supporting easiness with regard to an effective electrode area in which an electrochemical reaction proceeds is controlled appropriately. Note that, the "average particle diameter of catalyst particles" in the present invention is measured as a crystallite diameter obtained from a full width at half maximum of a diffraction peak of the catalyst component in an X-ray diffraction, or measured as an average value of the particle diameters of the catalyst component observed by a transmission electron microscope.

The catalyst support functions as a support for supporting the catalyst component described above, and functions as an electrical conductive path involved in a communication of electrons among the catalyst component and other members.

The catalyst support preferably has a specific surface area sufficient to support the catalyst component in a desired dispersed state, and has sufficient electron conductivity. Preferably, the catalyst support contains carbon as a main component. Specifically, carbon particles constituted by carbon black, activated carbon, coke, natural graphite, artificial graphite, and the like are included. In the present embodiment, "containing carbon as a main component" denotes that carbon atoms are contained as a main component, and includes concepts that the catalyst support is composed only of the carbon atoms, and that the catalyst support is substantially constituted by the carbon atoms. Depending on the situations, elements other than the carbon atoms may be contained in order to improve the characteristics of the fuel cell. Note that, "being substantially constituted by the carbon atoms" denotes that inclusion of impurities with approximately 2 to 3% by mass or less may be permitted.

The catalyst support preferably has a BET specific surface area sufficient to support the catalyst component in a highly dispersed state. The BET specific surface area is preferably between 20 and 1600 $m^2/g$, more preferably between 80 and 1200 $m^2/g$. When the specific surface area of the catalyst support is within the above-mentioned ranges, the balance between dispersibility of the catalyst component and efficiency of the catalyst component on the catalyst support can be controlled appropriately.

A size of the catalyst support is not particularly limited, but an average particle diameter is preferably between 5 nm and 200 nm, more preferably between 10 nm and 100 nm, in view of supporting easiness, catalyst efficiency, thickness control of the catalyst layer within an appropriate range, and the like.

In the electrode catalyst in which the catalyst component is supported on the catalyst support, the supported amount of the catalyst component is preferably 10 to 80% by mass, more preferably 30 to 70% by mass, with respect to the total amount of the electrode catalyst. When the supported amount of the catalyst component is within the above-mentioned ranges, the balance between dispersibility of the catalyst component and catalyst performance on the catalyst support can be controlled appropriately. Note that, the supported amount of the catalyst component in the electrode catalyst is measured by an inductively coupled plasma emission spectrometry (ICP).

The respective catalyst layers 3 include an ion conductive polymer electrolyte in addition to the electrode catalyst. The polymer electrolyte is not particularly limited, and conventionally known findings are appropriately applied. For example, the above-mentioned ion exchange resin constituting the polymer electrolyte membrane 2 is added to the catalyst layers 3 as a polymer electrolyte.

[Gas Diffusion Layer (GDL)]

The gas diffusion layers 4a and 4b shown in FIGS. 1 and 13 have a function to promote diffusion of the gases 5ag and 5bg in the catalyst layers 3a and 3b supplied via the gas flow paths 5aa and 5bb of the metal separators 5a and 5b, and a function as an electrical conductive path.

A material constituting substrates of the gas diffusion layers 4 (4a, 4b) is not particularly limited. Examples of the material include a sheet-like material having electrical conductivity and porosity, such as carbon-made fabric, finished paper, felt, and nonwoven fabric. Although a thickness of the substrates of the gas diffusion layers (4a, 4b) may be appropriately determined in view of the property of the gas diffusion layers 4 to be obtained, the thickness may be approximately between 30 μm and 500 μm. When the thickness of the substrates of the gas diffusion layers 4 is within the above-mentioned range, the balance between a mechanical strength and dispersibility of gas and water can be controlled appropriately.

The gas diffusion layers 4 preferably contain a water repellent agent in order to prevent a flooding phenomenon and the like by increasing water repellency. Examples of the water repellent agent include a fluorinated polymer material such as polytetrafluoroethylene (PTFE), polyvinylidene fluoride (PVDF), polyhexafluoropropylene, and a tetrafluoroethylene-hexafluoropropylene copolymer (FEP), polypropylene, and polyethylene.

In addition, in order to further improve water repellency, the respective gas diffusion layers 4 may be provided with a carbon particle layer containing the water repellent agent and constituted by an aggregation of carbon particles on the side of the catalyst layer.

As for the carbon particles included in the carbon particle layer, conventionally well-known materials such as carbon black, graphite and exfoliated graphite are appropriately used. Particularly, carbon black such as oil furnace black, channel black, lamp black, thermal black and acetylene black is preferable because of excellent electronic conductivity and a large specific surface area. An average grain diameter of the carbon particles is preferably approximately between 10 nm and 100 nm. Accordingly, high drainage property due to a capillary force can be obtained, and adhesion to the catalyst layers 3 can also be enhanced.

A water repellent agent to be used in the carbon particle layer may be similar to the above-mentioned water repellent agent. In particular, the fluorinated polymer material is preferably used because of high water repellency and corrosion resistance at the time of the electrode reaction.

A mixture ratio between the carbon particles and the water repellent agent in the carbon particle layer is preferably approximately 90:10 to 40:60 (carbon particles:water repellent agent) (mass ratio), in view of the balance between water repellency and electronic conductivity. A thickness of the carbon particle layer is preferably between 10 and 1000 μm, more preferably between 50 and 500 μm although the thickness may be arbitrarily determined in view of water repellency in the gas diffusion layers to be obtained.

[Fundamental Constitution of Cell Unit]

In FIGS. 1 and 13, the single cell 1 includes the MEA 9 in which a fuel electrode constituted by the electrode catalyst layer 3a and the gas diffusion layer 4a and an oxygen electrode constituted by the electrode catalyst layer 3b and the gas diffusion layer 4b are provided on both sides of the polymer electrolyte membrane 2, respectively. The MEA 9 is interposed between the anode separator 5a and the cathode separator 5b. The fuel gas 5ag and the oxidant gas 5bg supplied to the MEA 9 are supplied to the anode separator 5a and the cathode separator 5b via the fuel gas flow path 5aa and the oxidant gas flow path 5bb.

A stack having the single cell 1 or stacking two or more of the single cells 1 is fixed by a pair of end plates, i.e. a fuel electrode side end plate 70 and an oxygen electrode side end plate 80, from both sides in a thickness direction (see FIG. 14).

The fuel cell of the present embodiment is used as a power source. Examples of the applications of the power source include a stationary power source, a power source for a commercial mobile device such as a mobile phone, an emergency power source, an outdoor power source for leisure and construction, and a power source for transportation such as a vehicle having a limited installation space. Particularly, the transportation power source is required to have high output voltage after stopping a relatively long driving. When the fuel cell according to the present embodiment is installed in a vehicle, constitution parts (electrical conductive member) such as the metal separator 5 and the collectors 30 and 40 are totally reduced in thickness and cost, so as to improve output density. As a result, a reduction in vehicle weight and vehicle manufacturing cost can be achieved. In addition, when the fuel cell having the same volume is installed in a vehicle, the vehicle can travel a longer distance, and an acceleration performance can also be improved. Moreover, the electrical conductive member such as the metal separator 5 and the collectors 30 and 40 of the fuel cell has excellent resistance to corrosion, and an improvement in durability and a longer life operation of the fuel cell stack 20 can be achieved.

The stack 20 is provided with the collector 30 and 40, insulating plates 50 and 60 and the end plates 70 and 80 on both sides thereof. The collectors 30 and 40 are constituted by an electrical conductive gas-impermeable member such as dense carbon, a copper plate and an aluminum plate. In addition, the output terminals 37 and 47 are provided to output electromotive force generated in the stack 20. The insulators 50 and 60 are constituted by an insulating member such as rubber and resin.

When the copper plate, the aluminum plate, and the like are used for the collectors 30 and 40 instead of carbon as mentioned above in view of a decrease in thickness and cost, the electrical conductive member according to the present embodiment may be employed. Although the copper plate and the aluminum plate are easily reduced in thickness and weight compared with stainless steel, the copper plate and the aluminum plate have poor resistance to corrosion. However, when the middle layer and the electrical conductive carbon layer are formed, electrical resistance can be reduced on the outermost surface of the electrical conductive carbon layer while corrosion of the aluminum plate caused by intrusion of droplets in the middle layer is prevented. Accordingly, a chemical stability of the metal collectors 30 and 40 can be maintained while electrical conductivity is ensured even if the collectors 30 and 40 are subjected to an acidic atmosphere. Namely, as shown in FIG. 13, the collectors 30 and 40 capable of preventing ion elution caused by cracks such as pinholes can be provided without an increase in contact resistance to the metal separator 5.

As shown in FIG. 14, the end plates 70 and 80 are constituted by a material having rigidity, for example, a metal material such as steel. The end plates 70 and 80 include a fuel gas inlet 71, a fuel gas outlet 72, an oxidant gas inlet 74, an oxidant gas outlet 75, a coolant water inlet 77 and a coolant water outlet 78. The fuel gas inlet 71, the fuel gas outlet 72, the oxidant gas inlet 74, the oxidant gas outlet 75, the coolant water inlet 77 and the coolant water outlet 78 are communicated with the fuel gas flow paths 5aa, the oxidant gas flow paths 5bb and the coolant water flow paths 8 in order to flow the fuel gas 5ag, the oxidant gas 5bg and the coolant water 8w.

As shown in FIG. 14, the respective corners of the stack 20, the collectors 30 and 40, insulating plates 50 and 60 and the end plates 70 and 80 are provided with through holes through which tie rods 90 are inserted. The tie rods 90 fix the fuel cell stack 20 by the end plates 70 and 80 by screwing nuts on male screws formed at each end of the tie rods 90 (not shown in the figure). Load for the formation of the stack 20 acts in a stacking direction of the fuel cell single cells 1, so as to keep the single cells 1 in a pressed state.

As shown in FIG. 14, the tie rods 90 are constituted by a material having rigidity, for example, a metal material such as steel. In addition, the tie rods 90 have insulating surfaces in order to prevent electrical short circuit between the single cells 1. The number of the tie rods 90 to be provided is not limited to four (four corners). Furthermore, a fixing mechanism of the tie rods 90 is not limited to the fixation by screwing, and other means can be applied.

A gasket is a sealing member that is provided to surround the periphery of the separator 5 located on the surface of the MEA 9. The gasket may be fixed to an external surface of the electrolyte membrane 2 of the MEA 9 via an adhesion layer (not shown in the figure). The gasket has a function to ensure a sealing property between the separator 5 and the MEA 9. Preferably, the adhesion layer to be used as necessary has a shape corresponding to that of the gasket, and is provided in the form of a frame on the whole periphery of the electrolyte membrane in terms of ensuring adhesion.

As shown in FIG. 14, in the fuel cell stack 200, the middle layer 32 is preferably provided on an inner wall of the respective through holes of a manifold (the fuel gas inlet 71, the fuel gas outlet 72, the oxidant gas inlet 74, the oxidant gas outlet 75, the coolant water inlet 77 and the coolant water outlet 78). That is, since electrical conductivity is not necessary in the inner wall of the respective through holes of the manifold, the electrical conductive carbon layer is not required, but the middle layer (Cr layer) is preferably provided. Accordingly, corrosion in the through holes of the manifold can be prevented effectively.

The constitution parts (electrical conductive member) of the fuel cell, which are required to have electrical conductivity and resistance to corrosion, other than the metal separator 5 and the collectors 30 and 40 may employ the configuration according to the present embodiment. Therefore, the electrical conductive member and the fuel cell stack can be reduced in thickness and weight, and output density can be improved. Furthermore, the reduction in cost can be also achieved, which is an advantage for a fuel cell vehicle of which the cost reduction is strongly required. A method for manufacturing the fuel cell according to the present embodiment is not particularly limited, and conventionally known findings in the field of the fuel cell may be appropriately applied.

A type of fuel gas used at the time of the operation of the fuel cell is not limited to hydrogen. Examples of the fuel gas include methanol, ethanol, 1-propanol, 2-propanol, 1-butanol, 2-butanol, 3-butanol, dimethyl ether, diethyl ether, ethylene glycol and diethylene glycol, in addition to hydrogen. Particularly, hydrogen and methanol are preferably used in terms of having a high output property.

The cell unit 1 and the fuel cell stack 200 use the metal separator 5 having excellent electrical conductivity and resistance to corrosion. Therefore, the cell unit 1 and the fuel cell stack 200 have an excellent output property and durability, and can maintain a good power generation performance for a long period of time. In the cell unit 1 shown in FIG. 1, the metal separator 5 is formed in such a manner that a flat metal plate is subjected to a press treatment so as to have a concave-convex shape. However, the formation of the metal separator 5 is not limited to such a method. For example, the flat metal plate is subjected to a cutting treatment, so that concave-convex shapes constituting the gas flow paths 5aa, 5bb and the refrigerant flow path 8 are preliminarily formed, followed by forming the electrical conductive carbon layer 33 and the middle layer 32 on the surface thereof by the above-mentioned means so as to obtain the metal separator 5.

Figure 10:
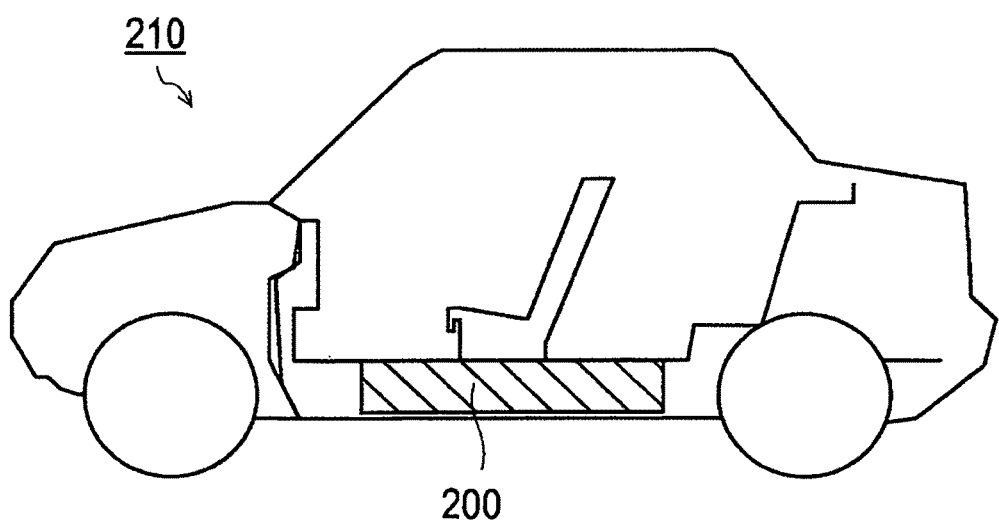
FIG. 10 is a schematic view of a vehicle on which a fuel cell stack according to an embodiment of the present invention is installed.

The cell unit 1 and the fuel cell stack 200 using the cell unit 1 are mounted on a vehicle as a driving power source. When the fuel cell stack 200 is mounted on a vehicle such as a fuel cell vehicle 210 as shown in FIG. 10, the fuel cell stack 200 may be installed under seats in the center of the vehicle of the fuel cell vehicle 210. By installing the fuel cell stack 200 under the seats, space inside the vehicle and in a trunk can be widely obtained. Depending on the circumstances, the fuel cell stack 200 may be installed under a rear trunk or a front engine room of the vehicle 210, in addition to the installation under the seats. Thus, the vehicle 210 mounting the cell unit 1 and the fuel cell stack 200 are also included in the scope of the present invention. The cell unit 1 and the fuel cell stack 200 have an excellent output property and durability. Therefore, the fuel cell vehicle 210 with high reliability for a long period of time can be provided.

The following is an explanation of the effect of the electrical conductive member according to the present embodiment with reference to Examples and Comparative Examples. However, the scope of the present invention is not limited to these examples.

EXAMPLE I-1

A stainless steel plate (SUS316L) was prepared as a constitution material of the metal substrate 31 constituting the electrical conductive member. The thickness of the stainless steel plate was 100 μm. The stainless steel plate was washed by ultrasonic waves in an ethanol aqueous solution for three minutes as a pretreatment. Next, the washed stainless steel plate was placed in a vacuum chamber, and subjected to an ion bombard treatment by Ar gas, so as to remove an oxide film on the surface thereof. Note that, both the pretreatment and the ion bombard treatment were performed on both surfaces of the stainless steel plate.

Then, by use of an unbalanced magnetron sputtering method, the middle layer 32 constituted by Cr with the thickness of 0.2 μm was formed on each surface of the stainless steel plate using Cr as a target, while applying negative bias voltage of 50 V to the stainless steel plate.

Further, by use of the UBMS method, the electrical conductive carbon layer 33 with the thickness of 0.2 μm was formed on the middle layer 32 on each side of the stainless steel plate using solid graphite as a target, while applying negative bias voltage of 100 V to the stainless steel plate. Thus, the electrical conductive member in Example I-1 was prepared.

EXAMPLE I-2

The electrical conductive member in Example I-2 was prepared by similar operations to those in Example I-1 except that the negative bias voltage (absolute value) applied at the time of the formation of the electrical conductive carbon layer 33 was 140 V.

EXAMPLE I-3

The electrical conductive member in Example I-3 was prepared by similar operations to those in Example I-1 except that the negative bias voltage (absolute value) applied at the time of the formation of the electrical conductive carbon layer 33 was 300 V.

EXAMPLE I-4

The electrical conductive member in Example I-4 was prepared by similar operations to those in Example I-1 except that the negative bias voltage (absolute value) applied at the time of the formation of the electrical conductive carbon layer 33 was 450 V.

EXAMPLE I-5

The electrical conductive member in Example I-5 was prepared by similar operations to those in Example I-2 except that the material constituting the metal substrate 31 was aluminum (Aluminum A1050).

EXAMPLE I-6

The electrical conductive member in Example I-6 was prepared by similar operations to those in Example I-2 except that the method for forming the middle layer 32 and the electrical conductive carbon layer 33 was an arc ion plating method.

EXAMPLE I-7

The electrical conductive member in Example I-7 was prepared by similar operations to those in Example I-1 except that the electrical conductive carbon layer 33 was formed directly on the stainless steel plate by an ECR sputtering method without forming the middle layer 32.

COMPARATIVE EXAMPLE I-1

The electrical conductive member in Comparative Example I-1 was prepared by similar operations to those in Example I-1 except that the electrical conductive carbon layer 33 was formed directly on the stainless steel plate without forming the middle layer 32, and the negative bias voltage was not applied at the time of the formation of the electrical conductive carbon layer 33.

COMPARATIVE EXAMPLE I-2

The electrical conductive member in Comparative Example I-2 was prepared by similar operations to those in Example I-1 except that the negative bias voltage was not applied at the time of the formation of the electrical conductive carbon layer 33.

COMPARATIVE EXAMPLE I-3

The electrical conductive member in Comparative Example I-3 was prepared by similar operations to those in Example I-1 except that the method for forming the middle layer 32 and the electrical conductive carbon layer 33 was a plasma chemical vapor deposition (CVD) method.

COMPARATIVE EXAMPLE I-4

The electrical conductive member in Comparative Example I-4 was prepared by similar operations to those in Example I-1 except that the method for forming the middle layer 32 and the electrical conductive carbon layer 33 was an ionized deposition method.

COMPARATIVE EXAMPLE I-5

The electrical conductive member in Comparative Example I-5 was prepared by similar operations to those in Example I-1 except that the method for forming the electrical conductive carbon layer 33 was a thermal chemical vapor deposition (CVD) method without forming the middle layer 32, and the thickness of the electrical conductive carbon layer 33 was 0.08 μm. In addition, a film formation temperature at the time of the operation of the thermal CVD was set at 850° C.

EXAMPLE I-8

An aluminum plate (Aluminum A1050) was prepared as a constitution material of the metal substrate 31 constituting the electrical conductive member. The thickness of the aluminum plate was 200 μm. The aluminum plate was washed by ultrasonic waves in an ethanol solution for three minutes as a pretreatment. Next, the metal substrate 31 was placed in a vacuum chamber, and subjected to an ion bombard treatment by Ar gas, so as to remove an oxide film on the surface thereof. Note that, both the pretreatment and the ion bombard treatment were performed on both surfaces of the metal substrate 31.

Next, by use of an unbalanced magnetron sputtering method, a Cr film (middle layer A) with the thickness of 0.1 μm was formed on each surface of the metal substrate 31 using Cr as a target, while applying negative bias voltage of 50 V to the metal substrate 31.

Then, a Cr layer with the thickness of 1 μm was formed on the middle layer A on each side of the metal substrate 31, while applying negative bias voltage of 200 V to the metal substrate 31. Note that, the Cr layer in addition to the middle layer A compose the middle layer 32.

Further, by use of the UBMS method, the electrical conductive carbon layer 33 with the thickness of 0.2 μm was formed on the Cr layer (middle layer 32) on each side of the aluminum plate using solid graphite as a target, while applying negative bias voltage of 140 V to the aluminum plate. Thus, the electrical conductive member in Example I-8 was prepared.

EXAMPLE I-9

An aluminum plate (Aluminum A1050) was prepared as a constitution material of the metal substrate 31 constituting the electrical conductive member. The thickness of the aluminum plate was 200 μm. The aluminum plate was washed by ultrasonic waves in an ethanol solution for three minutes as a pretreatment. Next, the metal substrate 31 was placed in a vacuum chamber, and subjected to an ion bombard treatment by Ar gas, so as to remove an oxide film on the surface thereof. Note that, both the pretreatment and the ion bombard treatment were performed on both surfaces of the metal substrate 31.

Next, by use of an unbalanced magnetron sputtering method, a Cr layer with the thickness of 1 μm was formed on each surface of the metal substrate 31 using Cr as a target, while applying negative bias voltage of 50 V to the metal substrate 31. Note that, only the Cr layer composes the middle layer 32.

Further, by use of the UBMS method, the electrical conductive carbon layer 33 with the thickness of 0.2 μm was formed on the Cr layer (middle layer 32) on each side of the aluminum plate using solid graphite as a target, while applying negative bias voltage of 140 V to the aluminum plate. Thus, the electrical conductive member in Example I-9 was prepared.

[R Value Measurement]

With regard to the respective electrical conductive members prepared in Examples I-1 to I-9 and Comparative Examples I-1 to I-5, an R value of the electrical conductive carbon layer 33 was measured. Specifically, first, Raman spectrum of the electrical conductive carbon layer 33 was measured by use of a Micro-Raman spectroscope. Then, a peak area ratio ($I_D/I_G$) of a peak intensity ($I_D$) of D-band located at 1300 to 1400 cm$^{-1}$ to a peak intensity ($I_G$) of G-band located at 1500 to 1600 cm$^{-1}$ was calculated to obtain the R value. The result thus obtained is shown in Table 1 below.

As shown in Table 1, the intensity ratios R ($I_D/I_G$) of the D-band peak intensities ($I_D$) to the G-band peak intensities ($I_G$) of the respective electrical conductive carbon layers 33 in the electrical conductive members prepared in Examples I-1 to I-9 were all 1.3 or more. On the other hand, the R values of the respective electrical conductive carbon layers 33 in the electrical conductive members prepared in Comparative Examples I-1 to I-5 were all less than 1.3. Note that, the intensity ratio R ($I_D/I_G$) is described by "DIG" in Table 1. Hereinafter, the intensity ratio R ($I_D$)/$I_G$) is also simply referred to as "the R value".

[Measurement of Hydrogen Atom Content in Electrical Conductive Carbon Layer 33]

With regard to the respective electrical conductive members prepared in Examples I-1 to I-9 and Comparative Examples I-1 to I-5, a content of hydrogen atoms in the electrical conductive carbon layer 33 was measured by an elastic recoil detection analysis (ERDA). The result thus obtained is shown in Table 1 below.

[Measurement of Vickers Hardness (Hv) of Electrical Conductive Carbon Layer 33]

With regard to the respective electrical conductive members prepared in Examples I-1 to I-9 and Comparative Examples I-1 to I-5, Vickers hardness (Hv) of the electrical conductive carbon layer was measured by a nanoindentation method. The result thus obtained is shown in Table 1 below.

As shown in Table 1, the values of the Vickers hardness of the electrical conductive carbon layers 33 in the electrical conductive members prepared in Examples I-1 to I-9 were all 1500 Hv or less.

[Measurement of Contact Resistance]

Figure 11:
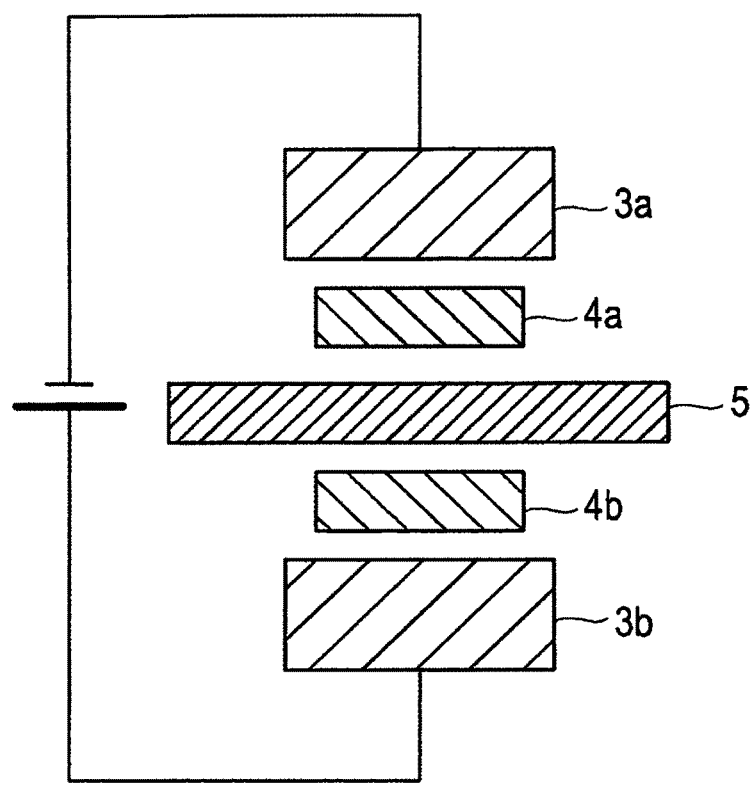
FIG. 11 is a typical view schematically showing a measurement device used for measuring a contact resistance in examples.

With regard to the respective electrical conductive members prepared in Examples I-1 to I-9 and Comparative Examples I-1 to I-5, a contact resistance in a thickness direction of the electrical conductive member was measured. As shown in FIG. 11, the prepared electrical conductive member (metal separator 5) was interposed between a pair of the gas diffusion substrates (gas diffusion layers 4a, 4b), the stacked body thus obtained was further interposed between a pair of the electrodes (catalyst layers 3a, 3b), and both ends thereof were connected to a power source to be held while 1 MPa load was applied to the whole stacked body including the electrodes, so as to compose a measurement device. Then, constant current of 1 A was applied to the measurement device, and a contact resistance value of the stacked body was calculated according to power distribution and a voltage value at the time of the load application with 1 MPa.

In addition, after the contact resistance value was measured, an immersion test with respect to acidic water was performed, and at the same time, the contact resistance value was measured. Specifically, each electrical conductive member (metal separator 5) prepared in Examples I-1 to I-9 and Comparative Examples I-1 to I-5 was cut into 30 mm×30 mm pieces, and the cut electrical conductive member was immersed in acidic water at 80° C. for 100 hours, followed by measuring the contact resistance values before and after the immersion test. The acidic water in Examples I-1 to I-7 and Comparative Examples I-1 to I-5 was pH 4 or less, and the acidic water in Examples I-8 and I-9 was pH 6 or less.

Figure 12B:
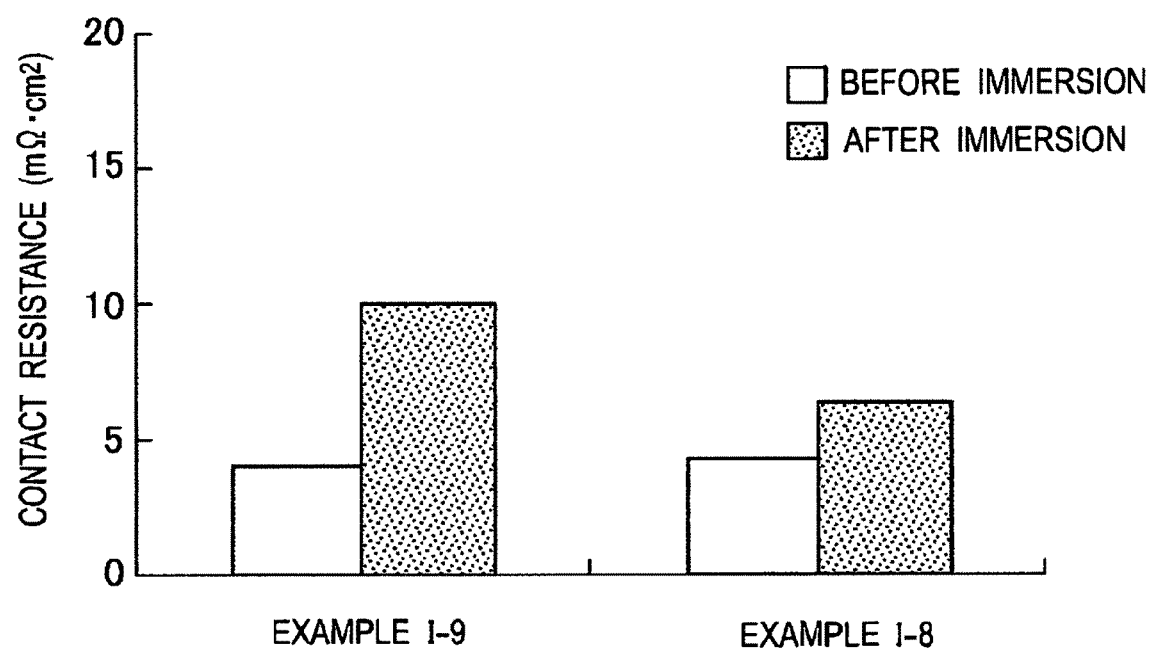
FIG. 12B is a graph showing a measurement result of a contact resistance before and after an immersion test for electrical conductive members prepared in Examples I-8 and I-9.

The result thus obtained is shown in Table 1 below. In addition, FIGS. 12A and 12B show graphs corresponding to the result with regard to the contact resistance shown in Table 1. In the graph shown in FIG. 12A, the vertical axis is a logarithmic scale, and the contact resistance value in the vertical axis is represented as a relative value.

As shown in Table 1 and FIGS. 12A and 12B, the electrical conductive members prepared in Examples I-1 to I-9 have extremely small contact resistance values even after the immersion test, which is different from the cases of Comparative Examples I-1 to I-5.

In addition, the electrical conductive member prepared in Example I-8 has an extremely small contact resistance value although easily-corroded aluminum is used for the metal substrate 31, compared with the similar cases of Examples I-5 and I-9. Moreover, the electrical conductive member prepared in Example I-8 has an extremely small contact resistance value even after the immersion test. Furthermore, it is recognized that the electrical conductive member prepared in Example I-8 has a good corrosion resistance comparable to Examples I-1 to I-4, I-6 and I-7 that use stainless steel for the metal substrate 31.

[Measurement of Al Elution]

With regard to the respective electrical conductive members prepared in Examples I-8 and I-9, Al quantitative analysis was performed by ICP mass spectrometry (ICP-MS) of the acidic solution after the immersion test used at the time of the measurement of the contact resistance.

The result thus obtained is shown in Table 2 below. The electrical conductive member prepared in Example I-8 has an improved anticorrosion effect of aluminum although easily-corroded aluminum is used for the metal substrate 31, compared with the electrical conductive member prepared in Example I-9 that also uses aluminum. Specifically, the electrical conductive member prepared in Example I-8 has an extremely small value of Al elution that is 500 ppb, compared with Al elution of 1500 ppb in the electrical conductive member prepared in Example I-9. Accordingly, it is recognized that an increase in contact resistance can be prevented while excellent electrical conductivity is ensured sufficiently, and the anticorrosion effect of the metal substrate 31 can be further improved, when the middle layer 32 is provided between the electrical conductive carbon layer 33 and the metal substrate 31 as in the case of Example I-8, and further when the protruded grains 33a are present on the outermost surface of the electrical conductive member.

The following are figure comparisons to distinguish the film boundary of the Cr layer (columnar middle layer 32) and the electrical conductive carbon layer 33 (DLC layer) between the respective electrical conductive members obtained in Example I-8 and Example I-9. FIGS. 15a and 15b are the SEM photographs observing the surfaces of the electrical conductive members in Examples I-9 and I-8. According to the photographs, the presence or absence of the protruded grains 33a on the outermost surfaces of the electrical conductive members in Examples I-9 and I-8 can be easily confirmed. In addition, the presence or absence of at least 30 or more of the protruded grains 33a per 100 μm$^2$ can be easily confirmed.

Figure 16:
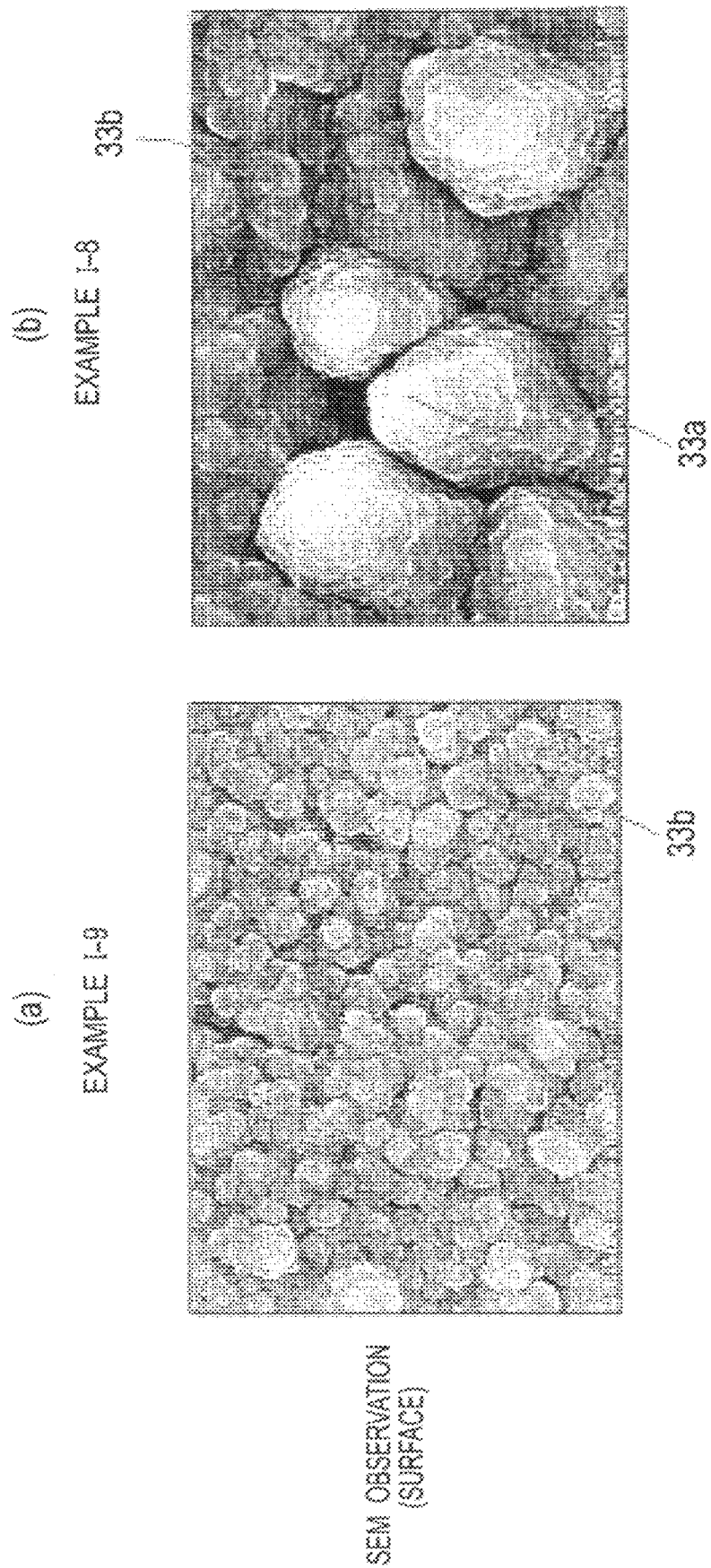
FIGS. 16a and 16b are enlarged SEM photographs of FIGS. 15a and 15b.

Next, FIGS. 16a and 16b are the enlarged SEM photographs of FIGS. 15a and 15b. According to the photographs, the presence or absence of the protruded grains 33a on the outermost surfaces of the electrical conductive members in Examples I-9 and I-8 can be easily confirmed. In addition, the coexisting state of the protruded grains 33a with a diameter of 200 to 500 nm and the microparticles 33b with a diameter of 50 to 100 nm on the outermost surface, and the sizes of the respective grains and particles can be confirmed.

Figure 17:
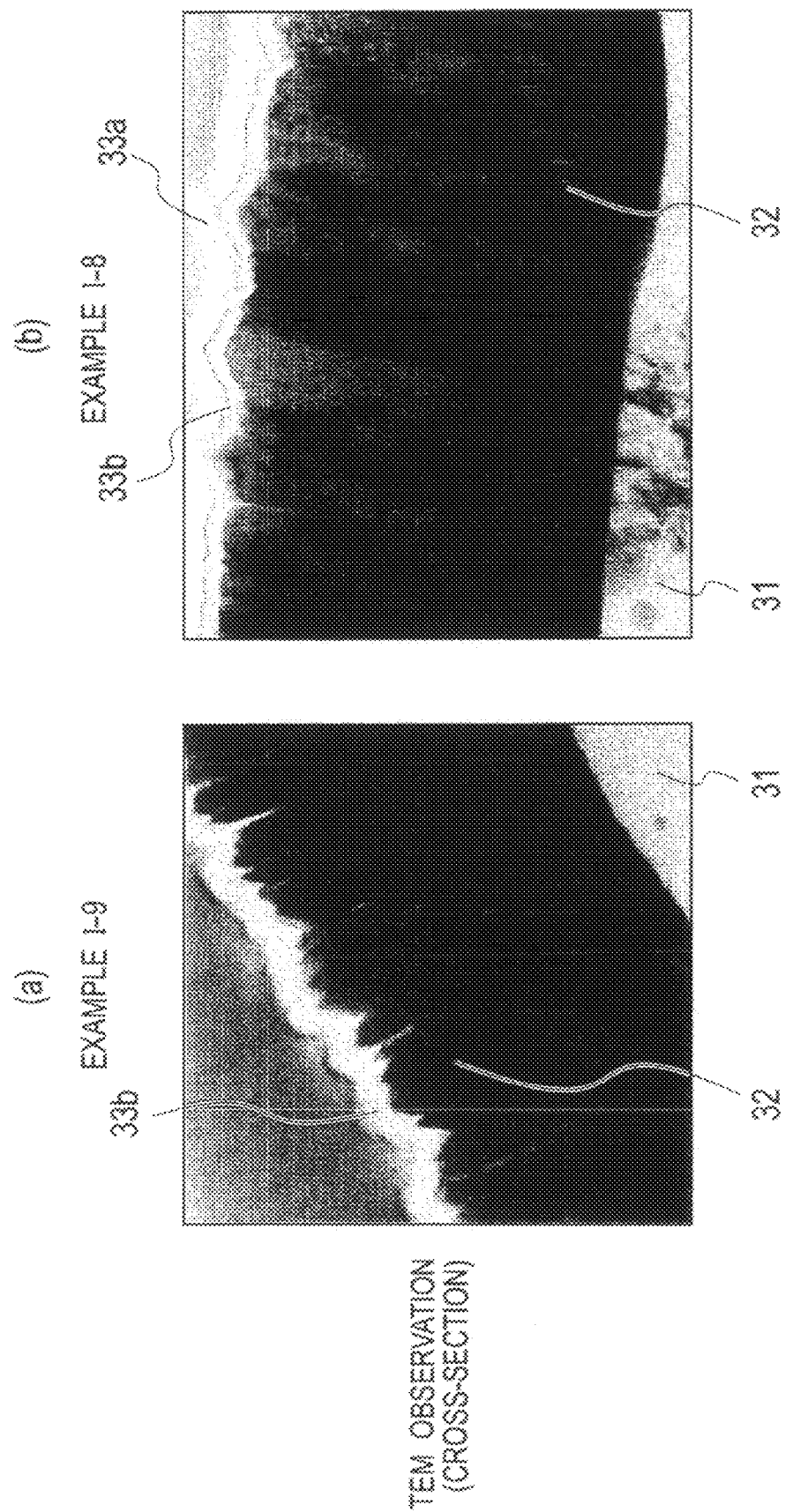
FIGS. 17a and 17b are TEM photographs observing cross-sections of Example I-9 and Example I-8.
Figure 18:
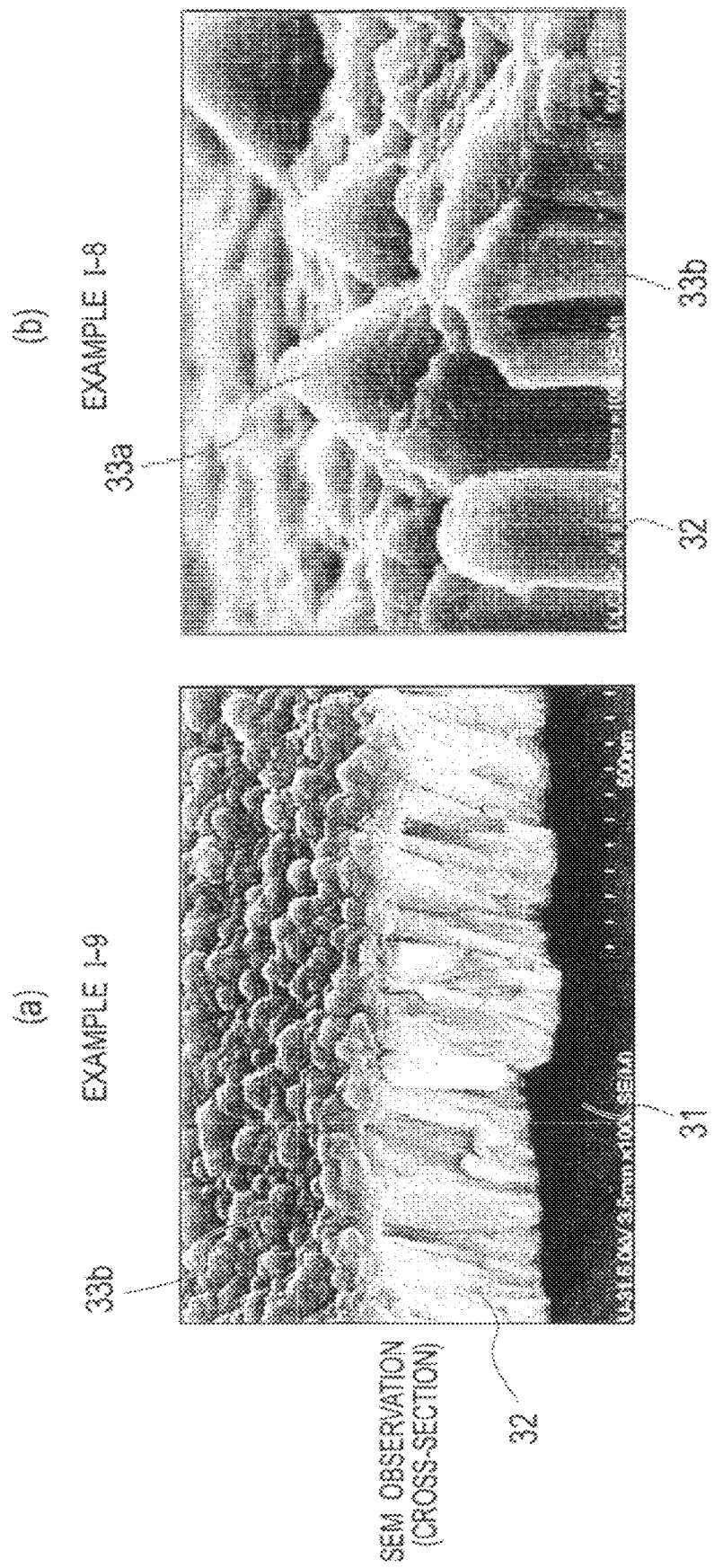
FIGS. 18a and 18b are SEM photographs observing cross-sections of Example I-9 and Example I-8.

Next, FIGS. 17a and 17b are the TEM photographs observing the cross-sections of Examples I-9 and I-8. FIGS. 18a and 18b are the SEM photographs observing the cross-sections of Examples I-9 and I-8. According to the photographs, the width of the columnar crystals in the cross-section of the middle layer 32 can be measured, and whether an average width of the columnar crystals in the cross-section of the middle layer 32 is within the range of 200 nm to 500 nm or not can be confirmed in Examples I-9 and I-8, respectively. In addition, the height of the protruded grains 33a with respect to the peripheral portions can be measured, and the height of the protruded grains 33a with respect to the peripheral portions that is within the range of 100 nm to 500 nm can be confirmed. Moreover, the thickness of the Cr middle layer 32 can be measured, and the thickness that is within the range of 0.02 μm to 5 μm can be easily confirmed. Further, the columnar crystals having the width between 200 nm and 500 nm on the outermost layer can be easily observed, and the percentage of the whole thickness of the middle layer 32 occupied by the columnar crystals having the above-mentioned width in the direction from the outermost layer to the metal substrate 31 can be measured.

TABLE 1

| | Film Formation Method | Substrate Metal | Middle Layer Material | Middle Layer Thickness (μm) | Carbon Film D/G | Carbon Film Thickness (μm) | Hydrogen Content (Atom %) | Vickers Hardness (Hv) | Contact Resistance (mΩ·cm²) Test before Immersion | Contact Resistance (mΩ·cm²) Test after Immersion |
|---|---|---|---|---|---|---|---|---|---|---|
| Example I-1 | UBM[1] | SUS316L | Cr | 0.2 | 1.7 | 0.2 | 12 | 980 | 3.9 | 4.4 |
| Example I-2 | UBM[1] | SUS316L | Cr | 0.2 | 1.6 | 0.2 | 11 | 360 | 2.9 | 3.4 |
| Example I-3 | UBM[1] | SUS316L | Cr | 0.2 | 1.7 | 0.2 | 9 | 580 | 1.7 | 2.3 |
| Example I-4 | UBM[1] | SUS316L | Cr | 0.2 | 1.9 | 0.2 | 6 | 680 | 2.1 | 3.3 |
| Example I-5 | UBM[1] | Al | Cr | 0.2 | 1.5 | 0.2 | 11 | 360 | 3.8 | 9.5 |
| Example I-6 | Ion[2] | SUS316L | Cr | 0.2 | 1.5 | 0.2 | 10 | 660 | 2.8 | 3.4 |
| Example I-7 | ECR[3] | SUS316L | — | — | 1.4 | 0.2 | 20 | 70 | 3.9 | 5.4 |
| Example I-8 | UBM[1] | Al | Cr | 1.1 | 1.7 | 0.2 | 9 | 600 | 4.5 | 6.5 |
| Example I-9 | UBM[1] | Al | Cr | 1.0 | 1.7 | 0.2 | 10 | 620 | 4.0 | 10.0 |
| Comparative Example I-1 | UBM[1] | SUS316L | — | — | 1.1 | 0.2 | 20 | 470 | 4200 | 4500 |
| Comparative Example I-2 | UBM[1] | SUS316L | Cr | 0.2 | 1.2 | 0.2 | 19 | 480 | 66 | 122 |
| Comparative Example I-3 | Plasma[4] | SUS316L | Cr | 0.2 | 0.8 | 0.2 | 32 | 2500 | 5600 | 9880 |
| Comparative Example I-4 | Ion Vapor Deposition | SUS316L | Cr | 0.2 | 1.0 | 0.2 | 25 | 2260 | 830 | 910 |
| Comparative Example I-5 | Thermal CVD | SUS316L | — | — | 1.0 | 0.08 | 12 | 2000 | 3650 | 5200 |

Note) With regard to the film formation method in Table 1, UBM[1] is an abbreviation for "UBM sputtering", ECR[3] is an abbreviation for "ECR sputtering", Ion[2] is an abbreviation for "ion plating", and Plasma[4] is an abbreviation for "plasma CVD".

TABLE 2

| | Contact Resistance (mΩ·cm²) Test before Immersion | Contact Resistance (mΩ·cm²) Test after Immersion | Al Elution (ppb) | Column Width of Middle Layer (nm) | Protruded Grain Diameter (nm) | Protrusion Height (nm) | Number of Protruded Grains 33a (Number/100 μm²) | Middle Layer Thickness (μm) |
|---|---|---|---|---|---|---|---|---|
| Example I-8 | 4.5 | 6.5 | 500 | Average Value 280 (Upper Limit: 500, Lower Limit: 200) | 200 | 300 | 60 | 1.1 |
| Example I-9 | 4.0 | 10.0 | 1500 | Average Value 35 (Upper Limit: 80, Lower Limit: 20) | — | — | — | 1.0 |

Note) The "column width" in the Table 2 represents an average value of the column widths of the columnar crystals in the cross-section of the middle layer 32. The "protruded grain diameter" is a diameter between 200 and 500 nm on the outermost surface (average value of diameters within a range of 200 to 500 nm). The "number of protruded grains 33a" is the number of the grains having a diameter between 200 and 500 nm on the outermost surface. The symbol "-" in the "protrude grain diameter" represents what there are no grains as an object to be measured having a diameter between 200 and 500 nm in the outermost surface. The symbol "-" in the "number of protruded grains 33a" represents what the number of the grains as an object to be measured having a diameter between 200 and 500 nm in the outermost surface is zero. The "protrusion height" is a height (average value) of the protruded grains 33a as an object to be measured, and the symbol "-" in the "protrusion height" represents what the height is unmeasurable since the number of the protruded grains 33a as an object to be measured is zero.

Second Embodiment

The following is an explanation of an electrical conductive member, and a method for manufacturing the electrical conductive member according to the second embodiment of the present invention with reference to the drawings. Note that, the components identical to the first embodiment are indicated by the same reference numerals, and explanations thereof are not repeated.

The electrical conductive member (electrical conductive structure) according to the present embodiment includes a metal substrate, a dense barrier layer formed on the metal substrate, a middle layer formed on the dense barrier layer, and an electrical conductive thin layer formed on the middle layer. The dense barrier layer has lower crystalline orientation than the middle layer.

The present embodiment is characterized in that the dense barrier layer having low crystalline orientation is provided between the metal substrate and the middle layer. Therefore, water generated in the electrode side may pass through the electrical conductive thin layer, but hardly passes though the dense barrier layer having low crystalline orientation. Thus, there are almost no water molecules that can pass through the dense barrier layer. In other words, there is little risk of exposure of the metal substrate to water. Accordingly, the electrical conductive member according to the present embodiment is hardly corroded by water even if the electrical conductive member is subjected to potential for a long period of time. Further, a fuel cell using the electrical conductive member according to the present embodiment as a separator can achieve excellent durability while excellent electrical conductivity of a metal separator is ensured sufficiently.

A polymer electrolyte fuel cell (PEFC) according to the present embodiment also has the same fundamental constitution as the PEFC according to the first embodiment. Specifically, as shown in FIG. 1, the PEFC includes the polymer electrolyte membrane 2, and a pair of the catalyst layers (anode catalyst layer 3a and cathode catalyst layer 3b) interposing the polymer electrolyte membrane 2. The stacked body constituted by the polymer electrolyte membrane 2 and the catalyst layers is further interposed between a pair of the gas diffusion layers 4 (anode gas diffusion layer a and cathode gas diffusion layer 4b). Thus, the polymer electrolyte membrane 2, the pair of the catalyst layers 3 (3a, 3b) and the pair of the gas diffusion layers 4 (4a, 4b) are stacked to constitute the membrane electrode assembly (MEA) 9. The MEA 9 is further interposed between a pair of the separators 5 (anode separator 5a and cathode separator 5b).

Figure 21:
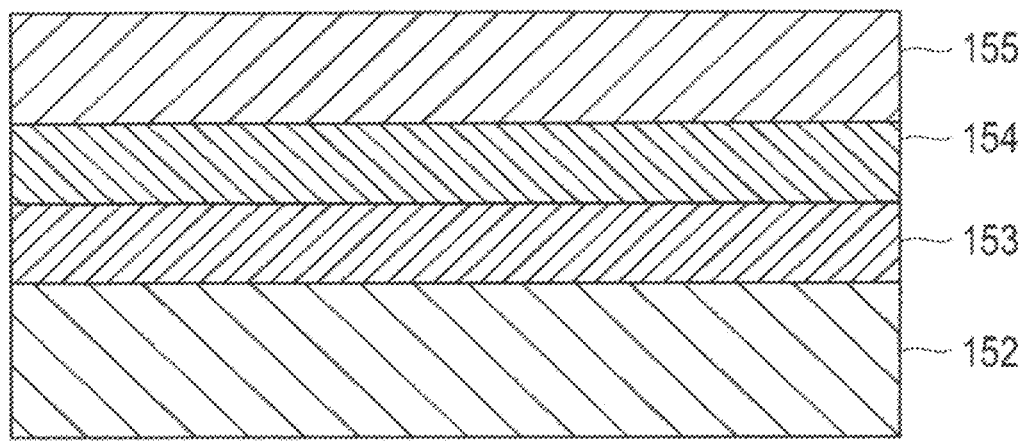
FIG. 21 is a schematic cross-sectional view showing a constitution of a surface of an electrical conductive member (separator) according to a second embodiment.

FIG. 21 is a cross-sectional view showing a constitution of a separator 5A that is the electrical conductive member according to the second embodiment. In the present embodiment, the separator 5A includes a metal substrate 152, a dense barrier layer 153, a middle layer 154, and an electrical conductive thin layer 155. The separator 5A in the PEFC is provided in such a manner that the electrical conductive thin layer 155 is positioned on the side of the MEA 9. The following is a specific explanation of each element of the metal separator 5A according to the present embodiment.

[Metal Substrate]

The metal substrate 152 is a main layer of the electrical conductive member constituting the separator 5A, and contributes to ensuring electrical conductivity and mechanical strength. The metal substrate 152 according to the present embodiment may be the same as the metal substrate 31 according to the first embodiment.

[Dense Barrier Layer]

The dense barrier layer 153 is provided on the metal substrate 152. Due to the presence of the dense barrier layer 153, intrusion of water generated in the electrode into the metal substrate 152 can be prevented. Therefore, the electrical conductive member constituting the separator 5A can have an improved resistance to corrosion while electrical conductivity is ensured due to the provision of the dense barrier layer 153, compared with the case where the electrical conductive member is only constituted by the metal substrate 152, the middle layer 154 and the electrical conductive thin layer 155.

As described above, the dense barrier layer having low crystalline orientation is interposed between the metal substrate and the middle layer. While water generated in the electrode side easily passes through the electrical conductive thin layer 155, the water hardly passes through the dense barrier layer. Therefore, corrosion occurrence in the electrical conductive member can be effectively prevented since water hardly reaches the middle layer 154 and the metal substrate 152.

The "dense barrier layer" in the present description is a sufficiently dense layer so as not to allow water molecules and elution ions to penetrate therethrough. Specifically, the dense barrier layer is a layer having a porosity of 10% or less, more preferably 7% or less. The lower limit of the porosity of the dense barrier layer is not particularly limited as long as water molecules do not pass through the dense barrier layer. In particular, the lower limit of the porosity of the dense barrier layer is approximately 0.5%, more preferably 0.7%. The "porosity" is obtained by an image analysis of the surface and cross-section of the layer, and measuring an area ratio (%) occupied by metal, metalloid, carbide of metal, or nitride of metal constituting the dense barrier layer.

The dense barrier layer according to the present embodiment preferably has lower crystalline orientation than the middle layer. Due to such a configuration, water molecules generated in the electrode side hardly pass through the dense barrier layer. The "crystalline orientation" represents a degree of orientation of a crystal axis in a polycrystalline structured material. Therefore, "high crystalline orientation" is a state in which each crystal axis is present in a similar direction (in parallel) in a polycrystalline structured material. On the other hand, "low crystalline orientation" is a state in which each crystal axis is present in various directions in a polycrystalline structured material. A level of such crystalline orientation (crystalline orientation degree) can be determined by use of JCPDS (ASTM) data, as an index, defined as reference data by powder X-ray diffraction that is generally considered to have no orientation substantially. For example, the "crystalline orientation degree (%)" can be obtained from a peak intensity in intensity distribution of a Debye ring with regard to (121) reflection by a WAXD measurement.

An average crystalline diameter and a method for forming the dense barrier layer are arbitrarily determined so as to have lower crystalline orientation than the middle layer, thereby obtaining the dense barrier layer. Particularly, the average crystalline diameter is controlled to be smaller than that of the middle layer so as to form the dense barrier layer. Further, a ratio $(D_2/D_1)$ of the average crystalline diameter [$D_2$ (nm)] of the dense barrier layer to the average crystalline diameter [$D_1$ (nm)] of the middle layer is preferably 0.1 or more to less than 1, more preferably between 0.1 and 0.5. When the ratio is within the above-mentioned range, the dense barrier layer can have lower crystalline orientation so that water molecules do not substantially reach the metal substrate. Each average crystalline diameter of the respective layers is not particularly limited as long as each average crystalline diameter meets the above-mentioned size relationship. The average crystalline diameter [$D_2$ (nm)] of the dense barrier layer is preferably 10 nm or more to less than 30 nm, more preferably between 10 nm and 20 nm. The average crystalline diameter [$D_1$ (nm)] of the middle layer is preferably between 30 nm and 100 nm, more preferably between 30 nm and 50 nm. The "crystalline diameter" is a crystalline size calculated by Scherrer's method in X-ray diffractometry.

Examples of materials constituting the dense barrier layer according to the present embodiment include metal in Group 4 (Ti, Zr, Hf), metal in Group 5 (V, Nb, Ta), metal in Group 6 (Cr, Mo, W) in a periodic table; metalloid such as Si and B; and an alloy, carbide and nitride of those metals. Among those, metal with less ion elution such as chromium (Cr), tungsten (W), titanium (Ti), molybdenum (Mo), niobium (Nb) or hafnium (Hf), or nitride, carbide or carbonitride thereof can be preferably used. More preferably, Cr or Ti, or carbide or nitride thereof can be used. Especially, when the above-mentioned metal with less ion elution or carbide or nitride thereof is used, an anticorrosion property of the separator can be significantly improved. The above-mentioned respective materials constituting the dense barrier layer may be used singly, or may be used with a combination of two or more types thereof.

The material constituting the dense barrier layer preferably has a coefficient of thermal expansion higher than or equal to that of the material (metal, carbide of metal or nitride of metal) constituting the middle layer described below. Generally, the electrical conductive thin layer is not easily thermally-expanded, while the metal substrate is easily thermally-expanded. Therefore, the respective materials constituting the dense barrier layer and the middle layer are appropriately selected so that each has the above-described coefficient of thermal expansion. As a result, a difference between expansion and contraction caused by heat generated in the metal substrate, the dense barrier layer, the middle layer and the electrical conductive thin layer can be suppressed, and therefore, exfoliation caused in the respective layers can be prevented. Accordingly, adhesion between the middle layer and the dense barrier layer can be improved.

In addition, the material constituting the dense barrier layer is preferably noble as metal approximately equivalently to the material constituting the middle layer as described below, or more noble as metal than the material of the middle layer. Accordingly, a potential difference between the dense barrier layer and the middle layer is not easily occurred, so as to more effectively protect the metal substrate and improve an anti-corrosion property of the electrical conductive member.

A thickness of the dense barrier layer 153 is not particularly limited. However, in order to decrease the size of the fuel cell stack as much as possible, the thickness of the dense barrier layer 153 is preferably between 0.01 μm and 10 μm, more preferably between 0.05 μm and 5 μm, even more preferably between 0.1 μm and 2 μm. When the thickness of the dense barrier layer 153 is 0.01 μm or more, the dense barrier layer can be formed evenly, so that a corrosion resistance of the metal substrate can be improved effectively. When the thickness of the dense barrier layer 153 is 10 μm or less, an increase in film stress of the dense barrier layer can be suppressed, so that a decrease of a film following property with respect to the metal substrate 31 and a generation of exfoliation and cracks associated therewith can be prevented.

According to the present embodiment, the metal substrate 152 is preferably covered totally with the dense barrier layer 153. In other words, an area ratio (coverage) of the metal substrate 152 covered with the dense barrier layer 153 is preferably 100% in the present embodiment. However, the present invention is not limited only to this value, and the coverage may be less than 100%. The coverage of the metal substrate 152 covered with the dense barrier layer 153 is preferably 60% or more, more preferably between 80 and 100%, even more preferably between 90 and 100%, most preferably 100%. When the coverage is within the above-mentioned ranges, intrusion of water molecules into exposed areas of the metal substrate 152 that are not covered with the dense barrier layer 153 can be sufficiently prevented, and a decrease in electrical conductivity and corrosion resistance can be suppressed effectively. Note that, the coverage represents an area ratio of the metal substrate 152 that is overlapped with the dense barrier layer 153 when the electrical conductive member (separator 5A) is viewed from a stacking direction.

[Middle Layer]

The middle layer 154 is provided on the dense barrier layer 153. The middle layer 154 has a function to improve adhesion between the dense barrier layer 153 and the electrical conductive thin layer 155, and a function to prevent elution of ions from the metal substrate 152. In particular, a significant effect derived from the provision of the middle layer 154 can be obtained when the dense barrier layer is constituted by the above-mentioned metals. As described below, when the electrical conductive thin layer 155 contains electrical conductive carbon, and has a high intensity ratio R ($I_D/I_G$) of a peak intensity ($I_D$) of D-band to a peak intensity ($I_G$) of G-band measured by a Raman scattering spectroscopic analysis, that is, when the R value exceeds 2.0, a significant effect of adhesion to the electrical conductive thin layer 155 derived from the provision of the middle layer 154 can be obtained.

Although a material constituting the middle layer 154 is not particularly limited as long as the material can provide the above-mentioned adhesion, the same material as that used in the middle layer 32 in the first embodiment may be used. In addition, although a thickness of the middle layer 154 is not particularly limited, the middle layer 154 may have the same thickness as the middle layer 32 in the first embodiment. Further, although a structure of the middle layer 154 is not particularly limited, the middle layer 154 may have the same columnar structure as the middle layer 32 in the first embodiment.

As described above, when the material constituting the middle layer 154 has a coefficient of thermal expansion lower than or equal to that of the material constituting the dense barrier layer 153, adhesion between the middle layer and the dense barrier layer can be improved. However, such a condition may decrease adhesion between the middle layer 154 and the electrical conductive thin layer 155. Also, when the coefficient of thermal expansion of the middle layer 154 is similar to or lower than the coefficient of thermal expansion of the electrical conductive thin layer 155, adhesion between the middle layer 154 and the electrical conductive thin layer 155 may be decreased. In view of these situations, the relation among the coefficient of thermal expansion ($\alpha_{sub}$) of the material constituting the metal substrate, the coefficient of thermal expansion ($\alpha_{den}$) of the material constituting the dense barrier layer, the coefficient of thermal expansion ($\alpha_{mid}$) of the material constituting the middle layer, and the coefficient of thermal expansion ($\alpha_c$) of the material constituting the electrical conductive thin layer preferably meets the following formula.

[Math 3]

$$\alpha_{sub} \geq \alpha_{den} \geq \alpha_{mid} \geq \alpha_c$$

[Electrical Conductive Thin Layer]

The electrical conductive thin layer 155 is formed on the middle layer 154. Examples of the electrical conductive thin layer 155 include a metal thin layer and an electrical conductive carbon layer constituted by carbon. Examples of materials constituting the metal thin layer include copper (Cu), gold (Au), silver (Ag), platinum (Pt), and palladium (Pd). The electrical conductive carbon layer contains electrical conductive carbon. Among those, the electrical conductive carbon layer is preferable. Due to the presence of the electrical conductive carbon layer, a corrosion resistance is improved while electrical conductivity of the electrical conductive member constituting the separator 5A is ensured, compared with the case where the electrical conductive carbon layer is not provided. As the electrical conductive carbon layer, the electrical conductive carbon layer 33 in the first embodiment can be used.

The following is a preferable embodiment for manufacturing the electrical conductive member according to the present embodiment. However, the scope of the present invention is not limited only to the following embodiment. The conditions such as a material for the respective elements of the electrical conductive member constituting the separator 5A are the same as described above, and therefore, the explanation thereof will not be repeated in this embodiment.

In the method for manufacturing the electrical conductive member according to the present embodiment, first, the dense barrier layer is formed on the metal substrate by plating, thermal spraying, CVD or coating [Process (1)]. Next, the middle layer is formed on the dense barrier layer by a sputtering method or an ion plating method [Process (2)]. Then, the electrical conductive thin layer is further formed on the middle layer by the sputtering method or the ion plating method [Process (3)].

[Process (1)]

First, a metal plate such as a stainless steel plate or an aluminum plate having a desired thickness is prepared as the metal substrate. Next, the surface of the prepared metal substrate is subjected to a degreasing and washing treatment by use of an appropriate solvent in a manner similar to the first embodiment. Then, an oxide film formed on the surface (both sides) of the metal substrate is removed. The method for removing the oxide film is a method similar to the first embodiment.

Then, the dense barrier layer is formed on the treated surface of the metal substrate. The method for forming the dense barrier layer is not particularly limited as long as the dense barrier layer has low crystalline orientation as described above. However, plating, thermal spraying, CVD (chemical vapor deposition) or coating may be used. Preferably, the dense barrier layer is formed on the surface of the metal substrate by plating.

Plating conditions are not particularly limited as long as the above-described dense barrier layer can be formed, and conventionally known various conditions are employed, depending on the type and amount of the constitution material used for the dense barrier layer. For example, the conditions for the Cr plating treatment include a current density of 3 to 10 A/dm$^2$, a bath temperature of 20 to 60° C., and an electrodeposition time of 30 to 120 minutes. Due to such conditions, the dense barrier layer as described above can be easily formed.

Due to the above-described process, the dense barrier layer having spherical or granular compositions (surface convex portions) with low crystalline orientation can be formed on the metal substrate. A size of the spherical/granular compositions in the dense barrier layer is preferably sufficiently fine so as not to allow water molecules to penetrate into the dense barrier layer. In particular, an average crystalline diameter of the spherical/granular compositions in the dense barrier layer is preferably between 10 nm and 30 nm, more preferably between 10 nm and 20 nm. When the average crystalline diameter is within the above-mentioned ranges, intrusion of water molecules can be effectively prevented. The "average crystalline diameter of the spherical/granular compositions in the dense barrier layer" is calculated from a full width at half maximum of a peak intensity ratio by X-ray diffraction by use of Scherrer's equation.

[Process (2)]

Next, the middle layer is formed on the dense barrier layer formed in the Process (1). A method for forming the middle layer is not particularly limited as long as the middle layer has relatively high crystalline orientation as described above. However, a sputtering method and an ion plating method may be used as in the case of the first embodiment. Particularly, the sputtering method is preferable.

When the middle layer is formed on the dense barrier layer by the sputtering method or the ion plating method, a dense and low crystalline portion derived from the dense barrier layer may coexist with a high crystalline columnar portion derived from the middle layer at the interface between the dense barrier layer and the middle layer. Even if such a coexisting portion is present, the effect according to the present invention can be achieved sufficiently when the dense barrier layer with dense and low crystallinity and the middle layer having a columnar structure with high crystallinity are provided having the above-mentioned thicknesses.

Due to the above-described process, the middle layer having a columnar structure with higher crystalline orientation than the dense barrier layer can be formed on the dense barrier layer. A size of columnar compositions in the middle layer is not particularly limited. However, in view of adhesion to the dense barrier layer and the electrical conductive thin layer, the size of the columnar compositions in the middle layer is preferably larger than the size of the spherical/granular compositions in the dense barrier layer. Particularly, an average size (average width) of the columnar crystals in the middle layer is preferably between 10 nm and 100 nm, more preferably between 30 nm and 100 nm. When the average size is within the above-mentioned range, sufficient adhesion to the dense barrier layer and the electrical conductive thin layer can be achieved. The "average size of the columnar crystals in the middle layer" is calculated by an image analysis of the cross-section of the middle layer by SEM.

[Process (3)]

Then, the electrical conductive thin layer is formed on the middle layer formed in the Process (2). A method for forming the electrical conductive thin layer may be similar to the first embodiment when the electrical conductive thin layer is constituted by electrical conductive carbon.

According to the above-described method, the electrical conductive member can be manufactured, in which the metal substrate 152, the dense barrier layer 153, the middle layer 154 and the electrical conductive thin layer 155 are formed sequentially. In the above-described processes, the dense barrier layer 153, the middle layer 154 and the electrical conductive thin layer 155 are formed on only one side of the metal substrate 152. However, in order to manufacture the electrical conductive member in which the respective layers are formed on both sides of the metal substrate 152, the same processes may also be applied to the other side of the metal substrate 152.

The electrical conductive member according to the present embodiment can be used for various purposes as in the case of the first embodiment. One of representative examples is the separator 5A of the PEFC. When the electrical conductive member is used for the separator of the PEFC, the electrical conductive member may be used in at least one of anode and cathode. However, in terms of a large amount of water generated especially at the cathode side, the electrical conductive member is preferably used at least as a cathode separator. More preferably, the electrical conductive member according to the present embodiment is used for each cathode separator and anode separator. According to the present embodiment, the whole metal substrate is not necessarily covered with the dense barrier layer in the respective separators. However, in view of the effect of intrusion prevention of water into the metal substrate, the coverage in the cathode separator is preferably similar to or higher than the coverage in the anode separator. Due to such a configuration, intrusion of water molecules in the cathode side in which a larger amount of water is generated can be sufficiently prevented, and a decrease in electrical conductivity and corrosion resistance of the electrical conductive member (especially metal substrate) can be suppressed effectively. With regard to the coverage relationship between the cathode separator and the anode separator covered with the dense barrier layer, when the coverage in the cathode separator is 100, the coverage in the anode separator is preferably between 60 and 100, more preferably between 80 and 100.

The whole metal substrate is not necessarily covered with the dense barrier layer (with 100% coverage) in each surface direction of the cathode side separator and the anode side separator. Preferably, the dense barrier layer is formed on the metal substrate in such a manner that the coverage becomes higher in a downstream side in a gas flow direction continuously or in two or more segmented areas, as an in-plane distribution of each separator. This consideration is derived from the assumption of a larger amount of water generated in the downstream side in the gas flow direction in both cathode and anode. Therefore, the dense barrier layer is formed on the metal layer according to the amount of water to be generated, so as to prevent intrusion of water molecules effectively due to such a coverage distribution. Accordingly, a reduction in electrical conductivity and corrosion resistance of the electrical conductive member can be suppressed significantly.

The electrical conductive member according to the present embodiment can be used for a separator for various types of fuel cells such as PAFC, MCFC, SOFC and AFC in addition to the PEFC as in the case of the electrical conductive member in the first embodiment. In addition, the electrical conductive member can be also used for other members of the fuel cell (collector, bus bar, gas diffusion substrate, MEA), and contact points of electronic members, in addition to the separator for a fuel cell. Moreover, the electrical conductive member according to the present embodiment can be used under a humid environment and a conducting environment. Under such environments, the function effect of the present invention in achieving both electrical conductivity and corrosion resistance is significantly realized.

The following is a further explanation of the effect of the electrical conductive member according to the present embodiment with reference to Reference Examples, Examples and Comparative Examples. However, the scope of the present invention is not limited to these examples.

REFERENCE EXAMPLE II-1

An aluminum plate (thickness: 0.2 mm) was prepared as a metal substrate. The aluminum plate was subjected to immersion cleaning in an alkaline aqueous solution of pH 10 at 50° C. for 10 minutes. Next, the aluminum plate was subjected to etching by nitric acid to remove an oxide film. Then, the aluminum plate was subjected to a surface activation treatment by a hydrofluoric acid mixed solution, followed by a zincate treatment in a zinc substitution bath. The condition of the zincate treatment was a bath temperature of 25° C., and immersion time was 30 seconds. The above-mentioned treatments were performed on both sides of the aluminum plate.

Then, the pretreated aluminum plate was subjected to chrome plating in a Sargent bath to form a dense barrier layer. The condition for the plating treatment was a current density of 4 A/dm$^2$, a bath temperature of 35° C., and an electrodeposition time of one hour. Thus, the dense barrier layer constituted by Cr (Cr plating) with the thickness of 2 μm was formed.

When an average crystalline diameter in the dense barrier layer thus obtained was measured by Scherrer's method in X-ray diffractometry, the average crystalline diameter was 15 nm. In this example, an X-ray diffractometer manufactured by Mac Science Corporation was used.

In addition, the images of the cross-section of the dense barrier layer by SEM, and measuring an area ratio occupied by Cr plating was analyzed, so that a porosity of the dense barrier layer thus obtained was calculated. The porosity of the dense barrier layer was 1% or less.

REFERENCE EXAMPLE II-2

An aluminum plate (thickness: 0.2 mm) was prepared as a metal substrate constituting the electrical conductive member. The aluminum plate was washed by ultrasonic waves in an ethanol aqueous solution for three minutes as a pretreatment. Next, the washed aluminum plate was placed in a vacuum chamber, and subjected to an ion bombard treatment by Ar gas, so as to remove an oxide film on the surface thereof. Note that, both the pretreatment and the ion bombard treatment were performed on both surfaces of the aluminum plate.

Next, by use of a UBMS method, a middle layer was formed on the aluminum plate using Cr as a target, while applying negative bias voltage of 50 V to the aluminum plate. The thickness of the middle layer constituted by Cr was 0.2 μm.

When an average crystalline diameter in the middle layer thus obtained was measured in a manner similar to Reference Example II-1, the average crystalline diameter was 30 nm. In addition, when a porosity of the middle layer was measured in a manner similar to Reference Example II-1, the porosity was 7%.

When comparing the result of Reference Example II-1 with the result of Reference Example II-2, it is recognized that the porosity of the dense barrier layer obtained in Reference Example II-1 is lower than that of the middle layer obtained in the present example. In addition, the average crystalline diameter [$D_2$ (nm)] of the dense barrier layer obtained in Reference Example II-1 is smaller than the average crystalline diameter [$D_1$ (nm)] of the middle layer in the present example ($D_2/D_1$=0.5). Here, a crystalline orientation degree (crystalline orientation) is correlated with an average crystalline diameter. Therefore, it is assumed that the dense barrier layer obtained in Reference Example II-1 has lower crystalline orientation than the middle layer obtained in this example. It is also assumed that each average crystalline diameter is controlled so that the crystalline orientation degree of each layer can be easily controlled.

Figure 22A:
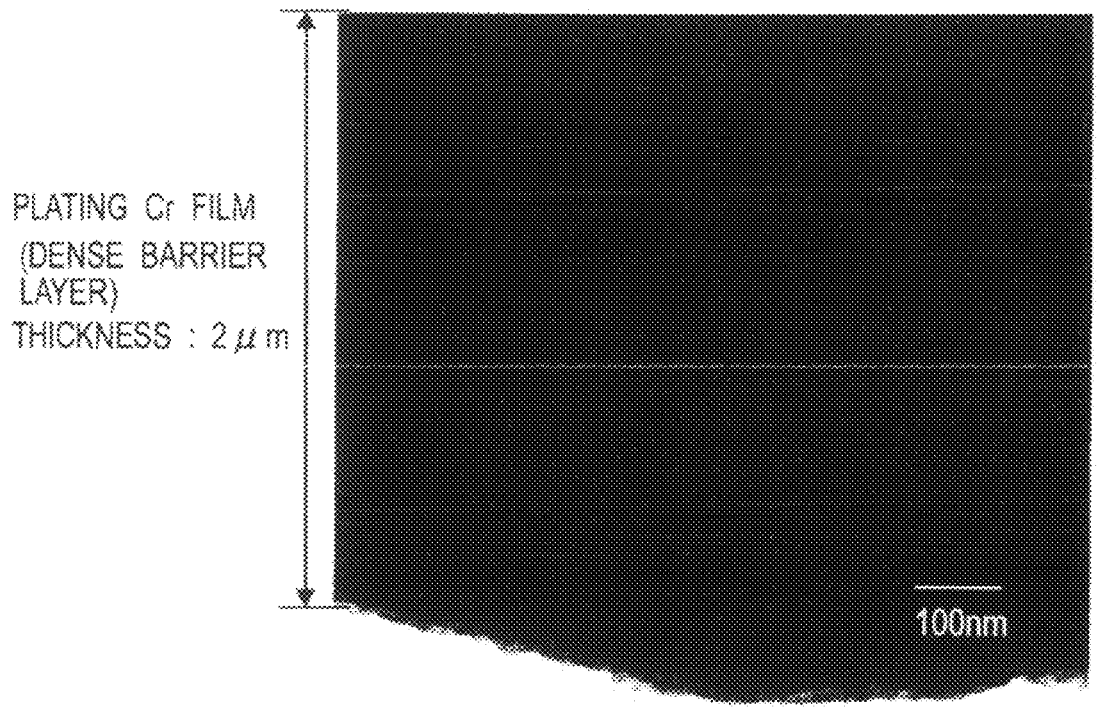
FIG. 22A is a photograph showing a result of an image analysis, using TEM, of a cross-section of a dense barrier layer prepared in Reference Example II-1.
Figure 22B:
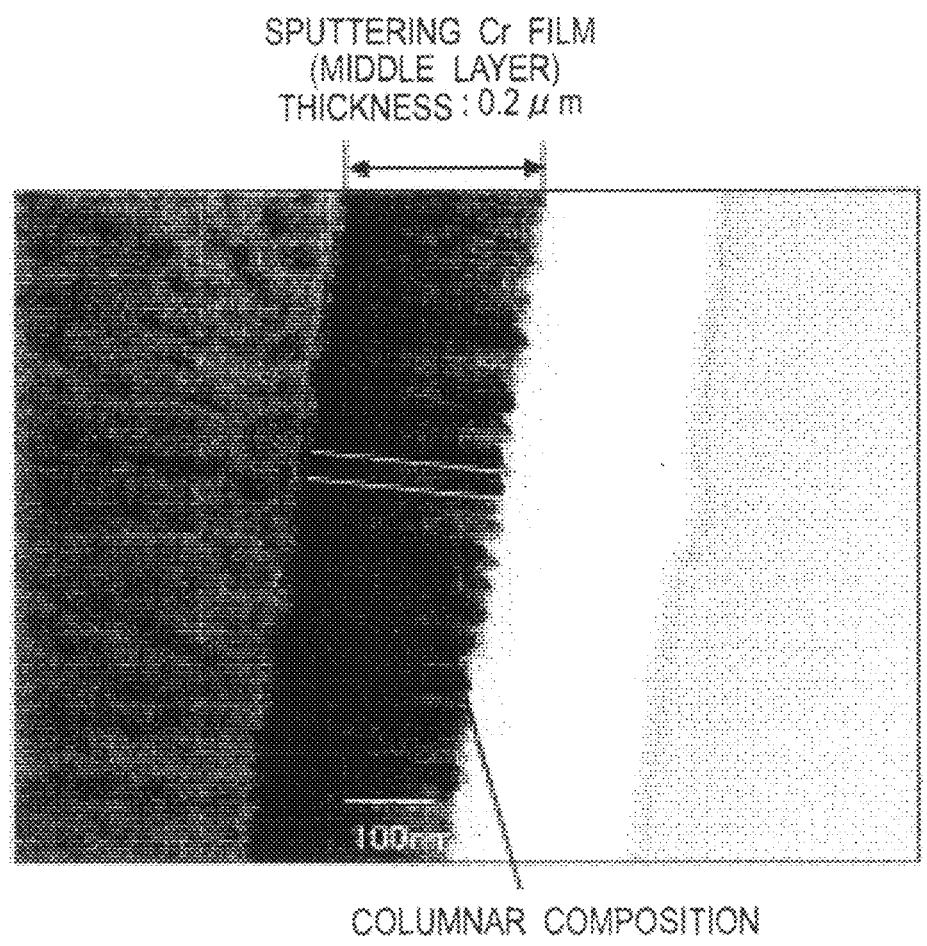
FIG. 22B is a photograph showing a result of an image analysis, using TEM, of a cross-section of a middle layer prepared in Reference Example II-2.

FIG. 22A (Reference Example II-1) and FIG. 22B (Reference Example II-2) show the respective results of the image analysis of each cross-section of the dense barrier layer and the middle layer prepared in Reference Example II-1 and Reference Example II-2, by use of TEM. According to FIG. 22A and FIG. 22B, it is recognized that the dense barrier layer of Reference Example II-1 has granular compositions, while the middle layer of Reference Example II-2 has columnar compositions. In addition, it is recognized that the dense barrier layer of Reference Example II-1 is denser than the middle layer of Reference Example II-2, according to these figures. This result corresponds to the result with regard to the porosity.

Figure 23A:
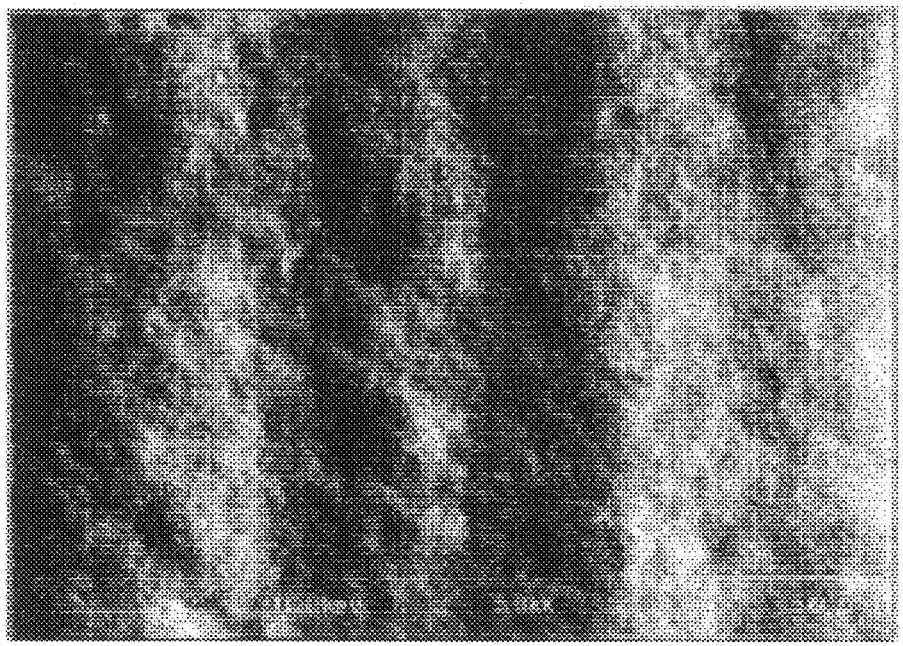
FIG. 23A is a photograph showing a result of an image analysis, using SEM, of a surface of a dense barrier layer prepared in Reference Example II-1.
Figure 23B:
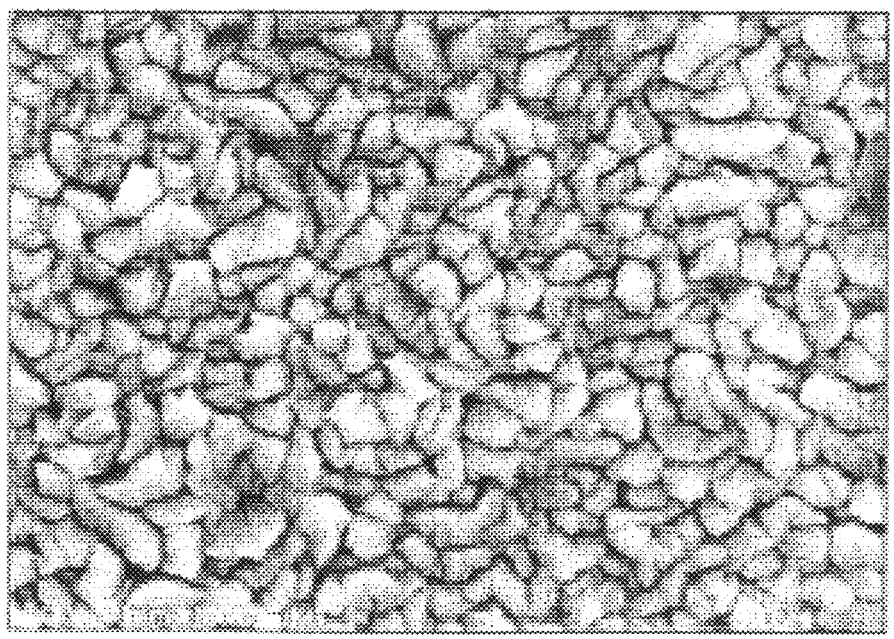
FIG. 23B is a photograph showing a result of an image analysis, using SEM, of a surface of a middle layer prepared in Reference Example II-2.

Similarly, FIG. 23A (Reference Example II-1) and FIG. 23B (Reference Example II-2) show the respective results of the image analysis of each surface of the dense barrier layer and the middle layer prepared in Reference Example II-1 and Reference Example II-2, by use of SEM. According to FIG. 23A and FIG. 23B, it is recognized that the dense barrier layer of Reference Example II-1 is provided with fine granular compositions, while the middle layer of Reference Example II-2 is provided with convex portions having gaps in certain intervals. In addition, it is recognized that an average size (average width) of the columnar compositions in the middle layer is approximately 50 nm according to FIG. 23B.

Figure 23C:
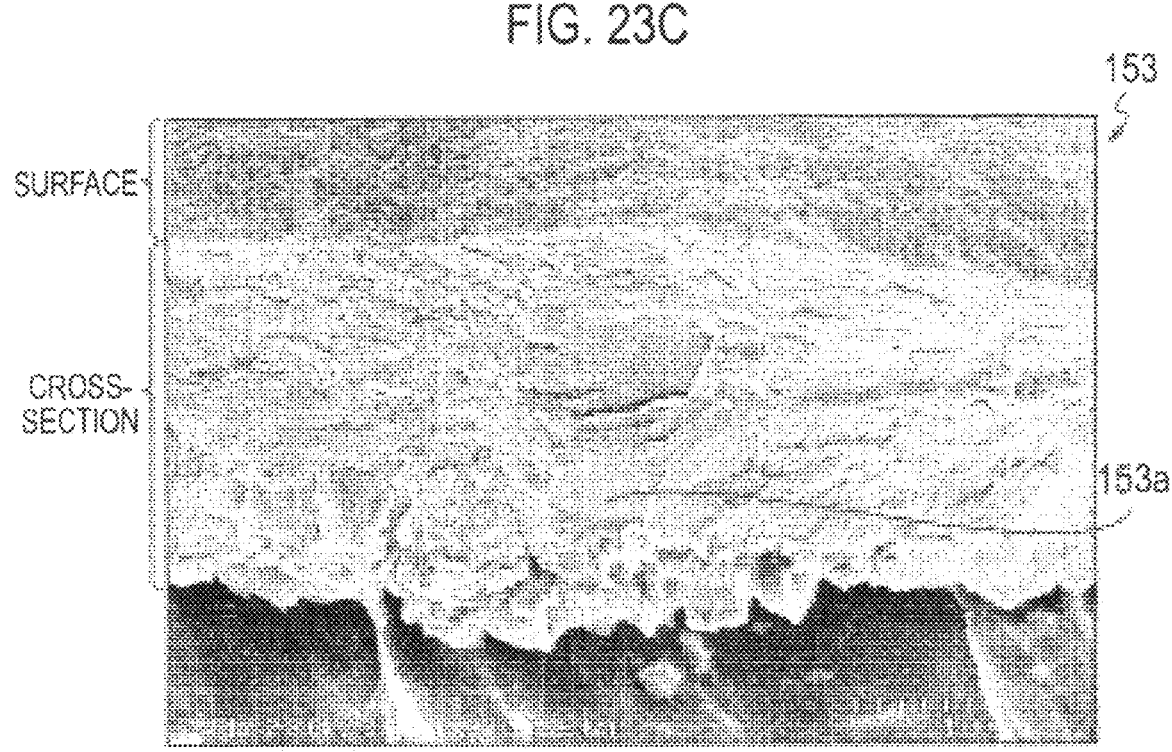
FIG. 23C is an SEM photograph showing a result of a more specific image analysis than FIG. 23A of a dense barrier layer prepared in Reference Example II-1.
Figure 23D:
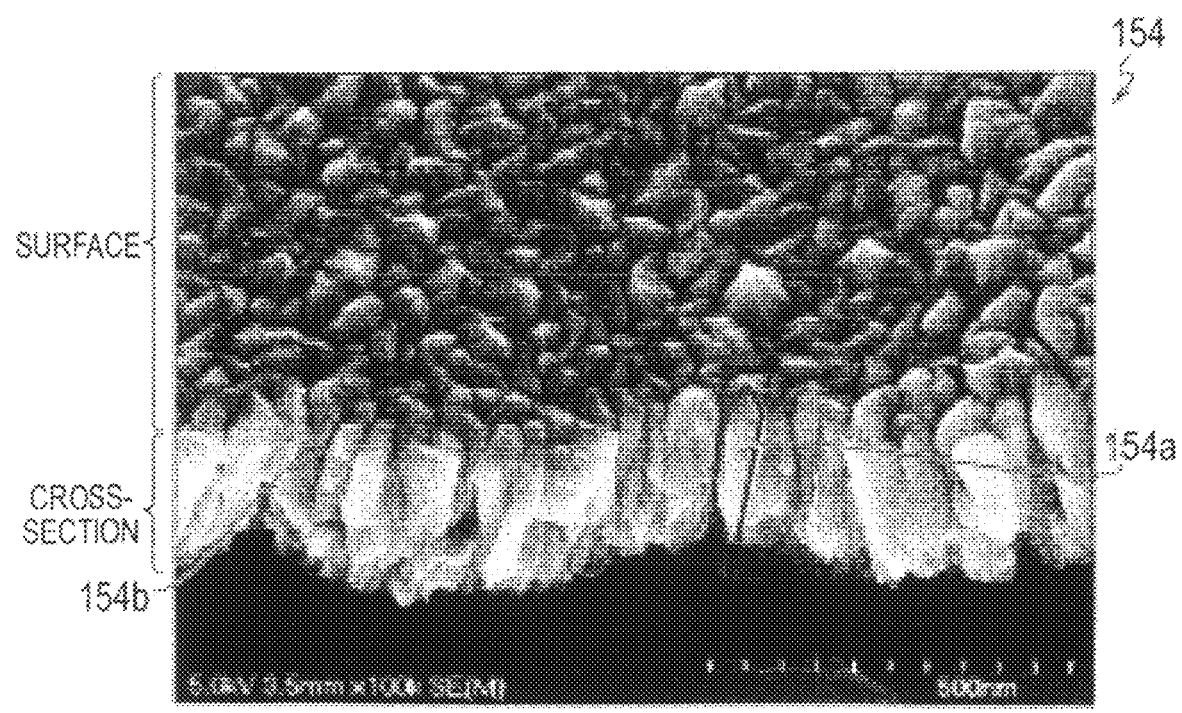
FIG. 23D is an SEM photograph showing a result of a more specific image analysis than FIG. 23B of a middle layer prepared in Reference Example II-2.

Further, FIG. 23C (Reference Example II-1) and FIG. 23D (Reference Example II-2) show specific SEM photographs of the dense barrier layer and the middle layer prepared in Reference Example II-1 and Reference Example II-2, respectively. As shown in FIG. 23C, it is recognized that granular or spherical chromium grains 153a are densely aggregated in the dense barrier layer, and the porosity of the dense barrier layer 153 is extremely low. It is also recognized that crystal axes of the chromium grains 153a are variously directed, and the crystalline orientation is also low. On the other hand, as shown in FIG. 23D, it is recognized that several gaps 154b are present between columnar chromium grains 154a in the middle layer 154, and the porosity of the middle layer is higher than that of the dense barrier layer 153. It is also recognized that the columnar chromium grains 154a are oriented upward from the bottom in the figure, and the crystalline orientation of the chromium grains 154a are higher than that of the chromium grains 153a of the dense barrier layer 153.

EXAMPLE II-1

The dense barrier layer having the thickness of 2 μm constituted by Cr (Cr plating, average crystalline diameter: 15 nm) was formed on each side of the metal substrate in a similar manner to Reference Example II-1. Next, by use of a UBMS method, the middle layer having the thickness of 0.2 μm constituted by Cr (average crystalline diameter: 30 nm) was formed on one side of the dense barrier layer using Cr as a target, while applying negative bias voltage of 50 V to the dense barrier layer, in a manner similar to the method described in Reference Example II-2. By repeating the similar operation, the middle layer having the thickness of 0.2 μm constituted by Cr was formed on the other side of the dense barrier layer. Thus, the stacked body having five layers constituted by the middle layer having the thickness of 0.2 μm constituted by Cr; the dense barrier layer having the thickness of 2 μm constituted by Cr; the metal substrate; the dense barrier layer having the thickness of 2 μm constituted by Cr; and the middle layer having the thickness of 0.2 μm constituted by Cr was prepared.

The stacked body was cut into 30 mm×30 mm pieces, and the side surfaces of one cut piece were masked by a silicone material, thereby preparing a sample (II-1).

COMPARATIVE EXAMPLE II-1

The dense barrier layer having the thickness of 2 μm constituted by Cr (Cr plating) was formed on each side of the metal substrate in a similar manner to Reference Example II-1. The dense barrier layer thus obtained was cut into 30 mm×30 mm pieces, and the side surfaces of one cut piece were masked by a silicone material, thereby preparing a sample (II-2).

COMPARATIVE EXAMPLE II-2

The middle layer having the thickness of 0.2 μm constituted by Cr was formed on each side of the metal substrate in a similar manner to Reference Example II-2. The middle layer thus obtained was cut into 30 mm×30 mm pieces, and the side surfaces of one cut piece were masked by a silicone material, thereby preparing a sample (II-3).

[Evaluation: Corrosion Resistance Test]

The respective samples (II-1), (II-2) and (II-3) prepared in Example II-1, Comparative Example II-1 and Comparative Example II-2 were subjected to a test for the elution amount of aluminum ion by the following experimentation. The samples (II-1), (II-2) and (II-3) were impregnated with 70 mL of a sulfuric acid aqueous solution (pH 4) at 80° C. for 100 hours, respectively. The sulfuric acid aqueous solution is a solution simulating an environment to which a separator is subjected in a fuel cell. A test temperature was set at 80° C. since a driving temperature of a fuel cell is generally 80° C.

The amount of aluminum ion (ppm) eluted in the sulfuric acid aqueous solution after 100 hours was analyzed by ICP-MS (inductively-coupled plasma-mass spectrometry). The result is shown in Table 3 below.

TABLE 3

| | Elution Amount of Aluminum Ion (ppm) |
|---|---|
| Sample (II-1) | 1.8 |
| Sample (II-2) | 2.0 |
| Sample (II-3) | 6.0 |

EXAMPLE II-2

The dense barrier layer having the thickness of 2 μm constituted by Cr (Cr plating, average crystalline diameter: 15 nm) was formed on one side of the metal substrate in a manner similar to the method described in Reference Example II-1. Next, by use of a UBMS method, the middle layer having the thickness of 0.2 μm constituted by Cr (average crystalline diameter: 30 nm) was formed on the dense barrier layer thus obtained using Cr as a target, while applying negative bias voltage of 50 V to the dense barrier layer, in a similar manner to Reference Example II-2.

Further, by use of the UBMS method, the electrical conductive thin layer having the thickness of 0.2 μm was formed on the middle layer using solid graphite as a target, while applying negative bias voltage of 100 V to the middle layer. Thus, the electrical conductive member according to the present example was prepared.

Figure 24:
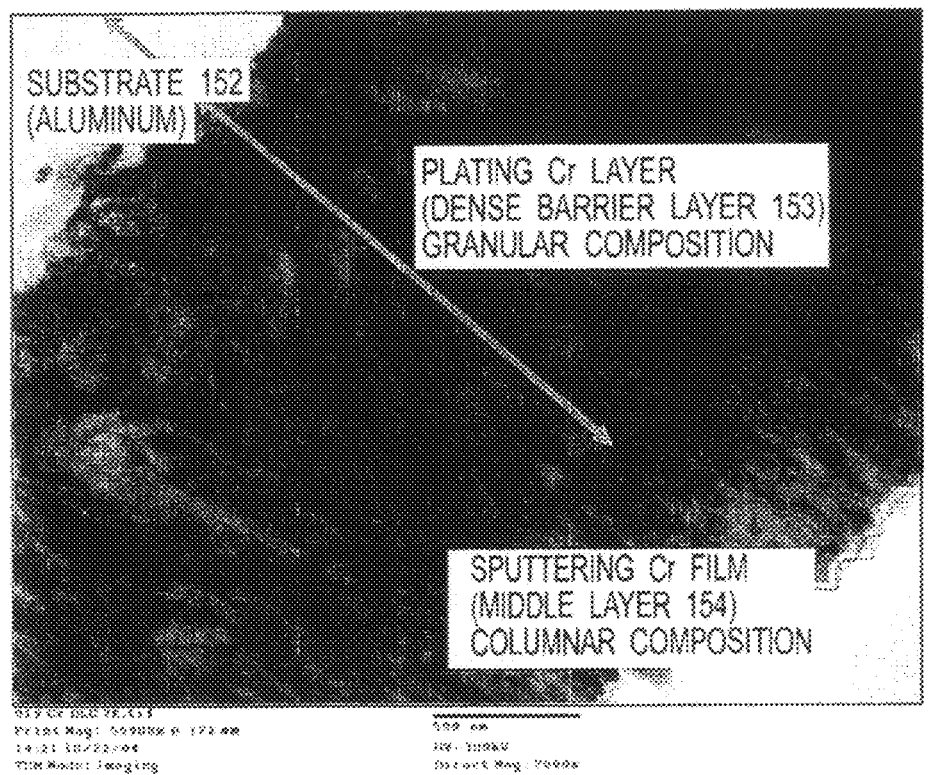
FIG. 24 is a photograph showing a result of an image analysis, using TEM, of a cross-section of an electrical conductive member prepared in Example II-2.

FIG. 24 shows the result of an image analysis of the cross-section of the electrical conductive member by use of TEM. According to the FIG. 24, it is recognized that, in the electrical conductive member of the present embodiment, the dense barrier layer is formed to have granular compositions while the middle layer is formed to have columnar compositions, and the dense barrier layer is denser than the middle layer. This result corresponds to the result with regard to the porosity described above.

Third Embodiment

The following is an explanation of an electrical conductive member, and a method for manufacturing the electrical conductive member according to the third embodiment of the present invention with reference to the drawings. Note that, the components identical to the first embodiment are indicated by the same reference numerals, and explanations thereof are not repeated.

The electrical conductive member (electrical conductive structure) according to the present embodiment is constituted by a metal substrate, a middle layer, and an electrical conductive carbon layer that are stacked sequentially. In addition, an electrical conductive reinforcing layer containing electrical conductive grains is interposed between the metal substrate and the middle layer.

According to the present embodiment, the electrical conductive grains are present between the metal substrate and the middle layer. Thus, even when an oxide film derived from oxidation of the metal substrate or the middle layer is formed, the electrical conductive grains form an electrical conductive path to maintain electrical conductivity. The electrical conductive reinforcing layer not only contributes an improvement of electrical conductivity between the layers in order to suppress an increase of a resistance value, but also has an excellent resistance to corrosion. Therefore, the electrical conductive member according to the present embodiment can obtain excellent electrical conductivity and resistance to corrosion simultaneously. Accordingly, a fuel cell using the electrical conductive member as a separator can achieve excellent durability while excellent conductivity is ensured sufficiently.

A polymer electrolyte fuel cell (PEFC) according to the present embodiment also has the same fundamental constitution as the PEFC according to the first embodiment. Specifically, as shown in FIG. 1 the PEFC includes the polymer electrolyte membrane 2, and a pair of the catalyst layers 3 (anode catalyst layer 3a and cathode catalyst layer 3b) interposing the polymer electrolyte membrane 2. The stacked body constituted by the polymer electrolyte membrane 2 and the catalyst layers is further interposed between a pair of the gas diffusion layers (GDL) 4 (anode gas diffusion layer 4a and cathode gas diffusion layer 4b). Thus, the polymer electrolyte membrane 1 the pair of the catalyst layers 3 (3a, 3b) and the pair of the gas diffusion layers 4 (4a, 4b) are stacked to constitute the membrane electrode assembly (MEA) 9. The MEA 9 is further interposed between a pair of the separators 5 (anode separator 5a and cathode separator 5b).

Figure 25:
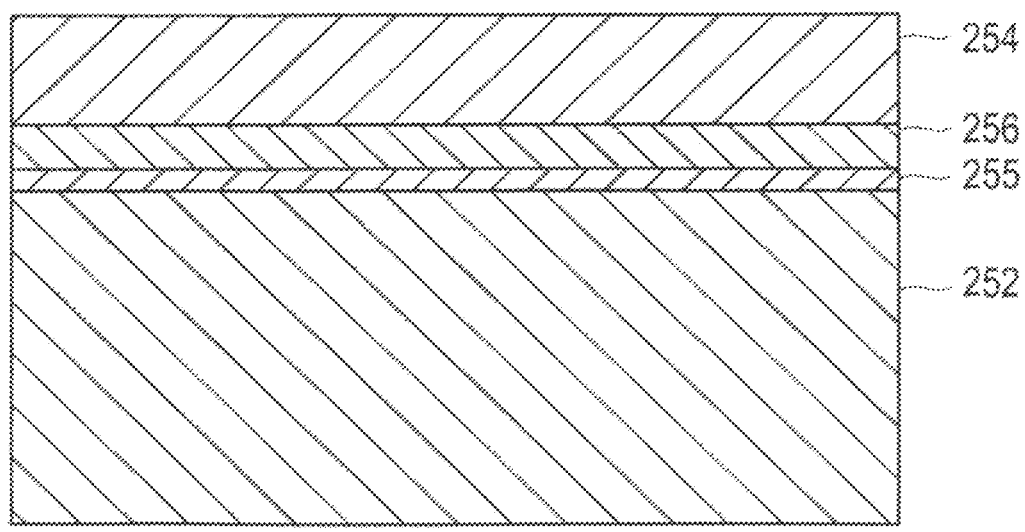
FIG. 25 is a schematic cross-sectional view showing a constitution of a surface of an electrical conductive member (separator) according to a third embodiment.

FIG. 25 is a cross-sectional view showing a constitution of a separator 5B that is the electrical conductive member according to the third embodiment. In the present embodiment, the separator 5B includes a metal substrate 252, a middle layer 256, and an electrical conductive carbon layer 254. In addition, an electrical conductive reinforcing layer 255 is interposed between the metal substrate 252 and the middle layer 256. The separator 5B in the PEFC is provided in such a manner that the electrical conductive carbon layer 254 is positioned on the side of the MEA 9. The following is a specific explanation of each element of the metal separator 5B according to the present embodiment.

[Metal Substrate]

The metal substrate 252 is a main layer of the electrical conductive member constituting the separator 5B, and contributes to ensuring electrical conductivity and mechanical strength. The metal substrate 252 according to the present embodiment may be the same as the metal substrate 31 according to the first embodiment.

In the present embodiment, the metal substrate 252 may be provided with an oxide film at least one surface of the metal substrate 252. The oxide film may be naturally formed on the metal substrate 252 by being subjected to air, or may be formed on the metal substrate 252 by being oxidized artificially in an oxidant atmosphere (gas, solution). For example, when the metal substrate is constituted by stainless steel, the metal substrate contains $Cr_2O_3$, NiO, and $Fe_2O_3$. When the metal substrate is composed aluminum, the metal substrate contains $Al_2O_3$. When the metal substrate is constituted by iron, the metal substrate contains $Fe_2O_3$. When the metal substrate is constituted by titanium, the metal substrate contains $TiO_2$.

[Electrical Conductive Reinforcing Layer]

The electrical conductive reinforcing layer 255 contains electrical conductive grains, and is provided on the metal substrate 252. Due to the presence of the electrical conductive reinforcing layer 255, sufficient electrical conductivity is ensured even if an oxide film is formed on the metal substrate or in the middle layer described below. Therefore, the electrical conductive member constituting the separator 5B can ensure electrical conductivity while having an enhanced resistance to corrosion due to the provision of the electrical conductive reinforcing layer 255, compared with the case where the electrical conductive member is only constituted by the metal substrate 252, the middle layer 256 and the electrical conductive carbon layer 254.

A material constituting the electrical conductive grains is not particularly limited as long as the material has electrical conductivity and does not form an oxide film. Particularly, the material is preferably at least one component selected from the group consisting of noble metal elements, alloys containing noble metal elements and carbon. When such a material is used, good electrical conductivity can be maintained since the electrical conductive grains do not form an oxide film even when acidic water enters the layers. As the noble metal elements, at least one element selected from the group consisting of gold (Au), silver (Ag), platinum (Pt), palladium (Pd), rhodium (Rh), iridium (Ir), ruthenium (Ru) and osmium (Os) is preferable. Examples of the alloys containing noble metal elements include a gold-cobalt alloy (Au—Co), a gold-nickel alloy (Au—Ni), and a palladium-nickel alloy (Pd—Ni). As carbon, at least one type of carbon selected from the group consisting of graphite, carbon black, amorphous carbon, activated carbon, coke, and glassy carbon is preferable. Among those, relatively low-cost graphite is preferable. The noble metal elements, the alloys containing noble metal elements and carbon may be used singly, or may be used with a combination of two or more types thereof. In addition, the electrical conductive grains preferably contain different materials from the materials constituting the middle layer. When the different materials are used, the electrical conductive reinforcing layer can have different characteristics and functions from the middle layer.

An average grain diameter of the electrical conductive grains is preferably larger than a thickness of an oxide film to be formed on the surface of the metal substrate or middle layer. Specifically, the thickness of the oxide film is preliminarily measured, followed by determining the average grain diameter of the electrical conductive grains that is larger than the thickness of the oxide film. One of the means to measure the thickness of the oxide film is to place the material constituting the metal substrate or the middle layer under an acidic atmosphere for a certain period of time, followed by measuring the thickness of the oxide film formed on the surface of the material by use of an Auger electron spectroscopy (AES) or the like. As a simple method, a thickness of an oxide film formed on a material impregnated with acidic water for a certain period of time may be measured.

Figure 26:
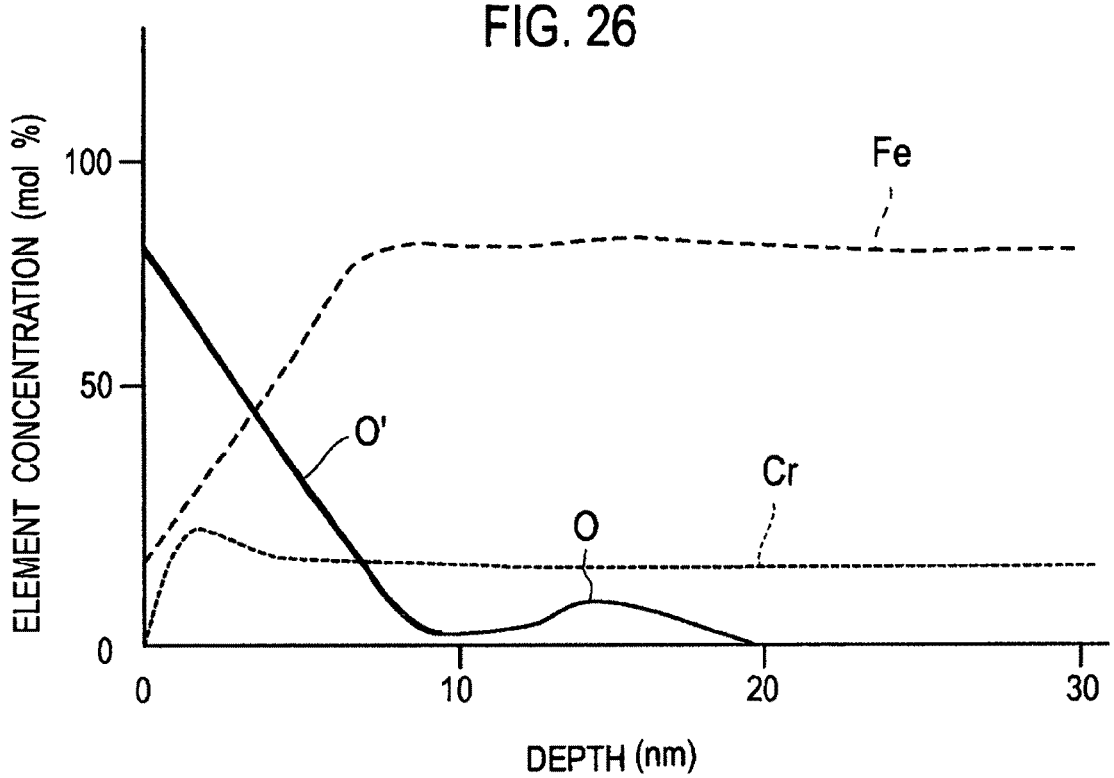
FIG. 26 is a graph showing a measurement result of an element concentration of a metal substrate (SUS316L), which is impregnated with a sulfuric acid aqueous solution of pH 4 at 80° C. for 100 hours, measured by an Auger electron spectroscopy.

FIG. 26 is a graph showing the measurement result of an element concentration of the metal substrate (SUS316L) that is impregnated with a sulfuric acid aqueous solution of pH 4 at 80° C. for 100 hours, measured by an Auger electron spectroscopy. According to FIG. 26, it is recognized that oxygen (O') derived from a surface oxide is present within approximately the 10 nm depth from the surface layer, in addition to the constituent elements (Fe, Cr, Ni) of the metal substrate. Therefore, under such a condition, the average grain diameter of the electrical conductive grains is preferably 10 nm or more, more preferably between 10 nm and 100 nm, even more preferably between 10 nm and 20 nm. Since an acidic atmosphere in a fuel cell depends on power generation conditions, the thickness of the surface oxide is preferably evaluated preliminarily under a condition simulating an environment in a fuel cell according to a power generation condition.

A thickness of an oxide film formed on a representative metal substrate material is approximately between 0.001 nm and 0.1 nm in SUS, and approximately between 0.001 nm and 1 nm in Al. Therefore, the average grain diameter of the electrical conductive grains is preferably between 0.01 nm and 100 nm, more preferably between 1 nm and 100 nm, even more preferably between 10 nm and 100 nm. When the average grain diameter is 0.01 nm or more, the effect of the present embodiment can be obtained. Particularly, when the average grain diameter is 10 nm or more, the electrical conductive grains have a thickness larger than thicknesses of almost all oxide films formed by the materials constituting the metal substrate or the middle layer. Thus, contact points between the electrical conductive grains or between the electrical conductive grains and the metal substrate/the middle layer are ensured, and electrical conductivity is improved. When the average grain diameter is 100 nm or less, considerable contact points can be ensured between the grains, and gaps between the grains can be reduced in size. Accordingly, adhesion and electrical conductivity is improved. Note that, the "grain diameter" represents a maximum distance among arbitrary two-point distances on an outline of the respective grains. In addition, the "average grain diameter" is calculated as an average value of the grain diameters of the grains observed in several to several tens of visual fields by use of an observational means such as a scanning electron microscope (SEM) and a transmission electron microscope (TEM), unless otherwise specified.

A coverage of the metal substrate covered with the electrical conductive grains is preferably 50% or more to 100% or less, more preferably 65% or more to 100% or less, even more preferably 70% or more to 100% or less, particularly preferably 80% or more to 95% or less. When the coverage is 50% or more, sufficient electrical conductivity is ensured, and an increase in contact resistance of the electrical conductive member can be suppressed. In view of an improvement of electrical conductivity, the metal substrate is preferably covered with the electrical conductive grains as much as possible, and particularly, 100% coverage (full coverage) is preferable. Note that, the amount of the electrical conductive grains increases, as the coverage becomes larger. Thus, a smaller coverage is preferable as long as electrical conductivity is ensured since noble metal elements that are representative materials for the electrical conductive grains are expensive. The "coverage of the metal substrate covered with the electrical conductive grains" represents an area ratio of the electrical conductive grains in the electrical conductive reinforcing layer that is overlapped with the metal substrate 252 when the electrical conductive member (separator 5) is viewed from a stacking direction. The coverage (substrate exposure ratio) may be calculated from the area ratio obtained by image processing of an in-plane distribution of the element of the electrical conductive grains obtained by an Auger electron spectroscopy.

Figure 27:
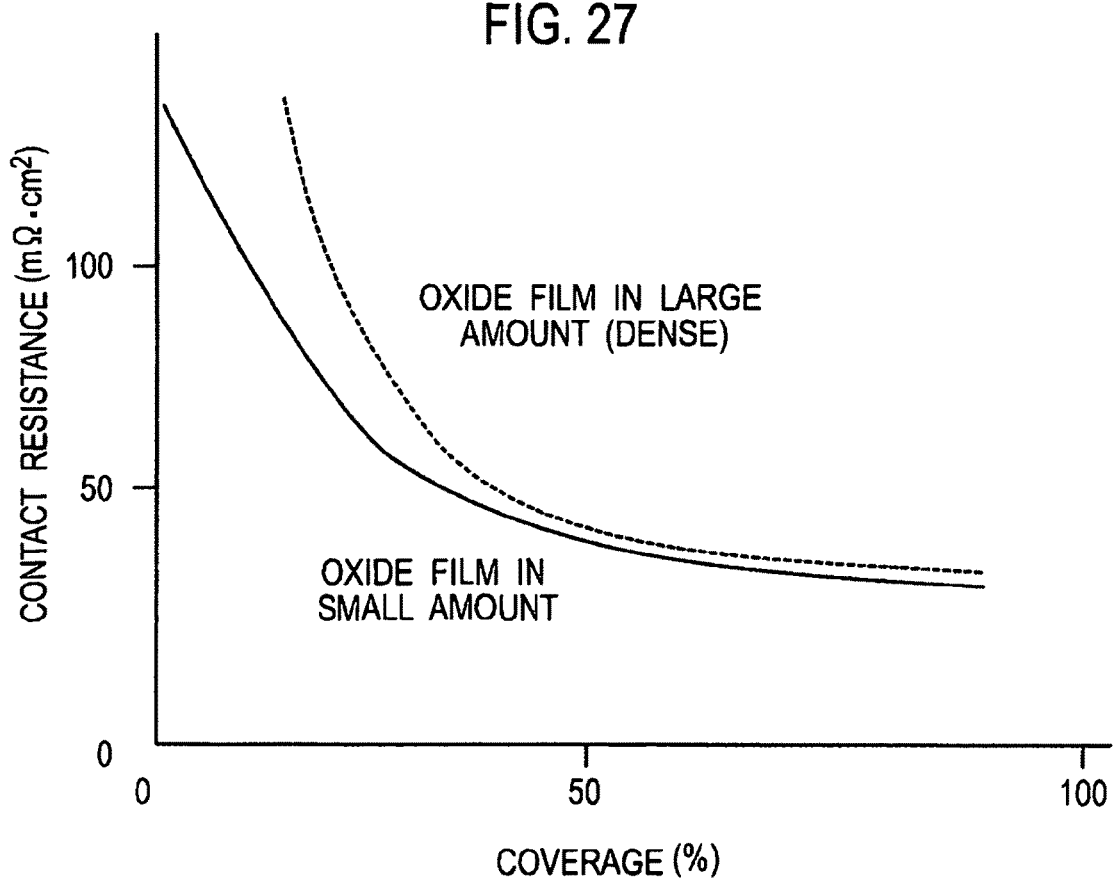
FIG. 27 is a graph showing a relationship between a coverage and a contact resistance of electrical conductive grains in a member, in which a surface of a metal substrate having an oxide film formed thereon is covered with the electrical conductive grains.

FIG. 27 is a graph showing a relationship between a coverage and contact resistance of the electrical conductive grains in a member in which the surface of the metal substrate provided with an oxide film is covered with the electrical conductive grains (Au). A dotted line in FIG. 27 represents the presence of many oxide films on the surface of the metal substrate and also the relationship between the coverage and the contact resistance in a dense state, and a solid line in FIG. 27 represents the relationship between the coverage and the contact resistance in a state with a small number of oxide films. It is recognized from FIG. 27 that the contact resistance tends to be increased as the coverage is decreased. Further, it is recognized that the contact resistance can be significantly decreased when the coverage is 50% or more even if the states of the oxide films differ, although this depends on density of the oxide films.

The electrical conductive reinforcing layer may contain other materials in addition to the electrical conductive grains. Due to the inclusion of other materials, the electrical conductive reinforcing layer contributes not only an improvement of electrical conductivity between the layers but also an excellent resistance to corrosion. In addition, when a high-cost noble metal element is used for the electrical conductive grains, the amount of the noble metal element can be reduced, which is advantageous to a reduction in cost. Examples of other materials include metal in Group 4 (Ti, Zr, Hf), metal in Group 5 (V, Nb, Ta), metal in Group 6 (Cr, Mo, W) in a periodic table; metalloid such as Si and B; and an alloy, carbide and nitride of those metals. Among those, metal with less ion elution such as chromium (Cr), tungsten (W), titanium (Ti), molybdenum (Mo), niobium (Nb) or hafnium (Hf), or nitride, carbide or carbonitride of those metals can be preferably used. More preferably, Cr or Ti, or carbide or nitride thereof can be used. Especially, when the above-mentioned metal with less ion elution or carbide or nitride thereof is used, an anticorrosion property of the separator can be significantly improved.

A content of the electrical conductive grains in the electrical conductive reinforcing layer 255 is not particularly limited, and the content may be arbitrarily adjusted so that the coverage of the metal substrate covered with the electrical conductive grains is the above-mentioned desired value.

The material constituting the electrical conductive reinforcing layer other than the electrical conductive grains preferably has a coefficient of thermal expansion that is preferably higher than or equal to, more preferably exceeds that of the material constituting the middle layer (metal, carbide of metal, or nitride of metal constituting the middle layer) described below. Generally, the electrical conductive carbon layer is not easily thermally-expanded, while the metal substrate is easily thermally-expanded. Therefore, the respective materials constituting the electrical conductive reinforcing layer and the middle layer are appropriately determined so that each has the above-described coefficient of thermal expansion. As a result, a difference between expansion and contraction caused by heat generated in the metal substrate, the electrical conductive reinforcing layer, the middle layer and the electrical conductive carbon layer can be suppressed, and therefore, exfoliation caused in the respective layers can be prevented. Further, in such a case, adhesion between the electrical conductive reinforcing layer and the middle layer can be improved.

In the present embodiment, the coverage of the electrical conductive grains in the electrical conductive reinforcing layer with respect to the metal substrate preferably becomes higher from an upstream side to a downstream side in a gas flow direction. Specifically, the coverage of the electrical conductive grains, regardless of anode and cathode, is the lowest in the upstream side that is approximately 50%, and is increased, as necessary in consideration of power generation conditions and the like, in the downstream side that is subjected to a severe corrosion circumstance. A concentration orientation of the electrical conductive reinforcing layer in an in-plane direction may be increased continuously in the gas flow direction. Alternatively, the concentration orientation may be increased in a stepwise manner by providing a plurality of segmented areas having different temperatures. However, the electrical conductive grains may be dispersed evenly in the entire area.

Figure 28:
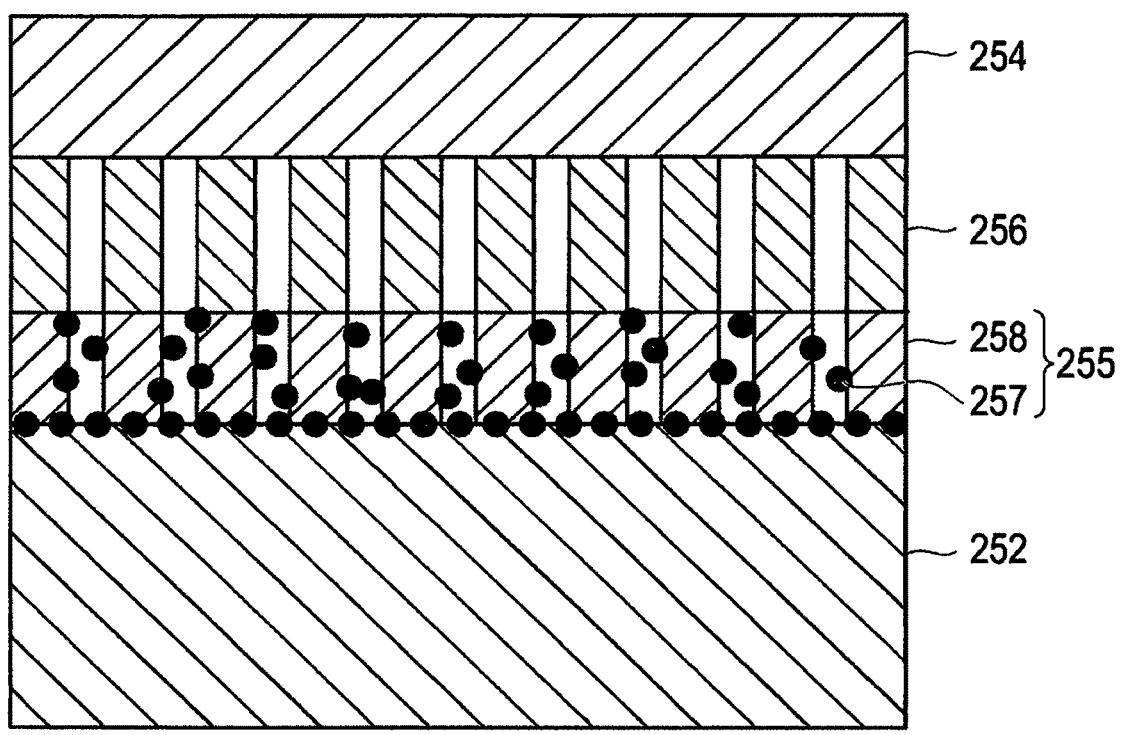
FIG. 28 is a cross-section typically showing an electrical conductive member including electrical conductive grains and a columnar material according to a third embodiment.

A dispersed state of the electrical conductive grains in the electrical conductive reinforcing layer is not particularly limited as long as electrical conductivity of the electrical conductive member is ensured. FIG. 28 is a typical cross-section of the electrical conductive member containing the electrical conductive grains and a columnar material according to the present embodiment. The "columnar material" is a material having columnar compositions with high crystalline orientation. The definition of the "crystalline orientation" is similar to that described in the explanation of the dense barrier layer in the second embodiment.

In the present embodiment, the electrical conductive reinforcing layer 255 contains a columnar material 258 having a plurality of columnar compositions provided in a thickness direction of the electrical conductive member, in addition to electrical conductive grains 257. The electrical conductive grains 257 are provided on the surface of the columnar material 258 in the electrical conductive reinforcing layer, and at the interface between the metal substrate 252 and the electrical conductive reinforcing layer 255.

When the electrical conductive reinforcing layer contains the columnar material having a plurality of the columnar compositions at a nano level, gaps between the columnar compositions function as flow paths for acidic water. Therefore, oxide films are easily formed on the surfaces of the columnar compositions and the surface of the metal substrate. Particularly, when the middle layer described below is constituted by a columnar material having a plurality of columnar compositions provided in a thickness direction of the electrical conductive member, gaps between the columnar compositions function as flow paths for acidic water. As a result, a formation of oxide films is easily promoted. Since such oxide films have insulation properties, electrical conductivity is reduced. Thus, there is a conventional problem of an increase in contact resistance as a separator. In the electrical conductive reinforcing layer according to the present embodiment, the electrical conductive grains are present on the surface of the columnar material. Therefore, electrical conductive paths are formed between the columnar compositions, so that electrical conductivity is sufficiently ensured in an in-plane direction. In addition, in the present embodiment, the electrical conductive grains are also present at the interface between the metal substrate and the electrical conductive reinforcing layer. Therefore, an increase in resistance at the interface of the metal substrate can be suppressed. Accordingly, a reduction in electrical conductivity can be prevented effectively even when oxide films are formed. The above-described columnar material tends to be formed when the layers are formed by a sputtering method.

Although the electrical conductive reinforcing layer and the middle layer in the present embodiment have a plurality of the columnar compositions provided in a thickness direction of the electrical conductive member, the structure of the middle layer is not limited to the columnar structure, and various configurations can be applied. In addition, the dispersed state of the electrical conductive grains is not limited to the above-described state, and other dispersed states can be applied appropriately. For example, as one of the other dispersed states, the electrical conductive grains and other materials may form layers, respectively, so as to be stacked on top of each other. The structures of the electrical conductive reinforcing layer and the middle layer described above can be confirmed by an SEM-EDX (scanning electron microscope-energy dispersive X-ray spectroscopic analyzer) or a TEM.

Although a thickness of the electrical conductive reinforcing layer 255 is not particularly limited, the thickness is preferably thinner, as long as an increase in resistance derived from the formation of oxide films at the interface of the metal substrate is prevented. Specifically, in the electrical conductive member including the metal substrate and the middle layer, the thickness of the electrical conductive reinforcing layer 255 is preferably thicker than the thickness of the area, in which an oxide film is formed, on the surface of the metal substrate. In addition, the thickness of the electrical conductive reinforcing layer 255 is preferably thinner than the thickness of the middle layer described below. When the electrical conductive reinforcing layer 255 has such a thickness, an effect of an adhesion improvement of the middle layer and an effect of an improvement of electrical conductivity of the electrical conductive reinforcing layer can be achieved, and a reduction in space is possible.

The electrical conductive reinforcing layer may be provided on at least one surface of the metal substrate. However, in terms of further achieving a desired effect in the present embodiment, the electrical conductive reinforcing layer may be provided on both sides of the metal substrate. When the electrical conductive reinforcing layer is provided on both sides of the metal substrate, the middle layer and the electrical conductive carbon layer are further provided on the surfaces of the respective electrical conductive reinforcing layers. When the electrical conductive reinforcing layer is provided on one surface of the metal substrate, the electrical conductive reinforcing layer is preferably interposed between the electrical conductive carbon layer to be provided on the side of the MEA and the metal substrate. In addition, the electrical conductive reinforcing layer may be a single layer, or may have a stacked structure constituted by several layers.

[Middle Layer]

The middle layer 256 is provided on the electrical conductive reinforcing layer 255, and functions to improve adhesion between the metal substrate 252 and the electrical conductive reinforcing layer 255 and to prevent ion elution from the metal substrate 252. Especially, the function effect due to the provision of the middle layer 256 is significantly achieved when the electrical conductive reinforcing layer 255 is constituted by the above-described metal or alloy thereof. As described below, when the electrical conductive carbon layer 254 contains electrical conductive carbon and has a high intensity ratio R ($I_D/I_G$) of a peak intensity ($I_D$) of D-band to a peak intensity ($I_G$) of G-band measured by a Raman scattering spectroscopic analysis (for example, when the R value exceeds 2.0), a significant effect of adhesion to the electrical conductive reinforcing layer 255 is obtained due to the provision of the middle layer 256.

Although a material constituting the middle layer 256 is not particularly limited as long as the material can provide the above-mentioned adhesion, the same material as the middle layer 32 in the first embodiment may be used. In addition, although a thickness of the middle layer 256 is not particularly limited, the middle layer 256 may have the same thickness as the middle layer 32 in the first embodiment. Further, although a structure of the middle layer 256 is not particularly limited, the middle layer 256 may have the same columnar structure as the middle layer 32 in the first embodiment.

As described above, when the material constituting the middle layer 256 has the coefficient of thermal expansion lower than or equal to that of the material constituting the electrical conductive reinforcing layer 255, adhesion between the middle layer 256 and the electrical conductive reinforcing layer 255 can be improved. Also, when the coefficient of thermal expansion of the middle layer 256 is similar to or higher than the coefficient of thermal expansion of the electrical conductive carbon layer 254, adhesion between the middle layer 256 and the electrical conductive reinforcing layer 255 can be improved. In view of these situations, the relation among the coefficient of thermal expansion ($\alpha_{sub}$) of the material constituting the metal substrate, the coefficient of thermal expansion ($\alpha_{rei}$) of the material constituting the electrical conductive reinforcing layer, the coefficient of thermal expansion ($\alpha_{mid}$) of the material constituting the middle layer, and the coefficient of thermal expansion ($\alpha_c$) of the material constituting the electrical conductive carbon layer preferably meets the following formula.

[Math 4]

$$\alpha_{sub} \geq \alpha_{rei} \geq \alpha_{mid} \geq \alpha_c$$

[Electrical Conductive Carbon Layer]

The electrical conductive carbon layer 254 is provided on the middle layer 256, and contains electrical conductive carbon. Due to the presence of the electrical conductive carbon layer, corrosion resistance is improved while electrical conductivity of the electrical conductive member (separator) 5B is ensured, compared with the case where only the metal substrate 252 is provided. As the electrical conductive carbon layer 254, the electrical conductive carbon layer 33 in the first embodiment can be used.

The following is a preferable embodiment for manufacturing the electrical conductive member according to the present embodiment. However, the scope of the present invention is not limited only to the following embodiment. The conditions such as a material for the respective elements of the electrical conductive member constituting the separator 5B are the same as described above, and therefore, the explanation thereof will not be repeated in this embodiment.

First, a plate such as a stainless steel plate having a desired thickness is prepared as the metal substrate. Next, the surface of the prepared metal substrate is subjected to a degreasing and washing treatment by use of an appropriate solvent as in the case of the first embodiment. Then, an oxide film formed on the surface (both sides) of the metal substrate is removed. The method for removing the oxide film is a method similar to the first embodiment.

Then, the electrical conductive reinforcing layer is formed on the treated surface of the metal substrate. Then, using the above-mentioned constitution material (electrical conductive grains and other materials as necessary) of the electrical conductive reinforcing layer as a target, a layer including electrical conductive carbon is stacked at an atomic level on the surface of the metal substrate so as to form the electrical conductive reinforcing layer. Thus, adhesion at the interface of the electrical conductive reinforcing layer and the metal substrate directly attached to each other and the periphery thereof can be maintained for a long period of time due to an intermolecular force and the like.

Examples of a preferable method for stacking the electrical conductive grains and other materials include a plating method, a PVD method such as a sputtering method and an ion plating method, and an ion beam deposition method such as an FCVA method. Examples of the sputtering method include a magnetron sputtering method, a UBMS method, and a dual magnetron sputtering method. Examples of the ion plating method include an arc ion plating method. Especially, the sputtering method and the ion plating method are preferable, and the sputtering method is particularly preferable. By use of those methods, the film formation at relatively low temperature is possible, and therefore, damage to the metal substrate as a base can be minimized. When the sputtering method is used, a bias voltage and the like is controlled so that a film property of the layer to be formed can be controlled. Moreover, according to the sputtering method, a sputtering condition such as a sputtering rate is adjusted so that a dispersed state of the electrical conductive grains can be controlled. Among the sputtering method, the unbalanced magnetron sputtering method is preferable. Due to this method, the electrical conductive reinforcing layer having excellent adhesion provided between the metal substrate and the middle layer can be formed.

A coverage and a grain diameter of the electrical conductive grains may be determined within a desired range by preliminarily recognizing a relationship between a sputtering time and a dispersed amount, followed by controlling those conditions.

Next, the middle layer and the electrical conductive carbon layer are formed on the surface of the electrical conductive reinforcing layer. A method for forming the middle layer and the electrical conductive carbon layer may be the same as the method used for forming the electrical conductive reinforcing layer described above. Preferably, the sputtering method and the ion plating method are used, more preferably, the sputtering method is used, and particularly preferably, the unbalanced magnetron sputtering method is used. However, the target is necessarily changed to the respective constitution materials of the middle layer and the electrical conductive carbon layer. When the middle layer is formed by the above-described method, adhesion can be further improved. When the electrical conductive carbon layer is formed by the same method, a carbon layer with a low hydrogen content in addition to the above-mentioned advantage can be formed. As a result, a connection ratio between carbon atoms ($sp^2$ hybridized carbon) can be increased, and excellent electrical conductivity can be achieved.

When the middle layer is formed on the electrical conductive reinforcing layer by the sputtering method or the ion plating method, a portion derived from the electrical conductive reinforcing layer may coexist with a portion derived from the middle layer at the interface between the electrical conductive reinforcing layer and the middle layer. Even if such a coexisting portion is present, the effect according to the present invention can be sufficiently achieved as long as the electrical conductive reinforcing layer and the middle layer have the above-mentioned thicknesses.

When each layer is formed by the sputtering method, negative bias voltage is preferably applied to the metal substrate at the time of sputtering. In such a case, the respective layers in which constitution grains and graphite clusters are densely assembled can be formed due to an ion irradiation effect. Since those layers have excellent electrical conductivity, the electrical conductive member (separator) with a small contact resistance to the other members (for example, MEA) can be provided. A level (absolute value) of negative bias voltage to be applied is not particularly limited, and any voltage available for forming the respective layers can be employed. The voltage to be applied is preferably between 50 and 500 V, more preferably between 100 and 300 V. Other specific conditions at the time of the film formation are not particularly limited, and conventionally known findings may be appropriately applied.

According to the above-described processes, the electrical conductive member in which the electrical conductive reinforcing layer 255, the middle layer 256 and the electrical conductive carbon layer 254 are formed on one main surface of the metal substrate 252 can be manufactured. When the electrical conductive member in which the electrical conductive reinforcing layer 255 is provided on both sides of the metal substrate 252, the same method described above may be also applied to the other main surface of the metal substrate 252 so as to provide the electrical conductive reinforcing layer 255 thereon.

The electrical conductive member according to the present embodiment can be used for various purposes as in the case of the first embodiment. One of representative examples is the separator 5B of the PEFC shown in FIG. 1. When the electrical conductive member according to the present embodiment is used for the separator of the PEFC, the electrical conductive member may be applied to at least one of the anode separator 5a and the cathode separator 5c. However, in terms of a large amount of water generated especially in the cathode side, the electrical conductive member is preferably used at least as a cathode separator. More preferably, the electrical conductive member is used for the respective cathode and anode separators. When the electrical conductive member is provided in the respective anode separator 5a and cathode separators 5c, the amount of the electrical conductive grains in the electrical conductive reinforcing layer is preferably larger in the cathode separator than the anode separator. In a fuel cell, voltage of 0 to 1 V (vs SHE) is generated in cathode, and approximately the same potential is also applied to the surface of the separator. Moreover, since a large amount of water produced by power generation is present in the cathode side, the cathode separator is subjected to an extremely severe corrosion environment. Therefore, an improved effect of electrical conductivity/corrosion resistance due to the electrical conductive grains can be obtained more in the cathode separator that is highly required to have a corrosion resistance.

As described above, the electrical conductive member according to the present embodiment is applied to the separator of the PEFC. However, the electrical conductive member according to the present embodiment is not limited to this application. For example, the electrical conductive member according to the present embodiment can be used for a separator for various types of fuel cells such as PAFC, MCFC, SOFC and AFC in addition to the PEFC as in the case of the electrical conductive member in the first embodiment. Moreover, the electrical conductive member is used for various purposes to be required to have both electrical conductivity and corrosion resistance, in addition to the separator for a fuel cell. Examples of other purposes other than the separator for a fuel cell in which the electrical conductive member is used include parts for a fuel cell (collector, bus bar, gas diffusion substrate, MEA), and contact points of electronic members. Moreover, the electrical conductive member according to the present embodiment can be used under a humid environment and a conducting environment. Under such environments, the function effect of the present invention in achieving both electrical conductivity and corrosion resistance is significantly realized.

The following is a further explanation of the effect of the electrical conductive member according to the present embodiment with reference to Examples and Reference Examples. However, the scope of the present invention is not limited to these examples.

EXAMPLE III-1

A stainless steel plate (SUS316L) was prepared as a metal substrate constituting an electrical conductive member. The thickness of the stainless steel plate was 100 μm. The stainless steel plate was washed by ultrasonic waves in an ethanol solution for three minutes as a pretreatment. Next, the washed stainless steel plate was placed in a vacuum chamber, and subjected to an ion bombard treatment by Ar gas, so as to remove an oxide film on the surface thereof. A degree of vacuum in the vacuum chamber was set to approximately $10^{-3}$ Pa, and an Ar gas pressure was set to approximately 0.1 to 1 Pa. Note that, both the pretreatment and the ion bombard treatment were performed on both surfaces of the stainless steel plate.

Then, by an unbalanced magnetron sputtering method, using Au that was electrical conductive grains and Cr that was the other electrical conductive reinforcing layer material as a target, an electrical conductive reinforcing layer constituted by Au and Cr was formed on each surface of the stainless steel plate. The thickness of the electrical conductive reinforcing layer (Au grain layer) was 20 nm.

Generally, when a layer is formed by sputtering, the formed layer includes a film formation material having a plurality of columnar compositions. However, it was recognized that, in the electrical conductive reinforcing layer of this example, Au grains were dispersed at the interface between the surface of the layer constituted by Cr having columnar compositions and the stainless steel plate (metal substrate). In addition, the coverage (surface coverage) of the Au grains was 90%. The coverage of the Au grains was calculated by a surface analysis and an image analysis by use of an AES. Although the coverage was calculated according to the AES and an image analyzing method described below, this calculation used another sample in which the film formation process was stopped before starting the formation of the electrical conductive carbon layer.

The coverage of the electrical conductive grains (Au) can be determined by a difference of a sputtering rate between Au and Cr that is formed simultaneously with Au. In the present example, a size and position of a target are preferably varied so that Au having higher sputtering rate is dispersed to the minimum necessary. After the determination of each condition of the target, the coverage and the layer thickness can be uniquely determined according to the film formation time.

Then, by use of the UBMS method, a middle layer having columnar compositions constituted by Cr was formed on the electrical conductive reinforcing layer on both surfaces of the stainless steel plate using Cr as a target. The middle layer was formed while applying negative bias voltage of 50 V to the stainless steel plate. The thickness of the middle layer was 0.2 μm.

Further, by use of the UBMS method, an electrical conductive carbon layer was formed on the middle layer formed on both sides of the stainless steel plate using solid graphite as a target. Thus, a sample (III-1) was prepared. The electrical conductive carbon layer was formed while applying negative bias voltage of 140 V to the stainless steel plate. The thickness of the electrical conductive carbon layer was 0.2 μm.

EXAMPLE III-2

A sample (III-2) was prepared by similar operations to Example III-1. The film formation time was adjusted, thereby forming the electrical conductive reinforcing layer with the Au coverage of 38%.

EXAMPLE III-3

A sample (III-3) was prepared by similar operations to Example III-1 except that Ag was used as the electrical conductive grains instead of Au. When a coverage of Ag was measured by a similar method to Example III-1 or Example III-2, the coverage was 83%.

REFERENCE EXAMPLE III-1

A sample (III-4) was prepared by similar operations to those in Example III-1 except that the middle layer constituted by Cr was formed directly on the stainless steel plate without using the electrical conductive grains. The thickness of the middle layer was controlled so as to be the same as the total thickness of the electrical conductive reinforcing layer and the middle layer in Example III-1.

[Evaluation: Corrosion Resistance Test]

The respective electrical conductive members prepared in Examples III-1 to III-3 and Reference Example III-1 were subjected to a test for a corrosion resistance. Specifically, with regard to the respective prepared electrical conductive members, a contact resistance value immediately after the preparation, and a contact resistance value after impregnating with a sulfuric acid aqueous solution of pH 4 at 80° C. for 100 hours were measured. Then, an increased amount of the contact resistance value immediately after the preparation was calculated. Note that, the sulfuric acid aqueous solution is a solution simulating an environment to which a separator is subjected in a fuel cell. A test temperature was set at 80° C. since a driving temperature of a fuel cell is generally a room temperature (25° C.) to 70° C. In this embodiment, when the increased amount of the contact resistance value is lower, it means that durability of the fuel cell is improved. The above-mentioned contact resistance represents a contact resistance value in a stacking direction of the electrical conductive member, and the measurement thereof was performed by the method described in the first embodiment. The result of the measurement of the contact resistance value is shown in Table 4 below.

[Profile Analysis of Element Concentration by AES (Auger Electron Spectroscopy)]

Figure 29:
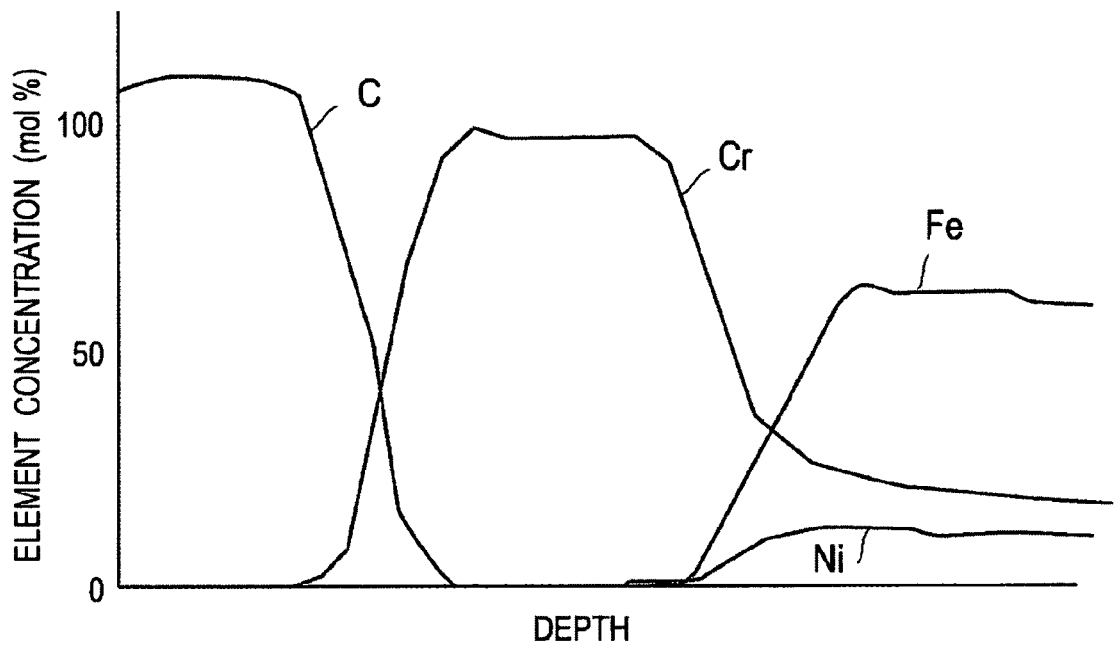
FIG. 29 is a view showing an element concentration profile in a stacking direction of a sample (III-1) before a durability test, measured by AES.
Figure 30:
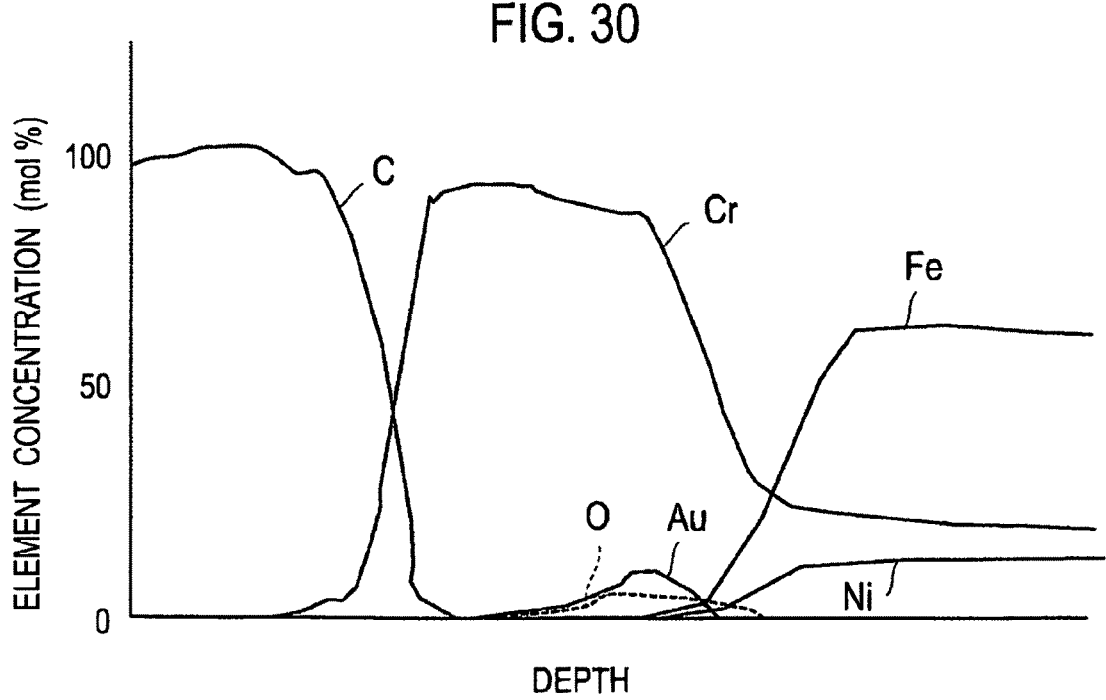
FIG. 30 is a view showing an element concentration profile in a stacking direction of a sample (III-1) after a durability test, measured by AES.
Figure 31:
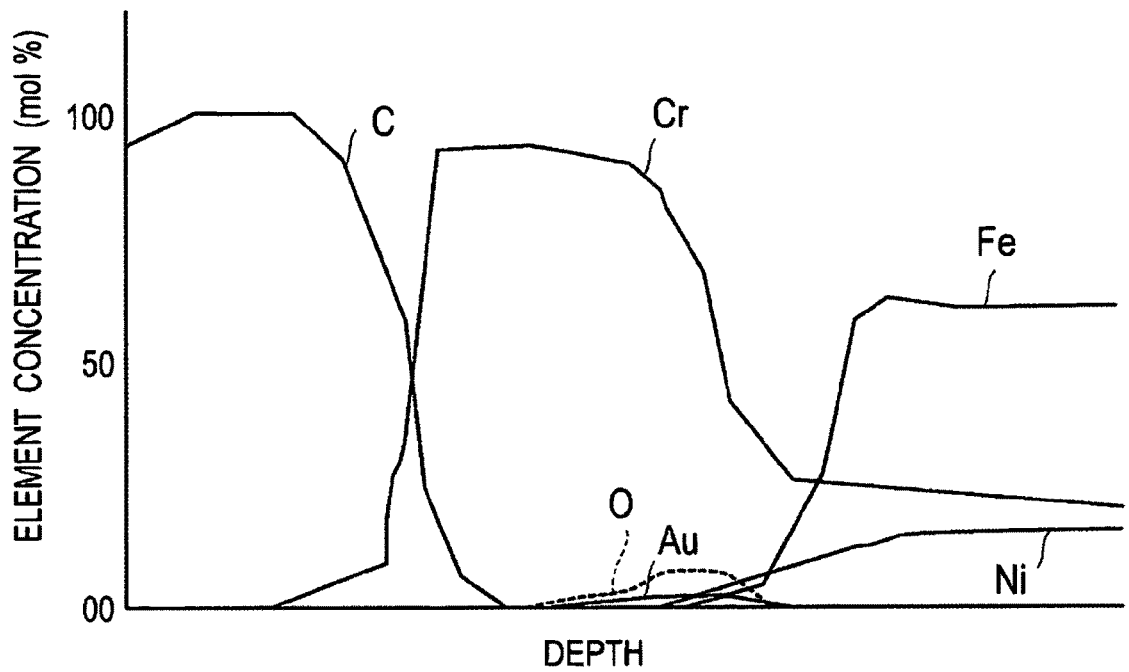
FIG. 31 is a view showing an element concentration profile in a stacking direction of a sample (III-2) after a durability test, measured by AES.
Figure 32:
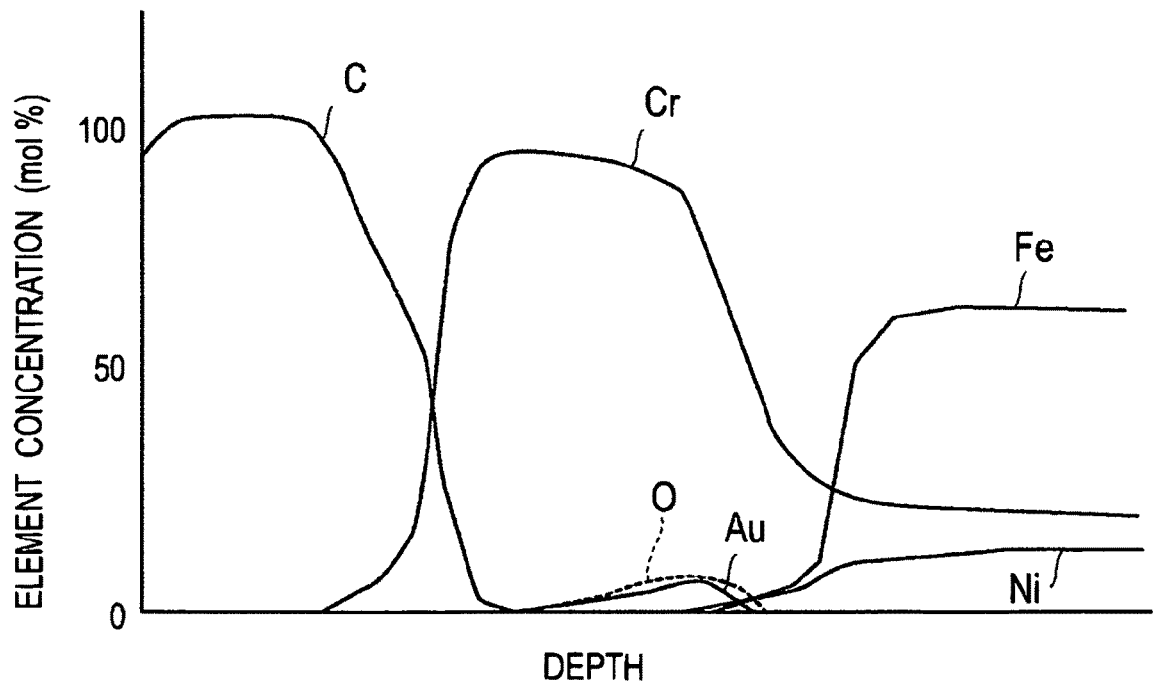
FIG. 32 is a view showing an element concentration profile in a stacking direction of a sample (III-3) after a durability test, measured by AES.
Figure 33:
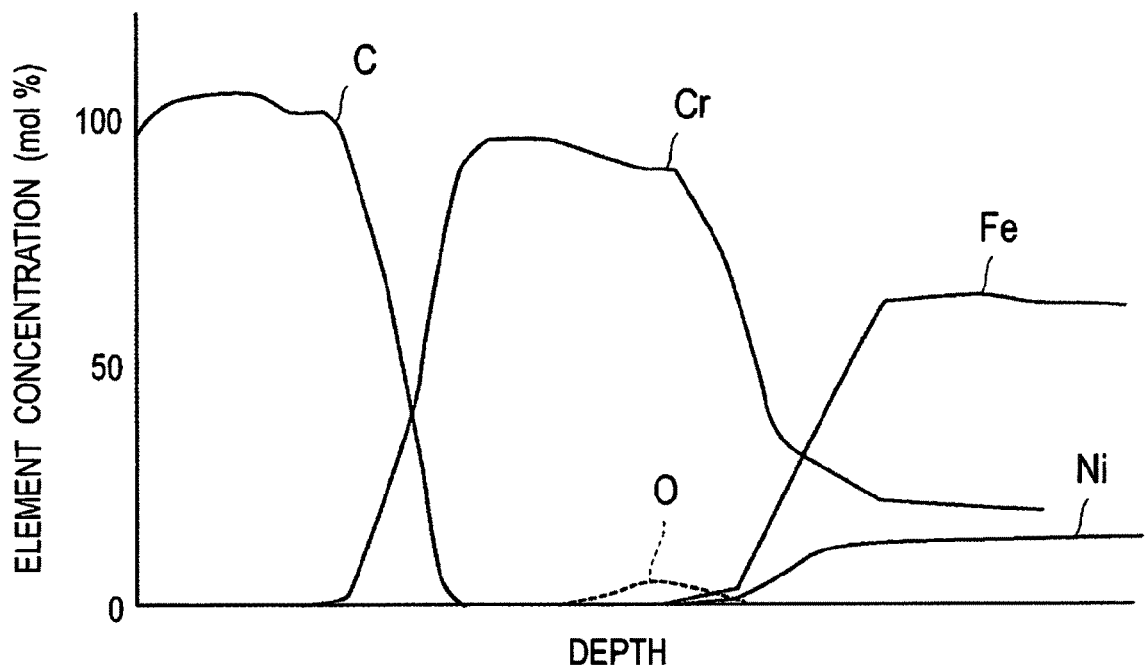
FIG. 33 is a view showing an element concentration profile in a stacking direction of a sample (III-4) after a durability test, measured by AES.

An element concentration profile in a stacking direction of the electrical conductive member was measured with regard to an AES in the respective samples (III-1) to (III-4) prepared in Examples III-1 to III-3 and Reference Example III-1 before the corrosion resistance test. FIG. 29 is an element distribution in a depth direction from the surface of the electrical conductive carbon layer in the sample (III-1) before the corrosion resistance test. It is recognized that an oxygen distribution in the substrate surface is not confirmed before the corrosion resistance test, and no oxide film is formed. Similarly in the AES measurements of the respective samples (III-1) to (III-4), no oxide film formation is confirmed.

Then, with regard to the AES in the respective samples (III-1) to (III-4) after the corrosion resistance test, an element concentration profile in a stacking direction of the electrical conductive member was measured. FIGS. 30 to 33 are element distributions in a depth direction from the surface of the electrical conductive carbon layer in the samples (III-1) to (III-4) after the corrosion resistance test. As can be seen from FIGS. 30 to 33, oxygen (O) is distributed in a region from the surface of the metal substrate (Fe, Ni) to the middle area of the Cr layer, and the oxide film formation is confirmed. In addition, it is recognized that while the electrical conductive grains of Au or Ag are present in the oxygen distribution region (oxide film) in the respective electrical conductive members (samples (III-1) to (III-3)) of Example III-1 to Example III-3, no electrical conductive grains are present in the electrical conductive member of Reference Example III-1 (sample (III-4)).

Then, an element concentration profile in an in-plane direction of the electrical conductive member was measured by the AES, and an in-plane element distribution of the electrical conductive grains was subjected to image processing, so as to calculate the coverage of the metal substrate covered with the electrical conductive grains according to the area ratio. The result thereof is shown in Table 4 below. The AES measurement was performed under the following conditions:

AES device: Field-emission Auger electron spectrometer Mode I-680 manufactured by ULVAC-PHI, Inc.

Data point: 256×256; Electron beam acceleration voltage: 10 kv

Coverage calculation by image processing: High-speed image processing device KS400 manufactured by Carl Zeiss, Inc.; Importing as digital images, and calculating area ratios of target elements As shown in Table 4, it is recognized that the contact resistance in the respective electrical conductive members of each example is controlled to an extremely small value compared to that in the reference example. Accordingly, it is recognized that an increase of the resistance value in a thickness direction of the electrical conductive member is suppressed even when an oxide film is formed on the electrical conductive member including the electrical conductive reinforcing layer.

Furthermore, it is recognized that the increased amount of the contact resistance can be reduced in the electrical conductive member (sample (III-1) of Example III-1) with the coverage of 50% or more, compared with the electrical conductive member (sample (III-2) of Example III-2) with the coverage of less than 50%.

TABLE 4

| | Electrical Conductive Reinforcing Layer | | | | | |
|---|---|---|---|---|---|---|
| | Electrical Conductive Grains | Grain Diameter (nm) | Coverage (%) | Electircal Conductive Grain Maximum Concentration (mol %) | Oxygen Maximum Concentration (mol %) | Contact Resistance (mΩ·cm²) |
| Sample (III-1) | Au | (20*¹) | 90 | 0.9 | 7.5 | 0.6 |
| Sample (III-2) | Au | 10 | 38 | 2.0 | 7.0 | 4.3 |
| Sample (III-3) | Ag | 18 | 83 | 8.0 | 8.0 | 1.1 |
| Sample (III-4) | none | — | 0 | 0.0 | 8.0 | 7.5 |

1*) The grain diameter is an average diameter of the grains observed by an SEM. When the coverage is 50% or more, the measurement of the grain diameter becomes difficult since the grains come in contact with each other to form a layer. Thus, the thickness of the layer formed by the conductive grains was measured.

Fourth Embodiment

The following is an explanation of an electrical conductive member, and a method for manufacturing the electrical conductive member according to the fourth embodiment of the present invention with reference to the drawings. Note that, the components identical to the first embodiment are indicated by the same reference numerals, and explanations thereof are not repeated.

The electrical conductive members (electrical conductive structures) according to the first to third embodiments use the metal substrate (metal plate) as a substrate. However, the electrical conductive member (electrical conductive structure) according to the present embodiment uses a porous material as a substrate, which may be used for a gas diffusion layer for a fuel cell. Hereinafter, an example of the constitution of the electrical conductive member used as a gas diffusion layer will be explained.

The gas diffusion layer includes a porous material layer, and an electrical conductive carbon layer or electrical conductive carbon particles provided on the surface of or in the porous material layer. An intensity ratio R ($I_D/I_G$) of a peak intensity ($I_D$) of D-band to a peak intensity ($I_G$) of G-band measured by a Raman scattering spectroscopic analysis is 1.3 or more in the electrical conductive carbon layer or the electrical conductive carbon particles. An average peak of the electrical conductive carbon layer measured by a rotational anisotropy measurement by use of a Raman scattering spectroscopic analysis shows a twofold symmetry pattern.

As described below, the porous material layer may contain at least one material selected from the group consisting of carbon fiber, metal fiber and organic fiber. One example of carbon fiber includes carbon fiber that is not graphitized but carbonized. Carbonized carbon fiber is generally used for a reinforcing member of buildings since it is less expensive than graphitized carbon fiber. However, the carbonized carbon fiber is inferior in electrical conductivity to the graphitized carbon fiber. Although metal fiber, such as fiber constituted by noble metal has sufficiently high electrical conductivity, such metal fiber is too expensive in terms of practicality. On the other hand, metal fiber constituted by inexpensive metal causes a loss of electrical conductivity because an oxide film is formed on the surface thereof. In other words, a deficiency of electrical conductivity caused by an oxide film is a technical problem when metal fiber is used.

The gas diffusion layer disclosed in Japanese Patent Unexamined Publication No. 2008-153200 uses a sheet-like substrate by use of carbon fiber that is graphitized having high electrical conductivity. However, there is a problem of a great increase in cost since a graphitization process of carbon fiber is a high temperature process of 2000° C. or more.

In view of such a technical problem, the technical principle according to the present embodiment is as follows. That is, even when the porous material layer is constituted by fiber inexpensive but not having sufficient electrical conductivity, the GDL applicable to a fuel cell can be obtained when the electrical conductive carbon layer or the electrical conductive carbon particles are covered with the above-mentioned fiber. Namely, the GDL for a fuel cell according to the present embodiment is a GDL that achieves high electrical conductivity and cost reduction.

Note that, in the present embodiment, electrical conductive carbon in carbon fiber constituting the porous material layer is referred to as "electrical conductive carbon constituting the porous material layer". On the other hand, the electrical conductive carbon layer and the electrical conductive carbon particles are simply referred to as "electrical conductive carbon", so as to distinguish between the two electrical conductive carbons.

According to the present embodiment, a contact resistance between the GDL constituted by the electrical conductive carbon layer or the electrical conductive grains provided on the porous material layer, and the adjacent member is decreased significantly. In addition, a fine pore diameter of a porous material constituting the porous material layer can be controlled due to the provision of the electrical conductive carbon layer or the electrical conductive grains, and an emission property of gas and liquid in a fuel cell can be improved. The electrical conductive carbon layer is provided on the surface of the porous material layer, or provided in the porous material layer (fiber). While, the electrical conductive grains are mostly present inside the porous material layer.

A polymer electrolyte fuel cell (PEFC) according to the present embodiment also has a similar fundamental constitution to the PEFC according to the first embodiment. Specifically, as shown in FIG. 1, the anode catalyst layer 3a and the cathode catalyst layer 3b are provided in close contact with the respective surfaces of the polymer electrolyte membrane 2 that selectively transfers hydrogen ions. Further, the anode gas diffusion layer 4a and the cathode gas diffusion layer 4b having gas permeability and electrical conductivity are provided in close contact with the respective outer surfaces of the catalyst layers 3 (3a, 3b). In addition, the membrane electrode assembly 9 is constituted by the gas diffusion layers 4 (4a, 4b) and the polymer electrolyte membrane 2.

The anode separator 5a and the cathode separator 5b are provided on the respective outer surfaces of the gas diffusion layers so that the membrane electrode assembly 9 is mechanically assembled, and the adjacent MEAs 9 are electrically connected to each other in series. The electrical conductive members (8a, 8b) are constituted by the separators (5a, 5b) and the gas diffusion layers (4a, 4b) that are adjacent to each other.

As the gas diffusion layers 4 (4a, 4b), the GDL for a fuel cell according to the present embodiment is used, so as to achieve high electrical conductivity and cost reduction. Accordingly, the PEFC 1 inexpensive and ensuring a high performance can be obtained.

Figure 34:
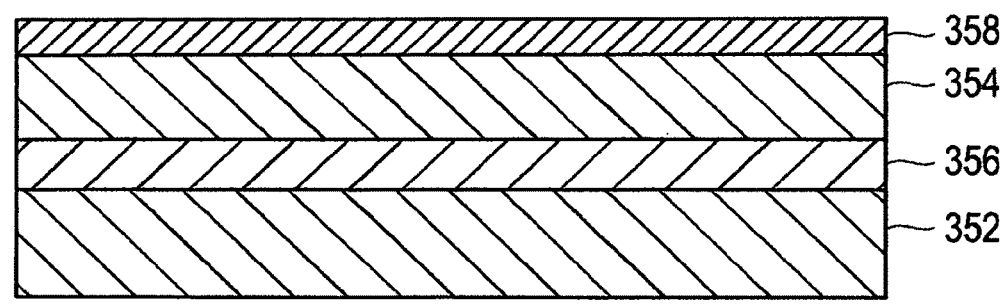
FIG. 34 is a schematic cross-sectional view showing a constitution of a surface of a gas diffusion layer according to a fourth embodiment.

FIG. 34 is a cross-sectional view showing a schematic constitution of the gas diffusion layer according to the present embodiment. In the present embodiment, a gas diffusion layer 351 includes, as a conductive body, a porous material layer 352 and the electrical conductive carbon layer 354. A middle layer 356 is interposed between these layers, although it is not required. The cross-sectional view of the gas diffusion layer in FIG. 34 shows a stacked structure of the middle layer and the electrical conductive carbon layer on the porous material layer. However, the present embodiment is not limited to this structure, and may have a structure constituted by the middle layer and the electrical conductive carbon layer that are "stacked" inside the porous material layer constituted by fiber. The "stacked" layer according to the present embodiment is not limited to a layer that is stacked on (or below) one layer, and the stacked layer may be a layer that is provided inside one layer. In addition, the present embodiment may include a gas diffusion layer having one of the above-mentioned "stacked" states, and may include a gas diffusion layer having both the "stacked" states.

A hydrophilic layer 358 also shown in FIG. 34 will be described below. The separator (5a, 5b) in the PEFC 1 is provided in such a manner that the electrical conductive carbon layer 354 is positioned on the side of the MEA 9. The following is a specific explanation of each element of the GDL for a fuel cell according to the present embodiment.

[Porous Material Layer]

The porous material layer 352 includes a sheet-like porous material as a fundamental composition. The porous material layer 352 preferably contains at least one material selected from the group consisting of carbon fiber, metal fiber and organic fiber. In this case, fibers are thermally bound together in a baking process at the time of producing the porous material layer. As a result, electrical resistance at the interface between the bound fibers can be decreased. Namely, fibers are thermally bound together, so that electrical conductivity is significantly enhanced.

Figure 35:
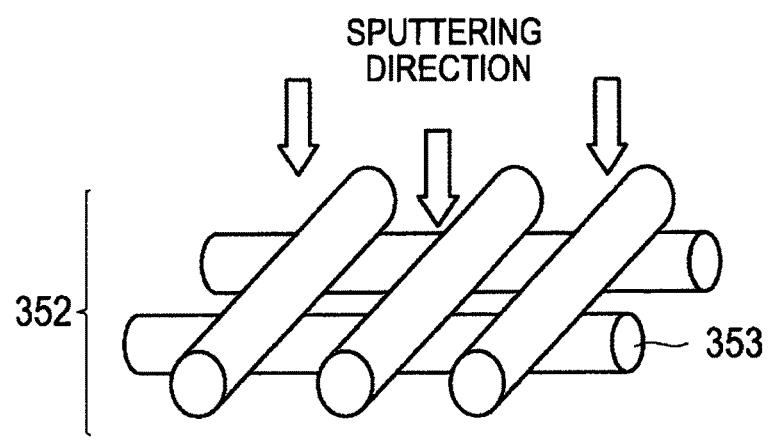
FIG. 35 is a schematic view microscopically showing a surface of a porous material layer.

FIG. 35 is a schematic view microscopically showing the surface of the porous material layer. As described below, the electrical conductive carbon layer 354 may be formed by a sputtering method. In the sputtering method for forming the electrical conductive carbon layer, a target (electrical conductive carbon) is linearly heading toward the porous material layer due to sputtering. Therefore, the electrical conductive carbon layer or the electrical conductive carbon particles are stacked only on an area of the fiber surface exposed with respect to the sputtering direction. Accordingly, by shifting the angle of the fiber substrate itself, in other words, by appropriately controlling the fine pore diameter, the electrical conductive carbon layer or the electrical conductive carbon particles can be provided on larger areas in the surface.

As shown in FIG. 35, the porous material layer 352 constituted by carbon fiber and the like has a configuration in which a plurality of fibers (carbon fibers (CF) 353) are stacked. When the electrical conductive carbon layer 354 is formed on the porous material layer 352 by sputtering, the target is sputtered on the main surface of the porous material layer 352 in a direction of the arrows as shown in FIG. 35. That is, the electrical conductive carbon layer is formed not only on the outermost surface of the porous material layer, but also on the adjacent portions thereof (exposed portions on the surface of the porous material layer). Namely, the electrical conductive carbon layer may be stacked on the surface of the porous material layer as shown in FIG. 34, may be provided only inside the porous material layer, and may be provided on the surface of the porous material layer and also inside the porous material layer.

With regard to a mutual alignment relationship between fibers constituting the porous material layer, a fiber diameter is controlled so that an improvement of electrical conductivity and a prevention of an increase in pressure loss can be achieved. Specifically, as the fiber diameter is larger, gaps between the fibers become larger although the number of contact points between the fibers is reduced. As a result, an increase in pressure loss can be prevented although electrical conductivity is decreased. On the other hand, as the fiber diameter is smaller, the gaps between the fibers become smaller although the number of the contact points between the fibers is increased. As a result, a pressure loss is increased although electrical conductivity can be increased. Consequently, the fiber diameter is preferably controlled within an appropriate range.

The "carbon fiber" according to the present embodiment is a fiber obtained by being baked as a raw material at 1000° C. or more in an inert atmosphere. Examples of such carbon fiber include, but not limited to, polyacrylonitrile (PAN) carbon fiber, pitch carbon fiber, phenol carbon fiber, and vapor-grown carbon fiber. The PAN carbon fiber is a fiber constituted by synthetic fiber as a raw material mainly composed of PAN. The pitch carbon fiber is a fiber constituted by petroleum, coal, synthetic pitch and the like as a raw material.

An average fiber diameter of carbon fiber is different in preferable range depending on specifications of PAN or pitch as a raw material and manufacturing methods. Among conventionally available carbon fibers, PAN carbon fiber having an average fiber diameter between 5 µm and 10 µm, pitch carbon fiber having an average fiber diameter between 5 µm and 20 µm, and vapor-grown carbon fiber having an average fiber diameter of several micrometers may be used. Carbon fiber applicable to the GDL according to the present embodiment may be commonly-used chopped fiber to be subjected to papermaking that has an average fiber length of, but not limited to, 10 mm or less (more preferably between 3 and 6 mm).

When carbon fiber is contained in the porous material layer, electric charge generated in the catalyst layer can be collected efficiently since carbon fiber has low electrical resistivity. In addition, carbon fiber is conventionally used industrially as a reinforcing material for composite materials in various purposes such as space aeronautics due to its excellent specific intensity and specific elasticity. Especially, PAN carbon fiber or pitch carbon fiber that is widely used for an industrial purpose is preferable for the GDL according to the present embodiment.

Further in view of general versatility, cost performance and high electrical conductivity, the porous material layer is preferably constituted by PAN or pitch carbon fiber, particularly preferably not containing graphitized (decarbonized) fiber. The "graphitized (decarbonized) fiber" is a fiber in which other elements (such as N and O) other than carbon are included in the middle of a carbon atomic chain constituting fiber. The reason why such fiber is particularly preferable will be described below.

While PAN carbon fiber has an excellent intensity and extensibility, the PAN carbon fiber has low electrical conductivity because of non-graphitizable carbon. In order to improve electrical conductivity, a baking process at high temperature of approximately 2200 to 3000° C. is generally required. However, the intensity is also decreased concurrently. Moreover, it is extremely difficult to prevent an increase in cost because of a short-life span of a furnace caused by a baking operation at high temperature and the like, which is industrially disadvantageous.

Although pitch carbon fiber is mainly divided into isotropic pitch-derived carbon fiber and anisotropic pitch-derived carbon fiber, anisotropic pitch is generally used because of its high performance property. While anisotropic pitch-derived carbon fiber has excellent elasticity and intensity due to a graphitizable characteristic of a raw material of the fiber, there is a disadvantage of low extensibility. Thus, anisotropic pitch-derived carbon fiber may be industrially inferior in productivity and handling performance at the time of a compounding process.

In view of the above-mentioned problems with regard to PAN carbon fiber and pitch carbon fiber, considerations to the compound of these carbon fibers have been presented to overcome the disadvantages of the respective fibers. However, there are many problems such as an increase in cost and a decline in quality derived from the complicated processes for compounding. Therefore, it is unrealistic to use those carbon fibers industrially.

However, the present embodiment solves such problems by providing the porous material layer constituted by PAN or pitch carbon fiber not containing graphitized fiber. In addition, a reduction in electrical conductivity of the porous material layer constituted by carbon fiber not containing graphitized fiber can be dealt with due to the presence of the electrical conductive carbon layer described below. Accordingly, the gas diffusion layer for a fuel cell according to the present embodiment can achieve high electrical conductivity and a reduction in cost. The "graphitized fiber" in the present description is a fiber obtained by being baked at high temperature of 2000° C. or more in an inert gas atmosphere in order to improve electrical conductivity of carbon fiber.

Figure 36:
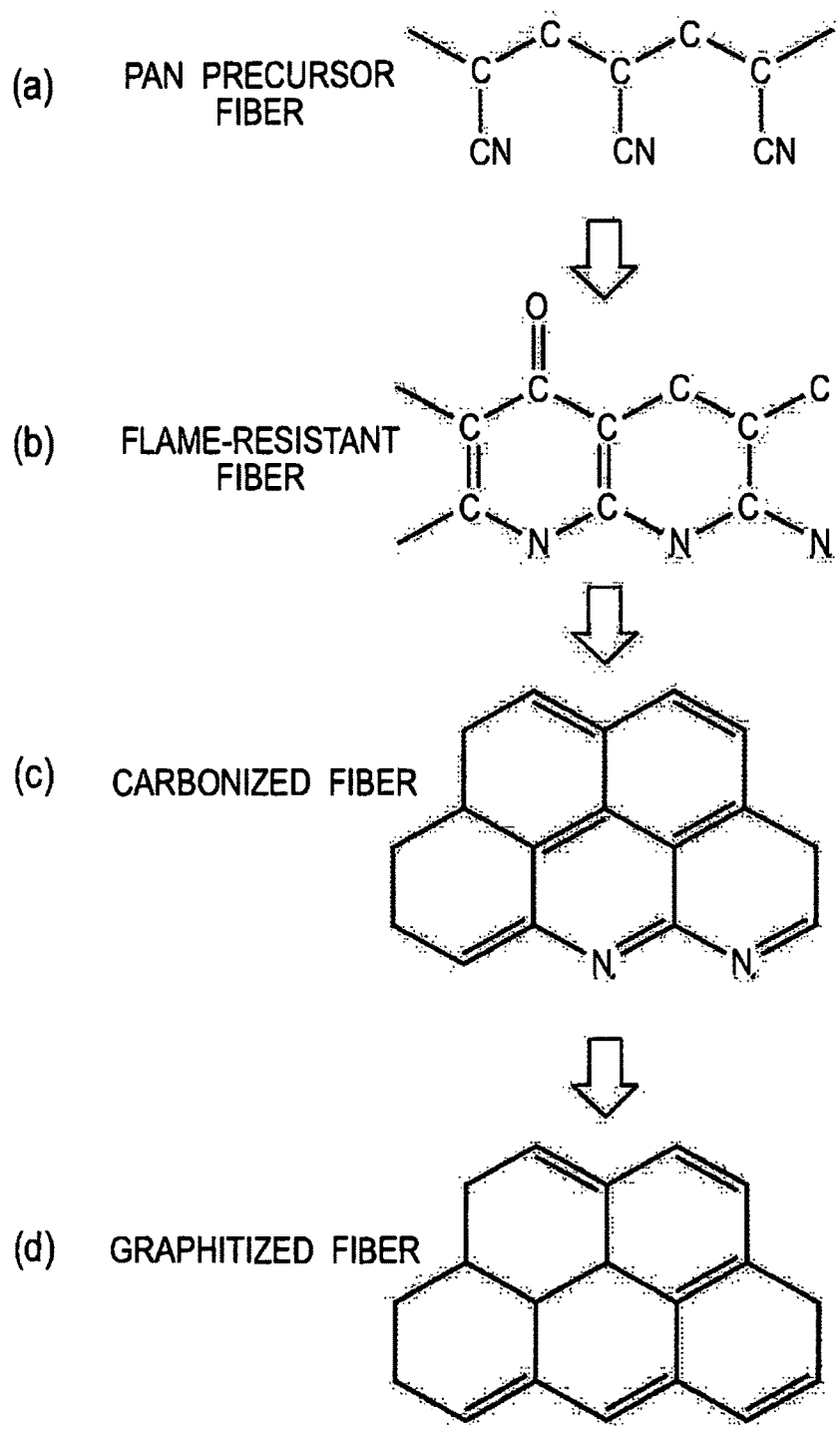
FIG. 36 is a schematic view showing a variation of fiber in each production process of PAN carbon fiber.

FIG. 36 is a schematic view showing a variation of fiber in each production process of PAN carbon fiber. Conventionally, PAN carbon fiber is crystallized by finally being subjected to a graphitization process in order to provide PAN carbon fiber with high electrical conductivity. Although such a conventional graphitization process at the time of producing the porous material layer achieves a significant improvement of electrical conductivity of the porous material layer, the process increases a production cost of the porous material layer itself. Namely, most of the production cost is spent in the graphitization process in the production of PAN carbon fiber. On the other hand, when the gas diffusion layer according to the present embodiment contains PAN carbon fiber, the graphitization process is not performed during the production of PAN carbon fiber. Therefore, as shown in FIG. 36, changed fiber is not graphitized fiber, but can be carbonized fiber. However, such carbonized fiber contains nitrogen atoms in the middle of the "carbon-carbon" bond. Thus, electrical conductivity in the carbonized fiber as PAN carbon fiber is inferior to that in graphitized fiber.

According to the present embodiment, the electrical conductive carbon layer or the electrical conductive carbon particles are provided on the surface of or in the porous material layer. Therefore, high electrical conductivity can be obtained without performing the graphitization process. Accordingly, high electrical conductivity and a large reduction in cost can be achieved. The conventional graphitization process may cause an excessive increase in porosity in the porous material layer. According to the present embodiment, however, the graphitization process is not necessary due to the inclusion of the electrical conductive carbon layer or the electrical conductive carbon particles. Thus, an excessive increase in porosity can be prevented.

Organic fiber is an electrical conductive resin fiber. The electrical conductive resin fiber is a fiber that contains a large amount of carbon atoms and is easily carbonized by being baked to be carbon fiber, so as to obtain electrical conductivity. Examples of organic fiber include, but not limited to, phenol resin fiber, polyacrylonitrile fiber, polyethylene terephthalate fiber, and polybutylene terephthalate fiber. Particularly, the porous metal layer preferably contains phenol resin fiber in view of ensuring electrical conductivity more reliably.

A fiber diameter of organic fiber is preferably between 5 μm and 50 μm, more preferably between 10 μm and 30 μm. A fiber length of organic fiber is not particularly limited since organic fiber is not chopped.

Examples of metal fiber include fiber of iron, titanium, aluminum and copper and alloys of those; fiber of stainless steel; and fiber of noble metal such as gold and silver. Particularly, the porous material layer 352 preferably contains fiber of stainless steel, aluminum or an aluminum alloy in view of a mechanical strength, general versatility, cost performance, processability and high electrical conductivity. Especially, the porous material layer 352 more preferably contains fiber of stainless steel in order to have sufficient durability under an oxidizing atmosphere in a fuel cell, in addition to the mechanical strength, general versatility, cost performance, processability and high electrical conductivity. When the porous material layer contains fiber of stainless steel, electrical conductivity at a contact surface between the porous material layer and the separator is ensured sufficiently. Accordingly, even if moisture enters gaps at a rib portion of a film, durability of the porous material layer can be retained due to a corrosion resistance of an oxide film generated on the porous material layer itself constituted by stainless steel.

A fiber diameter of metal fiber is preferably between 1 μm and 100 μm, more preferably between 5 μm and 50 μm, even more preferably between 5 μm and 20 μm. Metal fiber applicable to the GDL according to the present embodiment may be a commonly-used chopped fiber to be subjected to papermaking that has a fiber length of 10 mm or less. The length of chopped fiber is more preferably between 5 mm and 10 mm.

Examples of stainless steel include austenite series, martensite series, ferrite series, austenite-ferrite series, and precipitation hardening series, which are described in the first embodiment. Examples of the aluminum alloy include pure aluminum series, aluminum-manganese series, and aluminum-magnesium series, which are described in the first embodiment.

In addition, since the porous material layer 352 is required to have a mechanical strength and formability, alloy modification is appropriately performed in addition to the determination of the alloy types. When the porous material layer 352 is constituted by a simple body such as titanium and aluminum, purity of titanium and aluminum is preferably 95% by mass or more, more preferably 97% by mass or more, even more preferably 99% by mass or more.

The porous material layer may contain two or more fibers selected from the group consisting of carbon fiber, metal fiber and organic fiber. An example of the porous material layer that is constituted by carbon fiber and metal fiber will be explained. Carbon fiber and metal fiber may be in a state in which carbon fiber and metal fiber are simply combined, or a state in which metal fiber is present to cover the periphery of one carbon fiber.

The porous material layer may contain fiber or other components having no electrical conductivity. However, the content of the components having no electrical conductivity is preferably 50% by mass or less when the constituent of the porous material layer is 100% by mass, in view of sufficient electrical conductivity of the gas diffusion layer according to the present embodiment. More preferably, the content of the components having no electrical conductivity is 10% by mass or less, and particularly preferably, the porous material layer does not contain the components having no electrical conductivity.

[Electrical Conductive Carbon Layer]

The electrical conductive carbon layer 354 contains electrical conductive carbon. As described above, the electrical conductive carbon layer is provided so as to prevent a reduction in electrical conductivity that is accompanied by a reduction in production cost for the porous material layer. This prevention is achieved when carbon fiber (particularly PAN or pitch carbon fiber) is used. When metal fiber is used in the porous material layer, a corrosion resistance is further improved while electrical conductivity in the gas diffusion layer is ensured due to the presence of the electrical conductive carbon layer compared to the case where only the porous material layer is provided.

An intensity ratio R ($I_D/I_G$) of a peak intensity $I_D$ of D-band to a peak intensity $I_G$ of G-band measured by a Raman scattering spectroscopic analysis is 1.3 or more in the electrical conductive carbon layer or the electrical conductive carbon particles. In addition, an average peak of the electrical conductive carbon layer measured by a rotational anisotropy measurement by use of a Raman scattering spectroscopic analysis shows a twofold symmetry pattern.

As described below, most of the electrical conductive carbon layer or the electrical conductive carbon particles in which the intensity ratio R ($I_D/I_G$) is 1.3 or more are provided on the surface of or in the porous material layer as polycrystalline graphite. The "polycrystalline graphite" has an anisotropic graphite crystal structure (graphite cluster) in which graphene planes (hexagonal layers) are stacked. Therefore, most of the electrical conductive carbon layer or the electrical conductive carbon particles constitute a stacked body having the graphene planes since the intensity ratio R ($I_D/I_G$) is 1.3 or more.

As described in the first embodiment, the intensity ratio R ($I_D/I_G$) of the D-band peak intensity ($I_D$) to the G-band peak intensity ($I_G$) is used as an index of a graphite cluster size of the carbon material, a disordered level of the graphite structure (crystal structure defect), and an $sp^2$ bond ratio. That is, in the present embodiment, the R value can be regarded as an index of a contact resistance of the electrical conductive carbon layer 354, and can be used as a film parameter for controlling electrical conductivity of the electrical conductive carbon layer 354. Raman spectrum of the carbon material is measured to calculate the R value ($I_D/I_G$) as in the case of the first embodiment.

As described above, the R value according to the present embodiment is 1.3 or more. This R value is preferably between 1.4 and 2.0, more preferably between 1.4 and 1.9, even more preferably between 1.5 and 1.8. When the R value is 1.3 or more, the electrical conductive carbon layer in which electrical conductivity in a stacking direction is sufficiently ensured can be obtained. Moreover, the R value is 2.0 or less, a reduction of a graphite component, that is, a disordered level of the graphite structure can be suppressed. In addition, an increase in inner stress of the electrical conductive carbon layer itself can be suppressed, so that adhesion to the porous material layer or the middle layer as a base can be further improved.

It is assumed that a mechanism to obtain the above-mentioned function effect by setting the R value at 1.3 or more according to the present embodiment is the same as in the case described in the first embodiment. Namely, the R value is controlled to the above-mentioned value so that the amount and size of the graphite clusters are appropriately maintained, and an electrical conductive path from one side to the other side of the electrical conductive carbon layer 354 is obtained. Thus, it is considered that a reduction in electrical conductivity is prevented due to the provision of the electrical conductive carbon layer 354 in addition to the porous material layer 352.

When the electrical conductive carbon layer 354 according to the present embodiment is constituted by polycrystalline graphite, the size of the graphite clusters constituting polycrystalline graphite is not particularly limited. As one example, an average diameter of the graphite clusters is preferably between 1 nm and 50 nm, more preferably between 2 nm and 10 nm. When the average diameter of the graphite clusters is within the above-mentioned ranges, an increase in thickness of the electrical conductive carbon layer 354 can be prevented while the crystal structure of polycrystalline graphite is maintained. The "diameter" of the graphite clusters can be measured in the same manner to the first embodiment.

In the present embodiment, although the electrical conductive carbon layer 354 may be composed only of polycrystalline graphite, the electrical conductive carbon layer 354 may include other materials other than polycrystalline graphite. Examples of the carbon materials other than polycrystalline graphite include graphite grains such as carbon black, fullerene, carbon nanotube, carbon nanofiber, carbon nanohorn, and carbon fibril. Specific examples of carbon black include, but not limited to, Ketjen black, acetylene black, channel black, lamp black, oil furnace black, and thermal black. Carbon black may be subjected to a graphitization treatment. Further, examples of the materials other than carbon included in the electrical conductive carbon layer 354 include noble metal such as gold (Au), silver (Ag), platinum (Pt), ruthenium (Ru), palladium (Pd), rhodium (Rh), and indium (In). Moreover, water-repellent substances such as polytetrafluoroethylene, and electrical conductive oxides are also included. With regard to the materials other than polycrystalline graphite, only one of them may be used, or two or more of them may be combined.

Although a thickness of the electrical conductive carbon layer 354 is not particularly limited, the thickness is preferably between 1 nm and 1000 nm, more preferably between 2 nm and 500 nm, even more preferably between 5 nm and 200 nm. When the thickness of the electrical conductive carbon layer is within the above-mentioned ranges, sufficient electrical conductivity between the porous material layer constituting the gas diffusion layer and the separator can be obtained, and the porous material layer can have a high anti-corrosion function.

From a viewpoint of a Raman scattering spectroscopic analysis of the electrical conductive carbon layer 33 similar to the electrical conductive carbon layer 33 in the first embodiment, an average peak measured by a rotational anisotropy measurement of the Raman scattering spectroscopic analysis preferably shows a twofold symmetry pattern. When the average peak measured by the rotational anisotropy measurement shows the twofold symmetry pattern, the plane direction of the graphene planes constituting the electrical conductive carbon layer 354 approximately corresponds to the stacking direction of the electrical conductive carbon layer 354. Therefore, electrical conductivity in the electrical conductive carbon layer 354 is obtained by the shortest path.

In addition, from a similar viewpoint to the electrical conductive carbon layer 33 in the first embodiment, the Vickers hardness of the electrical conductive carbon layer 354 is preferably 1500 Hv or less, more preferably 1200 Hv or less, even more preferably 1000 Hv or less, particularly preferably 800 Hv or less. When the Vickers hardness is within the above-mentioned values, excessive incorporation of $sp^3$ carbon with no electrical conductivity is suppressed, and a decrease in electrical conductivity of the electrical conductive carbon layer 354 can be prevented. Although a lower limit of the Vickers hardness is not particularly limited, the hardness of the electrical conductive carbon layer 354 is sufficiently ensured if the Vickers hardness is 50 Hv or more. Accordingly, the electrical conductive carbon layer 354 that has a resistance to an external contact or impact such as friction and has excellent adhesion to the porous material layer 352 can be provided. In view of this, the Vickers hardness of the electrical conductive carbon layer 354 is more preferably 80 Hv or more, even more preferably 100 Hv or more, particularly preferably 200 Hv or more.

Further, from a similar viewpoint to the electrical conductive carbon layer 33 in the first embodiment, the content of hydrogen atoms in the electrical conductive carbon layer 354 is preferably 30 atom % or less, more preferably 20 atom % or less, even more preferably 10 atom % or less with respect to all atoms constituting the electrical conductive carbon layer 354.

In the present embodiment, the whole surface of the porous material layer 352 is preferably covered with the electrical conductive carbon layer 354 directly, or indirectly via the middle layer 356. In other words, an area ratio (coverage) of the porous material layer 352 covered with the electrical conductive carbon layer 354 is preferably 100%. However, the coverage is not limited to this, and may be less than 100%.

When the porous material layer 352 contains metal fiber (especially, the porous material layer 352 is composed of metal fiber), the coverage is preferably 50% or more. Namely, 50% or more of the surface of the porous material layer 352 containing metal fiber is preferably covered with "electrical conductive carbon". Further, the coverage is more preferably 80% or more, even more preferably 90% or more, most preferably 100%. When the coverage is such a ratio, a decrease in electrical conductivity and corrosion resistance associated with an oxide film formation on exposed areas of the porous material layer 352 that are not covered with the electrical conductive carbon layer 354 can be suppressed effectively.

When the porous material layer 352 contains carbon fiber (especially, the porous material layer 352 is composed of carbon fiber), the coverage of the porous material layer 352 covered with the electrical conductive carbon layer 354 is preferably 85% or more. The coverage is more preferably 90% or more, most preferably 92%. When the coverage is such a ratio, a contact resistance with a similar level to the porous material layer constituted by graphitized carbon fiber can be ensured especially when the carbon fiber is PAN or pitch carbon fiber.

According to the present embodiment, when the middle layer 356 described below is interposed between the porous material layer 352 and the electrical conductive carbon layer 354, the coverage represents an area ratio of the porous material layer 352 that is overlapped with the electrical conductive carbon layer 354 when the gas diffusion layer is viewed from a stacking direction.

[Middle Layer]

First, as shown in FIG. 34, the electrical conductive carbon layer 354 is provided on the surface of the porous material layer 352, and the middle layer 356 constituted by metal may be further provided between the electrical conductive carbon layer 354 and the porous material layer 352. Second, the metal may be provided inside at least one of the porous material layer 352 and the electrical conductive carbon layer 354 (not shown in the figure).

The GDL according to the present embodiment may include the middle layer 356 as an electrical conductive body. The middle layer 356 functions to improve adhesion between the porous material layer 352 and the electrical conductive reinforcing layer 354 and to prevent ion elution from the porous material layer 352. Especially, a significant effect due to the provision of the middle layer 356 is obtained when the R value exceeds the upper limit of the above-mentioned desired range. However, the middle layer may be provided even when the R value is within the above-mentioned desired range. From the other point of view, the function effect due to the provision of the middle layer 356 is also significantly achieved when the porous material layer 352 is constituted by aluminum or an aluminum alloy. In the present embodiment, the middle layer is an arbitrary layer, and is not necessarily provided. Hereinafter, a preferable embodiment including the middle layer will be simply explained.

Although a material constituting the middle layer 356 is not particularly limited as long as the material can provide adhesion, the same material to the middle layer 32 in the first embodiment may be used. Particularly, when the above-mentioned metal with less ion elution or carbide or nitride thereof is used, a corrosion resistance in the porous material layer can be significantly improved. Although a structure of the middle layer 356 is not particularly limited, the middle layer 356 may have the same columnar structure as the middle layer 32 in the first embodiment.

A thickness of the middle layer 356 is preferably between 0.005 μm and 10 μm, more preferably between 0.005 μm and 0.1 μm, even more preferably between 0.005 μm and 0.01 μm. The middle layer itself has advantages in the prevention of exfoliation caused by thermal expansion between the electrical conductive carbon layer and fiber, and in anticorrosion when metal constituting fiber has a low corrosion resistance. When the thickness of the middle layer is 10 μm or more, the possibility that pores in the porous material layer may be blocked becomes high. When the thickness of the middle layer is 0.005 μm or less, an accurate and good result cannot be obtained by a spectroscopic measurement means. The thickness of the middle layer may be measured by a depth analysis by an AES.

The surface of the middle layer 356 on the side of the electrical conductive carbon layer 354 preferably has a coarse surface at a nano level. Due to such a configuration, adhesion to the middle layer 356 of the electrical conductive carbon layer 354 formed on the middle layer 356 can be further increased.

Moreover, when a coefficient of thermal expansion of the middle layer 356 is close in value to a coefficient of thermal expansion of metal constituting the porous material layer 352, adhesion between the middle layer 356 and the porous material layer 352 is improved. However, such a situation may cause a decrease in adhesion between the middle layer 356 and the electrical conductive carbon layer 354. Also, when a coefficient of thermal expansion of the middle layer 356 is close in value to a coefficient of thermal expansion of the electrical conductive carbon layer 354, adhesion between the middle layer 32 and the porous material layer 352 may be decreased. In view of these situations, the relation among the coefficient of thermal expansion ($\alpha_{mid}$) of the middle layer, the coefficient of thermal expansion ($\alpha_{sub}$) of the porous material layer, and the coefficient of thermal expansion ($\alpha_c$) of the electrical conductive carbon layer preferably meets the following formula.

[Math 5]

$$\alpha_{sub} \geq \alpha_{mid} > \alpha_c$$

The middle layer 356 may be provided on at least one surface of the porous material layer 352. When the electrical conductive carbon layer is provided on both surfaces of the porous material layer, the middle layer is preferably provided between the porous material layer and the respective electrical conductive carbon layers. When the middle layer is provided only between the porous material layer and one of the electrical conductive carbon layers, the middle layer is preferably present between the porous material layer and the electrical conductive carbon layer to be provided on the side of the separator.

[Hydrophilic Layer]

As described above, the electrical conductive carbon layer 354 may be provided on the surface of the porous material layer 352. In such a case, as shown in FIG. 34, the hydrophilic layer 358 constituted by at least one material selected from the group consisting of metal, metal nitride, metal carbide and metal oxide may be further provided on the electrical conductive carbon layer 354. The hydrophilic layer 358 is preferably provided on the electrical conductive carbon layer facing the separator, so as to be located adjacent to the separator. When referring to FIG. 1, the hydrophilic layer is preferably provided on the surface of the gas diffusion layer (4a, 4b) at the side that faces the separator (5a, 5b). The following is an explanation of a function of the hydrophilic layer. When water is generated by power generation of a fuel cell, such water is particularly preferably transferred immediately to the separator so as to be discharged. Thus, when the hydrophilic layer is provided on the surface of the gas diffusion layer (4a, 4b) at the side facing the separator (5a, 5b), hydrophilicity at the interface of the separator is improved, so that water can be discharged immediately from the catalyst layer (3a, 3b) to the separator side.

In FIG. 1, water to be discharged passes through groove-like flow paths formed by a plurality of the concave portions provided on the separator (5a, 5b). The hydrophilic layer provided in the gas diffusion layer (4a, 4b) at the side facing the separator (5a, 5b) has portions corresponding to the concave portions and having high hydrophilicity. Thus, such portions are preferably constituted by metal. The other portions of the hydrophilic layer in contact with the convex portions are not required to have hydrophilicity. Thus, the other portions in contact with the convex portions may be constituted by at least one material selected from the group consisting of metal, metal nitride, metal carbide and metal oxide. Such portions in contact with the convex portions are not necessarily a part of the hydrophilic layer. In such a case, the hydrophilic layer may be a partial (discontinuous) "layer" partially provided on the surface of the gas diffusion layer.

Metal constituting the hydrophilic layer may include one or more materials selected form the group consisting of noble metal, metal elements constituting the separator, and metal elements used for the surface treatment of the separator. Examples of the noble metal include noble metal that may be contained in the electrical conductive carbon layer 354. Examples of the metal elements constituting the separator include iron, titanium, aluminum and copper, and alloys of those elements. Those alloys may include an alloy of stainless steel constituting the above-mentioned metal fiber. Examples of the metal elements used for the surface treatment of the separator include the elements described in the first to third embodiments. When the metal is noble metal, a contact resistance can be significantly decreased in addition to the improvement of hydrophilicity. When the metal is the metal elements constituting the separator or the metal elements used for the surface treatment of the separator, corrosion caused when different types of metals come in contact with each other can be prevented effectively. Note that, metal nitride, metal carbide and metal oxide may include nitride, carbide and oxide of all metal described above.

The hydrophilic layer 358 is shown in FIG. 34. In the figure, the hydrophilic layer 358 is shown as a continuous layer, as one example. However, the hydrophilic layer 358 may be a discontinuous layer, namely, may be a layer in which metal is dispersed as described above. The conductive body shown in FIG. 34 includes the porous material layer 352 and the electrical conductive carbon layer 354, and the arbitrary middle layer 356 and hydrophilic layer 358. However, in the present embodiment, the middle layer 356 and the hydrophilic layer 358 are not necessarily provided, or at least one of those layers may be provided.

The cross-section of the gas diffusion layer in FIG. 34 shows a structure in which the middle layer and the electrical conductive carbon layer are stacked on the porous material layer. However, the present embodiment is not limited to this structure, and may have a structure in which the middle layer and the electrical conductive carbon layer are "stacked" inside the porous material layer constituted by fiber. According to the present embodiment, the hydrophilic layer functions to promote a water discharge to the separator side. Therefore, the hydrophilic layer is preferably provided on the porous material layer wherever the electrical conductive carbon layer and the middle layer are provided.

An electrical resistance value in a thickness direction of the gas diffusion layer according to the present embodiment is preferably 1 m$\Omega \cdot$cm$^2$ or less. When the electrical resistance value in the thickness direction of the gas diffusion layer is 2.0 m$\Omega \cdot$cm$^2$ or less, a fuel cell performance tends to be improved, and also, constituent embrittlement of the gas diffusion layer caused by heat generation can be prevented effectively. The electrical resistance value in the thickness direction is an electrical resistance value (m$\Omega$) measured between two gold-plated test electrodes having a size of 50 mm×50 mm (thickness of 10 mm) by interposing the gas diffusion layer between the two test electrodes with pressure of 1 MPa.

A thickness of the gas diffusion layer according to the present embodiment may be between 100 μm and 300 μm. However, the thickness may be adjusted appropriately depending on a size and property of a cell. In the gas diffusion layer, fiber components have electrical conductivity, and fibers are mutually thermally bonded. Therefore, electrical conductivity of the gas diffusion layer is enhanced.

The following is a preferable embodiment for manufacturing the gas diffusion layer according to the present embodiment. However, the scope of the present invention is not limited only to the following embodiment. The conditions such as a material for the respective elements of the gas diffusion layer are the same as described above, and therefore, the explanation thereof will not be repeated in this embodiment.

The method for manufacturing the gas diffusion layer for a fuel cell according to the present embodiment includes a process of forming the electrical conductive carbon layer or the electrical conductive carbon particles on the surface of or inside the porous material layer. The porous material layer may be a commercially available layer. However, the porous material layer according to the present embodiment contains materials, some of which are actually not commercially available such as PAN or pitch carbon fiber that is not subjected to a graphitization treatment. Thus, a production method and condition of such peculiar PAN or pitch carbon fiber will be described later.

In the process (1) of producing the electrical conductive carbon layer or the electrical conductive carbon particles, a layer containing electrical conductive carbon is stacked on the porous material layer at an atomic level, using the electrical conductive carbon (for example, graphite) as a target. Thus, the electrical conductive carbon layer can be formed. Accordingly, adhesion at the interface between the electrical conductive carbon layer and the porous material layer that are directly adhered to each other and the periphery thereof can be maintained for a long period of time due to an intermolecular force or an entry of a small amount of carbon atoms.

Examples of a preferable method for stacking the electrical conductive carbon include a PVD method such as a sputtering method and an ion plating method, and an ion beam deposition method such as an FCVA method. Examples of the sputtering method include a magnetron sputtering method, a UBMS method, a dual magnetron sputtering method, and an ECR sputtering method. Examples of the ion plating method include an arc ion plating method. Especially, the sputtering method and the ion plating method are preferable, and the sputtering method is particularly preferable. By use of those methods, a carbon layer with a low hydrogen content can be formed. As a result, a connection ratio between carbon atoms (sp$^2$ hybridized carbon) can be increased, and excellent electrical conductivity can be achieved. In addition, the film formation at relatively low temperature is possible, and therefore, damage to the porous material layer can be minimized. By use of the sputtering method, bias voltage is controlled, so that a film property of the layer to be formed can be controlled. Furthermore, the electrical conductive carbon layer can be produced continuously and efficiently due to the sputtering method.

When the porous material layer contains metal fiber, an oxide film formed on the surface of the porous material layer (metal fiber) is preferably removed by sputtering by use of argon (Ar) plasma.

Figure 37:
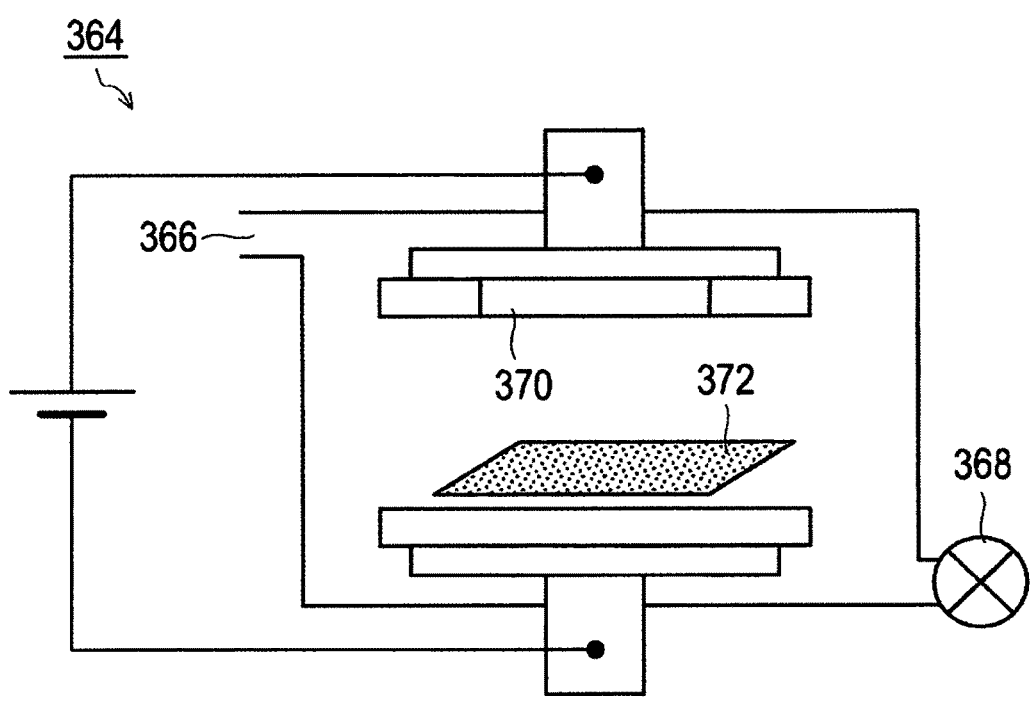
FIG. 37 is a schematic view showing a film formation device for a middle layer and an electrical conductive carbon layer using a sputtering method.

FIG. 37 is a schematic view showing a device for forming the middle layer and the electrical conductive carbon layer by use of the sputtering method. When the electrical conductive carbon layer is formed by the sputtering method, gas is preferably discharged from a gas outlet 366 so that a degree of vacuum in a chamber 364 is set at 3 to 10 Pa. Subsequently, approximately 0.1 to 1 Pa of Ar is preferably introduced thereto from an atmosphere gas inlet 368. Although a temperature of the gas diffusion layer itself is not particularly limited as long as it is approximately between a room temperature (25° C.) and 200° C., the temperature is preferably adjusted depending on the materials of the GDL (especially porous material layer). In addition, a target material (such as Cr and graphite) is flicked from a target 370 to a porous material layer 372 so as to perform sputtering.

When the electrical conductive carbon layer is formed by the sputtering method, negative bias voltage is preferably applied to the porous material layer at the time of sputtering. In such a case, the electrical conductive carbon layer in which graphite clusters are densely assembled can be formed due to an ion irradiation effect. Since the electrical conductive carbon layer has excellent electrical conductivity, the gas diffusion layer with a small contact resistance to other members (for example, catalyst layer and separator) can be provided. A level (absolute value) of negative bias voltage to be applied is not particularly limited, and any voltage available for forming the electrical conductive carbon layer can be employed. The voltage to be applied is, as one example, preferably between 50 and 500 V, more preferably between 100 and 300 V. Other specific conditions at the time of the film formation are not particularly limited. When the electrical conductive carbon layer 354 is formed by the UBMS method, the middle layer is preferably formed preliminarily, followed by forming the electrical conductive carbon layer thereon. As a result, the electrical conductive carbon layer having excellent adhesion to the base layer is formed. When the electrical conductive carbon layer is formed by other methods, the electrical conductive carbon layer having excellent adhesion to the porous material layer is formed even when the middle layer is not provided.

According to the above-described processes, the gas diffusion layer in which the electrical conductive carbon layer 354 is formed on one surface of the porous material layer 352 can be produced. When the gas diffusion layer in which the electrical conductive carbon layer 354 is formed on both surfaces of the porous material layer 352 is produced, the similar method described above may be also applied to the other surface of the porous material layer 352 so as to provide the electrical conductive carbon layer thereon.

When the gas diffusion layer including the middle layer as shown in FIG. 34 is produced, the middle layer is formed on at least one surface of the porous material layer before the formation of the electrical conductive carbon layer described above. In such a case, a similar process to the formation of the electrical conductive carbon layer described above is applied to the formation of the middle layer. However, the target is required to be shifted to the constitution material of the middle layer.

Subsequently, the electrical conductive carbon layer may be formed on the middle layer formed by the above-described process. A similar process to the formation of the electrical conductive carbon layer on the surface of the porous material layer described above is also applied to the formation of the electrical conductive carbon layer on the surface of the middle layer.

In addition, the process (2) of forming the hydrophilic layer may be performed after the process (1). As for the process (2), a sputtering method using at least one material selected from the group consisting of metal, metal nitride, metal carbide and metal oxide as a target, or metal plating process may be used. When the hydrophilic layer is formed on the surface of the gas diffusion layer at the side facing the separator, the process (1) and the process (2) can be performed readily and continuously due to a sputtering process of predetermined metal. When the porous material layer has a continuous sheet-like shape and the process (2) is performed by a plating treatment, the hydrophilic layer can be subjected to a roll-to-roll method in a solution, so that the hydrophilic layer can be formed efficiently at low cost.

With regard to the order of the processes, the process (2) is performed after the process (1), so that the desired gas diffusion layer can be formed. Alternatively, the process (1) and the process (2) are simultaneously performed, so that the hydrophilic layer can be formed on the surface of the gas diffusion layer at the side facing the separator, and a further advantage of a great reduction in production time can be obtained. When the process (1) and the process (2) are performed simultaneously, a hydrophilic material constituting the hydrophilic layer is to be provided not only on the surface of the gas diffusion layer at the side facing the separator, but also in the whole area of the gas diffusion layer. However, the hydrophilic layer may be a discontinuous layer, namely, may be a layer in which metal is dispersed. Accordingly, in terms of saving cost and work associated with a great reduction in production time, the simultaneous (approximately simultaneous) operation of the process (1) and the process (2) is significantly effective.

Metal used in the plating treatment is preferably noble metal or metal elements constituting the separator. When the metal is noble metal, a contact resistance can be significantly decreased in addition to the improvement of hydrophilicity. When the metal is the metal elements constituting the separator, corrosion caused when different types of metals come in contact with each other can be prevented effectively.

The process (1) and the process (2) may be restated as follows. First, the electrical conductive carbon layer or the electrical conductive carbon particles, and/or the hydrophilic layer may be formed by the sputtering method. With regard to the formation of the hydrophilic layer, a plating treatment may be used instead of the sputtering method.

Figure 38:
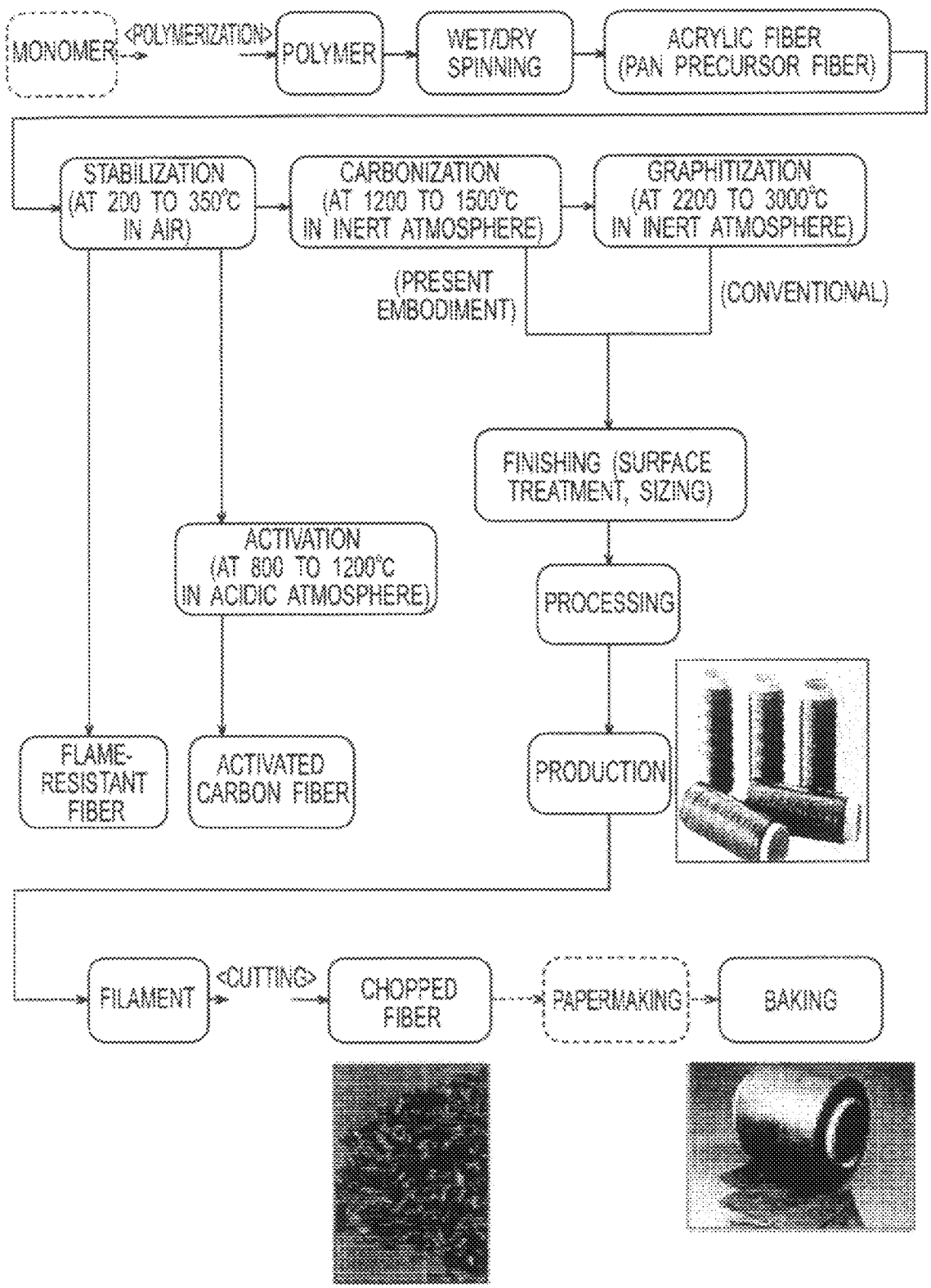
FIG. 38 is a chart showing a conventional production process of PAN carbon fiber and a production process of PAN carbon fiber according to a fourth embodiment.

When polyacrylonitrile or pitch carbon fiber is produced to obtain the porous material layer, the process thereof is preferably completed at a carbonization process, without subsequently performing a graphitization process. Accordingly, a significant reduction in cost is achieved. FIG. 38 is a chart showing a conventional production process of PAN carbon fiber and a production process of PAN carbon fiber according to this embodiment. The most significant characteristic according to the present embodiment in FIG. 38 is not to perform the graphitization process. As a simple explanation according to the flow chart of FIG. 38, the carbonization process is performed, followed by a finishing treatment (filament cutting) such as a surface treatment or sizing. When chopped fiber thus obtained is subjected to papermaking, the fiber surface is preferably subjected to a water repellent treatment by use of a conventionally known fluorine solution. The treated fiber is finally baked, thereby obtaining a roll sheet of the gas diffusion layer. With regard to a method and condition of each production process for the peculiar PAN carbon fiber according to the present embodiment, a conventionally known method and condition shown in FIG. 38 may be applied. The following is one example of the method and condition of each production process for the PAN carbon fiber according to the present embodiment. However, the production method and condition of the PAN carbon fiber according to the present invention are not limited to those described below, and the method and condition may be modified appropriately.

First, a monomer composed mainly of acrylonitrile is polymerized to obtain a PAN polymer. Then, the PAN polymer is subjected to a wet/dry spinning treatment, so as to produce PAN precursor fiber.

The PAN polymer contains preferably 90% by mass or more, more preferably 95% by mass or more of acrylonitrile as a main component of the monomer. If necessary, other monomers that can be copolymerized with acrylonitrile may be added to the polymer so as to obtain a copolymer. At the time of spinning, the polymer and the copolymer are dissolved in a solvent or an aqueous solution to obtain a spinning solution. Although the other monomers are not particularly limited as long as the monomers can be copolymerized with acrylonitrile, examples of those monomers include butadiene and styrene.

Examples of the solvent for the spinning solution include an organic solvent such as dimethylsulfoxide, dimethylformamide, dimethylacetamide and N-methylpyrrolidone. Examples of the aqueous solution for the spinning solution include a zinc chloride solution and a sodium thiocyanate solution.

Such a spinning solution is subjected to a wet/dry spinning treatment to be fiberized. The fiber thus obtained may be stretched in a heat atmosphere such as pressurized steam for an orientation adjustment as necessary. In some cases, the fiber may further be subjected to a heat treatment at 130 to 200° C., followed by winding up, so as to obtain PAN precursor fiber. A fundamental framework of the PAN precursor fiber is shown in FIG. 36(a).

Next, the PAN carbon fiber according to the present embodiment is produced from the PAN precursor fiber. First, the PAN precursor fiber is subjected to a stabilization treatment. In the stabilization treatment, the fiber is stretched up to 0.95 to 1.05 times while being heated at preferably between 200 and 350° C., more preferably between 200 and 300° C., even more preferably between 230 and 270° C. in an oxidizing atmosphere such as air. Thus, the PAN precursor fiber is changed to flame-resistant fiber. In this case, a treatment time is between 80 and 160 minutes, and a pressure level is, for example, above 1.3 g/cm$^3$. A fundamental framework of the flame-resistant fiber is shown in FIG. 36(b). Subsequently, as an arbitrary step, the flame-resistant fiber thus obtained is heated at preferably between 800 and 1200° C. in an oxidizing atmosphere such as air to be activated, thereby obtaining activated carbon fiber.

Then, the activated carbon fiber (or flame-resistant fiber) thus obtained is subjected to a carbonization treatment. The fiber is stretched up to 1.0 to 1.1 times while being heated at preferably between 600 and 900° C., more preferably between 700 and 800° C., as the highest temperature, in an inert atmosphere such as nitrogen. Further, the fiber is stretched up to 0.95 to 1.0 times while being heated at preferably between 1000 and 1800° C., more preferably between 1200 and 1500° C., as the highest temperature, in an inert atmosphere such as nitrogen, thereby obtaining carbonized fiber. A fundamental framework of the flame-resistant fiber is shown in FIG. 36(c). As shown in FIG. 36(c), the carbonized fiber contains nitrogen atoms in the middle of the "carbon-carbon" bond. Thus, electrical conductivity in the carbonized fiber is lower than that in graphitized fiber subjected to a graphitization treatment.

The graphitization treatment that is necessary in a conventional production method for PAN carbon fiber will be explained for confirmation, although such a treatment is not performed in the production method for the PAN carbon fiber according to the present embodiment. The carbonized fiber is stretched up to 1.01 to 1.2 times while being heated at preferably between 2000 and 3000° C., more preferably between 2200 and 3000° C., even more preferably between 2200 and 2800° C., as the highest temperature, in an inert atmosphere such as nitrogen. In this case, a treatment time is between 150 and 400 seconds, for example. A fundamental framework of the graphitized fiber is shown in FIG. 36(d). In some cases, the graphitized fiber thus obtained is subjected to a surface oxidation treatment, preferably an electrolytic oxidation treatment of 10 to 200 clones/g in an acidic or alkaline aqueous solution, so that a functional group to enhance adhesion is provided on the fiber surface.

In the present embodiment, the carbonization process is performed, followed by the finishing treatment (filament cutting) such as a surface treatment or sizing as described above. The chopped fiber obtained by this treatment is subjected to papermaking, which is a similar process for making paper. With regard to a method and condition for papermaking, a conventionally known method and condition may be applied. Examples of materials to be used for papermaking include constituents for the porous material layer (such as carbon fiber), activated carbon, pulp (such as cellulose fiber), and synthetic carbon fine powder. An additive ratio of each material is not particularly limited as long as it is within an available range for papermaking. A dimension and weight of a fiber sheet to be obtained are also not particularly limited. A condition for baking the sheet to be subsequently performed is not particularly limited as long as the process is performed at an appropriate temperature for an appropriate time so as to achieve graphitization of the materials contained in the sheet. As one example, the sheet may be baked at 1000 to 2500° C. for 1 to 48 hours.

At the time of papermaking, the surface of the fiber is subjected to a water repellent treatment by use of a conventionally known fluorine solution. The sheet subjected to papermaking preferably has a thickness of between 0.2 and 2 mm/sheet, and a density of between 100 and 250 g/m$^2$. The one to five sheets are stacked to be baked in an inert gas atmosphere such as nitrogen and argon. In order to prevent the sheets from being curled, the sheets may be baked while being interposed between graphite plates. The sheets are preferably heated up to approximately 800° C. or less (uppermost temperature) for between 5 and 100 hours. The final temperature for baking is not particularly limited. Accordingly, a roll sheet for the gas diffusion layer can be obtained.

The water repellent treatment will be explained more specifically. In order to enhance water repellency to prevent a flooding phenomenon and the like, a water repellent agent is preferably used in the gas diffusion layer. Although the water repellent agent is not particularly limited, examples thereof include a fluorinated polymer material such as polytetrafluoroethylene (PTFE), polyvinylidene fluoride (PVdF), polyhexafluoropropylene, and a tetrafluoroethylene-hexafluoropropylene copolymer (FEP), polypropylene, and polyethylene.

In order to further improve water repellency, the gas diffusion layer may include a carbon particle layer (microporous layer) containing the water repellent agent and constituted by an aggregation of carbon particles provided at the side of the catalyst layer of the substrate.

The carbon particles included in the carbon particle layer are not particularly limited, and carbon black, graphite and expanded graphite are appropriately employed. Particularly, carbon black such as oil furnace black, channel black, lamp black, thermal black and acetylene black is preferable because of good electric conductivity and a large specific surface area. An average grain diameter of the carbon particles is preferably approximately between 10 nm and 100 nm. Accordingly, high drainage property derived from a capillary force can be obtained, and adhesion to the catalyst layer can also be enhanced.

A water repellent agent to be used in the carbon particle layer may be similar to the above-mentioned water repellent agent. In particular, the fluorinated polymer material is preferably used because of high water repellency and corrosion resistance at the time of the electrode reaction.

A mixture ratio between the carbon particles and the water repellent agent in the carbon particle layer is preferably approximately 90:10 to 40:60 (carbon particles:water repellent agent) in a mass ratio, in view of the balance between water repellency and electronic conductivity. A thickness of the carbon particle layer is not particularly limited, and may be arbitrarily determined in view of water repellency in the gas diffusion layer to be obtained.

Particularly, the gas diffusion layer according to the present embodiment may be applied to a gas diffusion layer for various types of fuel cells such as PAFC, MCFC, SOFC and AFC, in addition to the PEFC. Therefore, an improvement of electrical conductivity and a significant reduction in cost can be achieved in all fuel cells. With regard to a separator used for the electrical conductive member in the present embodiment, any of the separators according to the first to third embodiments are preferably applied. However, other conventional separators may be also applied to the separator in this embodiment.

The following is an explanation of the effect of the electrical conductive member (gas diffusion layer) according to the present embodiment with reference to Example and Comparative Examples. However, the scope of the present invention is not limited to these examples.

EXAMPLE IV-1

First, a carbonized GDL was prepared. Note that, the carbonized GDL is a porous material layer constituted by carbonized PAN carbon fiber.

<Stacking of Chromium Layer and Electrical Conductive Carbon Layer>

First, a middle layer (Cr layer) was stacked by use of a UBMS sputtering method. A degree of vacuum in a chamber was reduced to approximately 3 to 10 Pa, followed by introducing approximately 1 Pa of argon gas. A temperature of the porous material layer itself was set at 80° C. with no consideration of the material thereof.

At the time of the UBMS sputtering, bias voltage of 140 V was applied to the gas diffusion layer with no consideration of the material of the porous material layer. In addition, 99% or more of Cr was used as a target. Thus, the Cr layer having the thickness of 20 nm was stacked on the surface of the porous material layer as a middle layer.

Then, the electrical conductive carbon layer was stacked by use of the UBMS sputtering method. The electrical conductive carbon layer was stacked by use of the same method and condition as those used for stacking the middle layer except that 99% or more of graphite was used as a target. The provision of a stacked structure of graphene planes in the electrical conductive carbon layer thus obtained was confirmed. The thickness of the electrical conductive carbon layer was 7 μm.

COMPARATIVE EXAMPLE IV-1

For Comparative Example IV-1, TGP-H-90 (manufactured by Toray Industries, Inc.) that was a commercially available graphitized GDL was used.

COMPARATIVE EXAMPLE IV-2

A GDL for a fuel cell only constituted by a porous material layer including carbonized PAN carbon fiber was manufactured. The porous material layer identical to Example IV-1 was used. Note that, the process for stacking the chromium (Cr) layer and the electrical conductive carbon layer was not performed in this example. Therefore, the GDL for a fuel cell thus obtained has no stacked structure of graphene planes.

[R Value Measurement]

With regard to the respective gas diffusion layers prepared in the above Example and Comparative Examples, an R value of the electrical conductive carbon layer was measured. Specifically, first, Raman spectrum of the electrical conductive carbon layer was measured by use of a Micro-Raman spectroscope. Then, a peak area ratio ($I_D/I_G$) of a peak intensity ($I_D$) of band (D-band) located at 1300 to 1400 cm$^{-1}$ to a peak intensity ($I_G$) of band (G-band) located at 1500 to 1600 cm$^{-1}$ was calculated to obtain the R value. The result thus obtained is shown in Table 5 below.

[Measurement of Contact Resistance]

Figure 39:
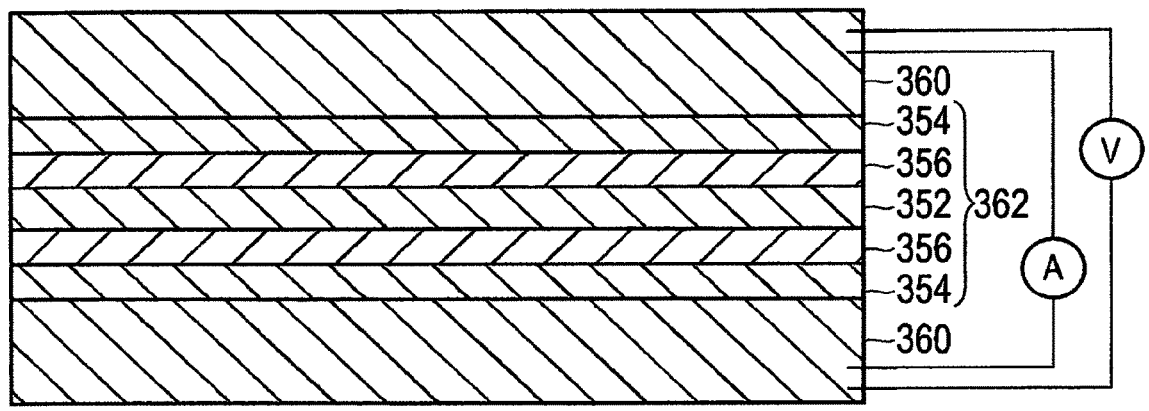
FIG. 39 is a view showing a method for measuring a contact resistance between GDL and a separator obtained in Example IV-1, and Comparative Examples IV-1 and IV-2.

A contact resistance between the gas diffusion layer and the separator prepared in the above Example and Comparative Examples was measured. FIG. 39 shows a measurement method of the contact resistance between the gas diffusion layer and the separator prepared in the above Example and Comparative Examples. As shown in FIG. 39, a gold-plated stainless steel plate was used as a separator 360 provided on the surface of a gas diffusion layer 362. The prepared gas diffusion layer 362 was interposed between a pair of the separators 360 of which each terminal was connected to a power source, and held while 1 MPa of load was applied to each main surface of the separators 360 from a perpendicular direction, so as to constitute a measurement device. Then, 1 A of constant current was applied to both terminals of the measurement device to calculate a contact resistance value of the stacked body according to a voltage value during the current application and Ohm's law. The result thus obtained is shown in Table 5 below.

As shown in Table 5, the respective contact resistance values of Example IV-1 and Comparative Example IV-1 are approximately the same. Therefore, it is recognized that a significant reduction in cost can be achieved in the present embodiment while a similar level of electrical conductivity is maintained with respect to a conventional gas diffusion layer for a fuel cell.

TABLE 5

| | Porous Material Layer | Middle Layer | Electrical Conductive Carbon Layer | | Contact Resistance (mΩ · cm$^2$) |
|---|---|---|---|---|---|
| | Material | Material | Material | R Value | |
| Example IV-1 | Carbonized Fiber | Cr Layer | Graphite | 1.5 | 10 |
| Comparative Example IV-1 | Graphitized Fiber | None | None | — | 8 |
| Comparative Example IV-2 | Carbonized Fiber | None | None | — | 65 |

Figure 40:
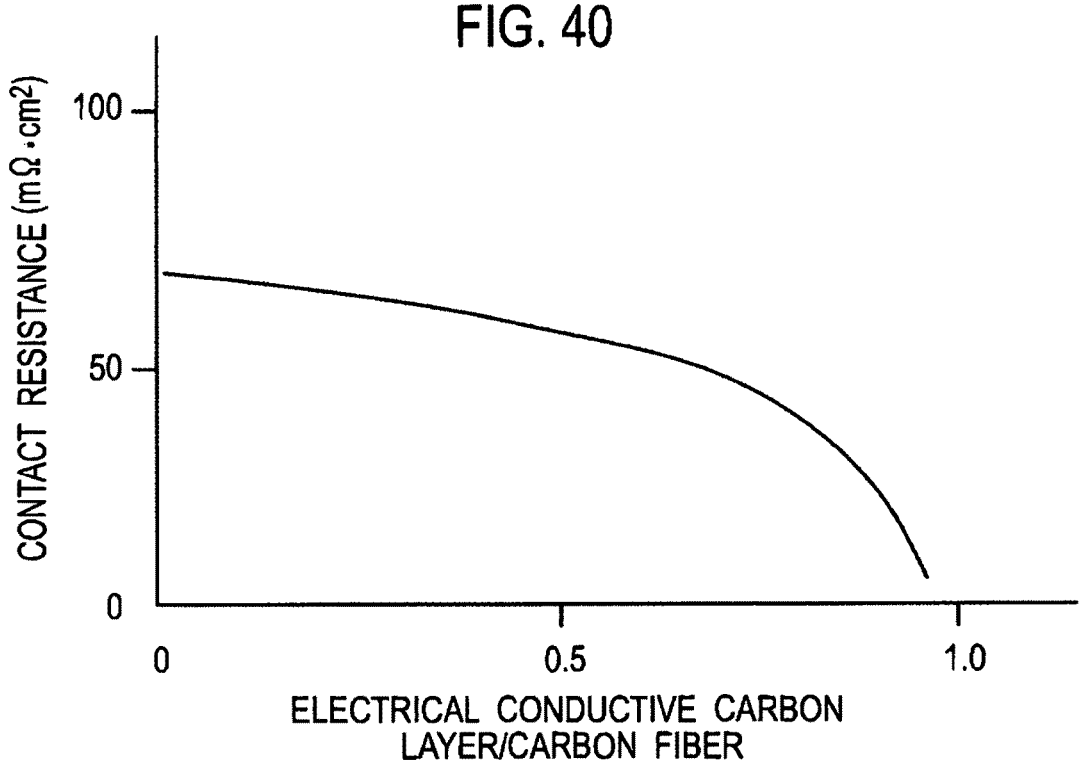
FIG. 40 is a graph corresponding to a result with regard to a contact resistance of Example IV-1 shown in Table 5.

FIG. 40 shows a graph corresponding to the result with regard to the contact resistance of Example IV-1 shown in Table 5. This graph shows the contact resistance value while a weight ratio of "electrical conductive carbon" to PAN carbonized fiber (electrical conductive carbon/PAN carbonized fiber) is shown on the horizontal axis. Namely, FIG. 40 shows a relationship between the increase of the electrical conductive carbon layer and the contact resistance. As shown in FIG. 40, the PAN carbonized fiber itself according to the present embodiment is inferior in electrical conductivity to the graphitized PAN carbon fiber. However, in the porous material layer constituted by such PAN carbonized fiber, the contact resistance is decreased in proportion to the stacked amount of the electrical conductive carbon layer. In other words, the gas diffusion layer according to the present embodiment has similar electrical conductivity to the gas diffusion layer constituted by the graphitized PAN carbon fiber. In view of this, since the PAN carbonized fiber according to the present embodiment is not subjected to the graphitization treatment contrary to a conventional PAN carbon fiber, a significant reduction in cost can be achieved.

The above-mentioned carbon fiber and electrical conductive carbon are both detected as carbon (C) by an Auger electron spectroscopy. Thus, a distinction between the two is not possible. Therefore, the carbon fiber and the constituent metal of the middle layer were subjected to surface mapping by the AES at the point of the formation of the middle layer before the provision of the electrical conductive carbon layer, based on the assumption that the electrical conductive carbon layer is always provided on the constituent element of the middle layer. Through such a process, the ratio of "electrical conductive carbon" to the carbon fiber was calculated.

REFERENCE EXAMPLE IV-1

A ratio of Au to electrical conductive carbon (Au/electrical conductive carbon) and a contact angle were obtained when the hydrophilic layer constituted by gold was formed on the electrical conductive carbon layer.

In the gas diffusion layer obtained in Example IV-1, a degree of vacuum in a chamber was reduced to approximately 3 to 10 Pa, followed by introducing approximately 1 Pa of argon gas. A temperature of the gas diffusion layer itself was set at 80° C. with no consideration of the material thereof.

At the time of UBMS sputtering, bias voltage of 140 V was applied to the gas diffusion layer with no consideration of the material of the porous material layer. In addition, 99% or more of Au was used as a target. Thus, the Au layer (hydrophilic layer) having the thickness of 5 nm was stacked on the surface of the electrical conductive carbon layer.

Figure 41:
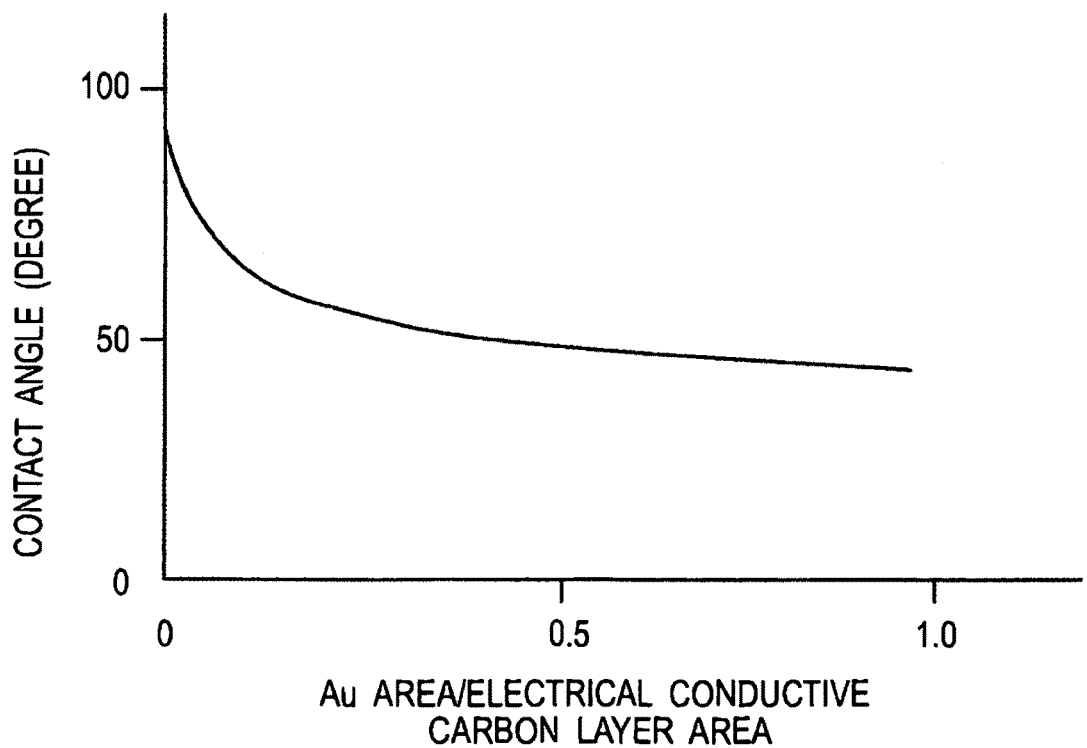
FIG. 41 is a graph showing a measurement result of a static contact angle of water with respect to an area ratio of Au to electrical conductive carbon calculated by surface mapping and an image analysis by AES.

The Au provision was calculated by surface mapping by an Auger electron spectroscopy and an image analysis since the porous material layer has porosity. Then, a static contact angle of water with respect to an area ratio of electrical conductive carbon to Au was measured. The contact angle was measured according to JIS K6768. More specifically, the static contact angle was measured by use of pure water (6 μL) at 24° C. and a humidity (RH) of 49%. As a measurement device, DM700 (θ/2 method) manufactured by Kyowa Interface Science Co., Ltd. was used. FIG. 41 shows a graph of the measurement result.

Under the condition without Au (negative control), the contact angle of conventionally known carbon was approximately 85 degrees. On the other hand, it is recognized that hydrophilicity is increased in proportion to the provision amount of Au.

REFERENCE EXAMPLE IV-2

An effect of decreasing in resistance was measured when Au was sputtered while being dispersed in the surface of the electrical conductive carbon layer.

In the gas diffusion layer obtained in Example IV-1, a degree of vacuum in a chamber was reduced to approximately 3 to 10 Pa, followed by introducing approximately 5 Pa of argon gas. A temperature of the gas diffusion layer itself was set at 80° C. with no consideration of the material thereof.

Figure 42:
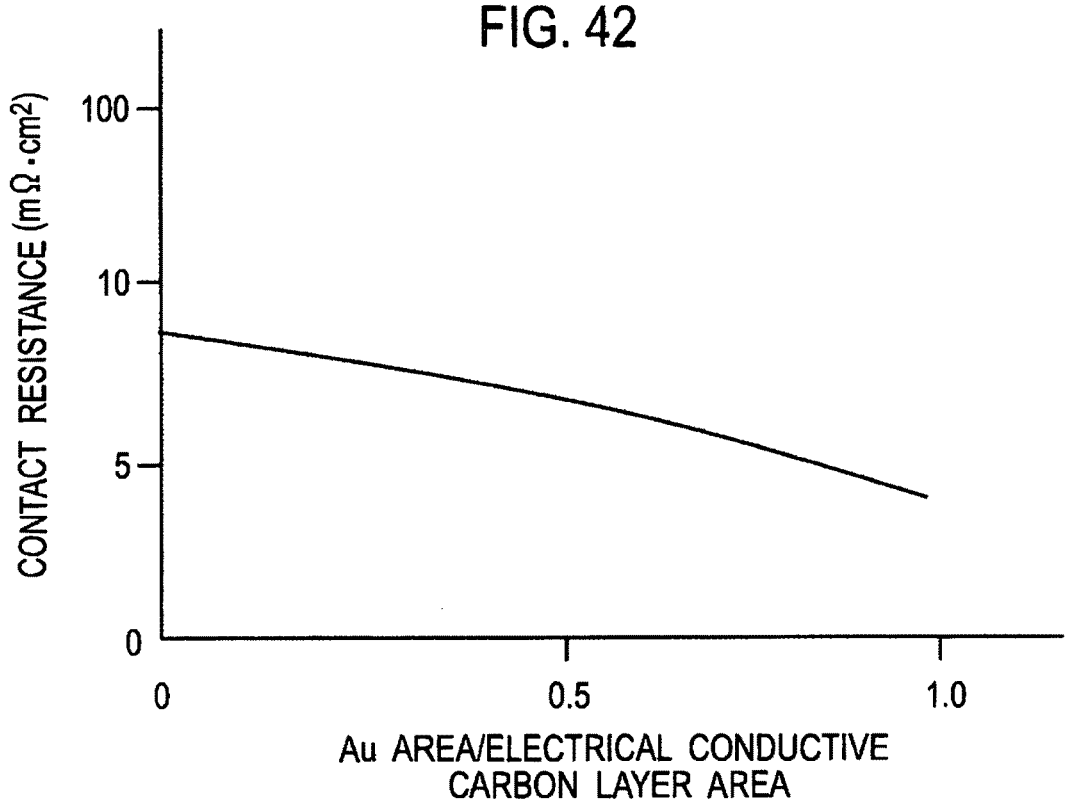
FIG. 42 is a graph showing a resistance reduction effect in a case of sputtering while dispersing Au on a surface of an electrical conductive carbon layer.

At the time of UBMS sputtering, bias voltage of 140 V was applied to the gas diffusion layer with no consideration of the material of the porous material layer. In addition, 99% or more of Au was used as a target. At this time, a contact resistance of the gas diffusion layer was measured in parallel with sputtering of Au on the surface of the electrical conductive carbon layer. FIG. 42 shows a graph of the measurement result.

As in the case of Example IV-1, the gas diffusion layer is provided with the electrical conductive carbon layer, so that a small contact resistance can be achieved sufficiently. However, as shown in FIG. 42, it is recognized that the contact resistance can be further decreased due to the further provision of Au. Moreover, Due to the presence of the hydrophilic layer in the gas diffusion layer, water can be immediately discharged from the catalyst layer to the separator side. Such hydrophilicity can be achieved when the hydrophilic layer is constituted by a metal oxide. In addition, when the hydrophilic layer is constituted by a non-metal oxide (such as Au), both hydrophilicity and excellent electrical conductivity can be obtained. Accordingly, a reduction in contact resistance can be also achieved.

Fifth Embodiment

The following is an explanation of an electrical conductive member, and a method for manufacturing the electrical conductive member according to the fifth embodiment of the present invention with reference to the drawings. Note that, the components identical to the first embodiment are indicated by the same reference numerals, and explanations thereof are not repeated.

The electrical conductive member according to the present embodiment includes a separator (conductive stacked body) for a fuel cell in which a metal substrate, a middle layer and the electrical conductive carbon layer are stacked, and a gas diffusion layer including a gas diffusion substrate having a plurality of pores. The electrical conductive carbon layer and the gas diffusion layer are stacked so as to face each other. In addition, electrical-conductive hydrophilic grains are dispersed in an area in contact with the gas diffusion layer and provided on the surface of the electrical conductive carbon layer. A grain diameter of the electrical conductive grains and a distance between the electrical conductive grains are not more than a distance between the pores of the gas diffusion substrate, respectively.

A polymer electrolyte fuel cell (PEFC) according to the present embodiment also has the same fundamental constitution to the PEFC according to the first embodiment. Specifically, as shown in FIG. 1, the PEFC includes the polymer electrolyte membrane 2, and a pair of the catalyst layers (anode catalyst layer 3a and cathode catalyst layer 3b) interposing the polymer electrolyte membrane 2. A stacked body constituted by the polymer electrolyte membrane 2 and the catalyst layers is further interposed between a pair of the gas diffusion layers (anode gas diffusion layer 4a and cathode gas diffusion layer 4b). Thus, the polymer electrolyte membrane 2, the pair of the catalyst layers (3a, 3b) and the pair of the gas diffusion layers (4a, 4b) are stacked to constitute the membrane electrode assembly (MEA) 9.

The MEA 9 is further interposed between a pair of the separators (anode separator 5a and cathode separator 5b) in the PEFC 1. Namely, the separators (5a, 5b) are provided adjacent to the gas diffusion layers (4a, 4b), and the separators (5a, 5b) and the gas diffusion layers (4a, 4b) adjacent to each other constitute the electrical conductive members (8a, 8b).

Figure 43:
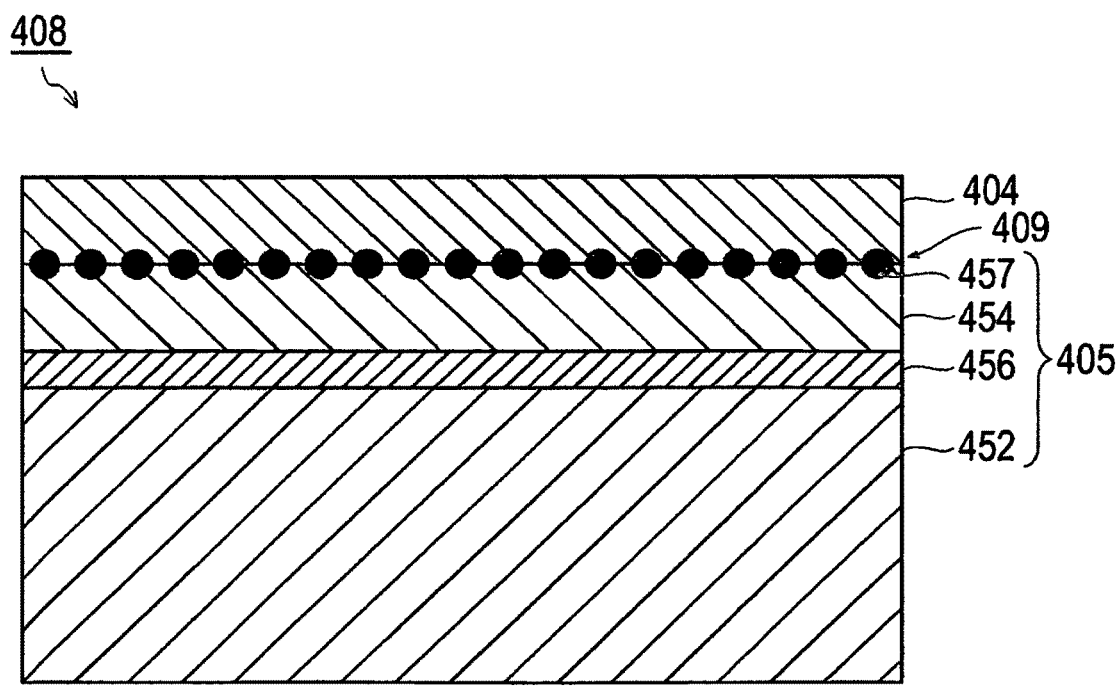
FIG. 43 is a schematic cross-sectional view showing a constitution of an electrical conductive member according to a fifth embodiment.

FIG. 43 is a cross-sectional view showing a schematic constitution of an electrical conductive member 408 according to this embodiment. In the present embodiment, the electrical conductive member 408 is constituted by a gas diffusion layer 404 and a separator 405. The separator 405 includes a metal substrate 452 and an electrical conductive carbon layer 454. In addition, electrical-conductive hydrophilic grains 457 are dispersed in an area 409 that is in contact with the gas diffusion layer 404 and provided on the electrical conductive carbon layer 454. Further, a middle layer 456 is interposed between the metal substrate 452 and the electrical conductive carbon layer 454. The separator 405 in the PEFC is provided in such a manner that the electrical conductive carbon layer 454 is positioned on the side of the MEA 9. The following is a specific explanation of each element of the electrical conductive member 408 according to the present embodiment.

(Separator)

[Metal Substrate]

The metal substrate 452 is a main layer of the separator 405, and contributes to ensuring electrical conductivity and mechanical strength. Metal constituting the metal substrate 452 may be the same as the metal substrate 31 according to the first embodiment.

[Electrical Conductive Carbon Layer]

The electrical conductive carbon layer 454 contains electrical conductive carbon. Due to the presence of this layer, a resistance to corrosion is improved compared to the case in which only the metal substrate 452 is provided while electrical conductivity of the separator 405 is ensured. As the electrical conductive carbon layer 454, the electrical conductive carbon layer 33 according to the first embodiment may be used.

[Electrical-Conductive Hydrophilic Grains]

The electrical-conductive hydrophilic grains 457 are electrical conductive grains having hydrophilicity. The electrical-conductive hydrophilic grains 457 are dispersed in the area 409 in contact with the gas diffusion layer 404 and provided on the electrical conductive carbon layer 454. Due to the presence of the electrical-conductive hydrophilic grains 457, hydrophilicity is provided to the electrical conductive carbon layer 454, and electrical conductivity is further improved. Therefore, a contact resistance between the electrical conductive carbon layer 454 and the gas diffusion layer 404 can be decreased. The electrical conductive grains may be present on the surface of the electrical conductive carbon layer and inside the electrical conductive carbon layer, other than the contact area 409. However, in order to achieve an effect of a decrease in contact resistance and an effect of improved hydrophilicity, and reduce manufacturing cost, the electrical conductive grains 457 are preferably present on the surface layer of the electrical conductive carbon layer 454. More specifically, the electrical conductive grains 457 are preferably dispersed evenly in a plane with a minimum thickness. Therefore, the thickness and dispersibility greatly depend on a production method and condition. A preferable average thickness of the electrical conductive carbon layer ascertained in the present embodiment is between 0.005 μm and 1 μm.

A material of the electrical conductive grains is not particularly limited as long as the material has electrical conductivity and hydrophilicity. A static contact angle with respect to water in the electrical conductive carbon layer is between 85 and 100 degrees. Therefore, hydrophilicity means a static contact angle lower than the above-mentioned range. The hydrophilicity preferably means the static contact angle with respect to water of 70 degrees or less, more preferably 60 degrees or less. The electrical conductive grains preferably contain at least one material selected from the group consisting of noble metal, alloys containing noble metal, electrical conductive nitride, and electrical conductive oxides. As noble metal, at least one element selected from the group consisting of gold (Au), silver (Ag), platinum (Pt), palladium (Pd), rhodium (Rh), iridium (Ir), ruthenium (Ru) and osmium (Os) is preferable. Examples of the alloys containing noble metal include a gold-cobalt alloy (Au—Co), a gold-nickel alloy (Au—Ni), and a palladium-nickel alloy (Pd—Ni). Examples of electrical conductive nitride include CrN, TiN, ZrN and HfN. As the electrical conductive oxides, at least one element selected from the group consisting of $MBa_2Cu_3O_{7-x}$ (M is Y, or rare earth elements except Ce, Pr and Tb), $SnO_2$, $In_2O_3$, $CrO_2$, $Fe_3O_4$, $IrO_2$, $OsO_2$, $PtO_2$, $ReO_2$ (β), $ReO_3$, $RhO_2$, $RuO_2$, $WO_2$, $W_{18}O_{49}$, $V_2O_3$, $V_7O_{13}$, $V_8O_{15}$, and $V_6O_{13}$ is preferable. Among the above-mentioned materials, platinum (Pt), gold (Au) and silver (Ag) are preferable because of high electrical conductivity, and silver (Ag) is more preferable in terms of cost performance. Gold (Au) is also preferably used in terms of cost performance when considering recycling. The above-mentioned noble metal, alloys containing noble metal, electrical conductive nitride, and electrical conductive oxides may be used singly, or may be used with a combination of two or more types thereof.

In the present embodiment, a grain diameter of the electrical conductive grains and a distance between the electrical conductive grains are preferably not more than a distance between pores of the gas diffusion substrate. Due to such a condition, contact points between the electrical conductive grains and the gas diffusion substrate can be obtained, and a contact resistance with respect to the gas diffusion layer can be decreased. The "distance between the electrical conductive grains" in the present embodiment is a distance between the cores of the two adjacent electrical conductive grains. The "distance between pores" is a distance between the centers of the two adjacent pores. The "distance between the electrical conductive grains" is calculated as an average value of the distances between the electrical conductive grains observed in several to several tens of visual fields by use of an observational means such as a scanning electron microscope and a transmission electron microscope. The "distance between pores" is also calculated as an average value of the distances between the pores observed in several to several tens of visual fields in a cross-section of the gas diffusion substrate by use of an observational means such as a scanning electron microscope and a transmission electron microscope.

Figure 44A:
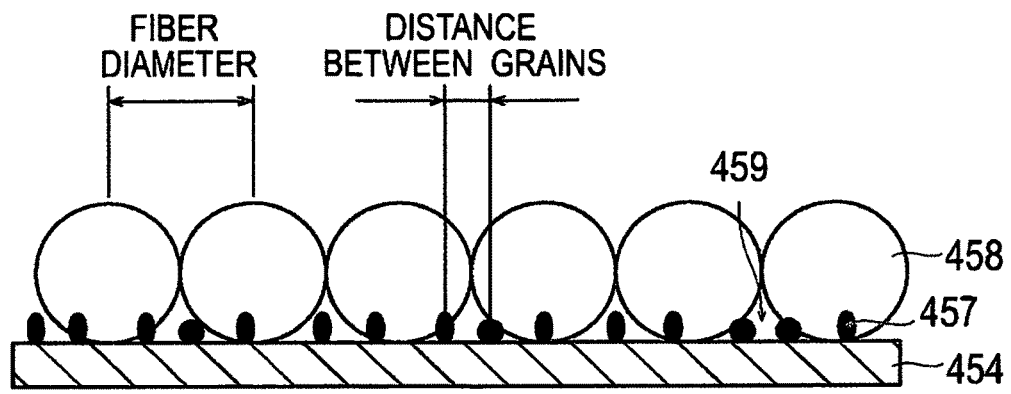
FIG. 44A is a cross-sectional view typically showing a contact area of a gas diffusion substrate constituted by carbon fiber or carbon particles and an electrical conductive carbon layer in which electrical conductive grains are dispersed.

More specifically, when the gas diffusion substrate is constituted by fiber (fiber aggregation), the distance between the pores corresponds to a diameter of the fiber. For example, as shown in FIG. 44A, when the gas diffusion substrate is constituted by carbon fibers 458, the diameter of the electrical conductive grains 457 and the distance between the electrical conductive grains 457 are preferably not more than the diameter of the carbon fibers 458. In addition, when the gas diffusion substrate is constituted by particles (particle aggregation), the distance between the pores corresponds to a diameter of the particles. For example, as shown in FIG. 44A, when the gas diffusion substrate is constituted by carbon particles 458, the diameter of the electrical conductive grains 457 and the distance between the electrical conductive grains 457 are preferably not more than the diameter of the carbon particles 458. Accordingly, contact points between the electrical conductive grains and the carbon fibers or the carbon particles can be surely obtained when the gas diffusion substrate is constituted by fibers or particles.

Figure 44B:
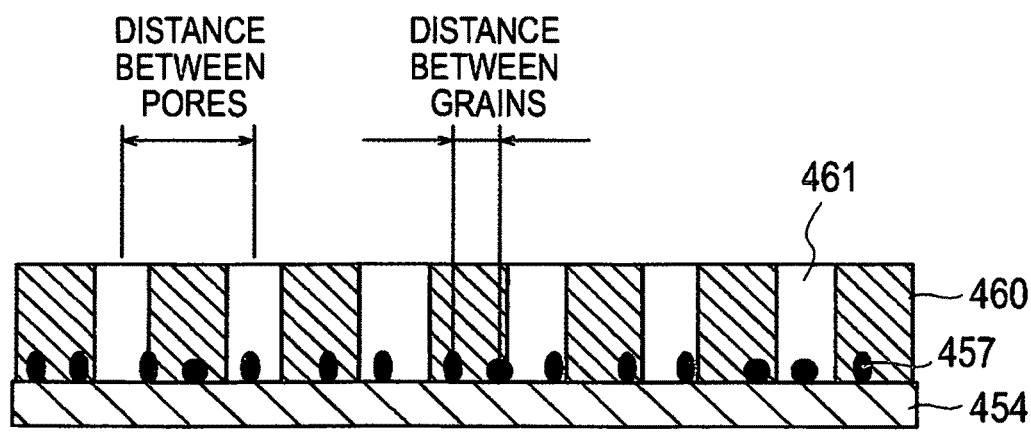
FIG. 44B is a cross-sectional view typically showing a contact area of a gas diffusion substrate constituted by porous metal and an electrical conductive carbon layer in which electrical conductive grains are dispersed.

When the gas diffusion substrate is constituted by porous metal such as a metal mesh and a punched plate having through-holes, the distance between the pores corresponds to the shortest distance between the centers of the pores. For example, as shown in FIG. 44B, when the gas diffusion substrate is constituted by a porous metal 460 having through-holes 461, the diameter of the electrical conductive grains 457 and the distance between the electrical conductive grains 457 are preferably not more than the distance between the pores of the porous metal 460. In this case, a large number of contact points can be obtained since fine grains are provided at smaller intervals than widths of substrate metal present between the pores in the porous metal. As one example, the diameter of the electrical conductive grains and the distance between the electrical conductive grains are between 1 nm and 7 µm.

A coverage of the electrical conductive grains in the contact area is preferably 1% or more. When the coverage is 1% or more, an effect of improved hydrophilicity and electrical conductivity due to the electrical conductive grains can be obtained. The coverage is more preferably between 2 and 100%, even more preferably between 3 and 100%, particularly preferably between 10 and 100%. When the lower limit of the coverage is the above-mentioned value or more, hydrophilicity and electrical conductivity are significantly improved. With regard to the upper limit, a higher coverage is preferable in view of the improvement of hydrophilicity and electrical conductivity, and particularly, a 100% coverage (full coverage) is preferable. However, in view of cost performance, a smaller coverage is preferable as long as electrical conductivity is ensured.

The contact resistance between the two members is calculated from a sum of volume specific resistance ($\rho_1$, $\rho_2$) of the two members constituting the contact points and an inverse ($1/a_n$) of a radius of the contact points.

$$R = \frac{\rho_1 + \rho_2}{2} \cdot \sum \frac{1}{a_n} \qquad [\text{Math 6}]$$

(wherein R: contact resistance [Ω], $\rho_1$, $\rho_2$: volume specific resistance [Ω·cm], $a_n$: radius of contact points [cm], n: number of contact points)

The above-mentioned $\rho_1$, $\rho_2$ are material-specific values. For example, when gold (Au) is used as the electrical conductive grains and carbon fiber is used as the gas diffusion substrate, the $\rho_1$ and $\rho_2$ are each volume specific resistance of gold (Au) and carbon fiber. Therefore, the contact resistance depends on the number of the contact points and the radius of the contact points.

As the coverage of the electrical conductive grains is larger, the number of the electrical conductive grains dispersed in the surface of the electrical conductive carbon layer is increased. Therefore, the contact points between the electrical conductive grains and the gas diffusion substrate can be increased, and accordingly, the contact resistance can be decreased.

The inventors have confirmed that, when the coverage of the electrical conductive grains is the above-mentioned lower limit or more, the contact points between the electrical conductive grains and the gas diffusion substrate can be increased, and the contact resistance can be decreased. In the present embodiment, it is recognized that the contact resistance is decreased when the coverage of the electrical conductive grains is the above-mentioned lower limit or more, and the electrical conductive grains are constituted by the above-described noble metal, alloys containing noble metal, electrical conductive nitride, or electrical conductive oxide. However, the number of the contact points between the gas diffusion substrate and the electrical conductive grains depends on the material and size of the electrical conductive grains and the gas diffusion substrate, and surface roughness and material in the contact area of the electrical conductive carbon layer. For example, when the surface roughness in the contact area is small, the number of the contact points between the gas diffusion layer and the electrical conductive grains dispersed in the contact area can be increased. As a result, the contact resistance can be decreased. On the other hand, it is generally known that hydrophilicity is higher, as the surface roughness is larger on a hydrophilic surface. Therefore, as the surface roughness is larger, a higher hydrophilic effect is achieved on the hydrophilic surface with a high coverage. Accordingly, the coverage of the electrical conductive grains is preferably controlled appropriately according to the electrical conductive grains, the gas diffusion substrate and the electrical conductive carbon layer (contact area) to be used.

The water contact angle in the contact area in which the electrical conductive grains are dispersed is preferably 70 degrees or less, more preferably between 0 and 60 degrees, even more preferably between 45 and 50 degrees. When the contact angle is within the above-mentioned ranges, a drainage performance of the separator surface on which water flow paths are formed is further improved. Therefore, water can be discharged sufficiently even in narrow flow paths with a small rib pitch (with a fine concave-convex configuration) in the separator that especially may cause a difficulty in discharging water. Note that, the contact angle in the present embodiment is measured based on a wetting test method according to JIS K6768.

The electrical conductive grains may be present on the surface of the electrical conductive carbon layer that is formed at least one surface of the metal substrate. When the electrical conductive carbon layer is provided on both main surfaces of the metal substrate, the electrical conductive grains may be dispersed in the surfaces of the respective electrical conductive carbon layers. However, in view of an achievement of the drainage effect, the electrical conductive grains is preferably present on the surface of the electrical conductive carbon layer to be provided on the MEA side (reaction surface side).

[Middle Layer]

As shown in FIG. 43, the separator 405 includes the middle layer 456 in the present embodiment. The middle layer 456 functions to improve adhesion between the metal substrate 452 and the electrical conductive carbon layer 454 and to prevent ion elution from the metal substrate 452. Especially, a significant effect due to the provision of the middle layer 456 is obtained when the R value exceeds the upper limit of the above-mentioned desired range. However, the middle layer 456 is provided even when the R value is within the above-mentioned desired range. From the other point of view, the above-mentioned function effect due to the provision of the middle layer 456 is also significantly achieved when the metal substrate 452 is constituted by aluminum or an aluminum alloy.

Although a material constituting the middle layer 456 is not particularly limited as long as the material can provide the above-mentioned adhesion, the same material as the middle layer 32 in the first embodiment may be used. In addition, although a thickness of the middle layer 456 is not particularly limited, the middle layer 456 may have the same thickness as the middle layer 32 in the first embodiment. Moreover, although a structure of the middle layer 456 is not particularly limited, the middle layer 456 may have the same columnar structure as the middle layer 32 in the first embodiment. Further, the relation among the coefficient of thermal expansion ($\alpha_{mid}$) of the middle layer, the coefficient of thermal expansion ($\alpha_{sub}$) of the metal substrate, and the coefficient of thermal expansion ($\alpha_c$) of the electrical conductive carbon layer preferably meets the formula 2 as in the case of the first embodiment.

The middle layer may be provided on at least one surface of the metal substrate. Note that, when the electrical conductive carbon layer is provided only on one main surface of the metal substrate, the middle layer is provided between the metal substrate and the electrical conductive carbon layer. The electrical conductive carbon layer may be provided on each surface of the metal substrate as described above. In such a case, the middle layer is preferably provided between the metal substrate and the respective electrical conductive carbon layers. When the middle layer is provided between the metal substrate and only one of the electrical conductive carbon layers, the middle layer is preferably provided between the electrical conductive carbon layer and the metal substrate to be positioned on the side of the MEA in the PEFC.

[Gas Diffusion Layer]

The gas diffusion layer (anode gas diffusion layer 404a, cathode gas diffusion layer 404b) is constituted by the gas diffusion substrate having a plurality of pores, and provided adjacent to the separator (anode separator 5a, cathode separator 5b). The gas diffusion layer functions to promote diffusion of gas (fuel gas or oxidant gas) supplied to the catalyst layer 3a, 3b via gas flow paths 6a, 6c of the separator, and also functions as an electric conductive path. The gas diffusion layer described in the first embodiment or the gas diffusion layer described in the fourth embodiment may be applied to the present embodiment.

The following is a preferable embodiment for manufacturing the electrical conductive member according to the present embodiment. However, the scope of the present invention is not limited only to the following embodiment. The conditions such as a material for the respective elements of the separator 405 and the gas diffusion layer 404 constituting the electrical conductive member are the same as described above, and therefore, the explanation thereof will not be repeated in this embodiment.

The method for manufacturing the electrical conductive member includes a process of forming the electrical conductive carbon layer on at least one main surface of the metal substrate, a process of dispersing the electrical-conductive hydrophilic grains on the surface of the electrical conductive carbon layer, and a process of providing the gas diffusion layer so as to come in contact with the area in which the electrical conductive grains are dispersed. The electrical conductive grains are dispersed by a sputtering method.

First, a plate such as a stainless steel plate having a desired thickness is prepared as a constitution material of the metal substrate. Next, the surface of the prepared metal substrate is subjected to a degreasing and washing treatment by use of an appropriate solvent as in the case of the first embodiment. Then, an oxide film formed on the surface (both sides) of the metal substrate is removed. A method for removing the oxide film is similar to the first embodiment.

Then, the electrical conductive carbon layer is formed on the treated surface of the constitution material of the metal substrate. Then, using the above-mentioned constitution material (such as graphite) of the electrical conductive carbon layer as a target, a layer including electrical conductive carbon is stacked at an atomic level on the surface of the metal substrate so as to form the electrical conductive carbon layer. Accordingly, adhesion at the interface between the electrical conductive carbon layer and the metal substrate directly attached to each other and the periphery thereof can be maintained for a long period of time due to an intermolecular force or an entry of a small amount of carbon atoms. A preferable method for stacking the electrical conductive carbon may be a similar method used in the first embodiment.

Next, the electrical conductive grains are dispersed on the entire or in a part of the treated surface of the electrical conductive carbon layer. As described above, the electrical conductive grains may be dispersed in the area in contact with the gas diffusion layer and provided on the surface of the electrical conductive carbon layer. When the electrical conductive grains are dispersed in a part of the surface of the electrical conductive carbon layer, for example, a mask is formed so that the electrical conductive grains may be selectively dispersed in a desired portion. A method for dispersing the electrical conductive grains may be a similar method used for the electrical conductive grains in the third embodiment. Particularly, a sputtering method or a plating method is preferable.

When the sputtering method is used, a dispersed structure with high adhesion of the electrical conductive grains can be obtained. In addition, the sputtering method is preferable since the electrical conductive grains can be sequentially dispersed only by the change of the target after the formation (sputtering) of the electrical conductive carbon layer. The sputtering conditions are not particularly limited as long as the above-described dispersed structure of the electrical conductive grains can be achieved. However, negative bias voltage is preferably applied to the metal substrate at the time of sputtering. The applied voltage is, for example, preferably between 50 and 500 V, more preferably between 100 and 300 V. The other specific conditions are not particularly limited, and conventionally known findings may be appropriately applied.

When the plating method is used, the electrical conductive grains can be dispersed with high coverage. In addition, a mass production can be possible since the plating method can be performed by a roll-to-roll method. The plating conditions are not particularly limited as long as the dispersed structure of the electrical conductive grains as described above can be achieved, and the conditions depend on the type and amount of the electrical conductive grains to be used. For example, the conditions for the plating treatment include a current density of 0.25 to 5 A/dm$^2$, a bath temperature of 45 to 55° C., and an electrodeposition time of approximately 10 seconds to 100 minutes. Note that, the electrodeposition time may be appropriately adjusted since it varies depending on the size and shape of the opposite electrode. Due to the above-described conditions, the desired dispersed structure of the electrical conductive grains is easily formed.

A relationship between a time condition such as a sputtering time and a plating time and a dispersed amount is preliminarily recognized, followed by controlling those conditions, so that a coverage and a grain diameter of the electrical conductive grains can be determined within a desired range. In addition, the coverage varies depending on the material of the electrical conductive carbon layer in which the electrical conductive grains are dispersed, and depending on the dispersing method of the grains, as described above. Therefore, a relationship between the material of the electrical conductive carbon layer and the coverage state should be preliminarily recognized. For example, when a composite material of electrical conductive carbon and resin is dispersed as the electrical conductive grains by the plating method, the electrical conductive grains are adsorbed not on the resin surface but on the carbon surface. Therefore, when such a composite material is used, the coverage is required to be controlled while the resin amount contained in the composite material is also considered.

The surface of the electrical conductive carbon layer 454 provided on one or both main surfaces of the metal substrate 452 is subjected to the above-described treatments, therefore the separator is produced in which the electrical conductive carbon layer 454 is formed on one or both main surfaces of the metal substrate 452 and the electrical-conductive hydrophilic grains 457 are dispersed on the surface of the electrical conductive carbon layer 454.

When the separator including the middle layer 456 shown in FIG. 43 is produced, the middle layer is formed on at least one main surface of the metal substrate before the above-mentioned process of forming the electrical conductive carbon layer. In this case, the middle layer is formed by a similar method to the electrical conductive carbon layer described above. However, the target is necessarily changed to the constitution material of the middle layer. Subsequently, the electrical conductive carbon layer is formed on the middle layer thus obtained, followed by dispersing the electrical conductive grains thereon. The electrical conductive carbon layer is formed on the surface of the middle layer by a similar method to the electrical conductive carbon layer formed on the surface of the metal substrate.

Then, the gas diffusion substrate is stacked on the separator thus obtained, thereby obtaining the electrical conductive member in which the separator and the gas diffusion layer are stacked. In this case, the gas diffusion layer is stacked so as to come in contact with the area in which the electrical conductive grains are dispersed.

The electrical conductive member according to the present embodiment may be used for an electrical conductive member constituting various types of fuel cells such as PAFC, MCFC, SOFC and AFC, in addition to the PEFC as in the case of the electrical conductive member in the first embodiment. Moreover, the electrical conductive member according to the present embodiment is also used for various purposes required to have both electrical conductivity and corrosion resistance. The electrical conductive member according to the present embodiment is used under a humid environment and a conducting environment when the electrical conductive member is applied to the other preferable purposes. Under such environments, a function effect of the present invention in achieving both electrical conductivity and corrosion resistance is significantly realized.

The following is a further explanation of the effect of the electrical conductive member according to the present embodiment with reference to Examples and Comparative Examples. However, the scope of the present invention is not limited to these examples.

EXAMPLE V-1

A stainless steel plate (SUS316L) was prepared as a constitution material of a metal substrate constituting a separator. The thickness of the stainless steel plate was 100 µm. The stainless steel plate was washed by ultrasonic waves in an ethanol solution for three minutes as a pretreatment. Next, the washed stainless steel plate was placed in a vacuum chamber, and subjected to an ion bombard treatment by Ar gas, so as to remove an oxide film on the surface thereof. A degree of vacuum in the vacuum chamber was set at approximately $10^{-3}$ Pa, and an Ar gas pressure was set at approximately 0.1 to 1 Pa. Note that, both the pretreatment and the ion bombard treatment were performed on both surfaces of the stainless steel plate.

Next, by use of an unbalanced magnetron sputtering method, a middle layer was formed. Specifically, the middle layer constituted by Cr was formed on each side of the stainless steel plate using Cr as a target, while applying negative bias voltage of 50 V to the stainless steel plate. The thickness of the middle layer was 0.2 µm.

Then, by use of the UBMS method, an electrical conductive carbon layer (polycrystalline graphite layer) was formed. Specifically, the electrical conductive carbon layer was formed on the middle layer on each side of the stainless steel plate using solid graphite as a target, while applying negative bias voltage of 100 V to the stainless steel plate. The thickness of the electrical conductive carbon layer was 0.2 µm.

Further, by use of the UBMS method, electrical conductive grains were dispersed on the electrical conductive carbon layer on both surfaces of the stainless steel plate using Au as a target, while applying negative bias voltage of 100 V to the stainless steel plate that was a raw material of the electrical conductive grains. Thus, the separator (1) was prepared.

EXAMPLE V-2

The separator (2) was prepared by similar operations to those in Example V-1 except that the sputtering time of the electrical conductive grains (Au) was changed.

EXAMPLE V-3

The separator (3) was prepared by similar operations to those in Example V-1 except that the sputtering time of the electrical conductive grains (Au) was changed.

COMPARATIVE EXAMPLE V-1

The separator (4) was prepared by similar operations to those in Example V-1 except that the electrical conductive grains were not dispersed on the surface of the electrical conductive carbon layer.

EXAMPLE V-4

The separator (5) was prepared by similar operations to those in Example V-1 except that graphite block (high crystalline graphite) was used as the electrical conductive carbon layer.

COMPARATIVE EXAMPLE V-2

The separator (6) was prepared by similar operations to those in Example V-4 except that the electrical conductive grains were not dispersed on the surface of the electrical conductive carbon layer.

[SEM Observation/Coverage Measurement]

With regard to the separators (1) to (6) prepared in the respective examples and comparative examples, the surface of the electrical conductive carbon layer was micrographed using a scanning electron microscope.

Figure 45:
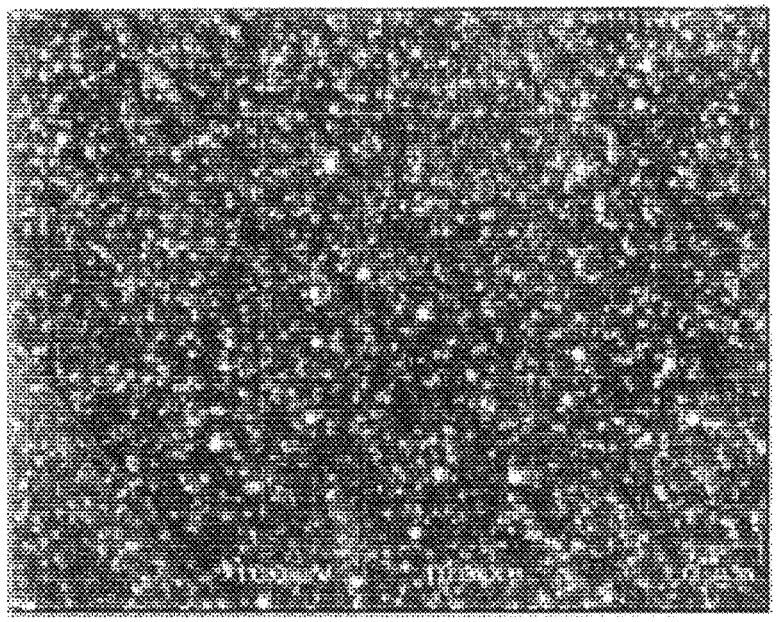
FIG. 45 is an SEM photograph showing a surface of an electrical conductive carbon layer in which electrical conductive grains (Au) are dispersed in a separator (1).
Figure 46:
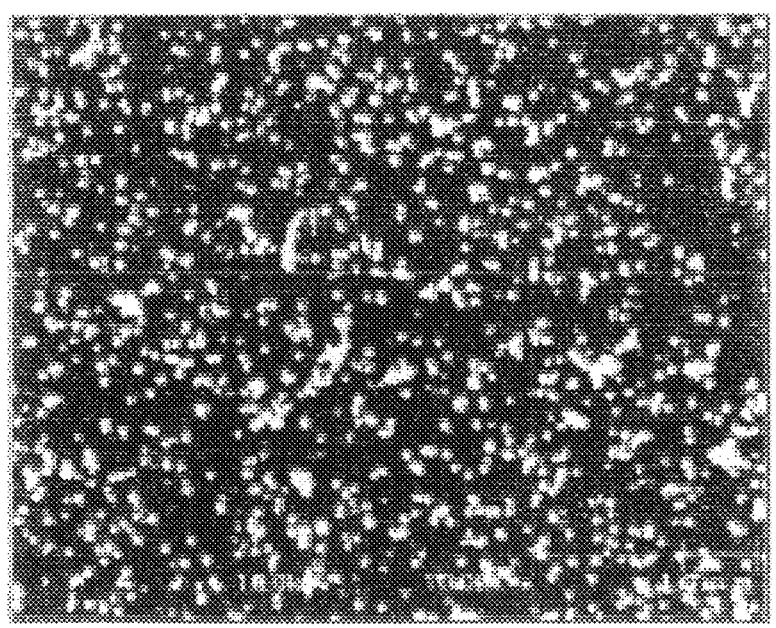
FIG. 46 is an SEM photograph showing a surface of an electrical conductive carbon layer in which electrical conductive grains (Au) are dispersed in a separator (2).

FIGS. 45 and 46 are SEM photographs showing the surfaces of the electrical conductive carbon layers of the separators (1) and (2) in which the electrical conductive grains (Au) were dispersed. As shown in FIGS. 45 and 46, it is recognized that the electrical conductive grains (Au) are uniformly dispersed in the surfaces of the electrical conductive carbon layers, respectively. In the other separators other than the separator (4) in which the electrical conductive grains or metal oxides were not dispersed, it is also recognized that the electrical conductive grains (Au) are uniformly dispersed in the surfaces of the electrical conductive carbon layers, respectively, as in the cases of FIGS. 45 and 46.

According to the SEM photographs, an average grain diameter of the dispersed grains (electrical conductive grains or metal oxides) present on the surface of each separator and an average distance between the dispersed grains were calculated.

In addition, an in-plane distribution of the elements present on the surface of the electrical conductive carbon layer was investigated by use of an EDX. Next, an area occupied by carbon was indicated by green, and an area occupied by the electrical conductive grains (Au) was indicated by red, so as to be binarized. Then, a ratio of the area occupied by red was calculated by image processing, thereby defining the ratio as a coverage (%). The grain diameter and coverage of the electrical conductive grains in each separator are shown in Table 6.

[Profile Analysis of Element Concentration by AES (Auger Electron Spectroscopy)]

Figure 47A:
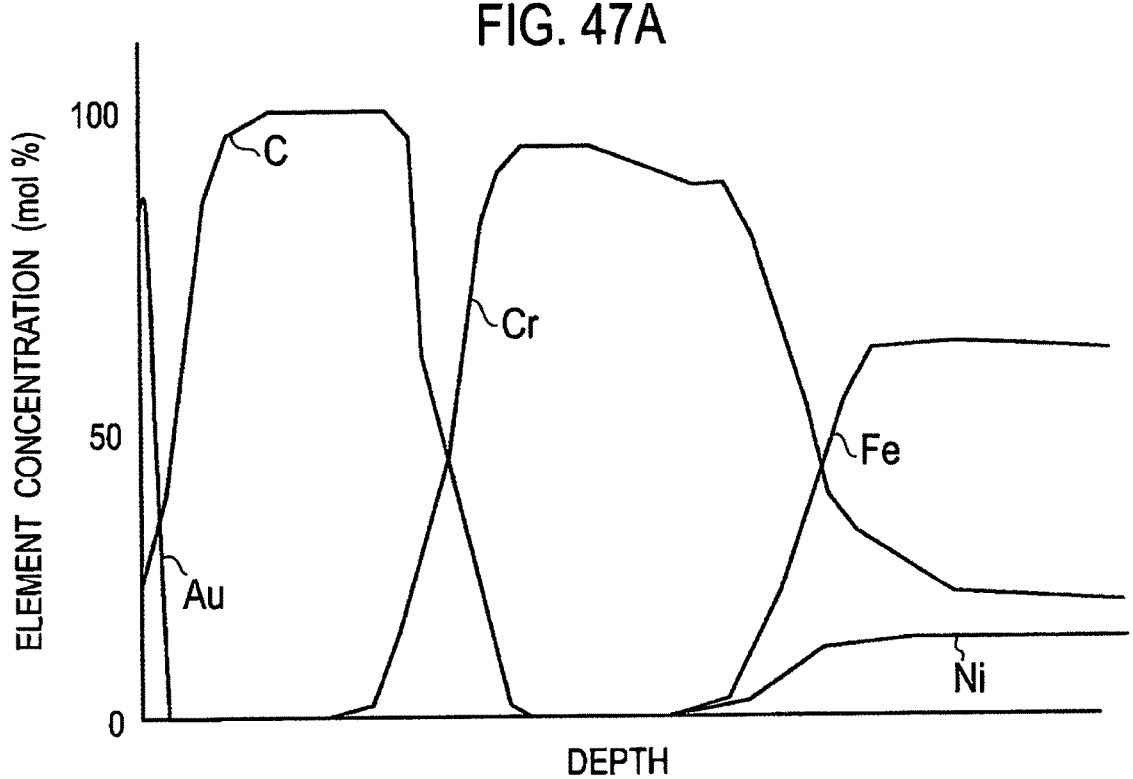
FIG. 47A is a view showing an element concentration profile in a stacking direction of a separator (2) measured by AES.
Figure 47B:
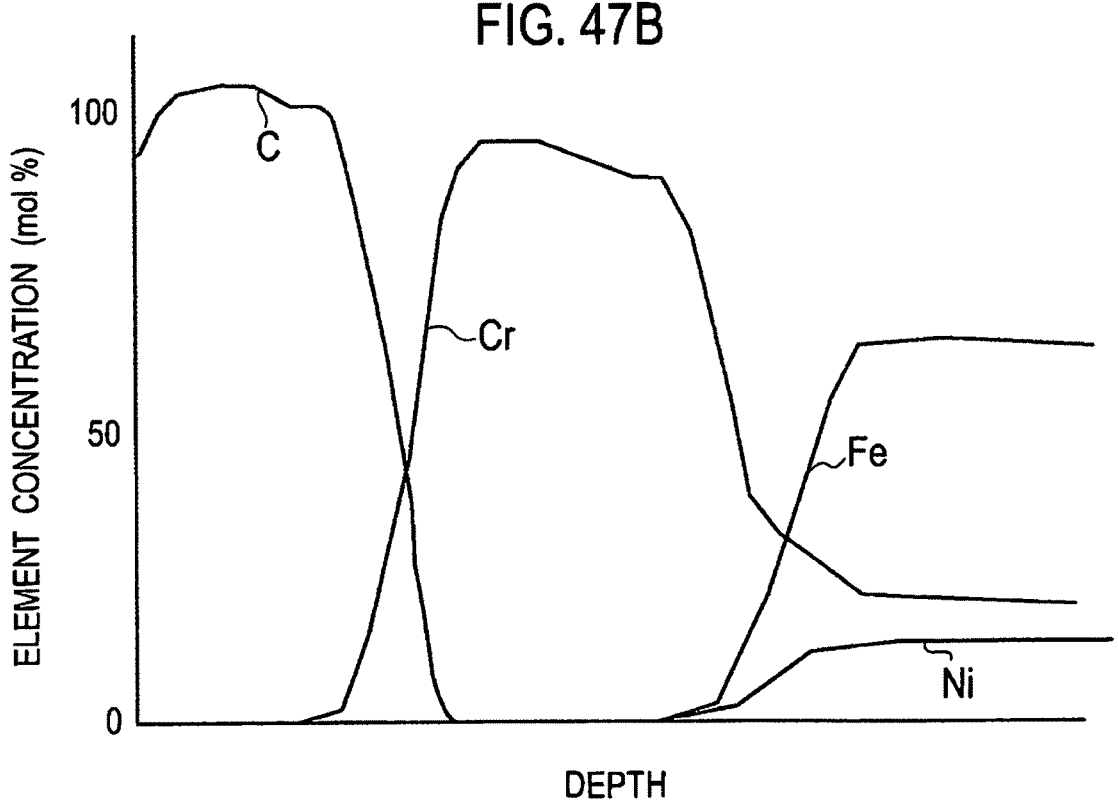
FIG. 47B is a view showing an element concentration profile in a stacking direction of a separator (4) measured by AES.

An element concentration profile in a stacking direction of the separator was measured by use of an AES with regard to the respective separators prepared in Example V-2 and Comparative Example V-1. FIGS. 47A and 47B show element distributions in a depth direction from the surfaces of the electrical conductive carbon layers of the separators (2) and (4), respectively. It is recognized that the electrical conductive grains (Au) are present in the surface layer of the electrical conductive carbon layer of the separator (2) of Example V-2, although there is no electrical conductive grain on the surface of the electrical conductive carbon layer of the separator (4) of Comparative Example V-1. Namely, there were the electrical conductive grains (Au) in the surface layer of the electrical conductive carbon layer (C). Note that, the AES measurement was performed under similar conditions to the examples in the third embodiment.

[Measurement of Contact Resistance]

With regard to the respective separators prepared in the examples and comparative examples, a contact resistance in a thickness direction of the separator was measured. As shown in FIG. 11, the prepared separator 5 was interposed between the pair of the gas diffusion layers 4a and 4b, the stacked body thus obtained was further interposed between the pair of the electrodes (catalyst layers 3a and 3b), and both ends thereof were connected to a power source and held while 1 MPa load was applied, so as to compose a measurement device. Carbon fiber (manufactured by Toray Industries, Inc., an average fiber diameter of 7 μm) was used for the gas diffusion layer. Then, constant current of 1 A was applied to the measurement device, and a contact resistance value of the stacked body was calculated according to a voltage value during the current application. The result thus obtained is shown in Table 6 below. Also, FIG. 48 shows a graph corresponding to the result with regard to the contact resistance shown in Table 6.

Figure 48:
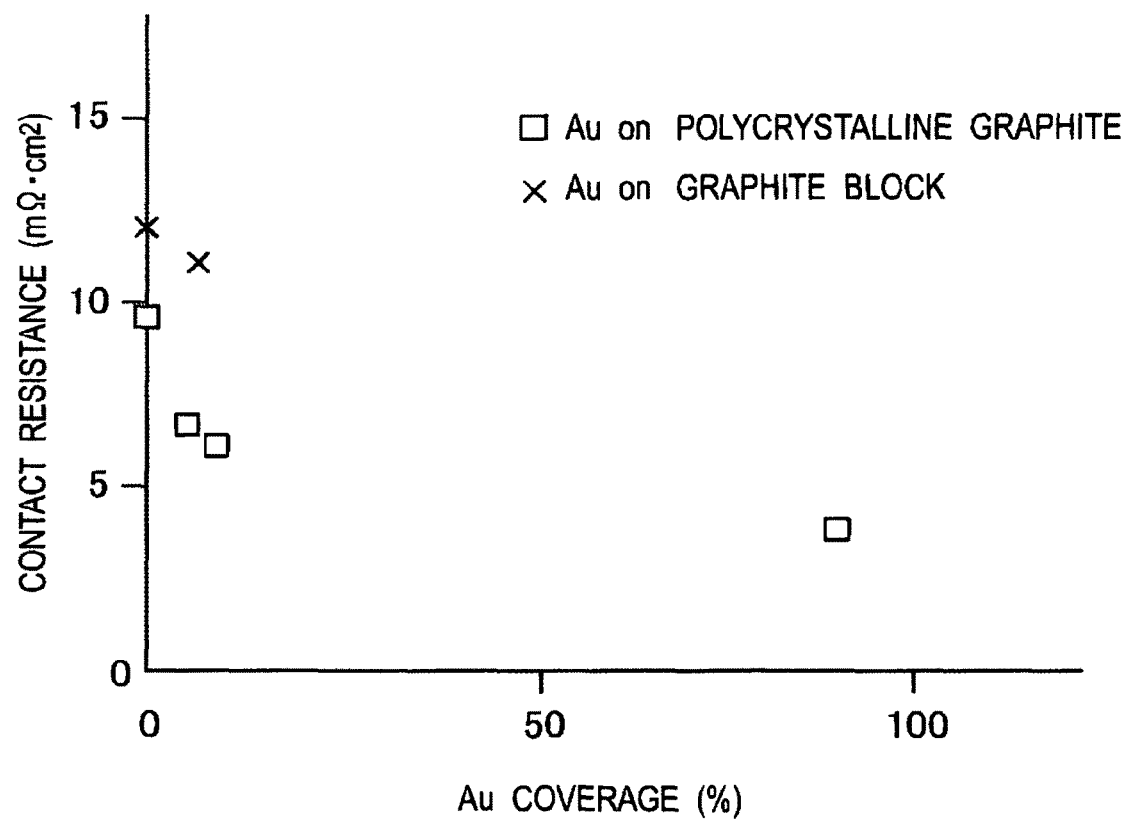
FIG. 48 is a graph showing a measurement result of a contact resistance with regard to separators prepared in examples and comparative examples.

As shown in Table 6 and FIG. 48, the separators prepared in Examples have smaller contact resistance values, respectively, compared with the separators prepared in Comparative Examples. When the coverage is 1% or more, the contact resistance is significantly decreased in the respective examples. Moreover, it is recognized, when the coverage is 10% or more, the contact resistance can be decreased to an extremely low level.

In addition, when polycrystalline graphite is used in the separators (Examples V-1 to V-3), it is recognized that the contact resistance can be significantly decreased with low coverage compared with the case of the separator using graphite block (Example V-4). When polycrystalline graphite is used in the separator, the contact points between the separator and the gas diffusion substrate can be increased since polycrystalline graphite has smaller surface roughness than graphite block. Therefore, it is assumed that the contact resistance in the separator is further decreased due to the increased contact points.

[Measurement of Contact Angle]

Figure 49:
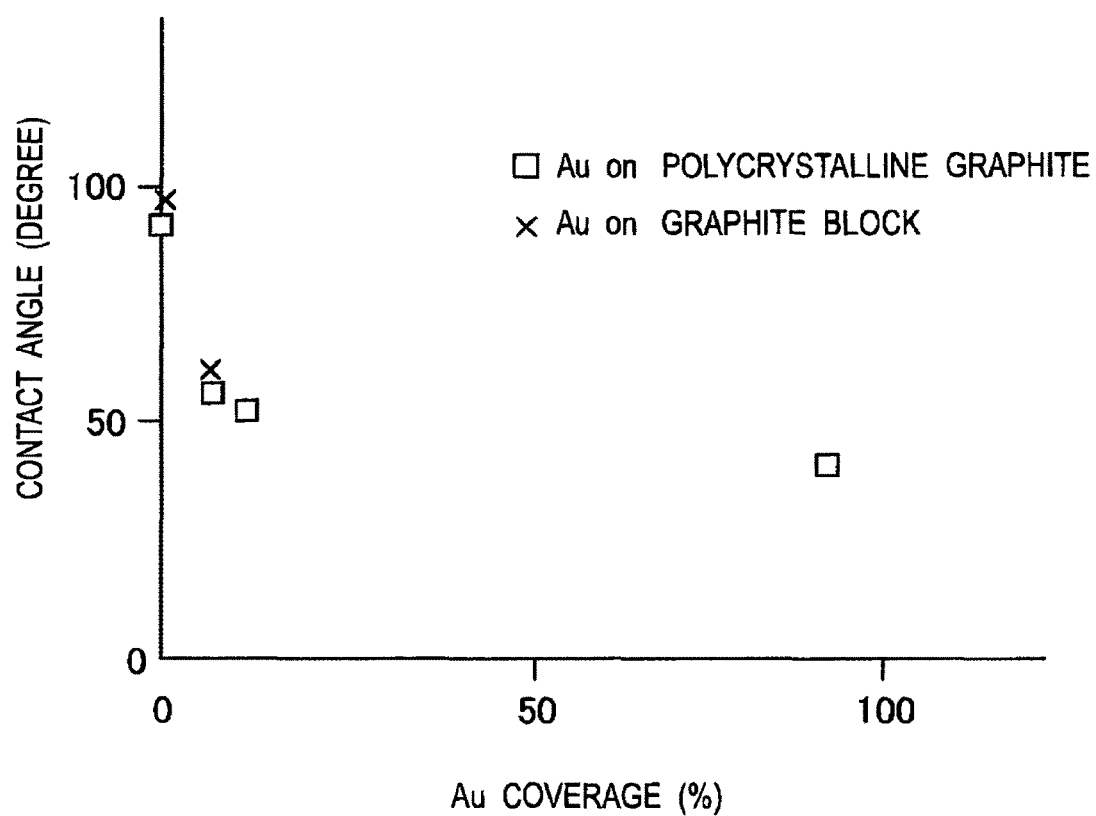
FIG. 49 is a graph showing a measurement result of a contact angle with regard to separators prepared in examples and comparative examples.

With regard to the respective separators (1) to (6) prepared in Examples and Comparative Examples, a water contact angle in the surface of the electrical conductive carbon layer in which the electrical conductive grains were dispersed was measured according to JIS K6768. The result thus obtained is shown in Table 6 below. Also, FIG. 49 shows a graph corresponding to the result with regard to the contact angle shown in Table 6.

According to the result, it is recognized that the water contact angle in the surface of the electrical conductive carbon layer is suppressed to 70 degrees or lower when the separators prepared in each example have 1% or more of the coverage, compared with the separators prepared in Comparative Examples. Further, it is recognized, when the coverage is 10% or more, the value of the contact angle is decreased so that hydrophilicity is greatly improved.

When polycrystalline graphite is used in the separator (Example V-1), it is recognized that the contact angle is suppressed to 70 degrees or lower with low coverage of approximately 4%. Even when graphite block is used in the separator (Example V-4), it is recognized that the contact angle is suppressed to 70 degrees or lower with low coverage of approximately 4%.

[R Value Measurement]

With regard to the respective separators prepared in Examples and Comparative Examples, an R value of the electrical conductive carbon layer was measured. Specifically, first, Raman spectrum of the electrical conductive carbon layer was measured by use of a Micro-Raman spectroscope. Then, a peak area ratio ($I_D/I_G$) of a peak intensity ($I_D$) of band (D-band) located at 1300 to 1400 cm$^{-1}$ to a peak intensity ($I_G$) of band (G-band) located at 1500 to 1600 cm$^{-1}$ was calculated to obtain the R value. The result thus obtained is shown in Table 6 below.

As shown in Table 6, the R values of the electrical conductive carbon layers in the respective separators prepared in Examples V-1 to V-3 and Comparative Example V-1 were all 1.3 or more. On the other hand, the R values of the electrical conductive carbon layers in the respective separators prepared in Example V-4 and Comparative Example V-2 were both less than 1.3. According to Table 6, when the separator prepared in Example V-1 having the R value of 1.3 or more was used, the contact resistance can be suppressed to a lower level compared with the separator in Example V-4 prepared under the similar conditions to Example V-1 other than the R value of less than 1.3.

TABLE 6

| | | Dispersed Grains | | | | Electrical Conductive | | |
|---|---|---|---|---|---|---|---|---|
| | Dispersing Method | Type | Average Grain Diameter (μm) | Average Distance Between Grains (μm) | Coverage (%) | Carbon Layer R Value | Contact Resistance (mΩ·cm²) | Contact Angle (°) |
| Example V-1 | UBMS | Au | 0.07 | 0.3 | 3.9 | 1.5 | 7.7 | 55 |
| Example V-2 | UBMS | Au | 0.15 | 0.8 | 11.0 | 1.5 | 7.3 | 48 |
| Example V-3 | UBMS | Au | *1 | *1 | 95.0 | 1.5 | 4.0 | 45 |
| Example V-4 | UBMS | Au | 0.07 | 0.3 | 4.1 | 1.1 | 12.5 | 65 |

TABLE 6-continued

| | Dispersed Grains | | | | | Electrical Conductive | | |
|---|---|---|---|---|---|---|---|---|
| | Dispersing Method | Type | Average Grain Diameter (μm) | Average Distance Between Grains (μm) | Coverage (%) | Carbon Layer R Value | Contact Resistance (mΩ·cm²) | Contact Angle (°) |
| Comparative Example V-1 | None | None | — | — | 0.0 | 1.5 | 9.8 | 93 |
| Comparative Example V-2 | None | None | — | — | 0.0 | 1.1 | 15.0 | 95 |

*1: The adjacent electrical conductive grains (Au) were bound together in the separator prepared in Example V-3 since the coverage was high. Thus, the separated grains could not be confirmed. Accordingly, the average grain diameter and the average distance between the grains could not be calculated.

The entire contents of Japanese Patent Application No. P2008-300133 (filed on Nov. 25, 2008), Japanese Patent Application No. P2008-301309 (filed on Nov. 26, 2008), Japanese Patent Application No. P2008-303217 (filed on Nov. 27, 2008), Japanese Patent Application No. P2008-303219 (filed on Nov. 27, 2008), Japanese Patent Application No. P2008-303223 (filed on Nov. 27, 2008) and Japanese Patent Application No. P2009-142600 (filed on Jun. 15, 2009) are herein incorporated by reference.

Although the present invention has been described above by reference to the embodiments and examples, the present invention is not limited to those embodiments and examples, and it will be apparent to these skilled in the art that various modifications and improvements can be made. Specifically, the configurations according to the first to fifth embodiments can be combined appropriately.

INDUSTRIAL APPLICABILITY

The electrical conductive member according to the present invention has a further improved corrosion resistance while excellent electrical conductivity is ensured sufficiently due to the provision of an electrical conductive path from one side to the other side of the electrical conductive carbon layer.

REFERENCE SIGNS LIST

1 Single cell
2 Polymer electrolyte membrane
3 Catalyst layer
4 Gas diffusion layer
5 Separator
6 Metal substrate
9 Membrane electrode assembly
20 Fuel cell stack
31 Metal substrate
32 Middle layer
33 Electrical conductive carbon layer

The invention claimed is:

1. An electrical conductive member comprising:
an electrical conductive structure comprising:
a substrate;
an electrical conductive carbon layer provided on at least one surface of the substrate and containing electrical conductive carbon; and
a middle layer interposed between the substrate and the electrical conductive carbon layer,
wherein an intensity ratio R ($I_D/I_G$) of a D-band peak intensity ($I_D$) to a G-band peak intensity ($I_G$) measured by a Raman scattering spectroscopic analysis in the electrical conductive carbon layer is between 1.4 and 1.9, and
the middle layer comprises columnar crystal grains, and protruded grains constituting the electrical conductive carbon layer arc on the middle layer.

2. The electrical conductive member according to claim 1, wherein an average peak measured by a rotational anisotropy measurement of the Raman scattering spectroscopic analysis in the electrical conductive carbon layer shows a twofold symmetry pattern.

3. The electrical conductive member according to claim 1, wherein the middle layer contains at least one material selected from the group consisting of chromium and titanium, and carbide and nitride thereof, and
the substrate contains at least one material selected from the group consisting of iron, titanium, copper and aluminum, and an alloy thereof.

4. The electrical conductive member according to claim 1, wherein a width of a columnar crystal grain in a cross-section of the middle layer is between 20 nm and 500 nm, and
a Vickers hardness Hv of the electrical conductive carbon layer is 1500 or less.

5. The electrical conductive member according to claim 1, further comprising:
a dense barrier layer interposed between the middle layer and the substrate constituted by a metal plate,
wherein the dense barrier layer has lower crystalline orientation than the middle layer, and a ratio ($D_2/D_1$) of an average crystalline diameter ($D_2$) of the dense barrier layer to an average crystalline diameter ($D_1$) of the middle layer is 0.1 or more to less than 1.

6. The electrical conductive member according to claim 1, further comprising:
an electrical conductive reinforcing layer containing electrical conductive grains and interposed between the middle layer and the substrate constituted by a metal plate,
wherein the electrical conductive grains contain at least one material selected from the group consisting of a noble metal, an alloy containing the noble metal, and carbon.

7. The electrical conductive member according to claim 6, wherein an average grain diameter of the electrical conductive grains is not less than a thickness of an oxide film made of a metal constituting the substrate or a material constituting the middle layer.

8. The electrical conductive member according to claim 6, wherein the electrical conductive reinforcing layer and the middle layer include a columnar material having a plurality of columnar compositions provided in a thickness direction of the substrate, and the electrical conductive grains are provided at least on a surface of the columnar material in the electrical conductive reinforcing layer and at an interface between the substrate and the electrical conductive reinforcing layer.

9. The electrical conductive member according to claim 1, further comprising:
a hydrophilic layer provided on the electrical conductive carbon layer and containing at least one material selected from the group consisting of a metal, metal nitride, metal carbide, and metal oxide,
wherein the substrate is constituted by a porous material.

10. The electrical conductive member according to claim 9, wherein the porous material contains at least one material selected from the group consisting of carbon fiber, metal fiber and organic fiber, and
the carbon fiber is polyacrylonitrile or pitch carbon fiber, and is a carbonized fiber not containing graphitized fiber.

11. The electrical conductive member according to claim 1, further comprising:
a gas diffusion layer for a fuel cell which includes a gas diffusion substrate having a plurality of pores and is stacked so as to face the electrical conductive carbon layer,
wherein the electrical conductive structure is a separator for a fuel cell,
electrical-conductive hydrophilic grains are dispersed in an area located on a surface of the electrical conductive carbon layer and being in contact with the gas diffusion layer, and
a grain diameter of the electrical-conductive hydrophilic grains and a distance between the electrical-conductive hydrophilic grains are each not more than a distance between the pores of the gas diffusion substrate.

12. The electrical conductive member according to claim 11, wherein the gas diffusion substrate is constituted by carbon fiber, and
the grain diameter of the electrical-conductive hydrophilic grains and the distance between the electrical-conductive hydrophilic grains are each not more than a diameter of the carbon fiber.

13. The electrical conductive member according to claim 11, wherein the electrical-conductive hydrophilic grains contain at least one material selected from the group consisting of a noble metal, an alloy containing the noble metal, a electrical conductive nitride, and an electrical conductive oxide.

14. A polymer electrolyte fuel cell comprising the electrical conductive member according to claim 1.

* * * * *